(12) United States Patent
Van Os et al.

(10) Patent No.: US 11,703,996 B2
(45) Date of Patent: Jul. 18, 2023

(54) USER INPUT INTERFACES

(71) Applicant: Apple Inc., Cupertino, CA (US)

(72) Inventors: Marcel Van Os, Santa Cruz, CA (US); Kristin Michele Canavan, San Francisco, CA (US); Bryant A. Jow, San Mateo, CA (US); Aram D. Kudurshian, San Francisco, CA (US); Pavel Pivonka, San Francisco, CA (US); Brandon Walkin, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/826,808

(22) Filed: May 27, 2022

(65) Prior Publication Data
US 2022/0291813 A1   Sep. 15, 2022

Related U.S. Application Data

(63) Continuation of application No. 17/129,027, filed on Dec. 21, 2020, now Pat. No. 11,409,410.

(60) Provisional application No. 63/078,317, filed on Sep. 14, 2020.

(51) Int. Cl.
| G06F 3/04817 | (2022.01) |
| G06F 21/32 | (2013.01) |
| G06F 1/3212 | (2019.01) |
| G06F 9/54 | (2006.01) |
| G06F 3/0488 | (2022.01) |

(52) U.S. Cl.
CPC ........ *G06F 3/04817* (2013.01); *G06F 1/3212* (2013.01); *G06F 3/0488* (2013.01); *G06F 9/542* (2013.01); *G06F 21/32* (2013.01)

(58) Field of Classification Search
CPC .................................................. G06F 3/04817
See application file for complete search history.

(56) References Cited

U.S. PATENT DOCUMENTS

| 6,459,424 B1 | 10/2002 | Resman |
| 7,030,861 B1 | 4/2006 | Westerman et al. |
| 7,363,593 B1 | 4/2008 | Loyens et al. |
| 7,474,772 B2 | 1/2009 | Russo et al. |
| 7,590,269 B2 | 9/2009 | Creasey et al. |
| 7,631,255 B2 | 12/2009 | Weise et al. |

(Continued)

FOREIGN PATENT DOCUMENTS

| CN | 1766904 A | 5/2006 |
| CN | 1918537 A | 2/2007 |

(Continued)

OTHER PUBLICATIONS

Advisory Action received for U.S. Appl. No. 14/402,087, dated Jul. 9, 2018, 3 pages.

(Continued)

*Primary Examiner* — Roland J Casillas
(74) *Attorney, Agent, or Firm* — DLA Piper LLP (US)

(57) ABSTRACT

The present disclosure generally relates to managing user inputs. In some examples, devices receive user inputs via a biometric sensor, such as a fingerprint sensor. In some examples, devices receive user inputs via a button. In some examples, devices receive user inputs via touch sensors. In some examples, the biometric sensor and/or the touch sensor is integrated into the button.

24 Claims, 69 Drawing Sheets

(56) References Cited

U.S. PATENT DOCUMENTS

| | | |
|---|---|---|
| 7,725,511 B2 | 5/2010 | Kadi |
| 7,847,787 B1 | 12/2010 | Boillot |
| 8,023,700 B2 | 9/2011 | Riionheimo et al. |
| 8,175,345 B2 | 5/2012 | Gardner |
| 8,291,350 B1 | 10/2012 | Park et al. |
| 8,358,200 B2 | 1/2013 | Madhvanath et al. |
| 8,438,487 B1 | 5/2013 | Lin-hendel |
| 8,443,199 B2 | 5/2013 | Kim et al. |
| 8,464,181 B1 | 6/2013 | Bailiang et al. |
| 8,702,513 B2 | 4/2014 | Lim |
| 8,878,879 B2 | 11/2014 | Lee et al. |
| 8,938,101 B2 | 1/2015 | Uy |
| 9,035,891 B2 | 5/2015 | Deluca |
| 9,141,259 B2 | 9/2015 | Bell et al. |
| 9,152,241 B2 | 10/2015 | Zlotnicki |
| 9,152,317 B2 | 10/2015 | Larco et al. |
| 9,201,539 B2 | 12/2015 | Hinckley et al. |
| 9,201,585 B1 | 12/2015 | Karakotsios et al. |
| 9,218,124 B2 | 12/2015 | Matsuda |
| 9,348,987 B2 | 5/2016 | Boshra |
| 9,369,657 B2 | 6/2016 | Lee |
| 9,626,099 B2 | 4/2017 | Michaelis et al. |
| 9,648,279 B2 | 5/2017 | Shen et al. |
| 9,684,444 B2 | 6/2017 | Lazaridis et al. |
| 9,705,676 B2 | 7/2017 | Quirk et al. |
| 9,785,330 B1 | 10/2017 | Yang et al. |
| 9,785,341 B2 | 10/2017 | Stallings et al. |
| 10,031,586 B2 | 7/2018 | Touloumtzis |
| 2002/0130841 A1 | 9/2002 | Scott et al. |
| 2002/0163506 A1 | 11/2002 | Adams et al. |
| 2002/0190960 A1 | 12/2002 | Kuo et al. |
| 2003/0048260 A1 | 3/2003 | Matusis et al. |
| 2003/0197740 A1 | 10/2003 | Reponen |
| 2003/0224848 A1 | 12/2003 | Baerlocher et al. |
| 2004/0085300 A1 | 5/2004 | Matusis et al. |
| 2004/0208348 A1 | 10/2004 | Baharav et al. |
| 2004/0239648 A1 | 12/2004 | Abdallah et al. |
| 2005/0052427 A1 | 3/2005 | Wu et al. |
| 2005/0078855 A1 | 4/2005 | Chandler et al. |
| 2005/0114796 A1 | 5/2005 | Bast |
| 2005/0169503 A1 | 8/2005 | Howell et al. |
| 2005/0174325 A1 | 8/2005 | Setlak et al. |
| 2006/0085115 A1 | 4/2006 | Ilan et al. |
| 2006/0101281 A1 | 5/2006 | Zhang et al. |
| 2006/0252486 A1 | 11/2006 | Walker et al. |
| 2007/0061126 A1 | 3/2007 | Russo et al. |
| 2007/0106942 A1 | 5/2007 | Sanaka et al. |
| 2007/0177803 A1 | 8/2007 | Elias et al. |
| 2007/0177804 A1 | 8/2007 | Elias et al. |
| 2007/0217662 A1 | 9/2007 | Matsunaga et al. |
| 2007/0236477 A1 | 10/2007 | Ryu et al. |
| 2007/0273658 A1 | 11/2007 | Yli-Nokari et al. |
| 2007/0287540 A1 | 12/2007 | Kiran et al. |
| 2007/0291018 A1 | 12/2007 | Park et al. |
| 2008/0042983 A1 | 2/2008 | Kim et al. |
| 2008/0063245 A1 | 3/2008 | Benkley et al. |
| 2008/0084400 A1 | 4/2008 | Rosenberg |
| 2008/0089587 A1 | 4/2008 | Kim et al. |
| 2008/0163131 A1 | 7/2008 | Hirai et al. |
| 2008/0165255 A1 | 7/2008 | Christie et al. |
| 2008/0168403 A1 | 7/2008 | Westerman et al. |
| 2008/0178126 A1 | 7/2008 | Beeck et al. |
| 2008/0235627 A1 | 9/2008 | Torning et al. |
| 2008/0240523 A1 | 10/2008 | Benkley et al. |
| 2008/0320419 A1 | 12/2008 | Matas et al. |
| 2009/0028395 A1 | 1/2009 | Riionheimo |
| 2009/0058595 A1 | 3/2009 | Mainguet et al. |
| 2009/0083847 A1 | 3/2009 | Fadell et al. |
| 2009/0083850 A1 | 3/2009 | Fadell et al. |
| 2009/0102604 A1 | 4/2009 | Madhvanath et al. |
| 2009/0125296 A1 | 5/2009 | Imlach et al. |
| 2009/0141046 A1 | 6/2009 | Rathnam et al. |
| 2009/0141951 A1 | 6/2009 | Ogo et al. |
| 2009/0158203 A1 | 6/2009 | Kerr et al. |
| 2009/0169070 A1 | 7/2009 | Fadell |
| 2009/0178007 A1 | 7/2009 | Matas et al. |
| 2009/0184921 A1 | 7/2009 | Scott et al. |
| 2009/0224874 A1 | 9/2009 | Dewar et al. |
| 2009/0244019 A1 | 10/2009 | Choi et al. |
| 2010/0027854 A1 | 2/2010 | Chatterjee et al. |
| 2010/0044121 A1 | 2/2010 | Simon et al. |
| 2010/0058252 A1 | 3/2010 | Ko |
| 2010/0110025 A1 | 5/2010 | Lim et al. |
| 2010/0125786 A1 | 5/2010 | Ozawa et al. |
| 2010/0141574 A1 | 6/2010 | Jung et al. |
| 2010/0164864 A1 | 7/2010 | Chou et al. |
| 2010/0180136 A1 | 7/2010 | Thompson et al. |
| 2010/0201636 A1 | 8/2010 | Kikin-Gil |
| 2010/0220900 A1 | 9/2010 | Orsley et al. |
| 2010/0225607 A1 | 9/2010 | Kim |
| 2010/0231356 A1 | 9/2010 | Kim |
| 2010/0237991 A1 | 9/2010 | Prabhu et al. |
| 2010/0240415 A1 | 9/2010 | Kim et al. |
| 2010/0265204 A1 | 10/2010 | Tsuda |
| 2010/0295772 A1 | 11/2010 | Alameh et al. |
| 2010/0299638 A1 | 11/2010 | Choi |
| 2010/0318905 A1 | 12/2010 | Rakesh |
| 2011/0010672 A1 | 1/2011 | Hope |
| 2011/0022307 A1 | 1/2011 | Lee |
| 2011/0039602 A1 | 2/2011 | Mcnamara et al. |
| 2011/0041096 A1 | 2/2011 | Larco et al. |
| 2011/0043472 A1 | 2/2011 | Hada |
| 2011/0057953 A1 | 3/2011 | Horodezky |
| 2011/0080359 A1 | 4/2011 | Jang et al. |
| 2011/0096087 A1 | 4/2011 | Chun |
| 2011/0102567 A1 | 5/2011 | Erhart |
| 2011/0124376 A1 | 5/2011 | Kim et al. |
| 2011/0163969 A1 | 7/2011 | Freddy et al. |
| 2011/0169743 A1 | 7/2011 | Oh et al. |
| 2011/0169760 A1 | 7/2011 | Largillier |
| 2011/0175807 A1 | 7/2011 | Grover et al. |
| 2011/0179368 A1 | 7/2011 | King et al. |
| 2011/0179387 A1 | 7/2011 | Shaffer et al. |
| 2011/0209088 A1 | 8/2011 | Hinckley et al. |
| 2011/0209099 A1 | 8/2011 | Hinckley et al. |
| 2011/0252381 A1 | 10/2011 | Chaudhri |
| 2011/0273267 A1 | 11/2011 | Bong |
| 2011/0287741 A1 | 11/2011 | Prabhu |
| 2011/0291945 A1 | 12/2011 | Ewing et al. |
| 2011/0296351 A1 | 12/2011 | Ewing et al. |
| 2012/0007713 A1 | 1/2012 | Nasiri et al. |
| 2012/0011437 A1 | 1/2012 | James et al. |
| 2012/0019562 A1 | 1/2012 | Park et al. |
| 2012/0023453 A1 | 1/2012 | Wagner |
| 2012/0026117 A1 | 2/2012 | Schneider et al. |
| 2012/0030624 A1 | 2/2012 | Migos |
| 2012/0036434 A1 | 2/2012 | Oberstein |
| 2012/0044156 A1 | 2/2012 | Michaelis et al. |
| 2012/0084737 A1 | 4/2012 | Gimpl et al. |
| 2012/0098766 A1 | 4/2012 | Dippel et al. |
| 2012/0105081 A1 | 5/2012 | Shaikh et al. |
| 2012/0127179 A1 | 5/2012 | Aspelin |
| 2012/0147052 A1 | 6/2012 | Homma et al. |
| 2012/0148115 A1 | 6/2012 | Birdwell et al. |
| 2012/0154303 A1 | 6/2012 | Lazaridis et al. |
| 2012/0162112 A1 | 6/2012 | Cho |
| 2012/0167003 A1 | 6/2012 | Johansson |
| 2012/0182253 A1 | 7/2012 | Brosnan et al. |
| 2012/0182296 A1 | 7/2012 | Han |
| 2012/0206353 A1 | 8/2012 | Chang et al. |
| 2012/0226979 A1 | 9/2012 | Harberts et al. |
| 2012/0280927 A1 | 11/2012 | Ludwig |
| 2013/0054652 A1 | 2/2013 | Antonelli et al. |
| 2013/0063362 A1 | 3/2013 | Papakipos et al. |
| 2013/0063488 A1 | 3/2013 | Gaebler et al. |
| 2013/0093685 A1 | 4/2013 | Kalu et al. |
| 2013/0093687 A1 | 4/2013 | Papakipos et al. |
| 2013/0120279 A1 | 5/2013 | Plichta et al. |
| 2013/0127592 A1 | 5/2013 | Fyke et al. |
| 2013/0129162 A1 | 5/2013 | Cheng et al. |
| 2013/0173925 A1 | 7/2013 | Yen et al. |
| 2013/0201155 A1 | 8/2013 | Wu et al. |
| 2013/0215040 A1 | 8/2013 | Bose et al. |
| 2013/0219340 A1 | 8/2013 | Linge |

(56) References Cited

U.S. PATENT DOCUMENTS

| | | | |
|---|---|---|---|
| 2013/0222274 A1 | 8/2013 | Mori et al. | |
| 2013/0257758 A1 | 10/2013 | Huang | |
| 2013/0278383 A1 | 10/2013 | Boshra | |
| 2013/0307788 A1 | 11/2013 | Rao et al. | |
| 2013/0324089 A1 | 12/2013 | Kim et al. | |
| 2014/0003678 A1 | 1/2014 | Vieta et al. | |
| 2014/0219520 A1 | 8/2014 | Myers | |
| 2015/0131878 A1* | 5/2015 | Kim | G06V 40/1347 382/125 |
| 2015/0135108 A1 | 5/2015 | Pope et al. | |
| 2016/0171280 A1 | 6/2016 | Han et al. | |
| 2016/0299556 A1 | 10/2016 | Jueng et al. | |
| 2016/0306491 A1 | 10/2016 | Lee et al. | |
| 2017/0242993 A1 | 8/2017 | Hama et al. | |
| 2018/0067596 A1 | 3/2018 | Wells et al. | |
| 2018/0173930 A1* | 6/2018 | Han | G06V 40/1353 |
| 2019/0080072 A1* | 3/2019 | Van Os | G06F 3/016 |
| 2019/0138194 A1 | 5/2019 | Ryan | |
| 2019/0213384 A1 | 7/2019 | Lu et al. | |
| 2020/0342081 A1 | 10/2020 | Nam et al. | |
| 2021/0112422 A1 | 4/2021 | Epstein | |
| 2022/0066604 A1 | 3/2022 | Pope | |
| 2022/0083199 A1 | 3/2022 | Van Os et al. | |

FOREIGN PATENT DOCUMENTS

| | | |
|---|---|---|
| CN | 101410781 A | 4/2009 |
| CN | 101448056 A | 6/2009 |
| CN | 101853379 A | 10/2010 |
| CN | 201765630 U | 3/2011 |
| CN | 102754062 A | 10/2012 |
| EP | 2076000 A2 | 7/2009 |
| JP | 2002-269046 A | 9/2002 |
| JP | 2003-509775 A | 3/2003 |
| JP | 2003-298689 A | 10/2003 |
| JP | 2004-151862 A | 5/2004 |
| JP | 2004-172851 A | 6/2004 |
| JP | 2004-297468 A | 10/2004 |
| JP | 2005-275488 A | 10/2005 |
| JP | 2006-92428 A | 4/2006 |
| JP | 2006-119920 A | 5/2006 |
| JP | 2006-301785 A | 11/2006 |
| JP | 2007-179213 A | 7/2007 |
| JP | 2008-186320 A | 8/2008 |
| JP | 2010-146301 A | 7/2010 |
| JP | 2011-229141 A | 11/2011 |
| JP | 2012-68778 A | 4/2012 |
| KR | 10-2003-0005535 A | 1/2003 |
| KR | 10-2010-0059698 A | 6/2010 |
| WO | 2005/064447 A2 | 7/2005 |
| WO | 2007/089766 A2 | 8/2007 |
| WO | 2009/085338 A2 | 7/2009 |
| WO | 2011/084856 A1 | 7/2011 |
| WO | 2011/099803 A2 | 8/2011 |
| WO | 2011/103218 A2 | 8/2011 |
| WO | 2011/126502 A1 | 10/2011 |
| WO | 2012/054350 A1 | 4/2012 |
| WO | 2012/068551 A1 | 5/2012 |
| WO | 2012/117652 A1 | 9/2012 |

OTHER PUBLICATIONS

Advisory Action received for U.S. Appl. No. 14/402,087, dated Jun. 29, 2020, 4 pages.
Brief Communication Regarding Oral Proceedings received for European Patent Application No. 13726969.2, mailed on Nov. 23, 2020, 8 pages.
Corrected Notice of Allowance received for U.S. Appl. No. 17/129,027, dated May 11, 2022, 6 pages.
Decision to Refuse received for European Patent Application No. 13726969.2, dated Feb. 22, 2021, 14 pages.
Final Office Action received for U.S. Appl. No. 14/402,087, dated Apr. 15, 2021, 34 pages.
Final Office Action received for U.S. Appl. No. 14/402,087, dated Jul. 10, 2019, 36 pages.
Final Office Action received for U.S. Appl. No. 14/402,087, dated Mar. 27, 2018, 27 pages.
International Search Report and Written Opinion received for PCT Patent Application No. PCT/US2021/048477, dated Apr. 20, 2022, 29 pages.
Invitation to Pay Additional Fees and Partial International Search Report received for PCT Patent Application No. PCT/US2021/048477, dated Feb. 1, 2022, 16 pages.
Non-Final Office Action received for U.S. Appl. No. 14/402,087, dated Jun. 8, 2017, 13 pages.
Non-Final Office Action received for U.S. Appl. No. 14/402,087, dated Nov. 2, 2018, 32 pages.
Non-Final Office Action received for U.S. Appl. No. 14/402,087, dated Oct. 5, 2020, 26 pages.
Non-Final Office Action received for U.S. Appl. No. 17/525,445, dated May 2, 2022, 21 pages.
Notice of Acceptance received for Australian Patent Application No. 2018204174, dated Oct. 24, 2019, 3 pages.
Notice of Acceptance received for Australian Patent Application No. 2020200397, dated Mar. 1, 2021, 3 pages.
Notice of Allowance received for Brazilian Patent Application No. BR112014028774-0, dated Mar. 22, 2022, 3 pages.
Notice of Allowance received for Chinese Patent Application No. 201380037829.2, dated Dec. 3, 2019, 2 pages.
Notice of Allowance received for Chinese Patent Application No. 202010079275.4, dated Mar. 30, 2021, 2 pages.
Notice of Allowance received for Japanese Patent Application No. 2015-512913, dated Sep. 9, 2016, 3 pages.
Notice of Allowance received for Japanese Patent Application No. 2016-199379, dated May 25, 2018, 4 pages.
Notice of Allowance received for U.S. Appl. No. 14/402,087, dated Aug. 24, 2021, 10 pages.
Notice of Allowance received for U.S. Appl. No. 14/402,087, dated Sep. 16, 2021, 4 pages.
Notice of Allowance received for U.S. Appl. No. 17/129,027, dated Jan. 5, 2022, 11 pages.
Notice of Allowance received for U.S. Appl. No. 17/129,027, dated Jun. 8, 2022, 10 pages.
Notice of Allowance received for U.S. Appl. No. 17/129,027, dated Mar. 21, 2022, 10 pages.
Office Action received for Australian Patent Application No. 2013262488, dated Aug. 28, 2015, 5 pages.
Office Action received for Australian Patent Application No. 2016219716, dated Jun. 7, 2018, 3 pages.
Office Action received for Australian Patent Application No. 2016219716, dated Jun. 9, 2017, 3 pages.
Office Action received for Australian Patent Application No. 2016219716, dated May 10, 2018, 4 pages.
Office Action received for Australian Patent Application No. 2018204174, dated Feb. 27, 2019, 8 pages.
Office Action received for Australian Patent Application No. 2020200397, dated Aug. 28, 2020, 10 pages.
Office Action received for Brazilian Patent Application No. BR112014028774-0, dated Jan. 3, 2020, 6 pages.
Office Action received for Brazilian Patent Application No. BR112014028774-0, dated Nov. 8, 2021, 6 pages.
Office Action received for Chinese Patent Application No. 201380037829.2, dated Dec. 5, 2018, 14 pages.
Office Action received for Chinese Patent Application No. 201380037829.2, dated Jul. 3, 2019, 6 pages.
Office Action received for Chinese Patent Application No. 202010079275.4, dated Dec. 3, 2020, 12 pages.
Office Action received for European Patent Application No. 13726969.2, dated Sep. 6, 2018, 6 pages.
Office Action received for Japanese Patent Application No. 2015-512913, dated Feb. 26, 2016, 7 pages.
Office Action received for Japanese Patent Application No. 2016-199379, dated Aug. 25, 2017, 9 pages.
Office Action received for Japanese Patent Application No. 2018-120019, dated Apr. 6, 2020, 8 pages.

(56) References Cited

OTHER PUBLICATIONS

Office Action received for Japanese Patent Application No. 2018-120019, dated May 17, 2019, 8 pages.
Office Action received for Japanese Patent Application No. 2020-128391, dated Jul. 26, 2021, 6 pages.
Office Action received for Korean Patent Application No. 10-2014-7035557, dated Feb. 16, 2016, 10 pages.
Summons to Attend Oral Proceedings received for European Patent Application No. 137269692, mailed on Jul. 14, 2020, 8 pages.
International Preliminary Report on Patentability received for PCT Patent Application No. PCT/US2013/041868, dated, Nov. 27, 2014, 6 pages.
Written Opinion received for PCT Patent Application No. PCT/US2013/041868, dated Nov. 27, 2014, 4 pages.
Office Action received for Japanese Patent Application No. 2020-128391, dated Jun. 10, 2022, 7 pages (3 pages of English Translation and 4 pages of Official Copy).
Examiner's Pre-Review Report received for Japanese Patent Application No. 2020-128391, dated Nov. 24, 2022, 3 pages (1 page of English Translation and 2 pages of Official Copy).
Final Office Action received for U.S. Appl. No. 17/525,445, dated Nov. 16, 2022, 17 pages.
International Preliminary Report on Patentability received for PCT Patent Application No. PCT/US2021/048477, dated Mar. 23, 2023, 22 pages.

\* cited by examiner

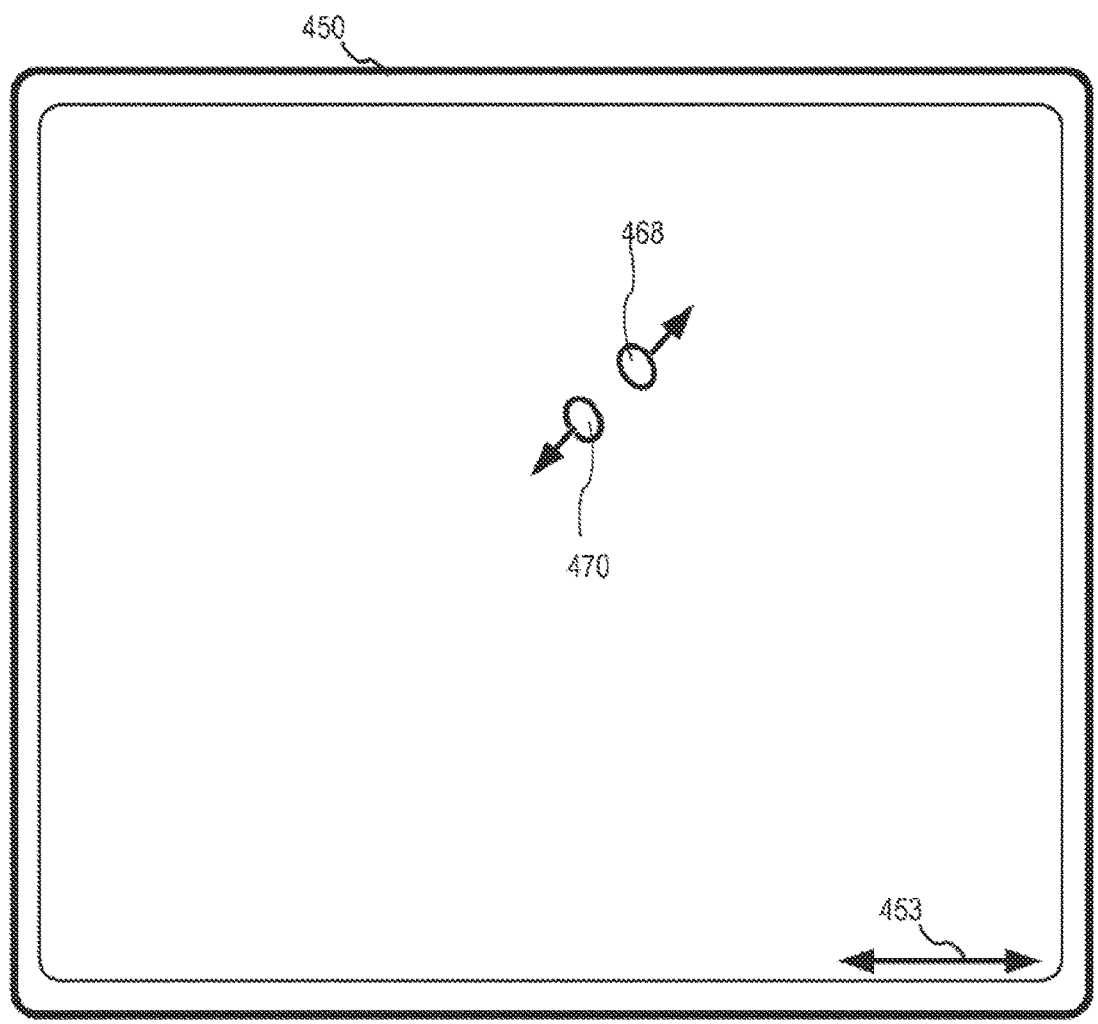
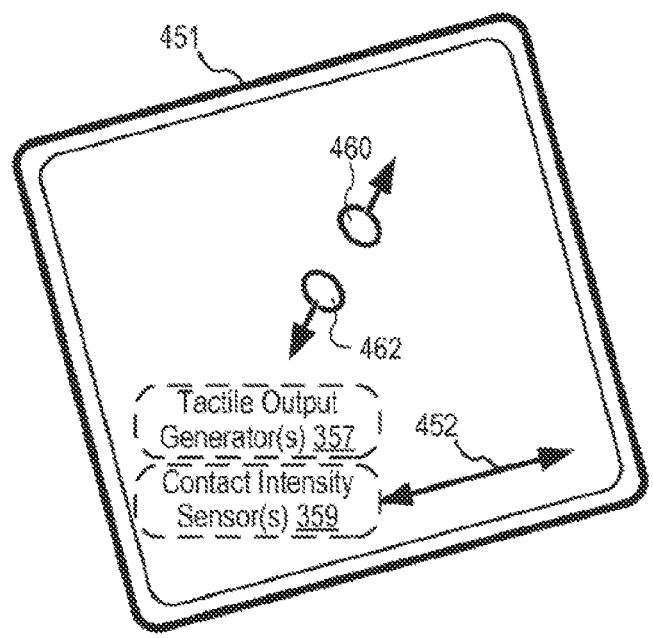
FIG. 4B

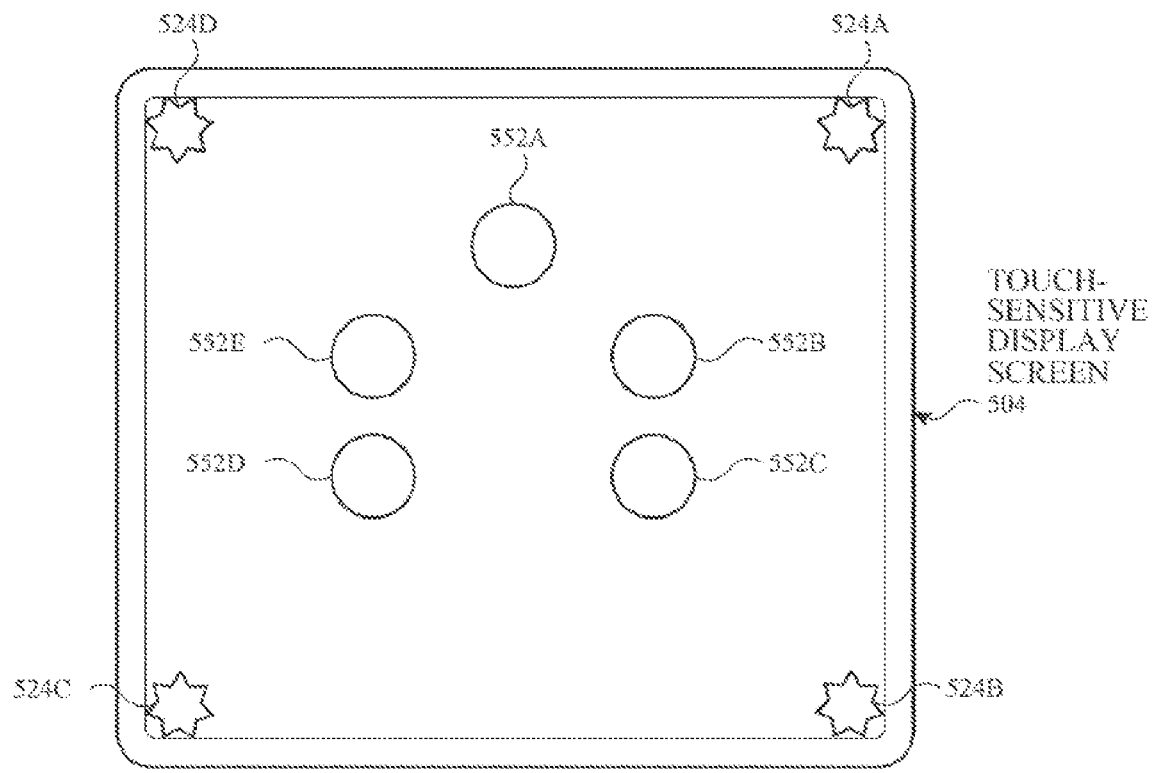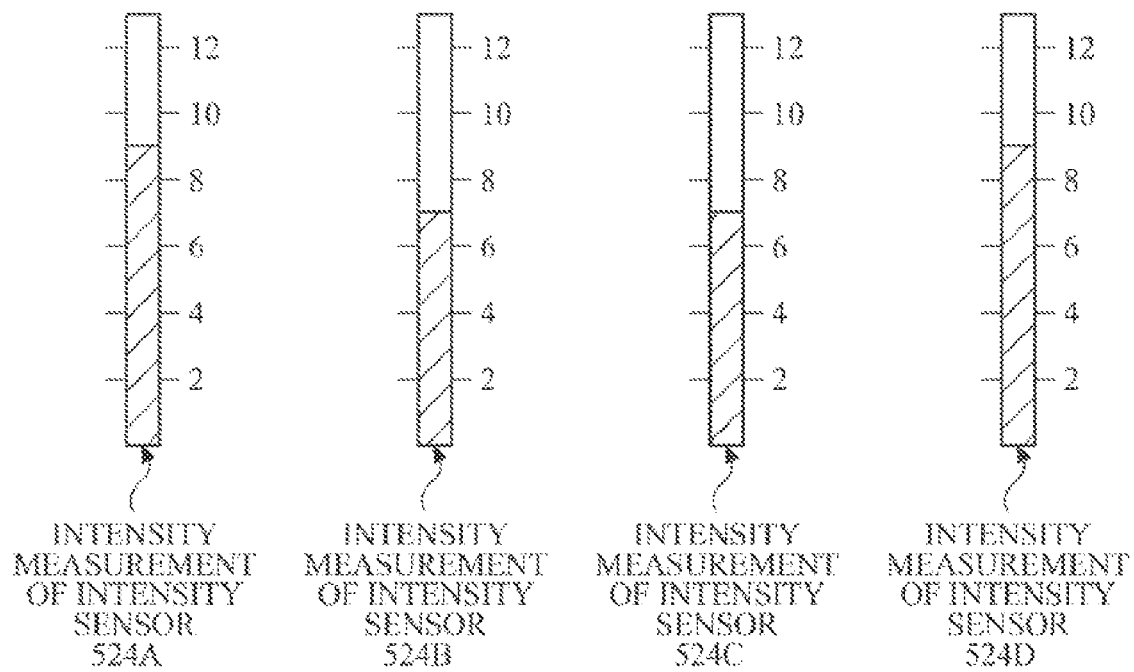
FIG. 5C

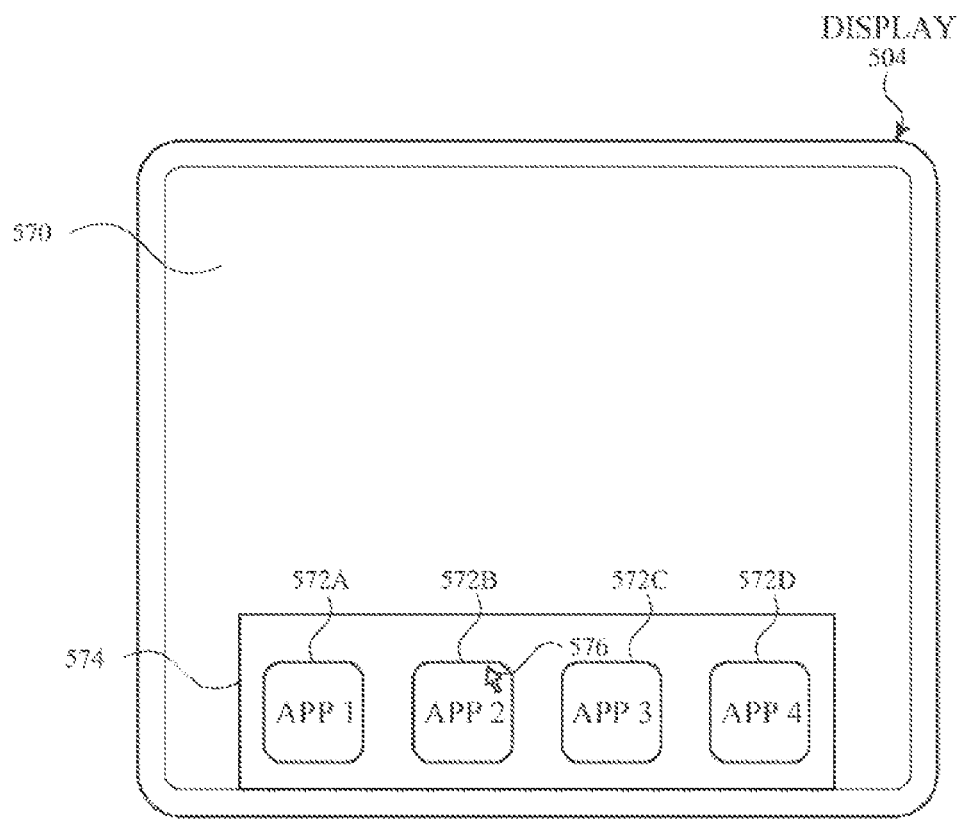
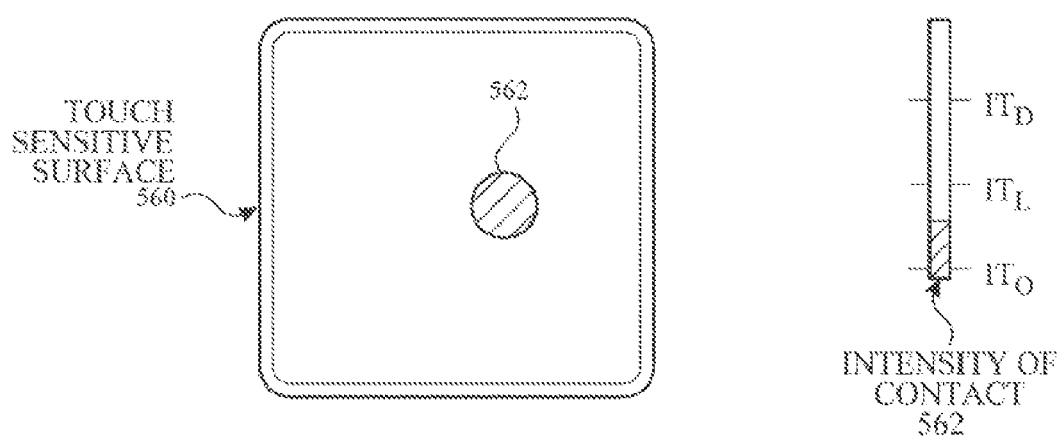
FIG. 5E

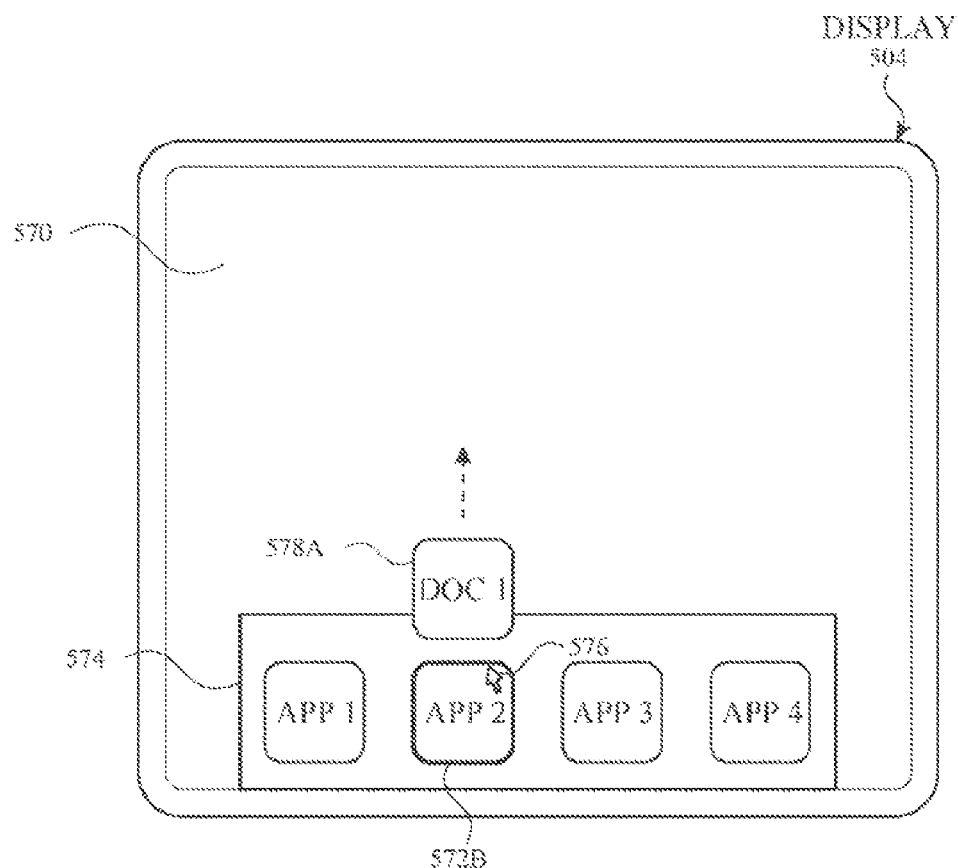
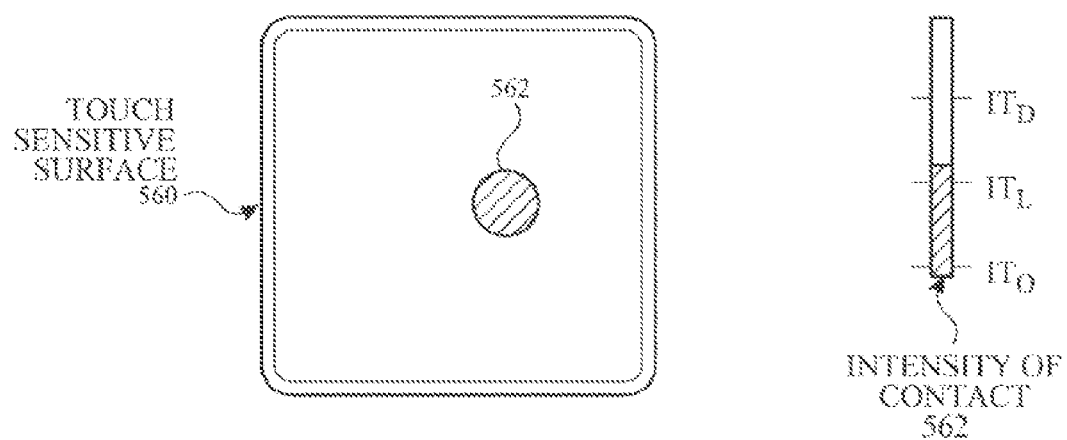
*FIG. 5F*

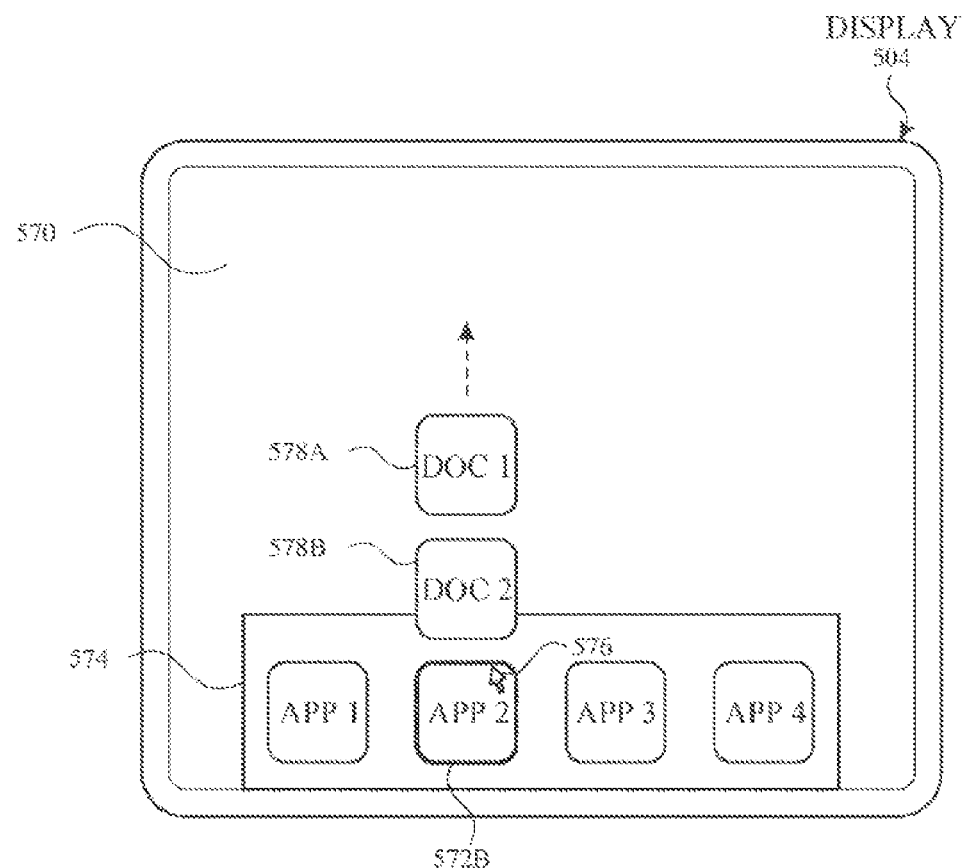
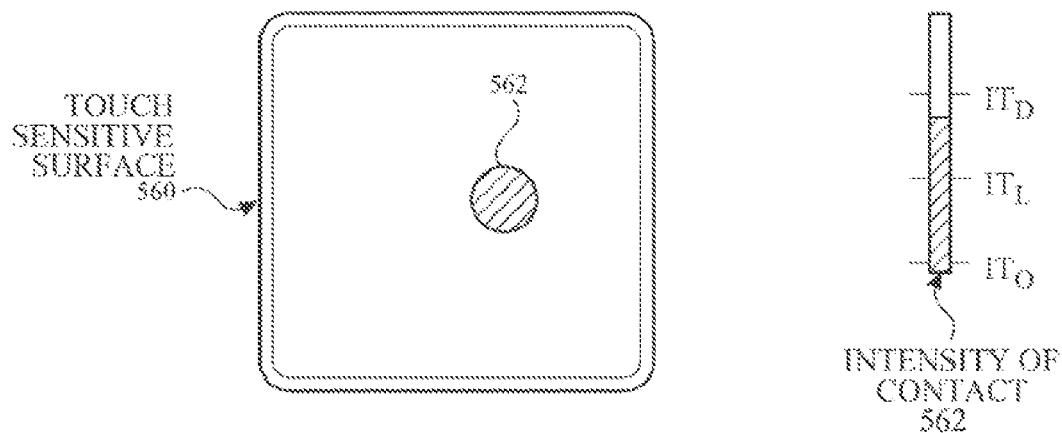
FIG. 5G

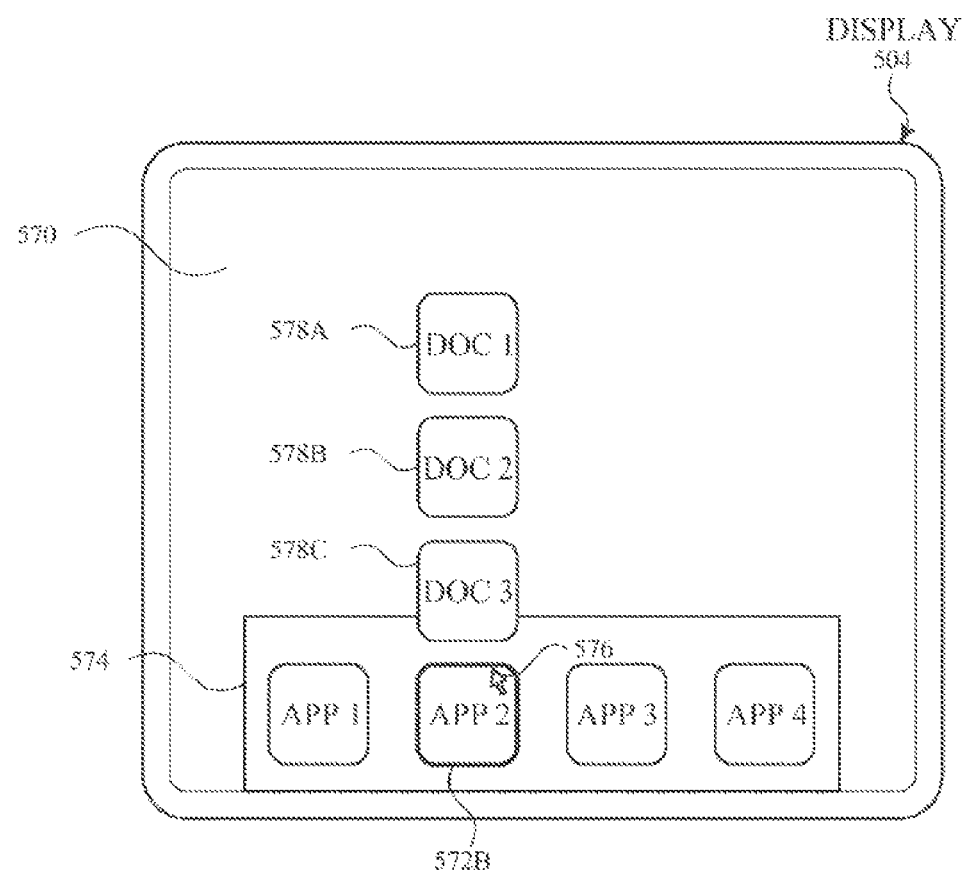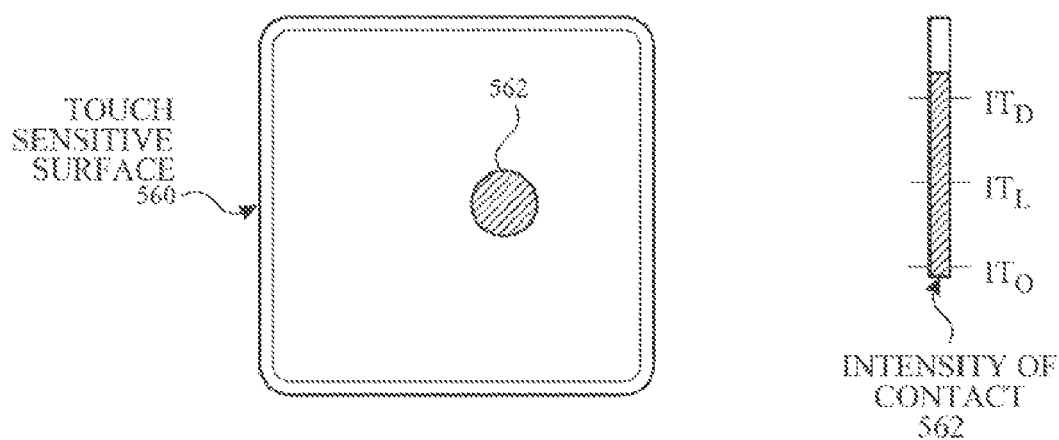
FIG. 5H

700

702
While displaying, via the display generation component, a wake screen, detect an input directed to the button.

704
In response to detecting the input:

706
In accordance with a determination that the input includes touching the touch sensor for less than a respective time threshold and does not include activation of the button:

708
Maintain display, via the display generation component, of the wake screen.

710
In accordance with a determination that the input includes touching the touch sensor for more than the respective time threshold and the computer system is unlocked:

712
Display, via the display generation component, a second user interface, wherein the second user interface is different from the wake screen in an unlocked state.

714
In accordance with a determination that the input includes activating the button:

716
Cease to display, via the display generation component, at least a portion of the wake screen and transition the display generation component to a low power state.

*FIG. 7*

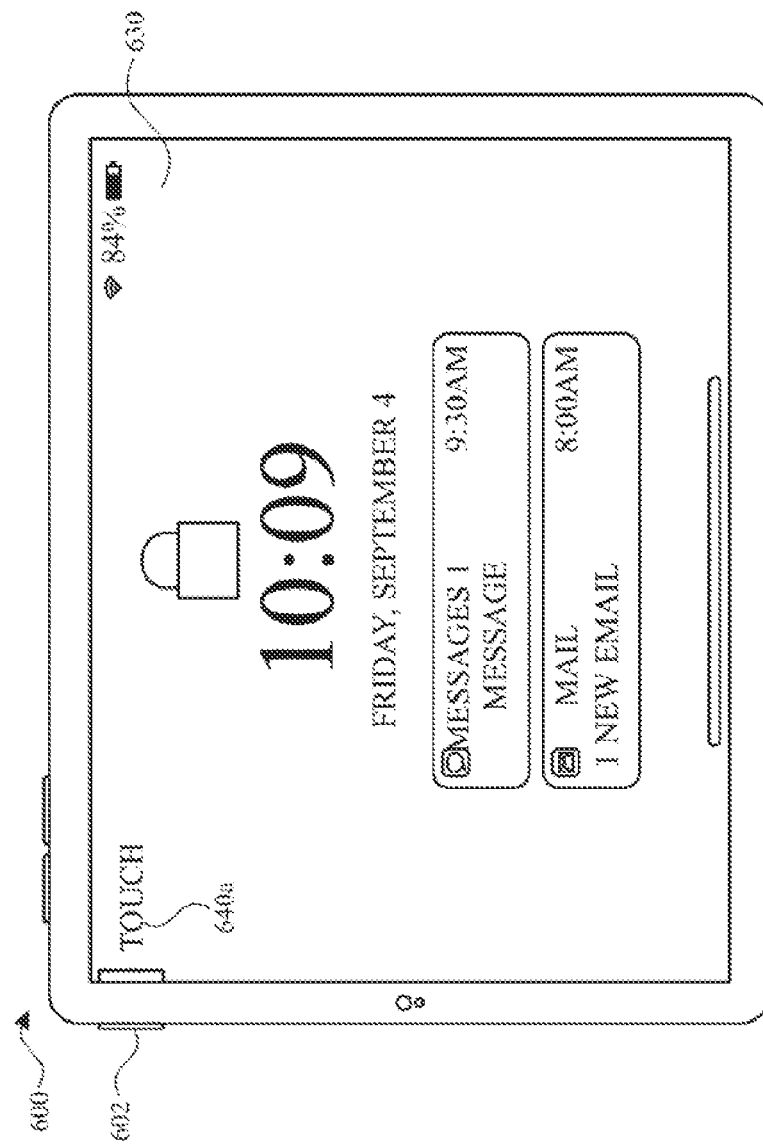

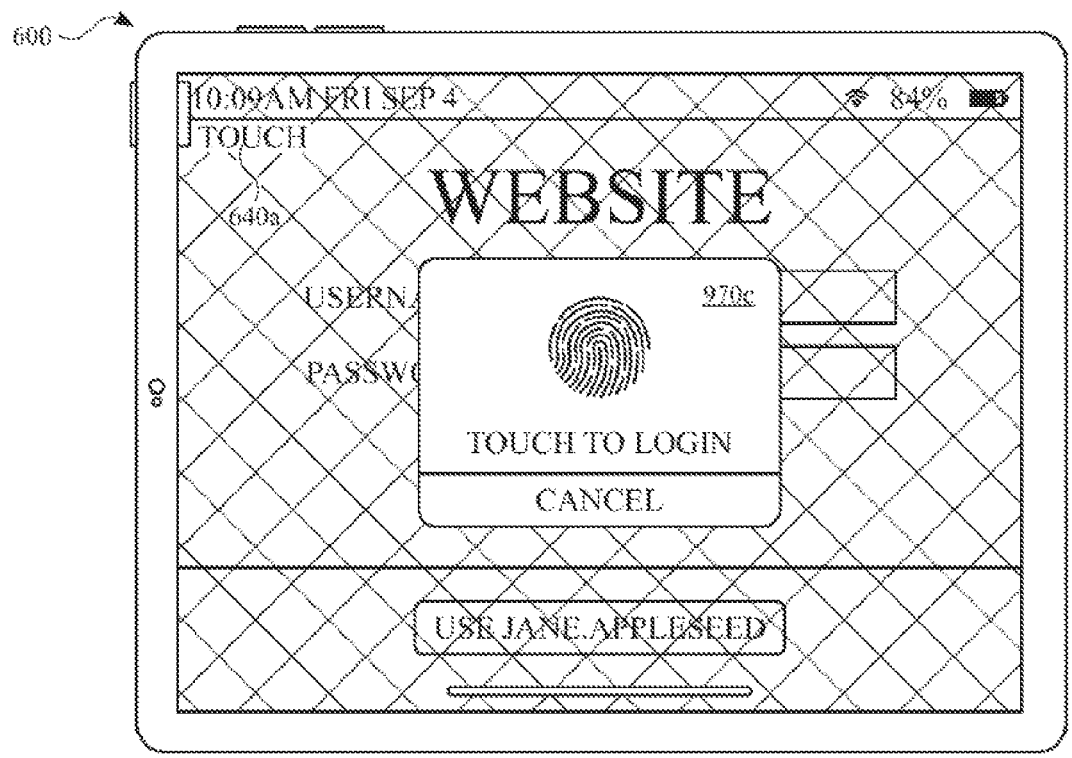
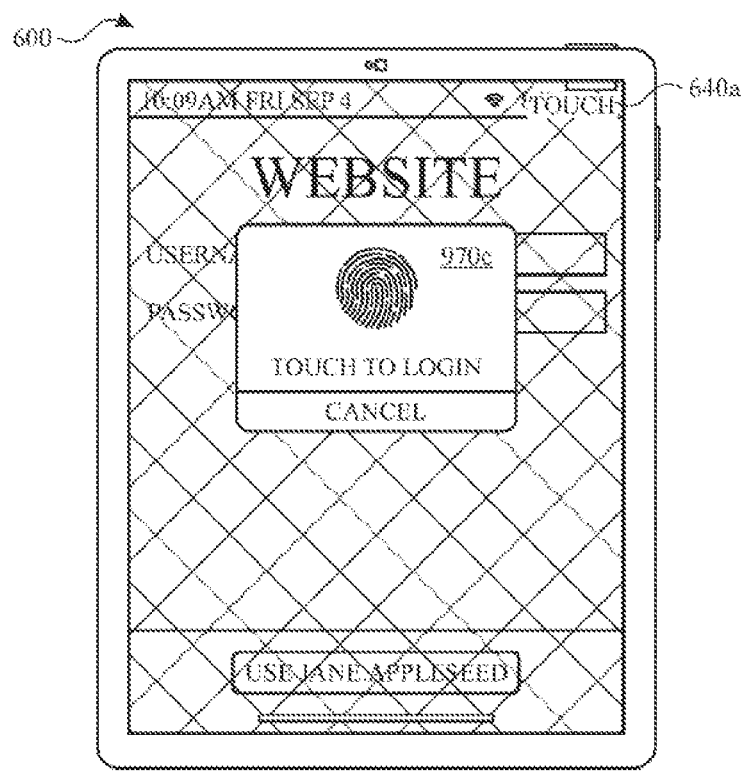
*FIG. 9Y*

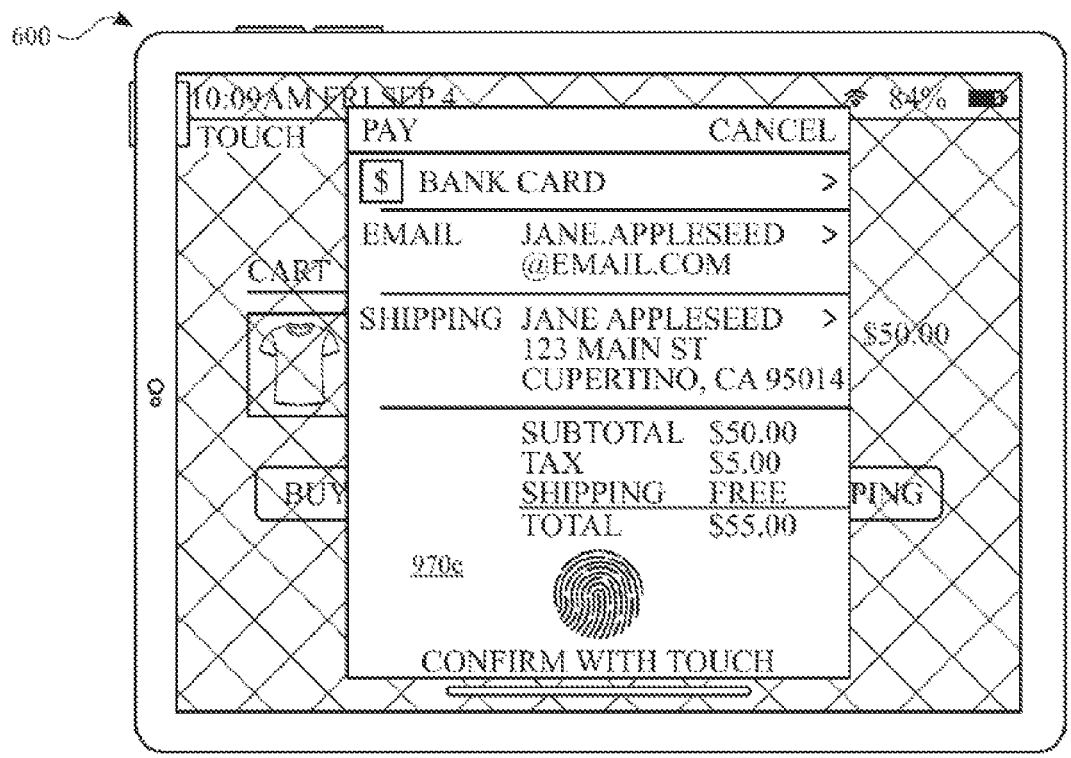
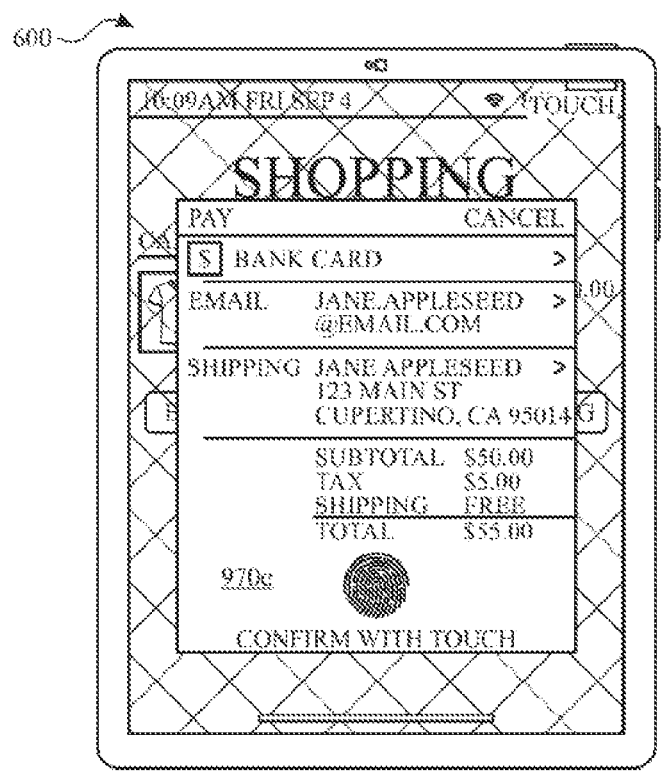
FIG. 9AC

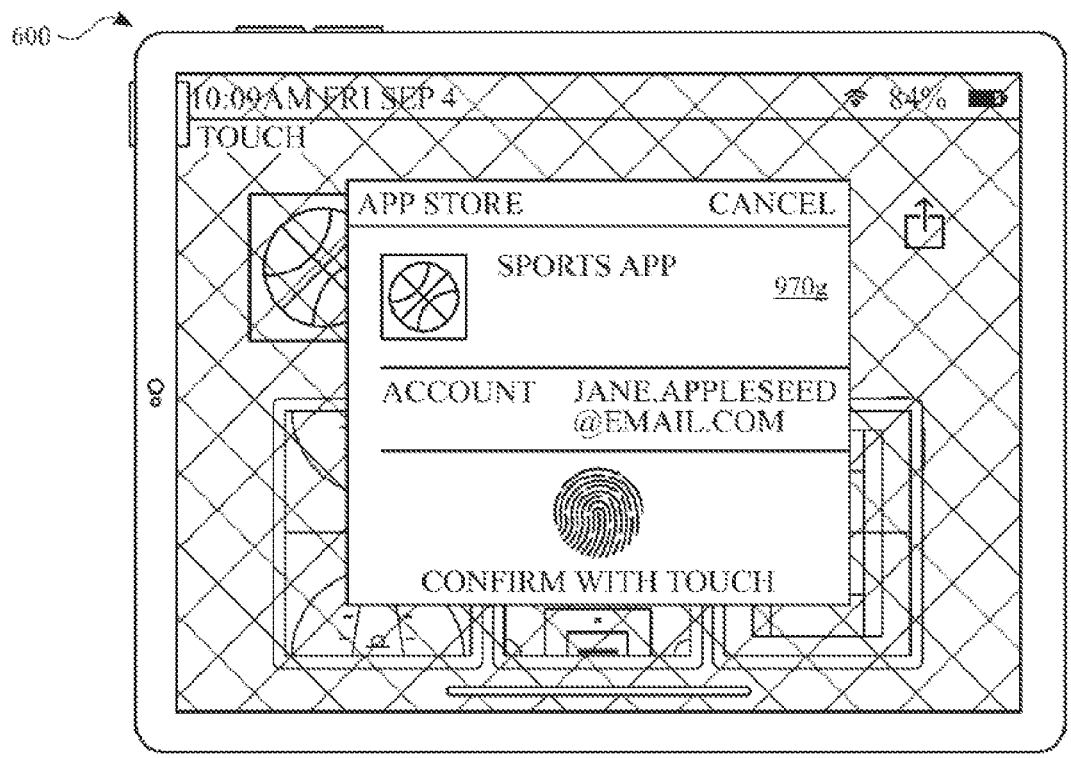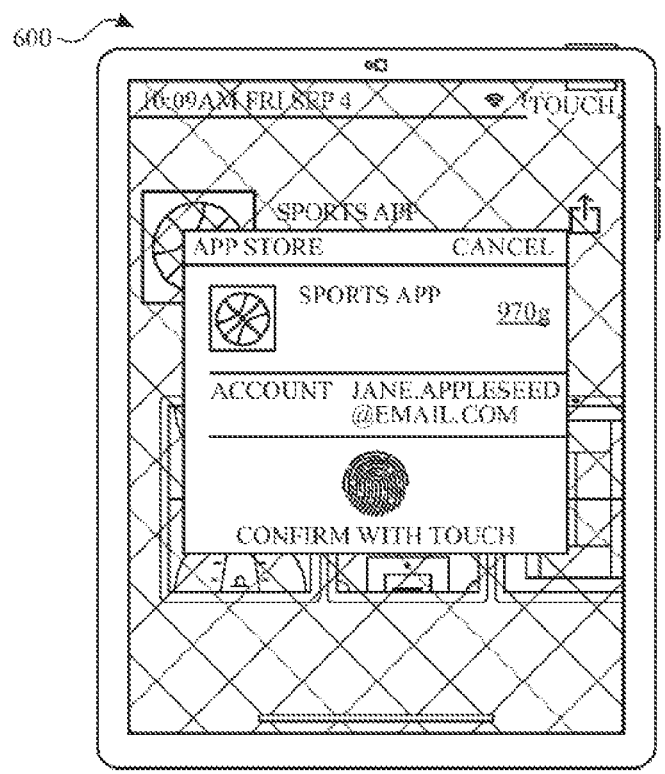
FIG. 9AG

1100 

1102
Receive, via one or more input devices, a request to initiate a process for enrolling a biometric feature, wherein the enrollment will be performed using biometric information collected via the biometric sensor.

1104
In response to receiving the request to initiate the process for enrolling the biometric feature:

1106
In accordance with a determination that the computer system is in a first orientation:

1108
Display, via the display generation component, a first user interface element indicating a location of the biometric sensor on the computer system.

1110
In accordance with a determination that the computer system is in a second orientation:

1112
Display, via the display generation component, a second user interface element indicating a location of the biometric sensor on the computer system, wherein the second user interface element is different from the first user interface element.

1202
Receive, via the one or more input devices, a request to perform an operation.

1204
In response to receiving the request to perform the operation while the fingerprint sensor is available to receive fingerprint input but a finger is not currently detected on the fingerprint sensor:

1206
In accordance with a determination that the operation requires authentication and that the computer system is in a first orientation:

1208
Display, via the display generation component, a graphical indication of a location of the fingerprint sensor in a first portion of the user interface.

1210
In accordance with a determination that the operation requires authentication and that the computer system is in a second orientation that is different from the first orientation:

1212
Display, via the display generation component, a graphical indication of a location of the fingerprint sensor in a second portion of the user interface that is different from the first portion of the user interface.

*FIG. 12*

USER INPUT INTERFACES

CROSS-REFERENCE TO RELATED APPLICATIONS

This application is a continuation of U.S. non-Provisional application Ser. No. 17/129,027, entitled "USER INPUT INTERFACES", filed Dec. 21, 2020 which claims priority to U.S. provisional patent application No. 63/078,317, entitled "USER INPUT INTERFACES", filed Sep. 14, 2020, the contents of which are hereby incorporated by reference in their entirety.

FIELD

The present disclosure relates generally to computer user interfaces, and more specifically to techniques for managing user inputs.

BACKGROUND

Electronic devices receive user inputs in various ways, such as through touch screens, voice comments, and keyboards. For example, an electronic device may be configured to receive a password via a keyboard before providing the user with access to information.

BRIEF SUMMARY

Some techniques for managing user inputs using electronic devices, however, are generally cumbersome and inefficient. For example, some existing techniques use a complex and time-consuming user interface, which may include multiple key presses or keystrokes. For another example, a user may need to provide one type of input to authorize an operation (such as an unlock operation) and another type of input to transition to a particular display screen. Existing techniques require more time than necessary, wasting user time and device energy. This latter consideration is particularly important in battery-operated devices.

Accordingly, the present technique provides electronic devices with faster, more efficient methods and interfaces for managing user inputs. Such methods and interfaces optionally complement or replace other methods for managing user inputs. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system with a touch sensor integrated into a button, wherein the computer system is in communication with a display generation component. The method comprises: while displaying, via the display generation component, a wake screen, detecting an input directed to the button; and in response to detecting the input: in accordance with a determination that the input includes touching the touch sensor for less than a respective time threshold and does not include activation of the button, maintaining display, via the display generation component, of the wake screen; in accordance with a determination that the input includes touching the touch sensor for more than the respective time threshold and the computer system is unlocked, displaying, via the display generation component, a second user interface, wherein the second user interface is different from the wake screen in an unlocked state; and in accordance with a determination that the input includes activating the button, ceasing to display, via the display generation component, at least a portion of the wake screen and transitioning the display generation component to a low power state.

In accordance with some embodiments, a non-transitory computer-readable storage medium is described. The non-transitory computer-readable storage medium stores one or more programs configured to be executed by one or more processors of a computer system with a touch sensor integrated into a button, wherein the computer system is in communication with a display generation component, the one or more programs including instructions for: while displaying, via the display generation component, a wake screen, detecting an input directed to the button; and in response to detecting the input: in accordance with a determination that the input includes touching the touch sensor for less than a respective time threshold and does not include activation of the button, maintaining display, via the display generation component, of the wake screen; in accordance with a determination that the input includes touching the touch sensor for more than the respective time threshold and the computer system is unlocked, displaying, via the display generation component, a second user interface, wherein the second user interface is different from the wake screen in an unlocked state; and in accordance with a determination that the input includes activating the button, ceasing to display, via the display generation component, at least a portion of the wake screen and transitioning the display generation component to a low power state.

In accordance with some embodiments, a transitory computer-readable storage medium is described. The transitory computer-readable storage medium stores one or more programs configured to be executed by one or more processors of a computer system with a touch sensor integrated into a button, wherein the computer system is in communication with a display generation component, the one or more programs including instructions for: while displaying, via the display generation component, a wake screen, detecting an input directed to the button; and in response to detecting the input: in accordance with a determination that the input includes touching the touch sensor for less than a respective time threshold and does not include activation of the button, maintaining display, via the display generation component, of the wake screen; in accordance with a determination that the input includes touching the touch sensor for more than the respective time threshold and the computer system is unlocked, displaying, via the display generation component, a second user interface, wherein the second user interface is different from the wake screen in an unlocked state; and in accordance with a determination that the input includes activating the button, ceasing to display, via the display generation component, at least a portion of the wake screen and transitioning the display generation component to a low power state.

In accordance with some embodiments, a computer system is described. The computer system comprises: a touch sensor integrated into a button; a display generation component; one or more processors; and memory storing one or more programs configured to be executed by the one or more processors, the one or more programs including instructions for: while displaying, via the display generation component, a wake screen, detecting an input directed to the button; and in response to detecting the input: in accordance with a determination that the input includes touching the touch sensor for less than a respective time threshold and does not include activation of the button, maintaining display, via the display generation component, of the wake screen; in accordance with a determination that the input includes touching the touch sensor for more than the respective time threshold and the computer system is unlocked, displaying, via the display generation component, a second user interface, wherein the second user interface is different from the wake screen in an unlocked state; and in accordance with a determination that the input includes activating the button, ceasing to display, via the display generation component, at least a portion of the wake screen and transitioning the display generation component to a low power state.

In accordance with some embodiments, a computer system is described. The computer system comprises: a touch sensor integrated into a button; a display generation component; means, while displaying, via the display generation component, a wake screen, for detecting an input directed to the button; and means, responsive to detecting the input, for: in accordance with a determination that the input includes touching the touch sensor for less than a respective time threshold and does not include activation of the button, maintaining display, via the display generation component, of the wake screen; in accordance with a determination that the input includes touching the touch sensor for more than the respective time threshold and the computer system is unlocked, displaying, via the display generation component, a second user interface, wherein the second user interface is different from the wake screen in an unlocked state; and in accordance with a determination that the input includes activating the button, ceasing to display, via the display generation component, at least a portion of the wake screen and transitioning the display generation component to a low power state.

In accordance with some embodiments, a method is described. The method is performed at a computer system with a fingerprint sensor, wherein the computer system is in communication with a display generation component. The method comprises: detecting an input directed to the fingerprint sensor; and in response to detecting the input: in accordance with a determination that the input includes fingerprint information detected by the fingerprint sensor that matches one or more enrolled fingers and is for less than a input threshold, displaying, via the display generation component, a wake screen in an unlocked state; and in accordance with a determination that the input includes fingerprint information detected by the fingerprint sensor that matches one or more enrolled fingers and is for more than the input threshold, displaying, via the display generation component, a second user interface, wherein the second user interface is different from the wake screen in an unlocked state.

In accordance with some embodiments, a non-transitory computer-readable storage medium is described. The non-transitory computer-readable storage medium stores one or more programs configured to be executed by one or more processors of a computer system with a fingerprint sensor, wherein the computer system is in communication with a display generation component, the one or more programs including instructions for: detecting an input directed to the fingerprint sensor; and in response to detecting the input: in accordance with a determination that the input includes fingerprint information detected by the fingerprint sensor that matches one or more enrolled fingers and is for less than a input threshold, displaying, via the display generation component, a wake screen in an unlocked state; and in accordance with a determination that the input includes fingerprint information detected by the fingerprint sensor that matches one or more enrolled fingers and is for more than the input threshold, displaying, via the display generation component, a second user interface, wherein the second user interface is different from the wake screen in an unlocked state.

In accordance with some embodiments, a transitory computer-readable storage medium is described. The transitory computer-readable storage medium stores one or more programs configured to be executed by one or more processors of a computer system with a fingerprint sensor, wherein the computer system is in communication with a display generation component, the one or more programs including instructions for: detecting an input directed to the fingerprint sensor; and in response to detecting the input: in accordance with a determination that the input includes fingerprint information detected by the fingerprint sensor that matches one or more enrolled fingers and is for less than a input threshold, displaying, via the display generation component, a wake screen in an unlocked state; and in accordance with a determination that the input includes fingerprint information detected by the fingerprint sensor that matches one or more enrolled fingers and is for more than the input threshold, displaying, via the display generation component, a second user interface, wherein the second user interface is different from the wake screen in an unlocked state.

In accordance with some embodiments, a computer system is described. The computer system comprises: a fingerprint sensor; a display generation component; one or more processors; and memory storing one or more programs configured to be executed by the one or more processors, the one or more programs including instructions for: detecting an input directed to the fingerprint sensor; and in response to detecting the input: in accordance with a determination that the input includes fingerprint information detected by the fingerprint sensor that matches one or more enrolled fingers and is for less than a input threshold, displaying, via the display generation component, a wake screen in an unlocked state; and in accordance with a determination that the input includes fingerprint information detected by the fingerprint sensor that matches one or more enrolled fingers and is for more than the input threshold, displaying, via the display generation component, a second user interface, wherein the second user interface is different from the wake screen in an unlocked state.

In accordance with some embodiments, a computer system is described. The computer system comprises: a fingerprint sensor; a display generation component; means for detecting an input directed to the fingerprint sensor; and means, responsive to detecting the input, for: in accordance with a determination that the input includes fingerprint information detected by the fingerprint sensor that matches one or more enrolled fingers and is for less than a input threshold, displaying, via the display generation component, a wake screen in an unlocked state; and in accordance with a determination that the input includes fingerprint information detected by the fingerprint sensor that matches one or more enrolled fingers and is for more than the input threshold, displaying, via the display generation component, a second user interface, wherein the second user interface is different from the wake screen in an unlocked state.

In accordance with some embodiments, a method is described. The method is performed at a computer system with a biometric sensor, wherein the computer system is in communication with a display generation component. The method comprises: displaying, via the display generation component, a user interface for enrolling a biometric feature; while displaying the user interface for enrolling the biometric feature, receiving one or more enrollment inputs via the biometric sensor; in response to receiving the one or more enrollment inputs, enrolling a first biometric feature; and after successfully enrolling the first biometric feature, prompting a user to enroll a second biometric feature that is different from the first biometric feature.

In accordance with some embodiments, a non-transitory computer-readable storage medium is described. The non-transitory computer-readable storage medium stores one or more programs configured to be executed by one or more processors of a computer system with a biometric sensor, wherein the computer system is in communication with a display generation component, the one or more programs including instructions for: displaying, via the display generation component, a user interface for enrolling a biometric feature; while displaying the user interface for enrolling the biometric feature, receiving one or more enrollment inputs via the biometric sensor; in response to receiving the one or more enrollment inputs, enrolling a first biometric feature: and after successfully enrolling the first biometric feature, prompting a user to enroll a second biometric feature that is different from the first biometric feature.

In accordance with some embodiments, a transitory computer-readable storage medium is described. The transitory computer-readable storage medium stores one or more programs configured to be executed by one or more processors of a computer system with a biometric sensor, wherein the computer system is in communication with a display generation component, the one or more programs including instructions for: displaying, via the display generation component, a user interface for enrolling a biometric feature; while displaying the user interface for enrolling the biometric feature, receiving one or more enrollment inputs via the biometric sensor; in response to receiving the one or more enrollment inputs, enrolling a first biometric feature; and after successfully enrolling the first biometric feature, prompting a user to enroll a second biometric feature that is different from the first biometric feature.

In accordance with some embodiments, a computer system is described. The computer system comprises: a biometric sensor; a display generation component; one or more processors; and memory storing one or more programs configured to be executed by the one or more processors, the one or more programs including instructions for: displaying, via the display generation component, a user interface for enrolling a biometric feature; while displaying the user interface for enrolling the biometric feature, receiving one or more enrollment inputs via the biometric sensor; in response to receiving the one or more enrollment inputs, enrolling a first biometric feature; and after successfully enrolling the first biometric feature, prompting a user to enroll a second biometric feature that is different from the first biometric feature.

In accordance with some embodiments, a computer system is described. The computer system comprises: a biometric sensor; a display generation component; means for displaying, via the display generation component, a user interface for enrolling a biometric feature; means, while displaying the user interface for enrolling the biometric feature, for receiving one or more enrollment inputs via the biometric sensor; means, responsive to receiving the one or more enrollment inputs, for enrolling a first biometric feature; and means, after successfully enrolling the first biometric feature, for prompting a user to enroll a second biometric feature that is different from the first biometric feature.

In accordance with some embodiments, a method is described. The method is performed at a computer system with a biometric sensor, wherein the computer system is in communication with a display generation component and one or more input devices. The method comprises: receiving, via one or more input devices, a request to initiate a process for enrolling a biometric feature, wherein the enrollment will be performed using biometric information collected via the biometric sensor; and in response to receiving the request to initiate the process for enrolling the biometric feature: in accordance with a determination that the computer system is in a first orientation, displaying, via the display generation component, a first user interface element indicating a location of the biometric sensor on the computer system; and in accordance with a determination that the computer system is in a second orientation, displaying, via the display generation component, a second user interface element indicating a location of the biometric sensor on the computer system, wherein the second user interface element is different from the first user interface element.

In accordance with some embodiments, a non-transitory computer-readable storage medium is described. The non-transitory computer-readable storage medium stores one or more programs configured to be executed by one or more processors of a computer system with a biometric sensor, wherein the computer system is in communication with a display generation component and one or more input devices, the one or more programs including instructions for: receiving, via one or more input devices, a request to initiate a process for enrolling a biometric feature, wherein the enrollment will be performed using biometric information collected via the biometric sensor; and in response to receiving the request to initiate the process for enrolling the biometric feature: in accordance with a determination that the computer system is in a first orientation, displaying, via the display generation component, a first user interface element indicating a location of the biometric sensor on the computer system; and in accordance with a determination that the computer system is in a second orientation, displaying, via the display generation component, a second user interface element indicating a location of the biometric sensor on the computer system, wherein the second user interface element is different from the first user interface element.

In accordance with some embodiments, a transitory computer-readable storage medium is described. The transitory computer-readable storage medium stores one or more programs configured to be executed by one or more processors of a computer system with a biometric sensor, wherein the computer system is in communication with a display generation component and one or more input devices, the one or more programs including instructions for: receiving, via one or more input devices, a request to initiate a process for enrolling a biometric feature, wherein the enrollment will be performed using biometric information collected via the biometric sensor; and in response to receiving the request to initiate the process for enrolling the biometric feature: in accordance with a determination that the computer system is in a first orientation, displaying, via the display generation component, a first user interface element indicating a location of the biometric sensor on the computer system; and in accordance with a determination that the computer system is in a second orientation, displaying, via the display generation component, a second user interface element indicating a location of the biometric sensor on the computer system, wherein the second user interface element is different from the first user interface element.

In accordance with some embodiments, a computer system is described. The computer system comprises: a biometric; a display generation component; one or more input devices; one or more processors; and memory storing one or more programs configured to be executed by the one or more processors, the one or more programs including instructions for: receiving, via one or more input devices, a request to initiate a process for enrolling a biometric feature, wherein the enrollment will be performed using biometric information collected via the biometric sensor; and in response to receiving the request to initiate the process for enrolling the biometric feature: in accordance with a determination that the computer system is in a first orientation, displaying, via the display generation component, a first user interface element indicating a location of the biometric sensor on the computer system; and in accordance with a determination that the computer system is in a second orientation, displaying, via the display generation component, a second user interface element indicating a location of the biometric sensor on the computer system, wherein the second user interface element is different from the first user interface element.

In accordance with some embodiments, a computer system is described. The computer system comprises: a biometric sensor; a display generation component; means for receiving, via one or more input devices, a request to initiate a process for enrolling a biometric feature, wherein the enrollment will be performed using biometric information collected via the biometric sensor; and means, responsive to receiving the request to initiate the process for enrolling the biometric feature, for: in accordance with a determination that the computer system is in a first orientation, displaying, via the display generation component, a first user interface element indicating a location of the biometric sensor on the computer system; and in accordance with a determination that the computer system is in a second orientation, displaying, via the display generation component, a second user interface element indicating a location of the biometric sensor on the computer system, wherein the second user interface element is different from the first user interface element.

In accordance with some embodiments, a method is described. The method is performed at a computer system with a fingerprint sensor, wherein the computer system is in communication with a display generation component and one or more input devices. The method comprises: receiving, via the one or more input devices, a request to perform an operation; and in response to receiving the request to perform the operation while the fingerprint sensor is available to receive fingerprint input but a finger is not currently detected on the fingerprint sensor: in accordance with a determination that the operation requires authentication and that the computer system is in a first orientation, displaying, via the display generation component, a graphical indication of a location of the fingerprint sensor in a first portion of the user interface; and in accordance with a determination that the operation requires authentication and that the computer system is in a second orientation that is different from the first orientation, displaying, via the display generation component, a graphical indication of a location of the fingerprint sensor in a second portion of the user interface that is different from the first portion of the user interface.

In accordance with some embodiments, a non-transitory computer-readable storage medium is described. The non-transitory computer-readable storage medium stores one or more programs configured to be executed by one or more processors of a computer system with a fingerprint sensor, wherein the computer system is in communication with a display generation component and one or more input devices, the one or more programs including instructions for: receiving, via the one or more input devices, a request to perform an operation; and in response to receiving the request to perform the operation while the fingerprint sensor is available to receive fingerprint input but a finger is not currently detected on the fingerprint sensor: in accordance with a determination that the operation requires authentication and that the computer system is in a first orientation, displaying, via the display generation component, a graphical indication of a location of the fingerprint sensor in a first portion of the user interface; and in accordance with a determination that the operation requires authentication and that the computer system is in a second orientation that is different from the first orientation, displaying, via the display generation component, a graphical indication of a location of the fingerprint sensor in a second portion of the user interface that is different from the first portion of the user interface.

In accordance with some embodiments, a transitory computer-readable storage medium is described. The transitory computer-readable storage medium stores one or more programs configured to be executed by one or more processors of a computer system with a fingerprint sensor, wherein the computer system is in communication with a display generation component and one or more input devices, the one or more programs including instructions for: receiving, via the one or more input devices, a request to perform an operation; and in response to receiving the request to perform the operation while the fingerprint sensor is available to receive fingerprint input but a finger is not currently detected on the fingerprint sensor: in accordance with a determination that the operation requires authentication and that the computer system is in a first orientation, displaying, via the display generation component, a graphical indication of a location of the fingerprint sensor in a first portion of the user interface; and in accordance with a determination that the operation requires authentication and that the computer system is in a second orientation that is different from the first orientation, displaying, via the display generation component, a graphical indication of a location of the fingerprint sensor in a second portion of the user interface that is different from the first portion of the user interface.

In accordance with some embodiments, a computer system is described. The computer system comprises: a fingerprint sensor; a display generation component; one or more input devices; one or more processors; and memory storing one or more programs configured to be executed by the one or more processors, the one or more programs including instructions for: receiving, via the one or more input devices, a request to perform an operation; and in response to receiving the request to perform the operation while the fingerprint sensor is available to receive fingerprint input but a finger is not currently detected on the fingerprint sensor: in accordance with a determination that the operation requires authentication and that the computer system is in a first orientation, displaying, via the display generation component, a graphical indication of a location of the fingerprint sensor in a first portion of the user interface; and in accordance with a determination that the operation requires authentication and that the computer system is in a second orientation that is different from the first orientation, displaying, via the display generation component, a graphical indication of a location of the fingerprint sensor in a second portion of the user interface that is different from the first portion of the user interface.

In accordance with some embodiments, a computer system is described. The computer system comprises: a fingerprint sensor; a display generation component; means for receiving, via the one or more input devices, a request to perform an operation; and means, responsive to receiving the request to perform the operation while the fingerprint sensor is available to receive fingerprint input but a finger is not currently detected on the fingerprint sensor, for: in accordance with a determination that the operation requires authentication and that the computer system is in a first orientation, displaying, via the display generation component, a graphical indication of a location of the fingerprint sensor in a first portion of the user interface; and in accordance with a determination that the operation requires authentication and that the computer system is in a second orientation that is different from the first orientation, displaying, via the display generation component, a graphical indication of a location of the fingerprint sensor in a second portion of the user interface that is different from the first portion of the user interface.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing user inputs, thereby increasing the effectiveness, efficiency, and user satisfaction with such devices. Such methods and interfaces may complement or replace other methods for managing user inputs.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 7 is a flow diagram illustrating methods of disambiguating between a touch input for displaying user interfaces and a press input for transitioning to a low power state in accordance with some embodiments.

FIG. 11 is a flow diagram illustrating methods of managing device orientation during biometric enrollment in accordance with some embodiments.

FIG. 12 is a flow diagram illustrating methods of managing requests to perform operations based on authentication requirements in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing user inputs. For example, some techniques enable the device to disambiguate between different types of instructions and concurrently provide biometric authorization. For another example, some techniques enable multiple biometric features to be enrolling during a device setup process. For another example, some techniques enable providing device orientation-specific information while enrolling biometric information. For another example, some techniques enable displaying information for collecting biometric information to perform operations that require authorization.

Such techniques can reduce the cognitive burden on a user who provide inputs to devices, such as authorization inputs, thereby enhancing productivity. Further, such techniques can reduce processor and battery power otherwise wasted on redundant user inputs.

Figure 8:
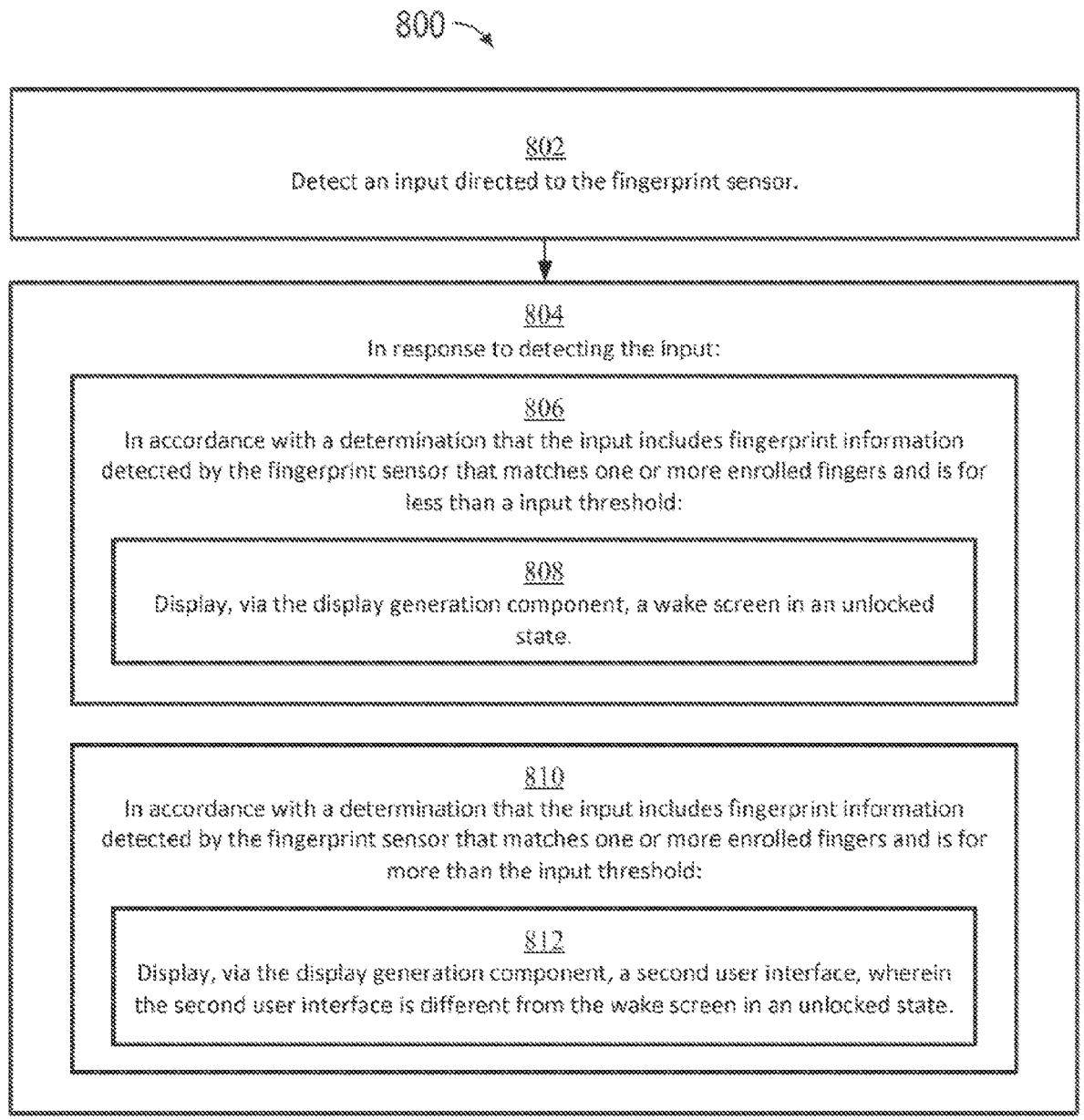
FIG. 8 is a flow diagram illustrating methods of disambiguating between inputs that are more or less than an input threshold in accordance with some embodiments.
Figure 9A:
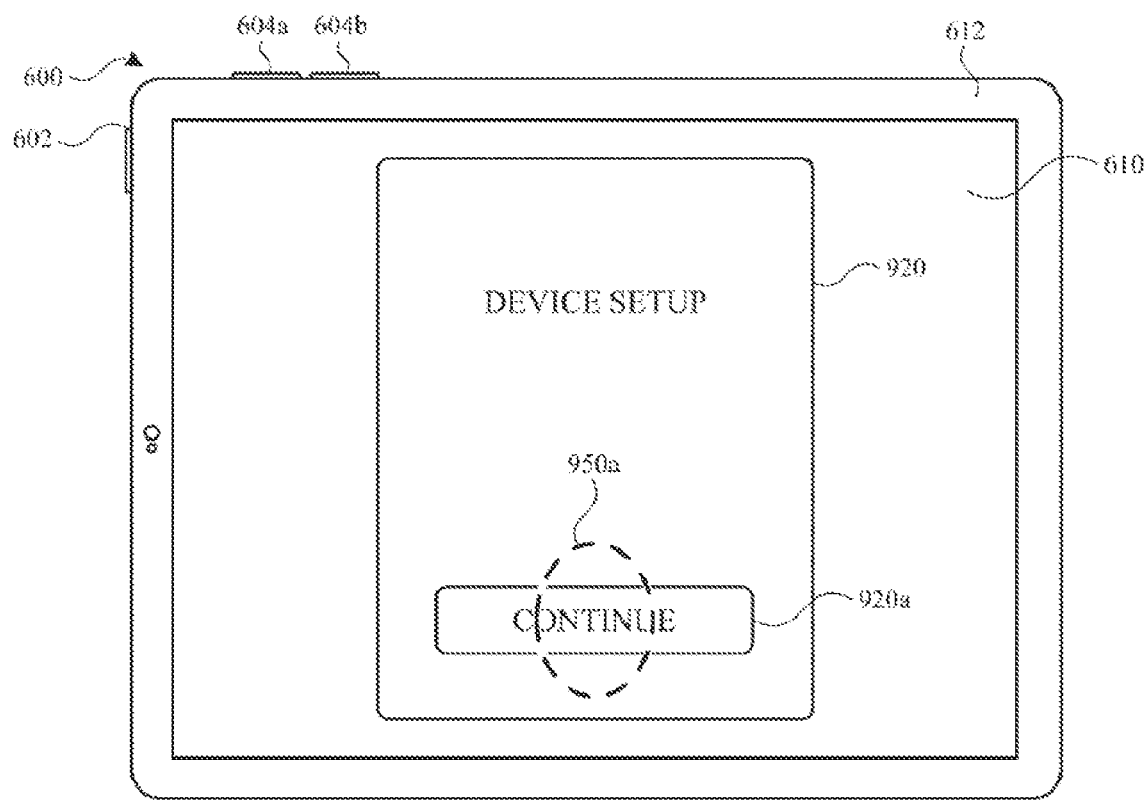
FIGS. 9A-9AH illustrate exemplary user interfaces for prompting to enroll biometric features in various device orientations and performing operations based on authentication requirements.
Figure 9P:
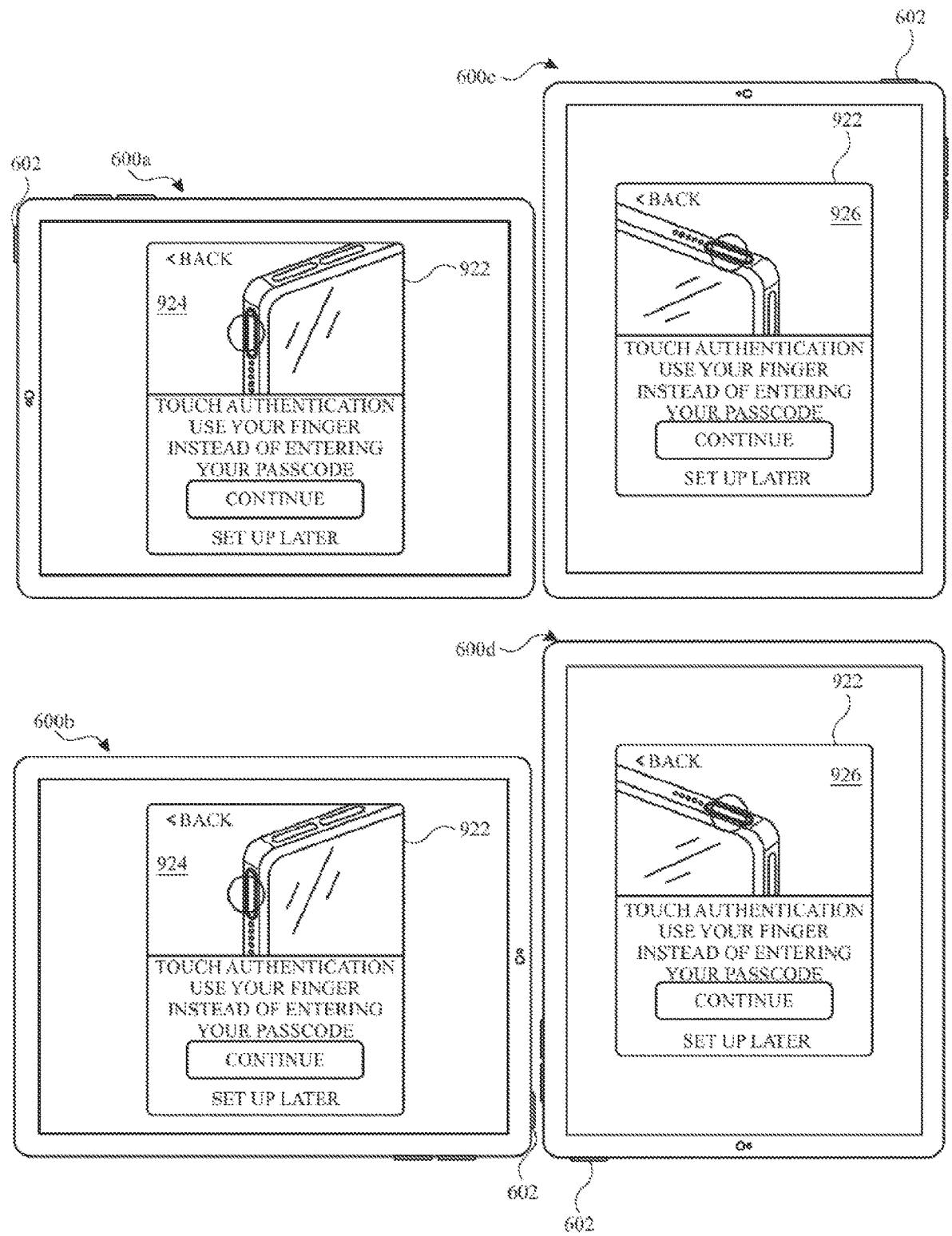
Figure 9Q:
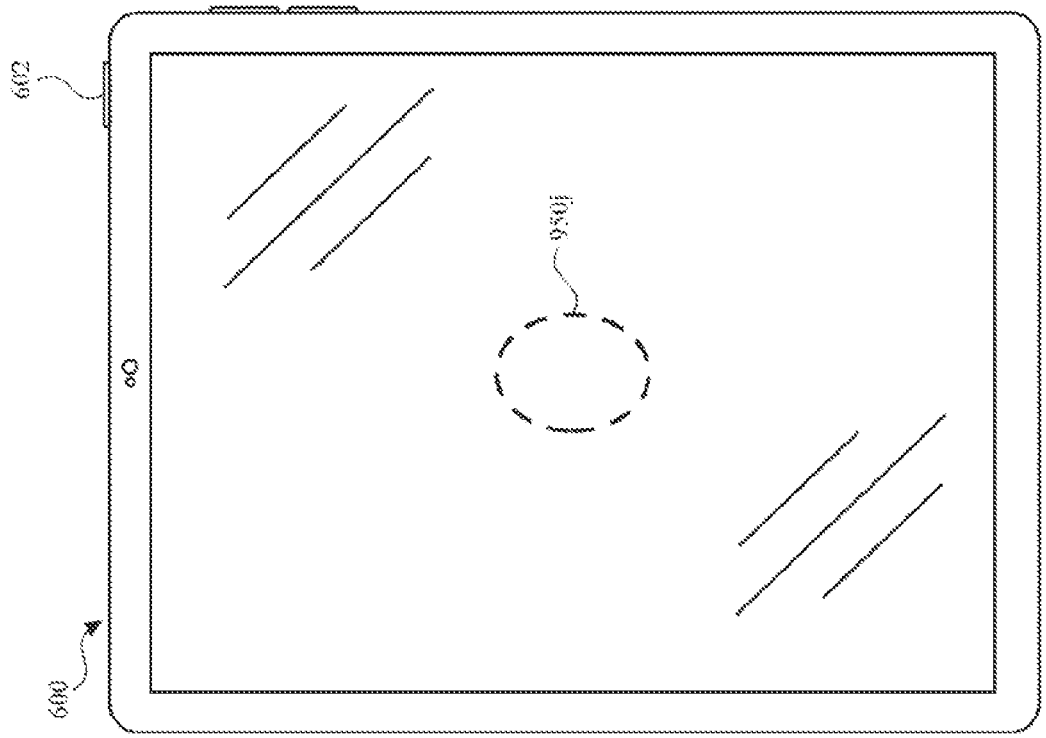
Figure 10:
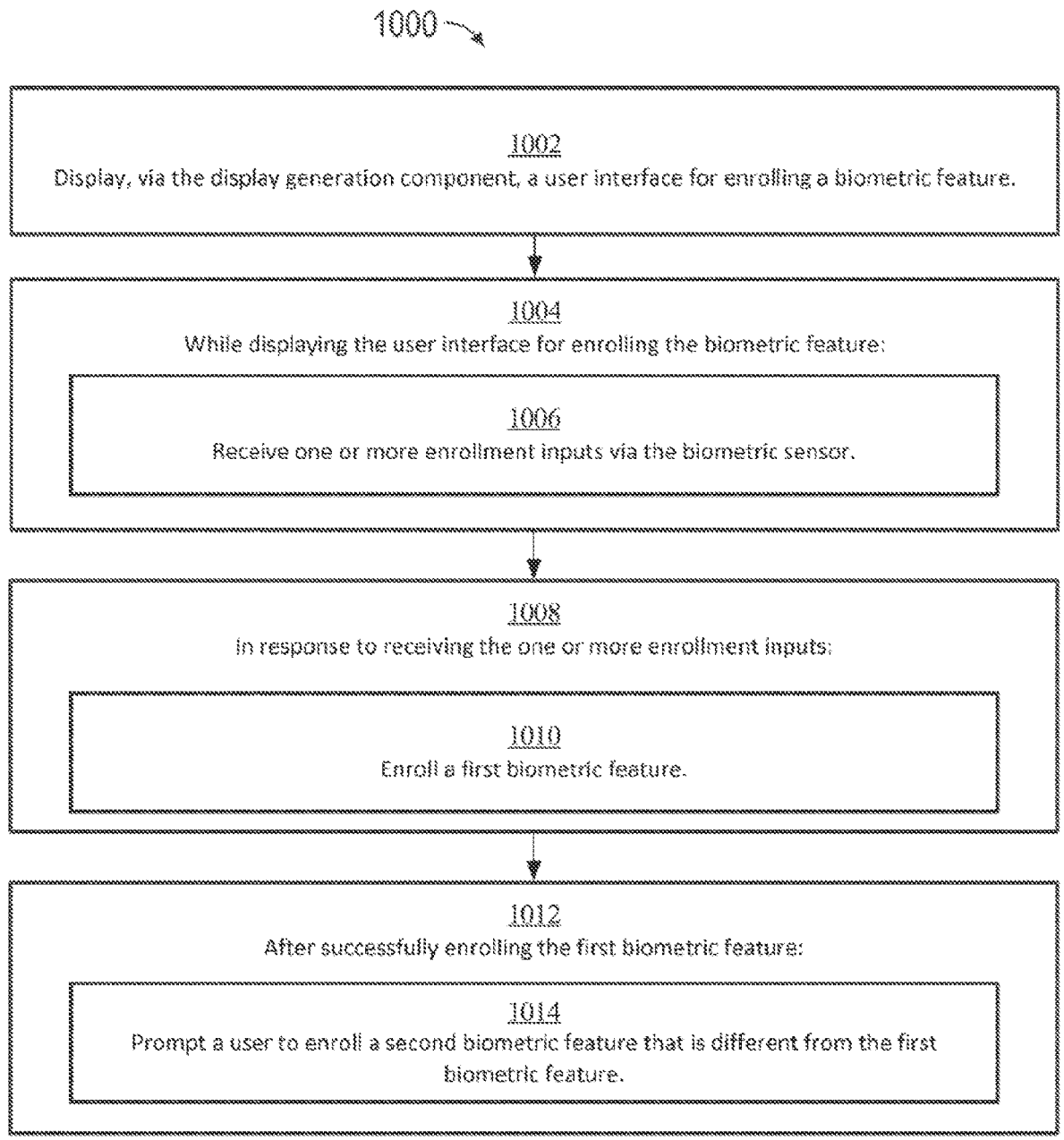
FIG. 10 is a flow diagram illustrating methods of prompting to enroll a second biometric feature after enrolling a first biometric feature in accordance with some embodiments.

Below, FIGS. 1A-1B, 2, 3, 4A-4B, and 5A-5H provide a description of exemplary devices for performing the techniques for managing user inputs. FIGS. 6A-6AY illustrate exemplary devices and user interfaces for detecting press and touch inputs and for performing biometric authentication. FIG. 7 is a flow diagram illustrating methods of disambiguating between a touch input for displaying user interfaces and a press input for transitioning to a low power state in accordance with some embodiments. FIG. 8 is a flow diagram illustrating methods of disambiguating between inputs that are more or less than an input threshold in accordance with some embodiments. The user interfaces in FIGS. 6A-6AY are used to illustrate the processes described below, including the processes in FIGS. 7-8. FIGS. 9A-9P illustrate exemplary user interfaces for prompting to enroll biometric features and managing device orientations during biometric enrollment. FIG. 10 is a flow diagram illustrating methods of prompting to enroll a second biometric feature after enrolling a first biometric feature in accordance with some embodiments. FIG. 11 is a flow diagram illustrating methods of managing device orientation during biometric enrollment. The user interfaces in FIGS. 9A-9P are used to illustrate the processes described below, including the processes in FIGS. 10-11. FIGS. 9Q-9AH illustrate exemplary user interface for managing requests to perform operations based on authentication requirements. FIG. 12 is a flow diagram illustrating methods of managing requests to perform operations based on authentication requirements in accordance with some embodiments. The user interfaces in FIGS. 9Q-9AH are used to illustrate the processes described below, including the processes in FIG. 12.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
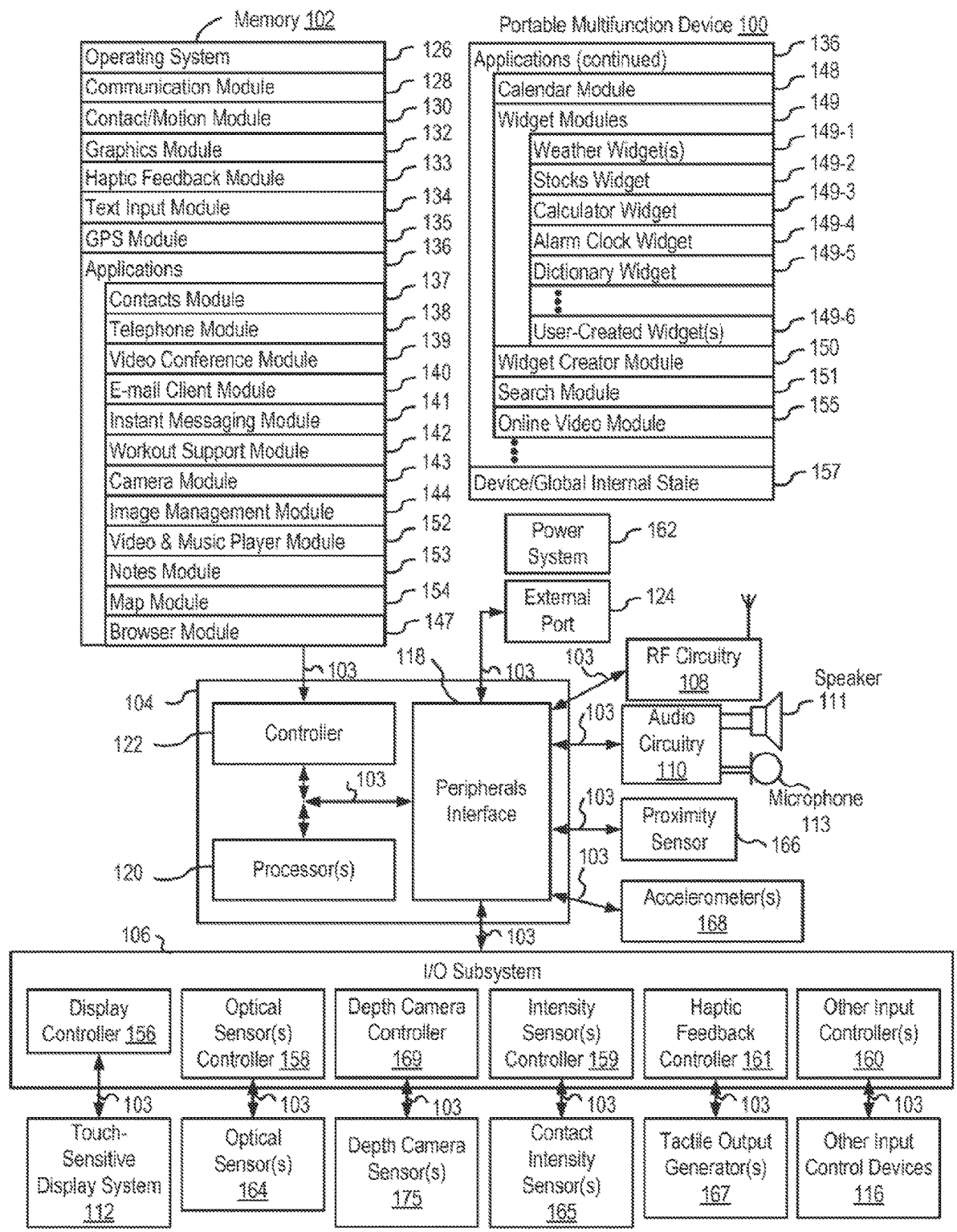
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005, (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device", Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
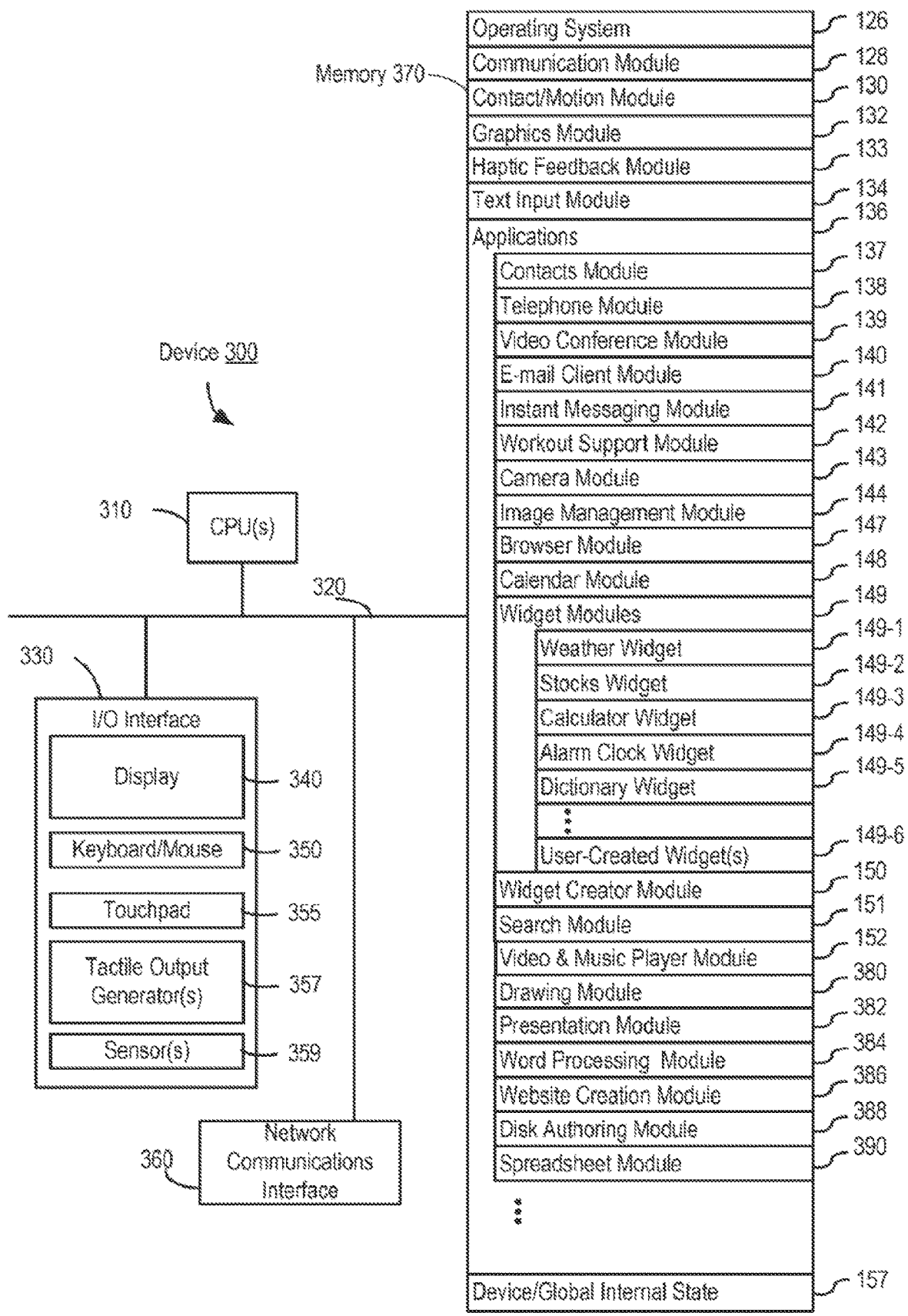
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module,
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
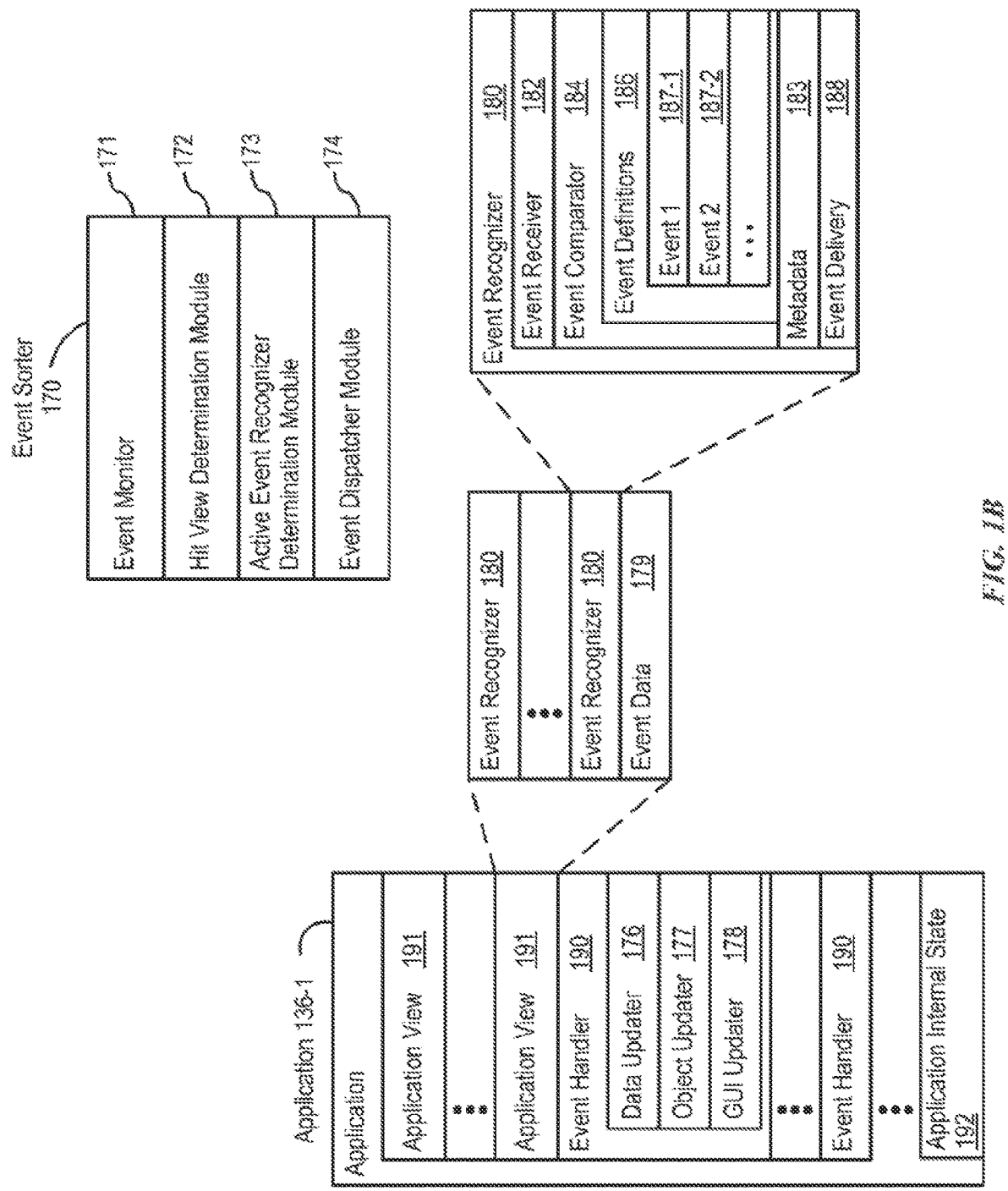
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
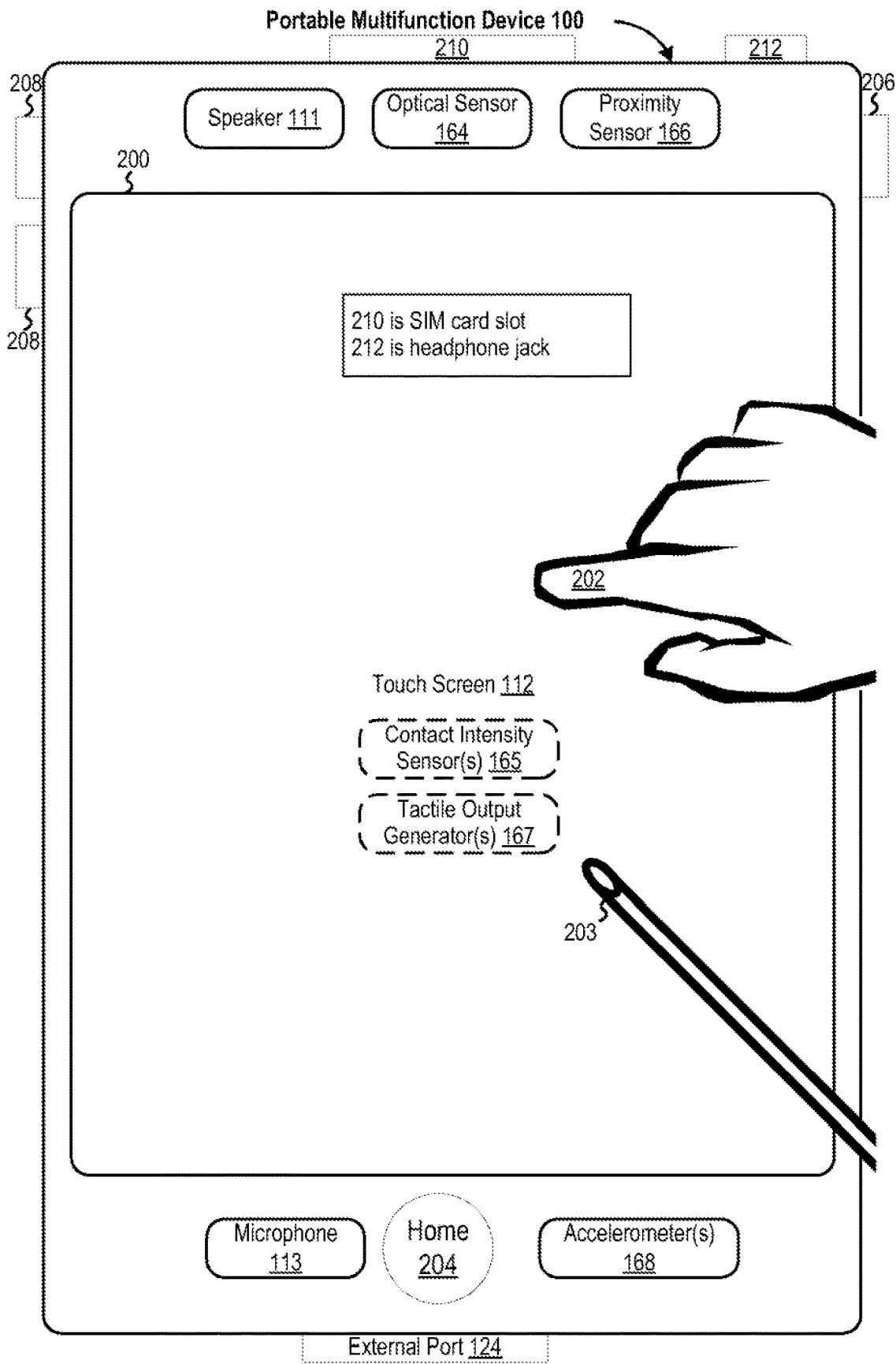
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
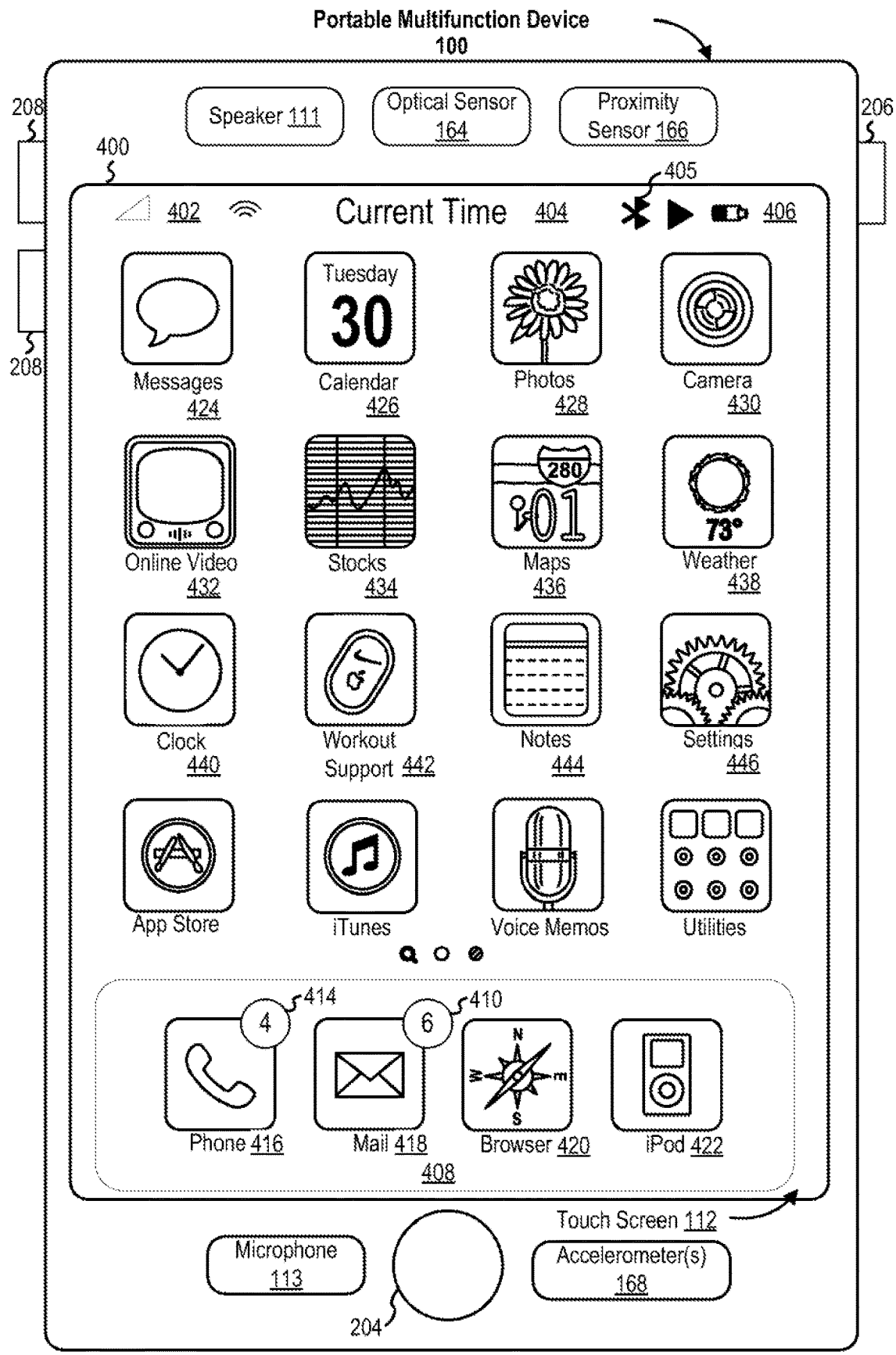
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;
Bluetooth indicator 405;
Battery status indicator 406;
Tray 408 with icons for frequently used applications, such as:
 Icon 416 for telephone module 138, labeled "Phone," which optionally includes an indicator 414 of the number of missed calls or voicemail messages;
 Icon 418 for e-mail client module 140, labeled "Mail," which optionally includes an indicator 410 of the number of unread e-mails;
 Icon 420 for browser module 147, labeled "Browser;" and
 Icon 422 for video and music player module 152, also referred to as iPod (trademark of Apple Inc.) module 152, labeled "iPod;" and
Icons for other applications, such as:
 Icon 424 for IM module 141, labeled "Messages;"
 Icon 426 for calendar module 148, labeled "Calendar;"
 Icon 428 for image management module 144, labeled "Photos;"
 Icon 430 for camera module 143, labeled "Camera;"
 Icon 432 for online video module 155, labeled "Online Video;"
 Icon 434 for stocks widget 149-2, labeled "Stocks;"
 Icon 436 for map module 154, labeled "Maps;"
 Icon 438 for weather widget 149-1, labeled "Weather;"
 Icon 440 for alarm clock widget 149-4, labeled "Clock;"
 Icon 442 for workout support module 142, labeled "Workout Support;"
 Icon 444 for notes module 153, labeled "Notes;" and
 Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
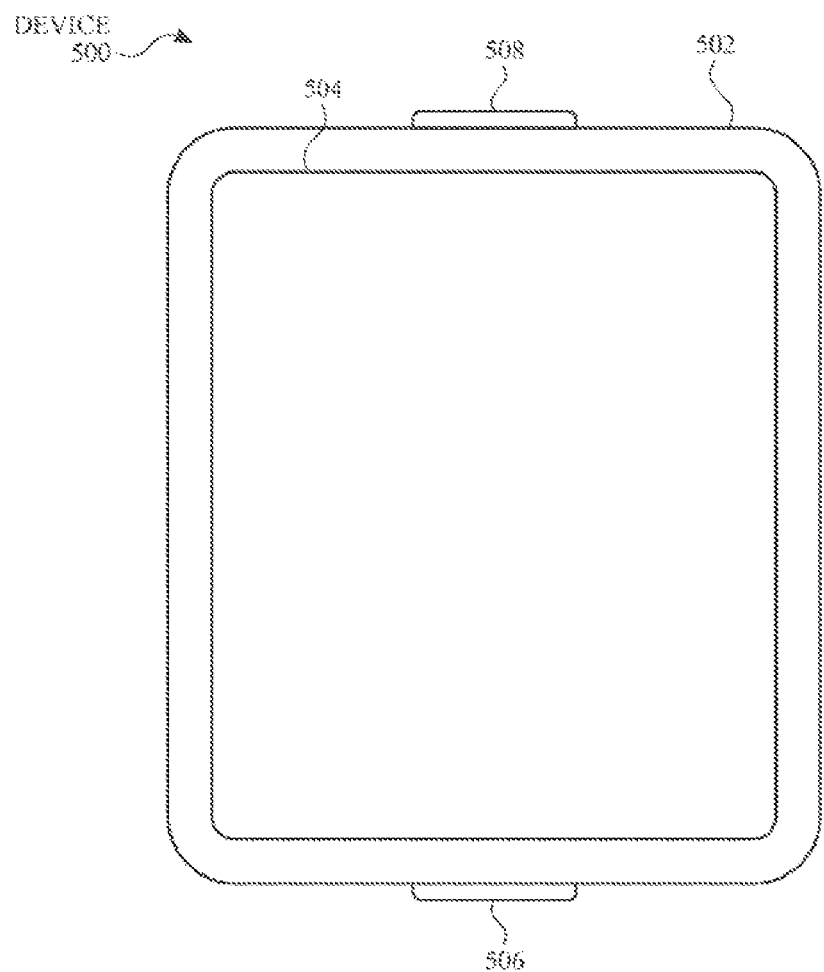
FIG. 5A illustrates a personal electronic device in accordance with some embodiments.
Figure 6A:
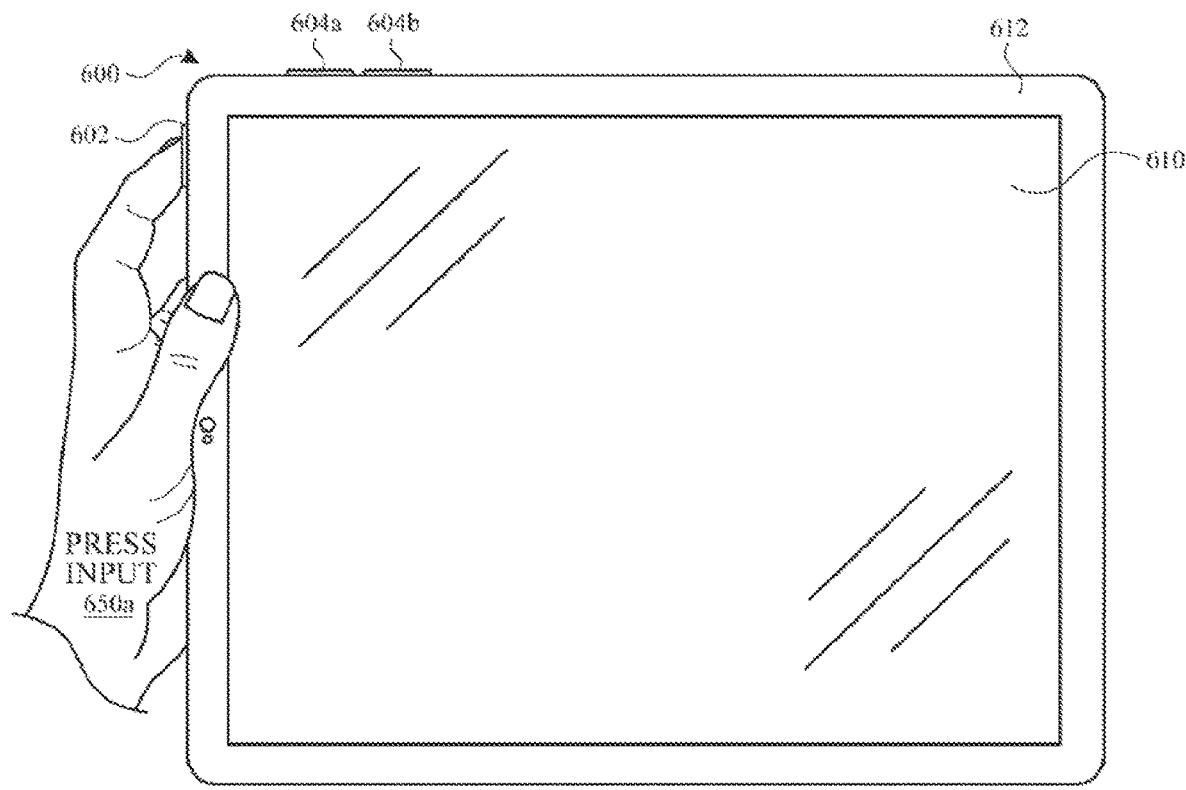
FIGS. 6A-6AY illustrate exemplary devices and user interfaces for detecting press and touch inputs and for performing biometric authentication.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as W IPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
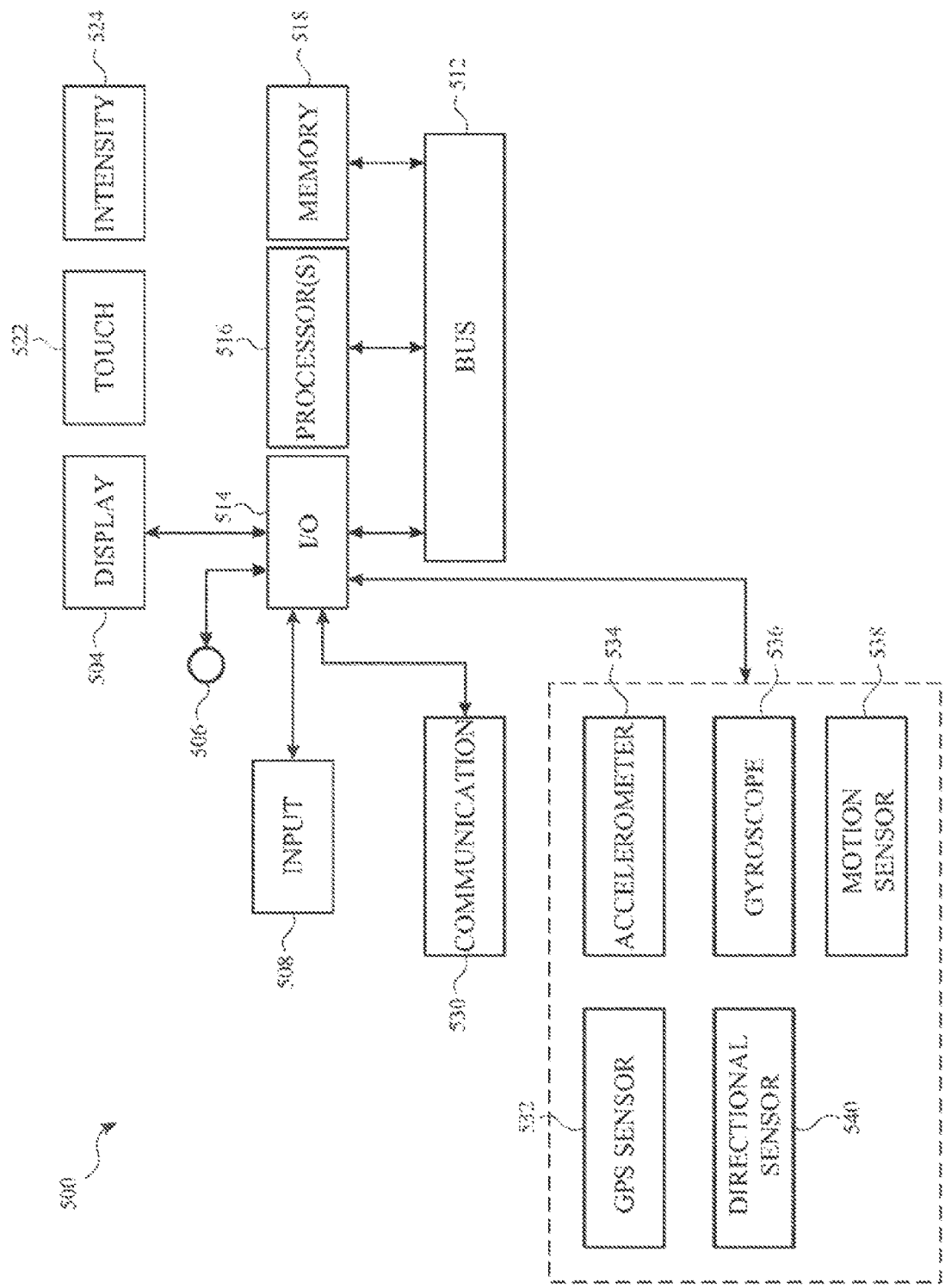
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 1000, 1100, 1200 (FIGS. 7, 8, 10, 11, and 12). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
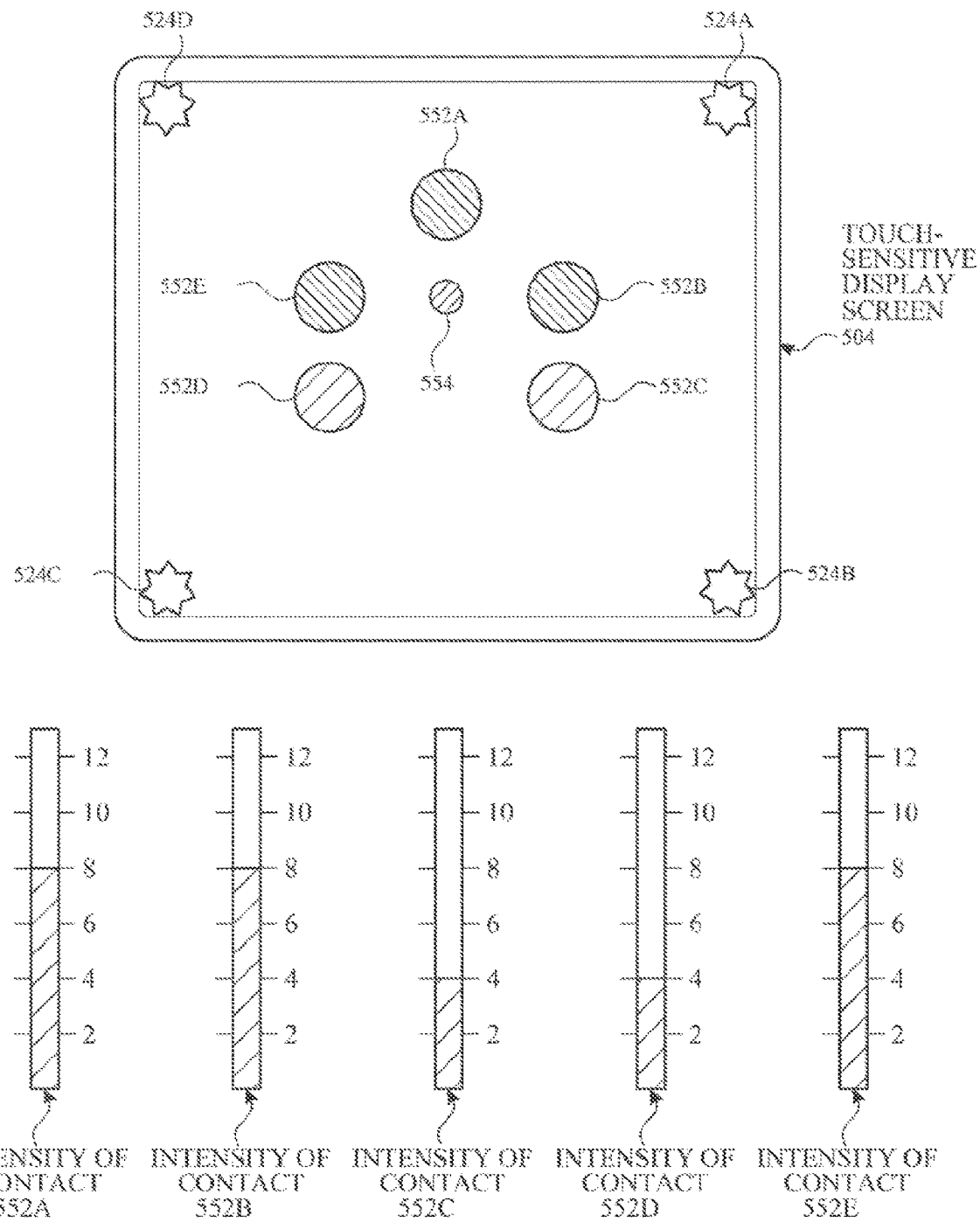

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

In some embodiments, the button (e.g., button 602) described throughout this description is optionally a mechanical button or a solid-state button.

In some embodiments, the mechanical button is a depressible button. In some embodiments, the computer system monitors for the mechanical button to be depressed (e.g., beyond a depress threshold). In accordance with a determination that the mechanical button has been depressed (a press input), the computer system determines that the mechanical button has been activated. In accordance with a determination that the mechanical button has not been depressed (not a press input), the computer system determines that the mechanical button has not been activated (or fails to detect activation of the button). In some embodiments, the duration of the activation is the duration that the mechanical button is depressed. In some embodiments, the mechanical button separately detects touch inputs (e.g., detected on the surface of the solid-state button). Thus a touch (and the duration of the touch) on the mechanical button can be detected separately from activation (and the duration of the activation) of the mechanical button, even when the same input (e.g., a touch by a finger) is used to achieve both the touch and the activation. In some embodiments, in addition to detecting touch and activation, the mechanical button includes a biometric sensor (e.g., a fingerprint sensor configured to detect fingerprints for use in fingerprint authentication of the finger used to touch/activate the button).

In some embodiments, the solid-state button is distinguished from the rest of the computer system by a ridge or other physical demarcation. For example, a user can feel the ridge or physical demarcation using a finger touch to more easily locate the solid-state button of the computer system. In some embodiments, the computer system monitors (e.g., using one or more intensity sensors) for intensities of touch inputs of the solid-state button (e.g., when the computer system is on and/or when a capacitive object (such as a finger) detected on the surface of the solid-state button). In accordance with a determination that a characteristic intensity of a touch input on the solid-state button exceeds an intensity threshold (a press input), the computer system determines that the solid-state button has been activated and, optionally, provides a tactile output (e.g., a first tactile output when the characteristic intensity exceeds the intensity threshold, and/or a second tactile output when the characteristic intensity ceases to exceed the intensity threshold, thereby providing the user with tactile feedback about the intensity of the touch). In accordance with a determination that the characteristic intensity of the touch input on the solid-state button does not exceed the intensity threshold (not a press input), the computer system determines that the solid-state button has not been activated and, optionally, forgoes providing a tactile output. In some embodiments, the duration of the activation is the duration that the characteristic intensity exceeds the intensity threshold. Thus a touch (and the duration of the touch) on the solid-state button can be detected separately from activation (and the duration of the activation) of the solid-state button, even when the same input (e.g., finger contact) is used to achieve both the touch and the activation. In some embodiments, in addition to detecting touch and activation, the solid-state button includes a biometric sensor (e.g., a fingerprint sensor configured to detect fingerprints for use in fingerprint authentication of the finger used to touch/activate the button, a face sensor, and/or an iris sensor).

In some embodiments, the computer system (e.g., 100, 300, 500, and/or 600) is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In the unlocked state, the computer system is powered on and operational and is not prevented from performing at least a portion of the predefined set of operations that cannot be performed while in the locked state. In some embodiments while the computer system is in the unlocked state, sensitive information of the computer system is accessible to the user, computer system configuration operations (e.g., clearing memory and/or changing passwords) can be performed, and/or destructive operations (e.g., files previously marked for deletion) can be changed (e.g., undone).

When the computer system is in the locked state, the computer system is said to be locked. In some embodiments, the computer system in the locked state optionally responds to a limited set of user inputs, including input that corresponds to an attempt to transition the computer system to the unlocked state or input that corresponds to powering the computer system off and/or transitioning the computer system to a low power mode of operation. In some embodiments while the computer system is in the locked state, sensitive information of the computer system is not user-accessible, computer system configuration operations (e.g., clearing memory and/or changing passwords) can't be performed, and/or destructive operations (e.g., files previously marked for deletion) can't be changed (e.g., undone).

In some embodiments, a secure element is a hardware component (e.g., a secure microcontroller chip) (e.g., of device 600) configured to securely store data or an algorithm such that the securely stored data is not accessible by the computer system without proper authentication information from a user of the computer system. Keeping the securely stored data in a secure element that is separate from other storage on the computer system prevents access to the securely stored data even if other storage locations on the computer system are compromised (e.g., by malicious code or other attempts to compromise information stored on the computer system). In some embodiments, the secure element provides (or releases) payment information (e.g., an account number and/or a transaction-specific dynamic security code). In some examples, the secure element provides (or releases) the payment information in response to the computer system receiving authorization, such as a user authentication (e.g., fingerprint authentication: facial authentication; iris authentication; passcode authentication. For example, the computer system detects a fingerprint at a fingerprint sensor (e.g., a fingerprint sensor integrated into a button) of the computer system. The computer system determines whether the fingerprint matches an enrolled fingerprint. In accordance with a determination that the fingerprint matches an enrolled fingerprint, the secure element provides (or releases) payment information. In accordance with a determination that the fingerprint does not match an enrolled fingerprint, the secure element forgoes providing (or releasing) payment information.

As used herein, a wake screen is the screen that is initially displayed when the computer system receives an input that causes the display generation component to transition from the low power state to a higher (e.g., standard) power state (e.g., a state in which more of the display device is active). In some embodiments, the wake screen transitions between not displaying secure content of a notification when the computer system is locked and displaying secure content of the notification when the computer system becomes unlocked. In some embodiments, in conjunction with transitioning the display generation component to the higher (e.g., standard) power state, the computer system also transitions input devices that were inactive to active states or to states in which the input devices detect inputs at higher frequencies (e.g., touches and/or button presses are detected at a lower frequency to conserve energy). In some embodiments, when in the low power state, the display generation component is off (e.g., not displaying any content or displaying reduced content). In some embodiments, when in the low power state, the display generation component is on and displaying content, but has reduced brightness, reduced amount of displayed content, and/or reduced energy consumption as compared to the higher power state. Thus, the same or similar information can optionally be displayed as part of the wake screen (e.g., when the display generation component is not in the low power state) as a non-wake screen (e.g., when the display generation component is in the low power state).

In some embodiments, while displaying the wake screen, the computer system receives a request to transition to a different user interface (e.g., an application user interface, and/or a user interface including a plurality of icons corresponding to applications). In response to receiving the request to transition to the different user interface: in accordance with a determination that the computer system is unlocked, the computer system displays the different user interface; and in accordance with a determination that the computer system is locked, the computer system forgoes display of the different user interface.

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6AY illustrate exemplary user interfaces for detecting press and touch inputs and for performing biometric authentication, in accordance with some embodiments. The user interfaces in these figures are used to illustrate the processes described below, including the processes in FIGS. 7 and 8.

FIG. 6A illustrates an electronic device 600 (e.g., a tablet, a smart phone) that includes display 610, housing 612, and buttons 602, 604a, and 604b. In some embodiments, a touch-sensitive surface is integrated into display 610 and display 610 is a touch-sensitive display. In some embodiments, device 600 includes one or more features of devices 100, 300, and/or 500.

Display 610 can operate in a low power state and a standard power state. For example, in the low power state, display 610 is optionally off or is in a low power consumption state in which less information is displayed via the display (e.g., at least a portion of the display is off (e.g., the display portion of display 610 is off while a touch-sensitive surface of display 610 remains active to detect touches), and/or the display is dimmed). In the standard power state, the display is not off and is not in the low power consumption state. In the examples of FIGS. 6A-6AY, display 610 is off when in the low power state. When display 610 is not off, the display is not in the low power state.

Button 602 is optionally a mechanical button or a solid-state button, as described above. A press input by the user of button 602 activates button 602 for less than a long-press threshold period of time (e.g., for less than an activation duration). A long press input by the user of button 602 activates button 602 for longer than the long-press threshold period of time (e.g., longer than the activation duration). Button 602 includes an integrated fingerprint sensor, which enables electronic device 600 to detect fingerprint features of a finger as the finger touches button 602 (e.g., a touch input where the finger is placed on button 602 without providing a press input) and while the finger is providing a press input of button 602.

Buttons 604a and 604b optionally do not include an integrated fingerprint sensor. Buttons 604a and 604b, when activated, increase and decrease, respectively, a volume of electronic device 600.

Figure 6B:
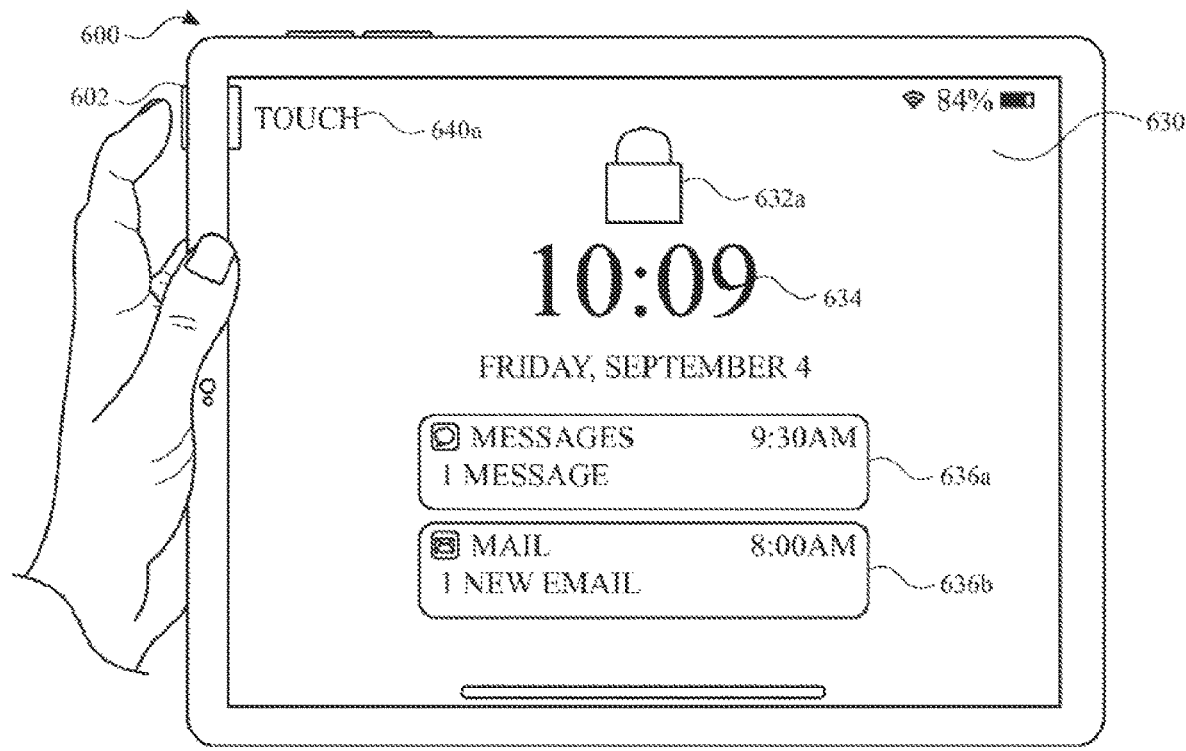

At FIG. 6A, display 610 is off. Detecting a press input while in the low power state (e.g., display being off) causes device 600 to display awake screen. While display 610 is off, electronic device 600 detects press input 650a of button 602. At FIG. 6B, in response to detecting press input 650a, display 610 transitions out of the low power state and device 600 displays wake screen 630. At FIG. 6B, wake screen 630 includes lock icon 632a indicating that device 600 is locked, current date and time 634, and unread notifications 636a and 636b. Unread notifications 636a and 636b include indications of the app (e.g., Messages, Mail) and the time the notification was received. Because device 600 is locked, secure content of unread notifications 636a and 636b are not displayed.

Press input 650a (and any subsequent touch of button 602 prior to breaking contact) was not sufficiently long to enable device 600 to detect the fingerprint features of the finger and determine whether the fingerprint corresponds to an authorized fingerprint (the fingerprint corresponds to an enrolled fingerprint) or does not correspond to an authorized fingerprint (the fingerprint does not correspond to any enrolled fingerprint). As a result, device 600 displays wake screen 630 and remains locked. Device 600 determines that a finger is not touching the fingerprint sensor of button 602 and, as a result, displays touch graphical element 640a indicating that a touch input is required to unlock device 600 and/or transition to a different user interface. Touch graphical element 640a is displayed.

Figure 6C:
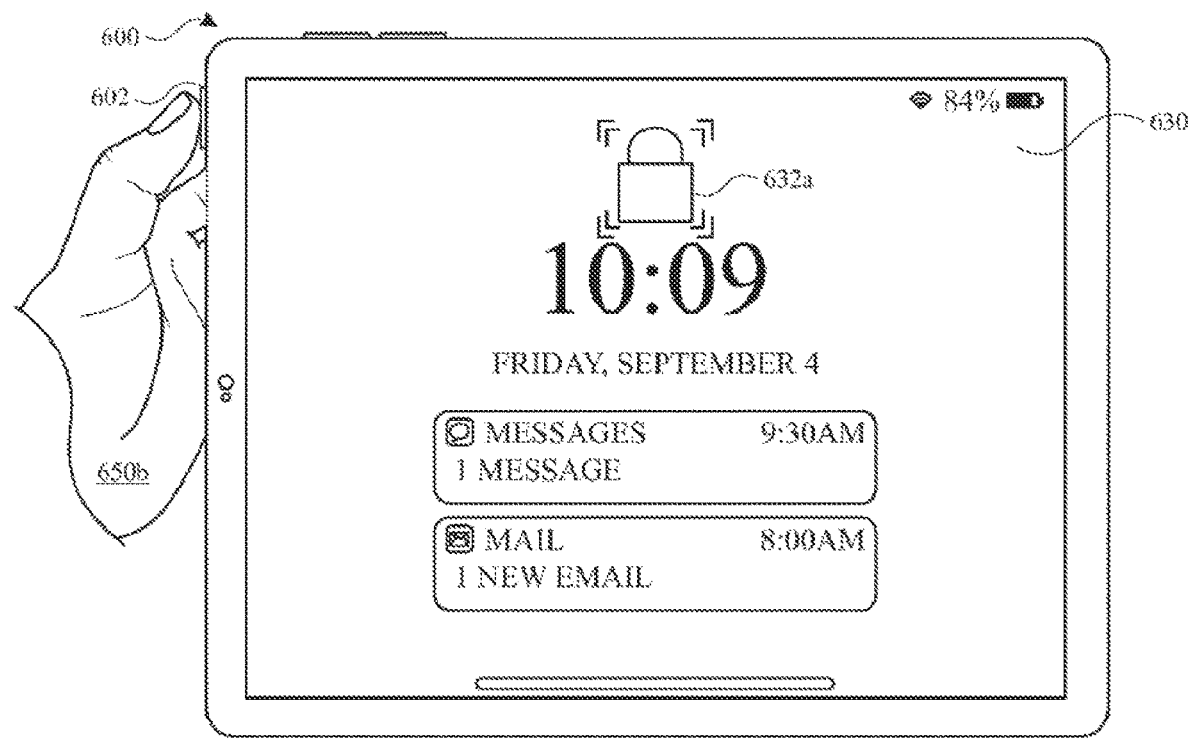

At FIG. 6C, device 600 detects touch input 650b of a fingerprint that does not correspond to an authorized fingerprint on the fingerprint sensor of button 602. In response to detecting touch input 650b of the fingerprint that does not correspond to an authorized fingerprint while device 600 is locked, device 600 remains locked and provides the user with feedback that the fingerprint does not corresponds to an authorized fingerprint, such as by displaying an animation of lock icon 632a shaking back and forth. In some embodiments, device 600 replaces display of touch graphical element 640a with an indication (e.g., textual message) that the fingerprint does not corresponds to an authorized fingerprint. Because device 600 is locked, secure content of unread notifications 636a and 636b are not displayed.

Figure 6D:
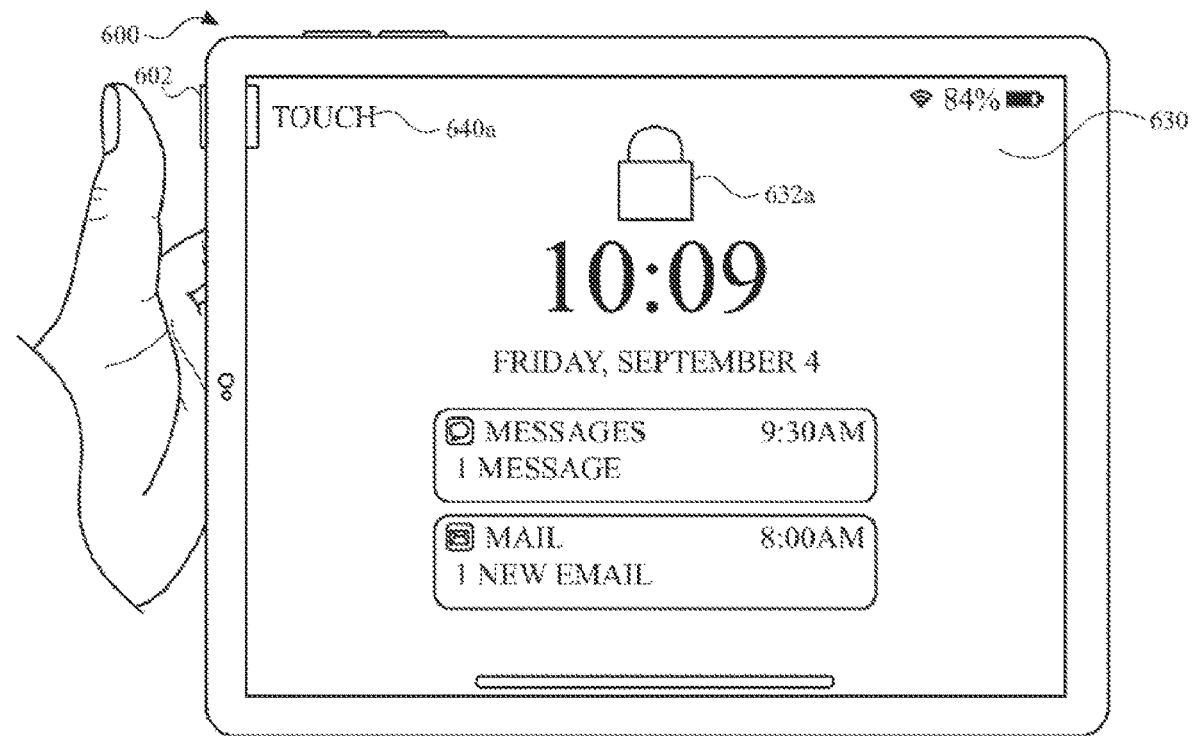

At FIG. 6D, device 600 determines that a finger is not touching the fingerprint sensor of button 602 and, as a result, displays touch graphical element 640a ("Touch", in this example) indicating that a touch input can be used to unlock device 600 and/or to transition to a different user interface (e.g., a home screen with application icons and/or a user interface of an application). Device 600 displays touch graphical element 640a next to button 602 to provide the user with an indication of the location of the button, as the location of the button may change with respect to the user interface as the orientation of device 600 changes. The placement of touch graphical element 640a within wake screen 630 is based on the orientation of device 600. At FIG. 6D, because the user interface is displayed in the landscape orientation (based on detecting the landscape orientation of device 600) with volume buttons 604a, 604b at the top of the user interface, the touch graphical element 640a is displayed on a top left corner of wake user interface 630, adjacent to button 602.

Figure 6E:
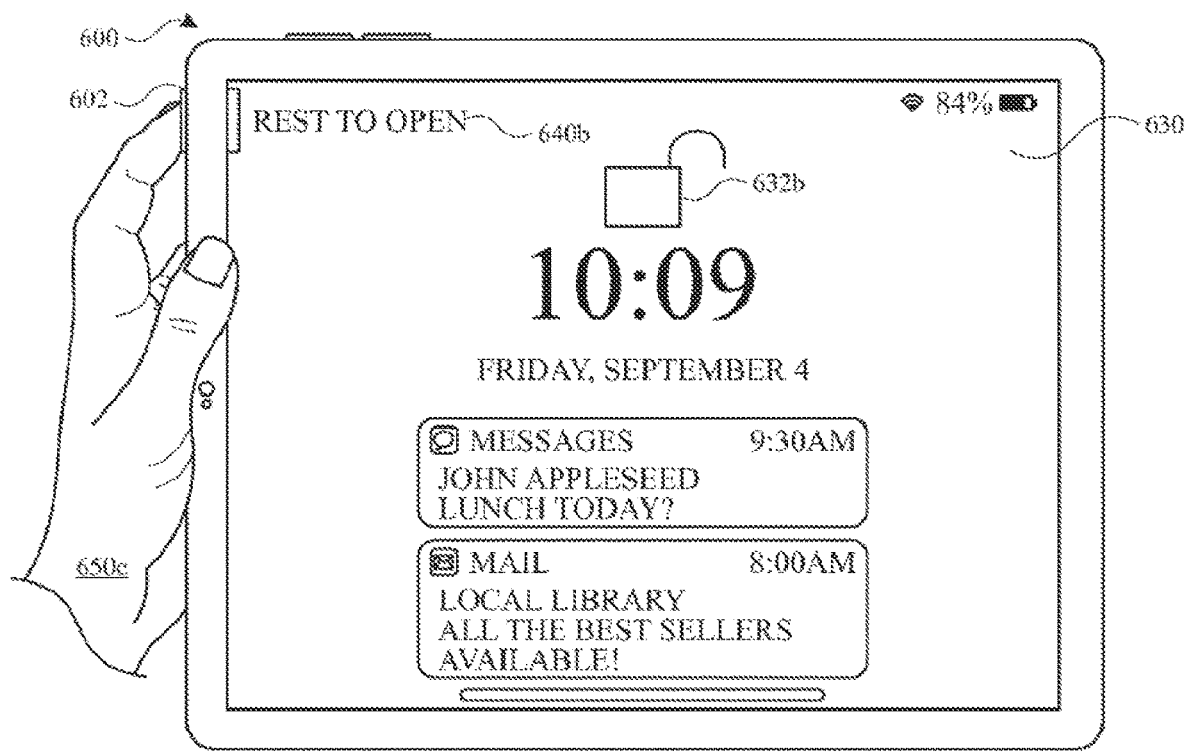

At FIG. 6E, device 600 detects touch input 650c and determines that the input on the fingerprint sensor of button 602 includes fingerprint information of a finger that corresponds to an authorized finger. In response to detecting touch input 650c of the fingerprint that corresponds to an authorized fingerprint (and because touch input 650 is determined to be authorized) while device 600 is locked, device 600 unlocks device 600 and replaces touch graphical element 640a with rest graphical element 640b (e.g., "Rest to open", displayed at the same location in the user interface, and/or using the same placement criteria as touch graphical element 640a). Rest graphical element 640b indicates to the user that they should provide a touch input (by resting their finger on the fingerprint sensor) to transition to a subsequent user interface (e.g., a home screen with application icons and/or a user interface of an application). In some examples, a cross-fade animation is used to replace touch graphical element 640a with rest graphical element 640b. Further in response to detecting touch input 650c of the fingerprint that corresponds to the authorized fingerprint while device 600 is locked, device 600 replaces (e.g., via an unlocking animation) lock icon 632a with unlock icon 632b and displays secure content (e.g., name of sender and/or portions of contents of notifications) of unread notifications 636a and 636b.

Figure 6F:
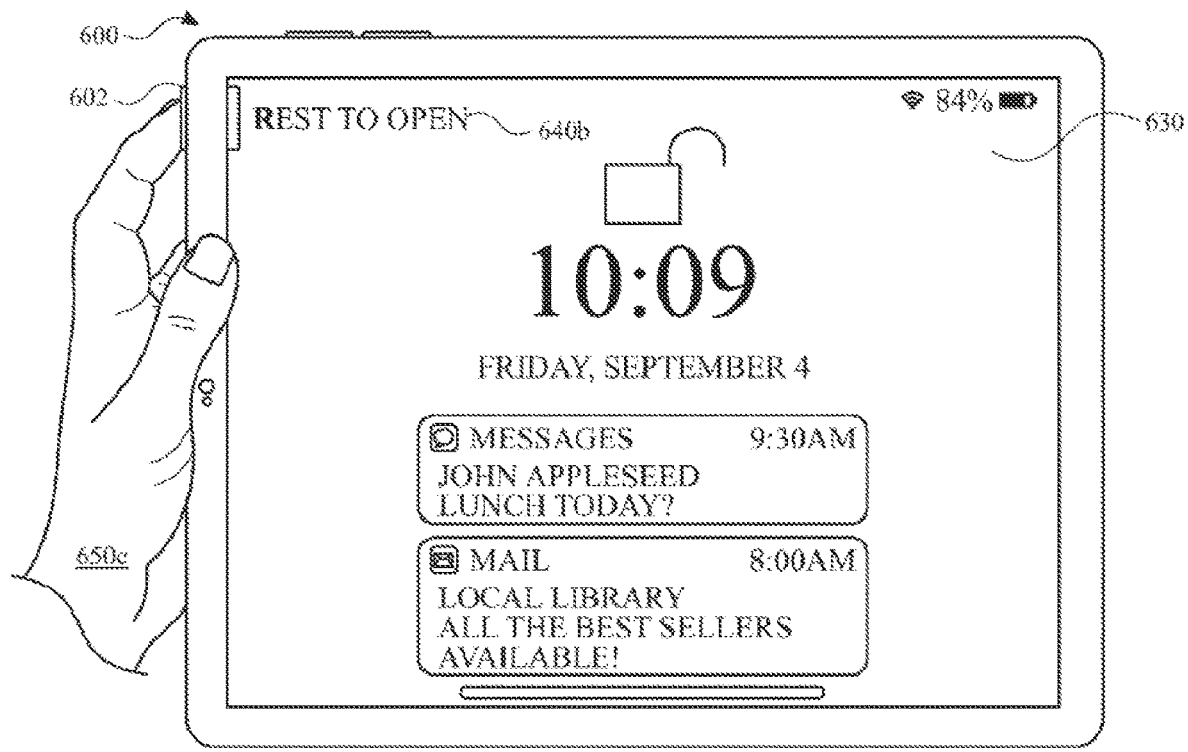

At FIG. 6F, as device 600 continues to detect a touch input of a finger on the fingerprint sensor of button 602, device 600 updates rest graphical element 640b to reflect the duration for which the touch input has been detected. Rest graphical element 640b is a threshold indicator that indicates progress toward reaching an input threshold of time by progressing a visual change (e.g., a change in color, a change in brightness, a change in boldness) across rest graphical element 640b over time (e.g., by sequentially updating letters, as shown in FIG. 6AY). The progress of the visual change to rest graphical element 640b corresponds to the progress toward reaching the input threshold of time. Because the touch input was initially detected (at FIG. 6E) while the display was not operating in the low power state (and, optionally, because notifications are displayed), the input threshold of time is a first amount of time (e.g., 0.2 seconds, 0.25 seconds, 0.375 seconds, 0.5 seconds, or 1 second).

Figure 6G:
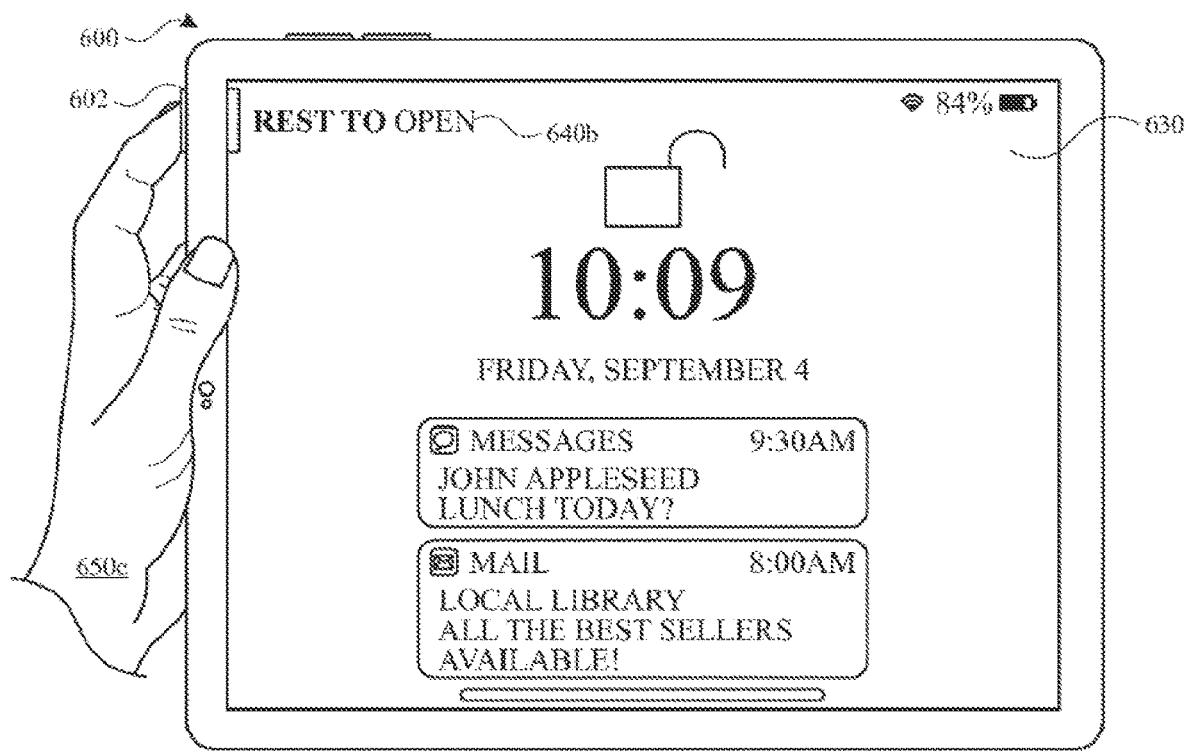

At FIG. 6G, as device 600 continues to detect the touch input (e.g., without detecting liftoff of the touch input, and/or without detecting an interrupting of the touch input) on the fingerprint sensor of button 602, device 600 continues to update rest graphical element 640b to reflect the duration for which the touch input has been detected, such as by sequentially updating or highlighting letters of rest graphical element 640b. The first amount of time (e.g., 0.2 seconds, 0.25 seconds, 0.375 seconds, 0.5 seconds, or 1 second) provides the user with an opportunity to review the secure content of the notifications to decide whether to continue providing the touch input to navigate away from the wake screen.

Figure 6H:
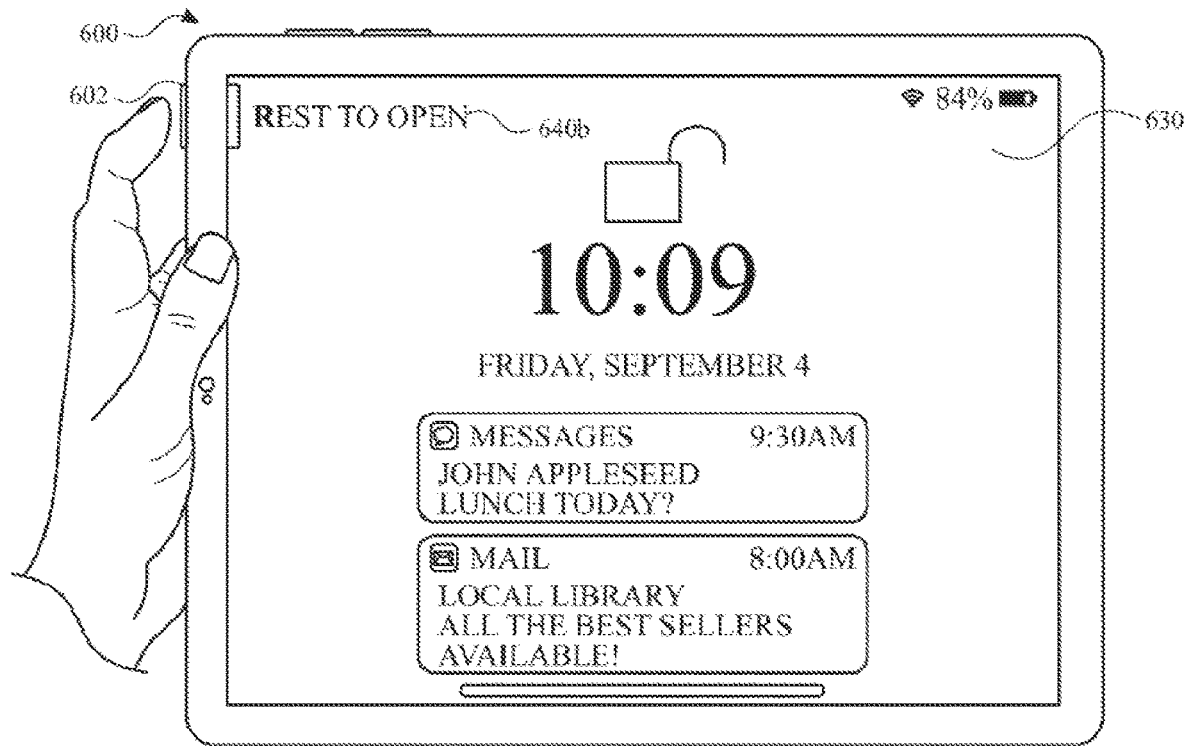

At FIG. 6H, device 600 detects a liftoff of the touch input from the fingerprint sensor of button 602. In response, device 600 resets the progress toward reaching the threshold input (e.g., device 600 will navigate away from the wake screen based on a subsequent touch input after detecting the touch input for the full input threshold of time (uninterrupted)). In response to detecting liftoff of the touch input, the progress of the visual change to rest graphical element 640b ceases and optionally regresses (e.g., the animation of sequentially updating or highlighting letters is reversed). Device 600 remains unlocked (e.g., for 3 minutes, 5 minutes, 8 minutes, and/or until a timeout condition is met).

Figure 6I:
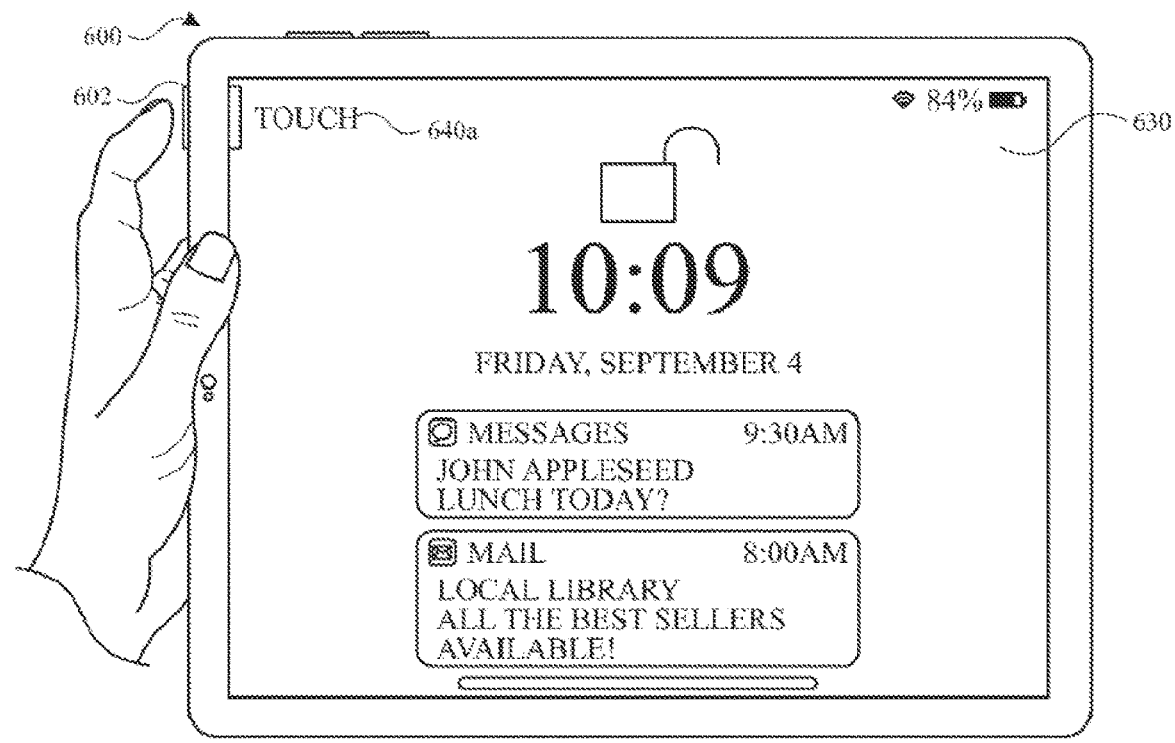

At FIG. 6I, after a predetermined amount of time, device 600 ceases to display rest graphical element 640b and, optionally, displays touch graphical element 640a (e.g., using a cross-fade animation) instead to indicate to the user that a touch input is required to transition to a subsequent user interface. Device 600 remains unlocked and, accordingly, secure content of unread notifications 636a and 636b continue to be displayed.

Figure 6J:
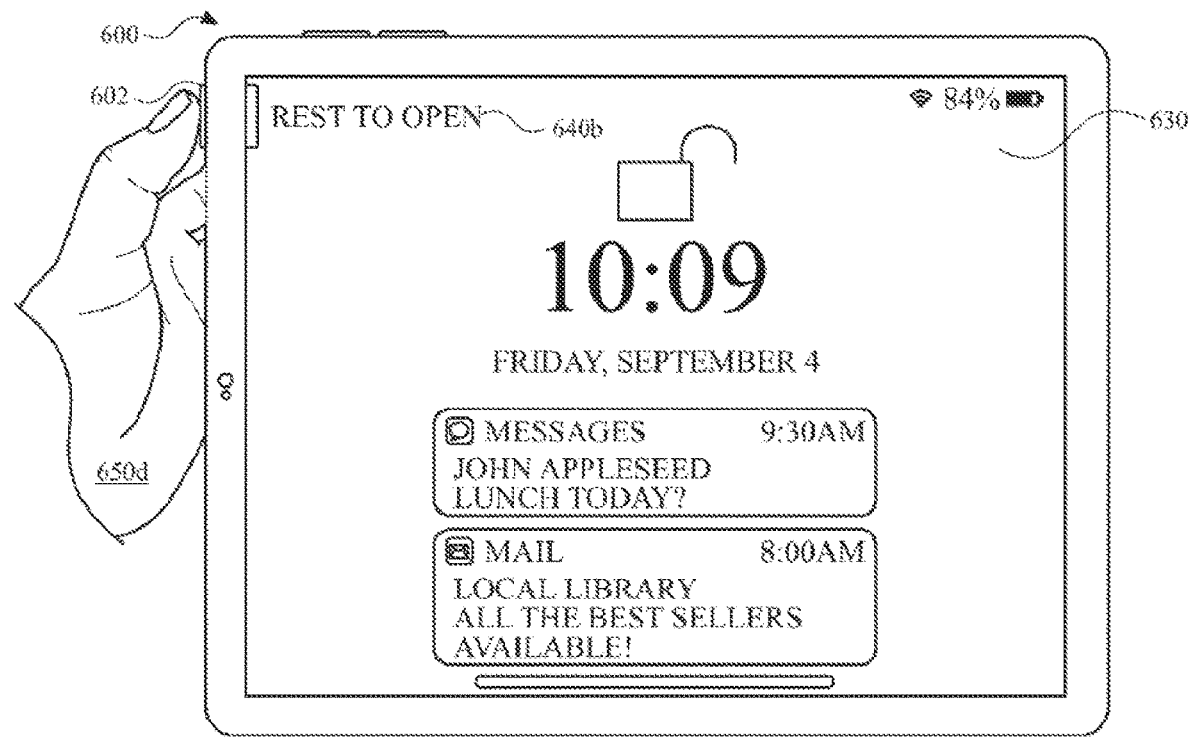
Figure 6K:
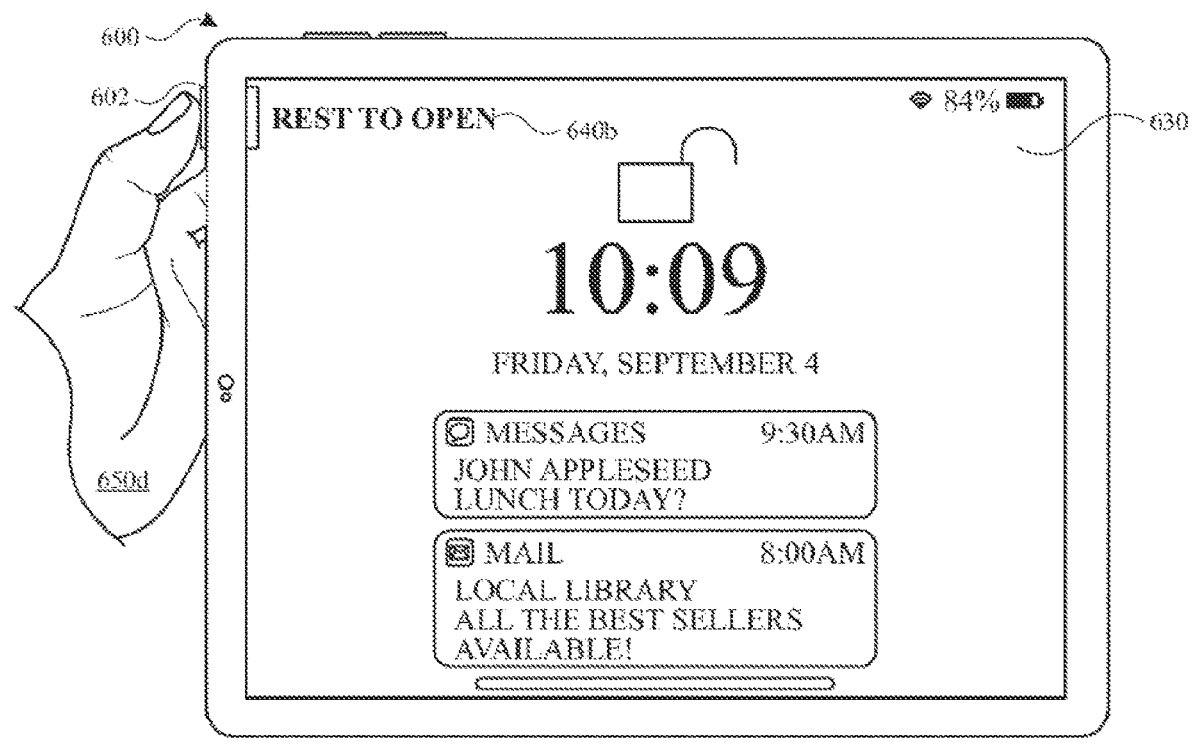

At FIGS. 6J-6K, device 600 detects touch input 650d of a finger that corresponds to an authorized finger on the fingerprint sensor of button 602. In response to detecting touch input 650d, device 600 replaces touch graphical element 640a with rest graphical element 640b and progresses toward reaching the threshold input of the first amount of time. Because device 600 was unlocked when touch input 650d was detected, device 600 progress toward the threshold input regardless of whether touch input 650d is made with a finger that does or does not corresponds to an authorized finger. At FIG. 6K, device 600 determines that touch input 650d has been provided for the full duration of the first amount of time, as indicated by rest graphical element 640b being fully highlighted. Thus, when the input on button 602 is initially detected when device 600 is unlocked, display 610 is on, and notifications are displayed, device 600 uses the first amount of time (e.g., 0.2 seconds, 0.25 seconds, 0.375 seconds, 0.5 seconds, or 1 second) as the threshold input.

Figure 6L:
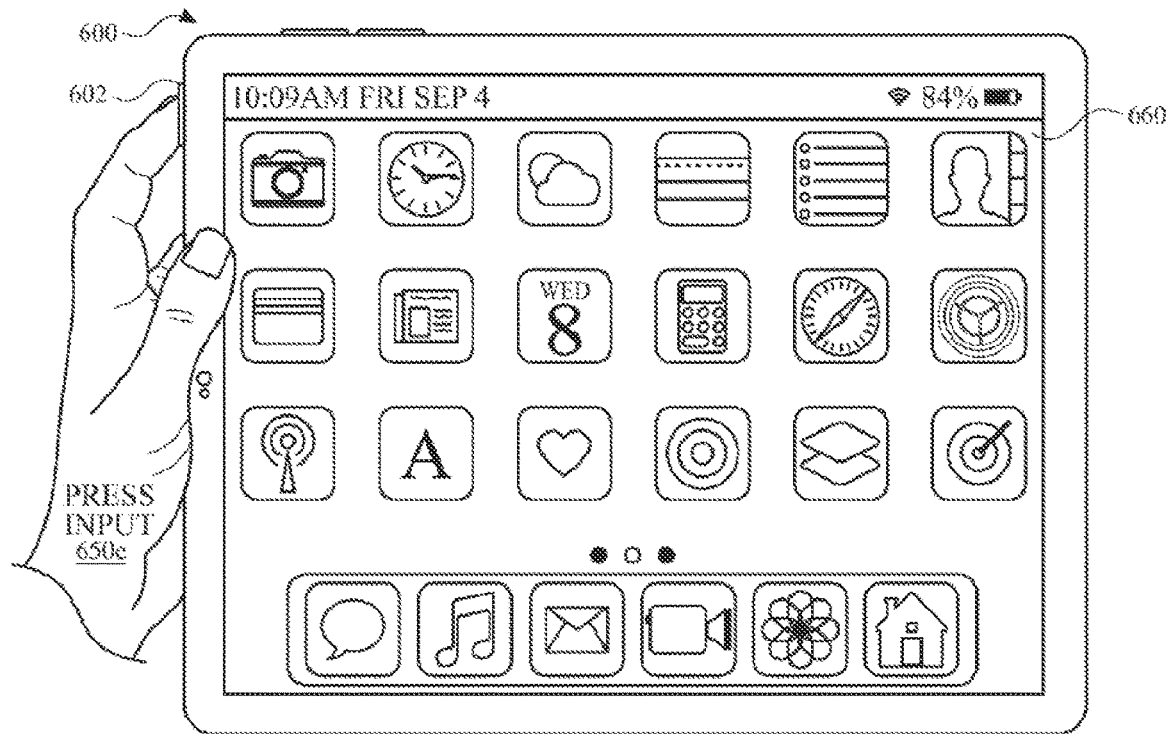

In response to the determination that touch input 650d has been provided for the full duration of the first amount of time, device 600 transitions to a subsequent user interface, as shown in FIG. 6L. In this example, device 600 transitions to displaying home screen 660, which includes a plurality of icons, wherein a tap input on a respective icon causes device 600 to display a user interface of the application corresponding to the respective icon.

Figure 6M:
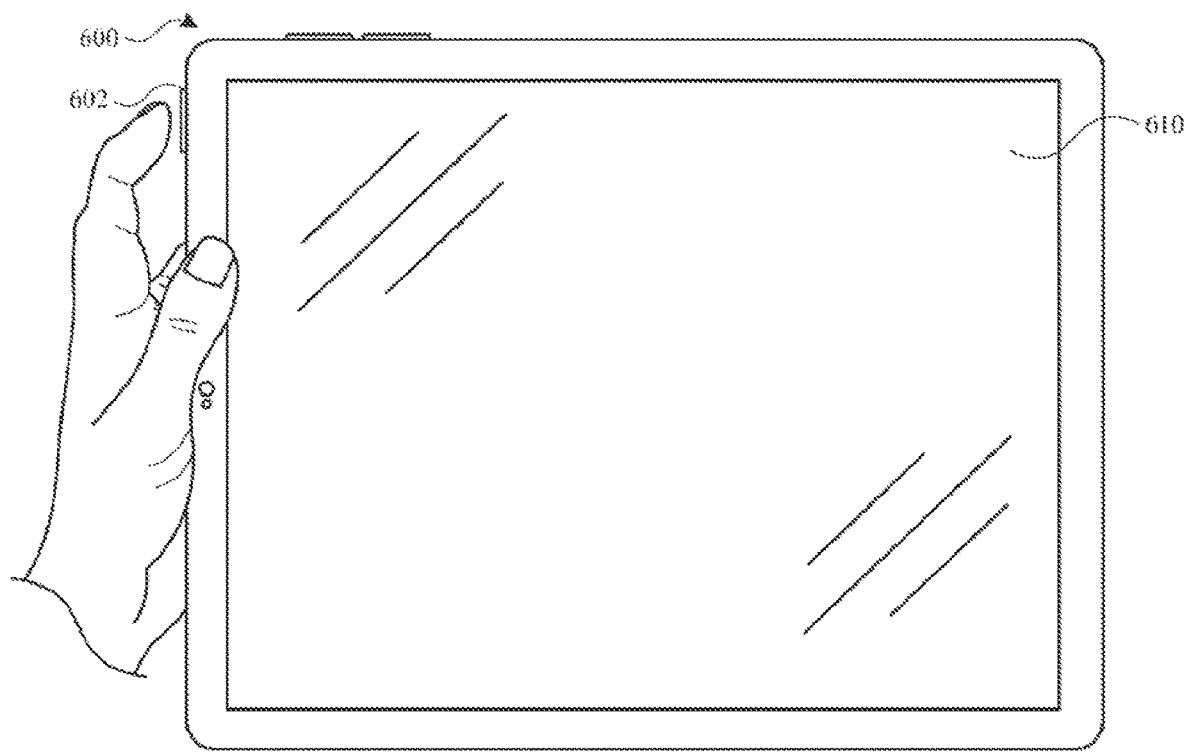

At FIG. 6L, while displaying home screen 660 (or alternatively, another user interface), device 600 detects a press input 650e of button 602. In response to detecting press input 650e when display 610 is on, device 600 turns display 610 off, as shown in FIG. 6M, and becomes locked.

Figure 6N:
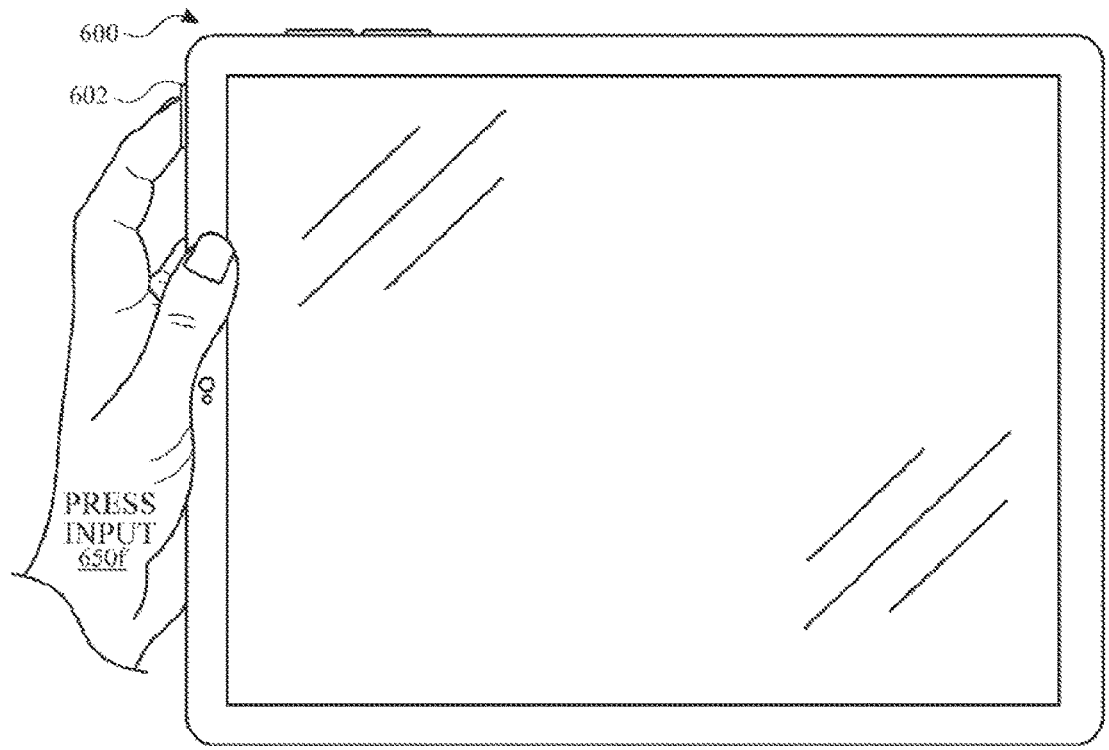

At FIG. 6N, while display 610 is off, electronic device 600 detects press input 650f of button 602.

Figure 6O:
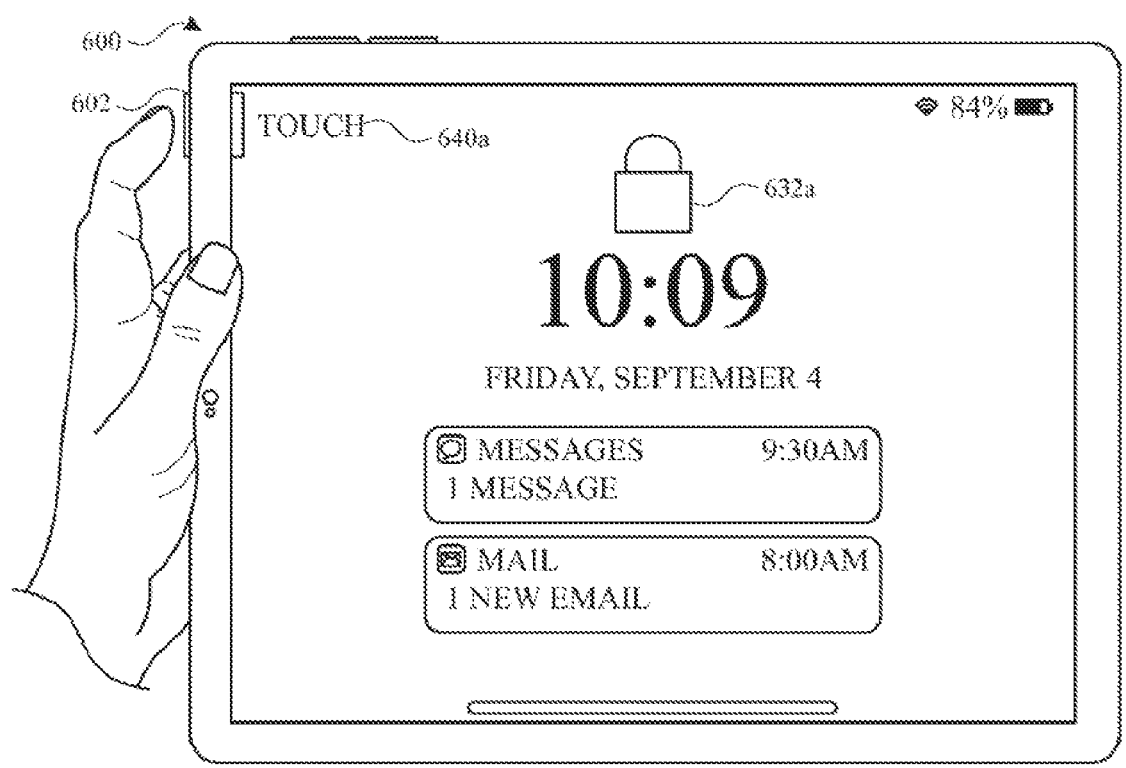

At FIG. 6O, in response to detecting press input 650f, device 600 displays wake screen 630. Press input 650f (and any subsequent touch of button 602) was not sufficiently long to enable device 600 to detect fingerprint features of the fingerprint and determine whether the finger corresponds to a finger that is authorized or does not corresponds to a finger that is authorized. As a result, wake screen 630 includes lock icon 632a indicating that device 600 is locked and unread notifications 636a and 636b. Because device 600 is locked, secure content of unread notifications 636a and 636b are not displayed. At FIG. 6O, device 600 also displays touch graphical element 640a indicating that a touch input can be used to unlock device 600 and/or transition to a different user interface.

FIGS. 6P-6V illustrate an exemplary scenario where device 600 receives input directed to button 602 that starts when device 600 is locked, display 610 is on and displaying wake screen 630 with notifications.

Figure 6P:

At FIG. 6P, device 600 detects touch input 650g of a fingerprint that corresponds to an authorized fingerprint on the fingerprint sensor of button 602. In response to detecting (while device 600 is locked) touch input 650g of the fingerprint that corresponds to the authorized fingerprint, device 600 unlocks, displays unlock icon 632b, displays secure content of unread notifications 636a and 636b, replaces touch graphical element 640a with rest graphical element 640b and progresses toward reaching the threshold input.

Figure 6Q:

As illustrated in FIG. 6Q, device 600 continues to detect touch input 650g and, as a result, device 600 continues progress toward reaching the threshold input amount of time, as reflected by highlighting of rest graphical element 640b. In response to a determination that touch input 650g has been provided for the threshold input amount of time, device 600 transitions to a subsequent user interface, as alternatively shown in FIGS. 6R and 6S. When the input on button 602 is initially detected when device 600 is locked, display 610 is on, and notifications are displayed, device 600 uses the first amount of time (e.g., 0.2 seconds, 0.25 seconds, 0.375 seconds, 0.5 seconds, or 1 second) as the threshold input.

Figure 6R:
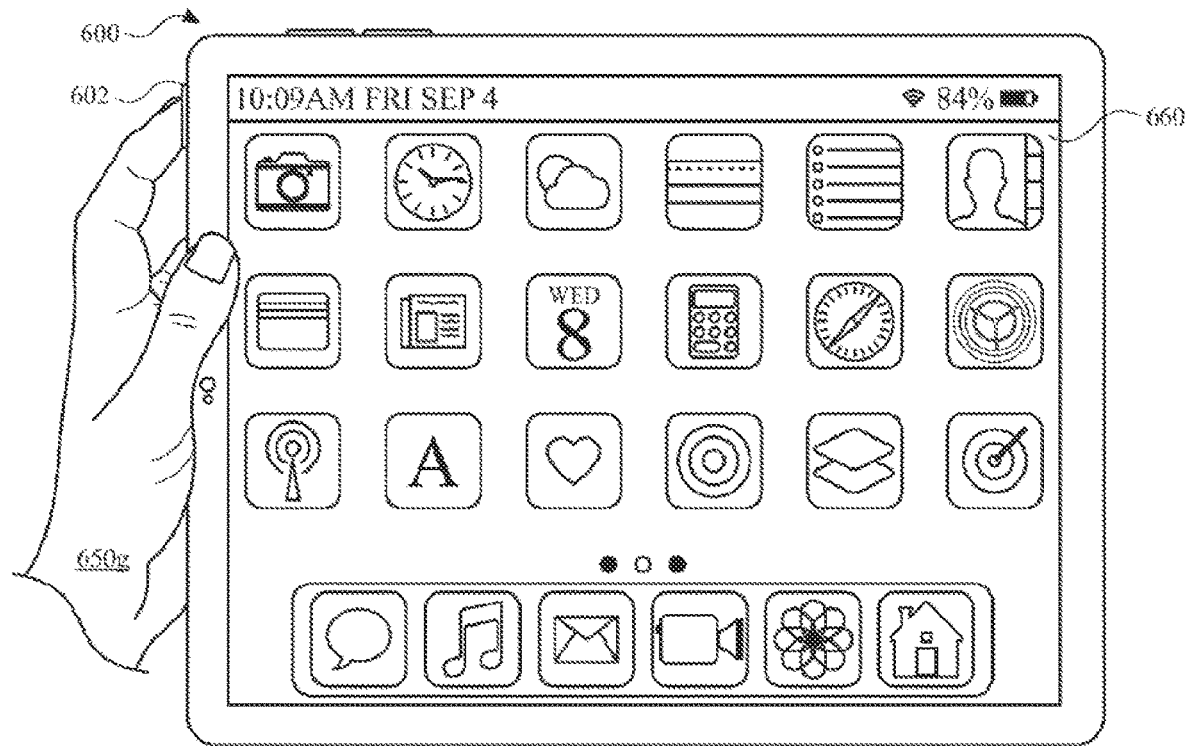
Figure 6S:
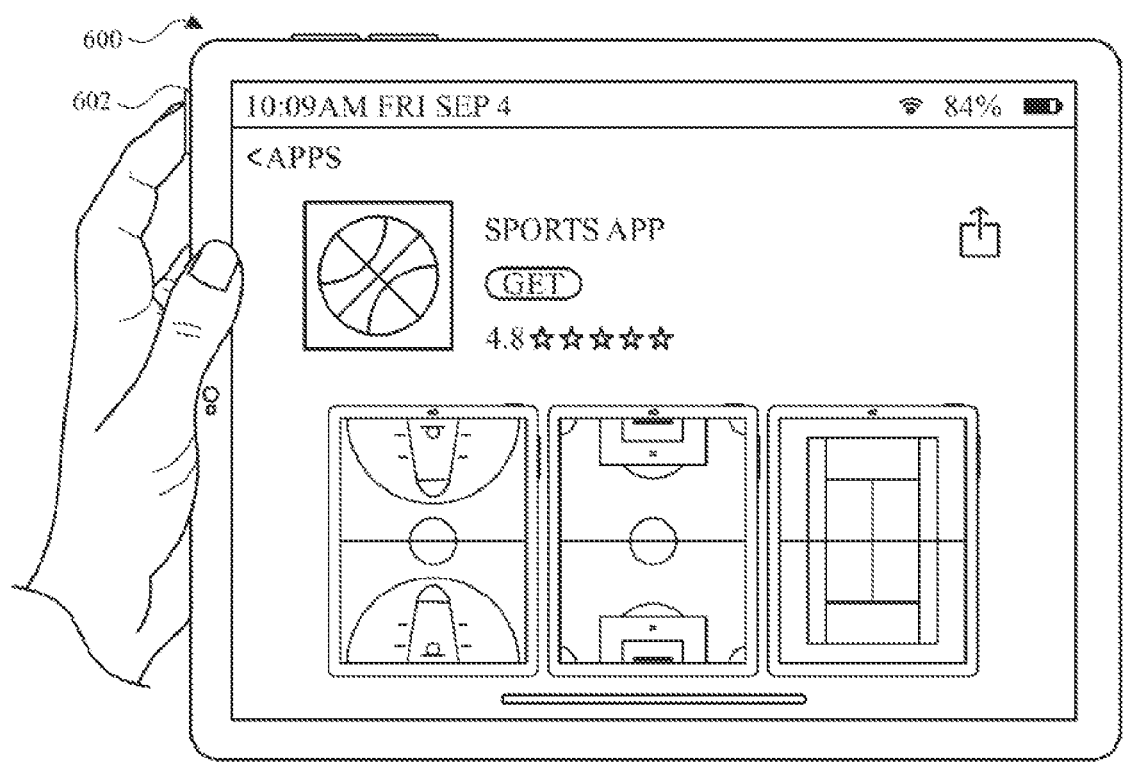

At FIG. 6R, the subsequent user interface is a home screen 660, which includes a plurality of icons, wherein a tap input on a respective icon causes device 600 to display a user interface of the application corresponding to the respective icon. At FIG. 6S, the subsequent user interface is a user interface of an application. The application is, optionally, selected based on selection criteria. In some embodiments, the selection criteria specifies that the application is a most recently displayed (or accessed) application, and thus a user interface of the most recently application is displayed (e.g., first application when it is the most recently displayed, second application when it is the most recently displayed). In some embodiments, the selection criteria specifies that the application is a most recently selected application (e.g., via a user input to display the application), and thus a user interface of the most recently selected application is displayed (e.g., third application when it is the most recently selected, fourth application when it is the most recently selected). The subsequent user interface continues to be displayed independent of whether the user continues to provide touch input 650g. A press input of button 602 while the subsequent user interface is displayed causes device 600 to lock and for display 610 to be turned off.

Figure 6T:
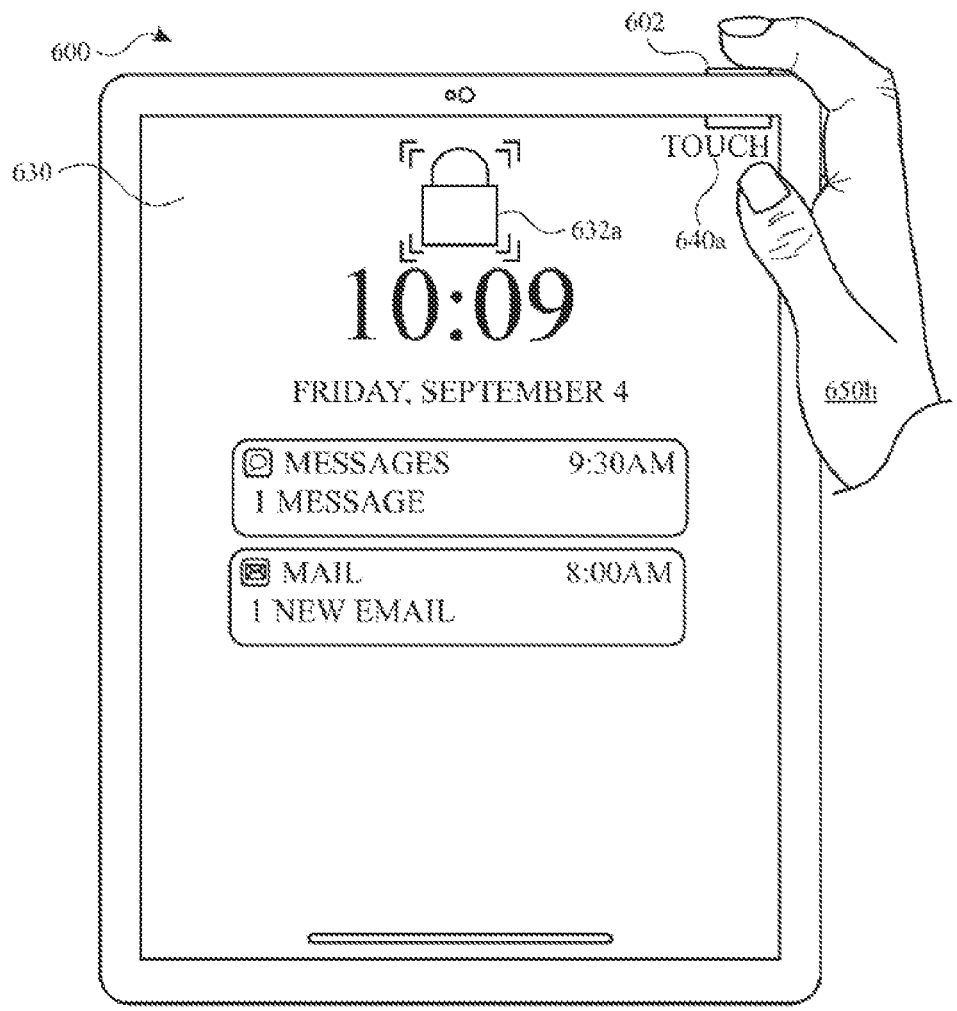

FIG. 6T illustrates device 600 in a portrait orientation (with volume buttons 604a, 604b at the top of the user interface) based on the user having turned device 600 to portrait orientation (e.g., as a result of detected rotation of the device by 90 degrees or approximately 90 degrees). As a result of being in the portrait orientation, device 600 displays wake screen 630 in a portrait orientation and displays touch graphical element 640a to indicate that a touch input can be used to unlock device 600. Touch graphical element 640a is displayed in a different portion of wake screen 630, as compared to when wake screen 630 is displayed in the landscape orientation. Device 600 displays touch graphical element 640a next to button 602 to provide the user with an indication of the location of the button, as the location of button 602 (and therefore touch graphical element 640a) changes with respect to the user interface as the orientation of device 600 changes. The placement of touch graphical element 640a within wake screen 630 is based on the orientation of device 600. In this example, (based on detecting the portrait orientation of device 600) touch graphical element 640a is displayed in the top-right corner of the display next to button 602.

At FIG. 6T, while device 600 is locked, device 600 detects touch input 650h on button 602. In response to detecting touch input 650h, and based on a determination that the fingerprint on the fingerprint sensor corresponds to an unauthorized fingerprint, device 600 remains locked and provides the user with feedback that the fingerprint does not correspond to an authorized fingerprint (e.g., is unauthorized), such as by displaying an animation of lock icon 632a shaking back and forth. In some embodiments, device 600 replaces display of touch graphical element 640a with an indication (e.g., textual message) that the fingerprint does not correspond to an authorized fingerprint (or ceases to display touch graphical element 640a when a fingerprint is detected). Because device 600 remains locked, secure content of unread notifications 636a and 636b continue to not be displayed. If a fingerprint that corresponds to an authorized fingerprint had been used to provide touch input 650h, device 600 would unlock and replace touch graphical element 640a with rest graphical element 640b (at the same location in the user interface as touch graphical element 640a) and would progress toward reaching the threshold input of the first amount of time, as would be indicated by visual changes to the displayed rest graphical element 640b in the (same) top right corner of the display (based on the orientation of displayed wake screen 630).

Figure 6U:
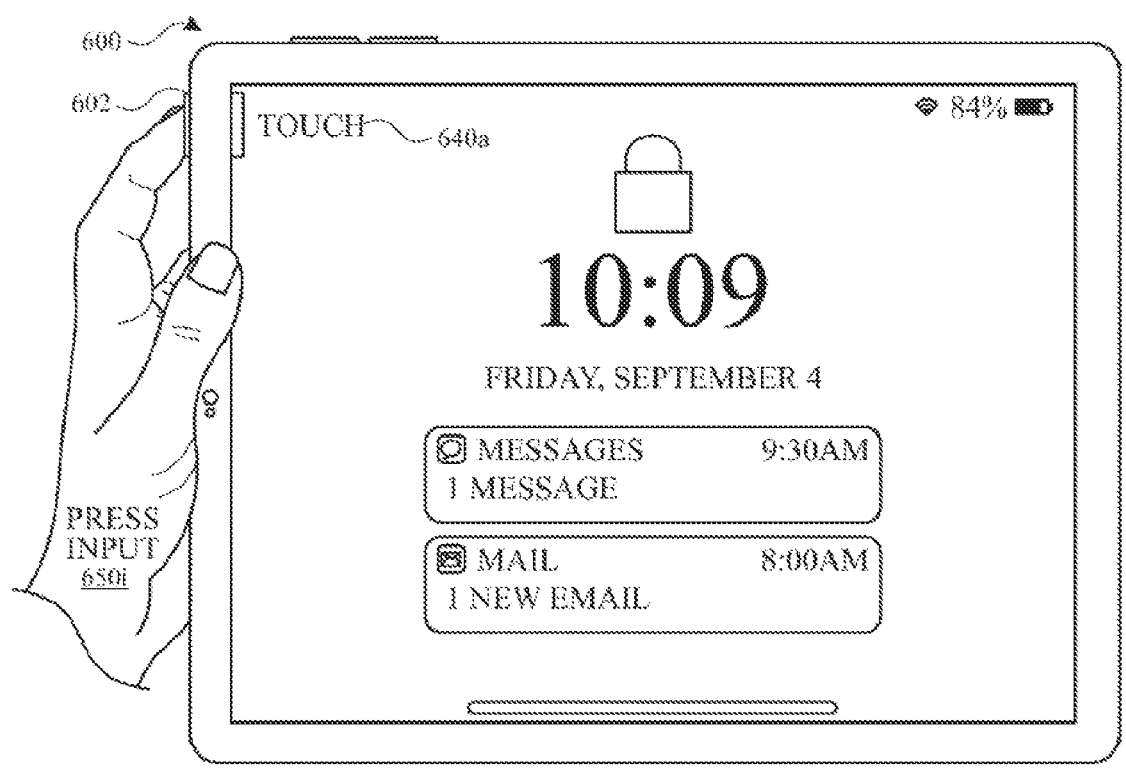

At FIG. 6U, the user has rotated device 600 back to the landscape orientation (with volume buttons 604a, 604b at the top) and, in response, device 600 updates wake screen 630 to be displayed in the landscape orientation, while maintaining device 600 in the locked state. For example, device 600 displays an animation of the wake screen rotating and/or rearranging, which optionally includes an animation of touch graphical element 640a rotating with respect to other elements of the wake screen 600 to remain next to button 602.

At FIG. 6U, while wake screen 630 is displayed in the landscape orientation, device 600 detects press input 650i of button 602. In response to detecting press input 650i when display 610 is on, device 600 turns display 610 off, as shown in FIG. 6V, and becomes locked.

Figure 6V:
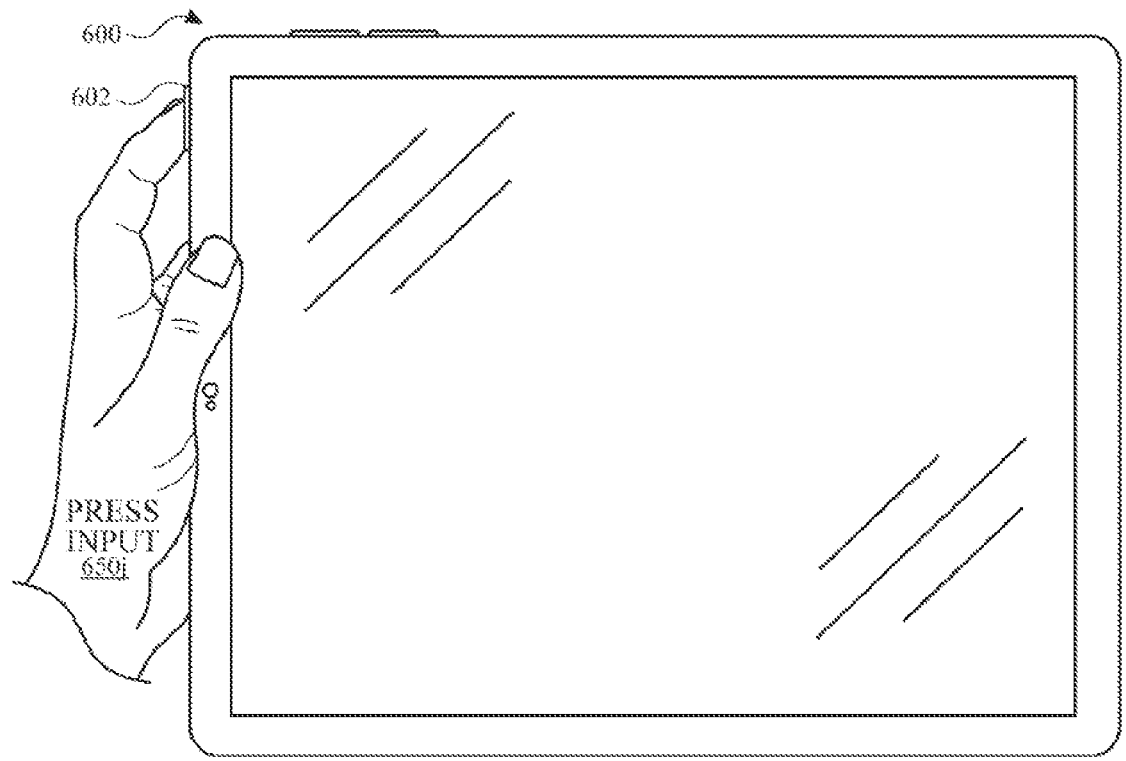

FIGS. 6V-6AA illustrate an exemplary scenario where device 600 receives input directed to button 602 that starts when device 600 is locked, display 610 is off, and notifications are available to be displayed. At FIG. 6V, while display 610 is off, device 600 receives input 650j directed to button 602. Input 650j is includes a press input (at FIG. 6V) that causes display 610 to turn on and display wake screen 630, as shown in FIG. 6W.

Figure 6W:
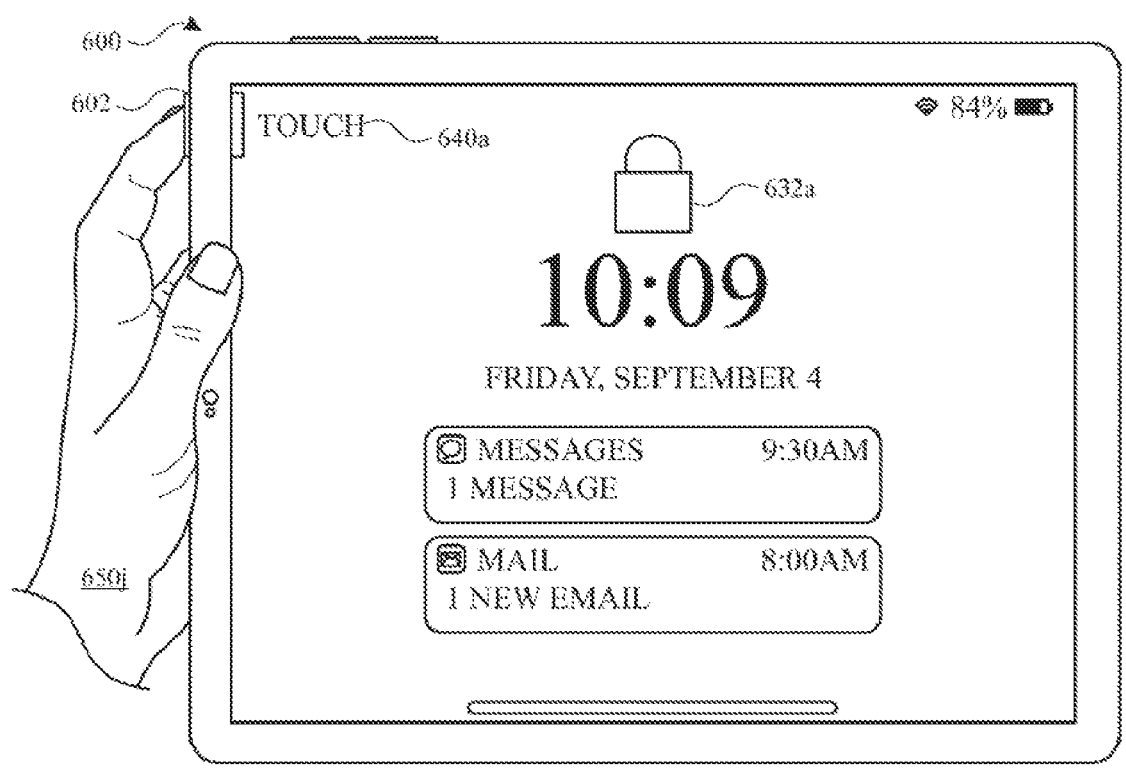
Figure 6X:

At FIG. 6W, in response to the press input portion of input 650j, device 600 displays wake screen 630, including unread notifications 636a, 636b, lock icon 632a, and touch graphical element 640a. Device 600 determines that input 650j was made with a fingerprint that corresponds to an authorized fingerprint (e.g., via the fingerprint sensor of button 602). In response to detecting input 650j was made with a fingerprint that corresponds to an authorized fingerprint, device 600 unlocks, secure content of unread notifications 636a and 636b, and replaces display of touch graphical element 640a with rest graphical element 640b (e.g., "Rest to open", displayed at the same location in the user interface, and/or using the same placement criteria as touch graphical element 640a), as shown in FIG. 6X. In response to detecting input 650j (e.g., the touch portion of input 650j), device 600 progresses toward reaching the threshold input of the first amount of time (e.g., 0.2 seconds, 0.25 seconds, 0.375 seconds, 0.5 seconds, or 1 second), as indicated by the visual change to rest graphical element 640b in FIGS. 6X-6Z. Device 600 displays rest graphical element 640b at a location next to button 602 to indicate to the user where button 602 is located and that the user should continue to rest their finger on button 602. The location of rest graphical element 640b is based on the orientation of device 600. For example, FIGS. 6Y and 6AU are counterpart examples of the same interface in landscape (FIG. 6Y) and portrait (FIG. 6AU) orientations, as the user provides input making progress towards reaching the threshold input. Device 600 optionally updates the user interface in response to detecting a change in orientation of device 600 and displays rest graphical element 640b in different portions of the user interface based on the orientation of device 600 (e.g., transitions from the UI of FIG. 6Y to 6AU and/or 6AU to 6Y as the orientation of device 600 changes). When displaying rest graphical element 640b, device 600 determines the orientation of device 600 and displays rest graphical element 640b at a location that is near or adjacent to button 602.

The first amount of time (e.g., 0.2 seconds, 0.25 seconds, 0.375 seconds, 0.5 seconds, or 1 second) provides the user with an opportunity to review the secure content of the notifications to decide whether to continue providing the touch input (to navigate to a subsequent user interface) or to cease providing the touch input (to remain at wake screen 630 and, for example, to read the secure content of the notifications).

Once input 650j (e.g., the touch portion of input 650j, starting subsequent to unlocking device 650, and/or starting once rest graphical element 640b) is detected for the first amount of time, device 600 transitions to a subsequent user interface, such as home screen 660, as shown in FIG. 6AA. Thus, when the input on button 602 is initially detected when device 600 is locked, display 610 is off, and notifications are available to be displayed, device 600 uses the first amount of time as the threshold input.

In some embodiments, the device detects that the user reads, deletes, and/or dismisses notifications 636a, 636b. As a result, the notifications are no longer unread notifications. Device 600 is now in a state where there are no unread notifications to be displayed.

At FIG. 6AA, while displaying home screen 660 (or alternatively, another user interface), device 600 detects a press input 650k of button 602. In response to detecting press input 650k when display 610 is on, device 600 turns display 610 off, as shown in FIG. 6AB, and becomes locked.

FIGS. 6AB-6AE illustrate an exemplary scenario where device 600 receives input directed to button 602 that starts when device 600 is locked, display 610 is off, and no unread notifications are available to be displayed. At FIG. 6AB, while display 610 is off, electronic device 600 detects input 650l directed to button 602, including an initial press input. In response to detecting the press input of input 650f, device 600 displays wake screen 630, as shown in FIG. 6AC.

At FIG. 6AC, as a touch input portion of input 650l continues to be detected and while device 600 is still locked (e.g., device 600 is still detecting the fingerprint features of the fingerprint to determine if it corresponds to an authorized fingerprint), wake screen 630 does not include notifications (because there are no unread notifications available to be displayed). Wake screen 630 also optionally includes touch graphic element 640a next to button 602 and/or lock icon 632a (e.g., each optionally indicating that device 600 is locked).

At FIG. 6AD, device 600 has determined that input 650l includes a fingerprint that corresponds to an authorized fingerprint on the fingerprint sensor of button 602. In response to the determination that the fingerprint corresponds to an authorized fingerprint, device 600 unlocks and displays unlock icon 632b without displaying secure content of notifications (because there are no unread notifications available to be displayed).

In some embodiments, in response to the determination that the fingerprint corresponds to an authorized fingerprint, device 600 ceases to display touch graphical element 640a without displaying rest graphical element 640b, as shown in FIGS. 6AC-6AD. Device 600 determines whether the touch input portion of input 650l has been detected (e.g., starting once the device unlocks, starting once touch graphical element 640a ceases to be displayed, starting once input 650l is detected) for a second amount of time (as the threshold input) (e.g., 0.1 seconds, 0.2 seconds, 0.250 seconds, 0.3 seconds, or 0.35 seconds) that is less than the first amount of time. Device 600 does not display rest graphic element 640b (which would visually indicate progress toward the threshold input of the second amount of time) and uses the shorter threshold input (e.g., second amount of time, such as 0.1 seconds, 0.2 seconds, 0.250 seconds, 0.3 seconds, or 0.35 seconds) to determine whether to transition to a subsequent user interface because there are no unread notifications displayed on the wake screen for the user to review.

In some embodiments, in response to the determination that the fingerprint corresponds to an authorized fingerprint, device 600 replaces display of touch graphical element 640a with display of rest graphical element 640b. Device 600 determines whether the touch input portion of input 650l has been detected (e.g., starting once the device unlocks, starting once touch graphical element 640a ceases to be displayed, starting once input 650l is detected) for a second amount of time (as the threshold input) (e.g., 0.1 seconds, 0.2 seconds, 0.250 seconds, 0.3 seconds, or 0.35 seconds) that is less than the first amount of time. Device 600 uses the shorter threshold input to determine whether to transition to a subsequent user interface because there are no unread notifications displayed on the wake screen for the user to review.

In response to a determination that touch input 650l has been provided for the threshold input amount of time (e.g., the second amount of time), device 600 transitions to a subsequent user interface, such as home screen 660 shown in FIG. 6AE. Thus, when the input on button 602 is initially detected when device 600 is locked, display 610 is off, and no unread notifications are available to be displayed, device 600 uses the second amount of time as the threshold input.

At FIG. 6AF, while displaying home screen 660 (or alternatively, another user interface), device 600 detects press input 650m of button 602. In response to detecting press input 650m when display 610 is on, device 600 turns display 610 off, as shown in FIG. 6AG, and becomes locked.

At FIG. 6AG, while display 610 is off, electronic device 600 detects press input 650n of button 602. In response to detecting press input 650n, device 600 displays wake screen 630, as shown in FIG. 6AH.

Press input 650n (and any subsequent touch of input 602) was not sufficiently long to enable device 600 to detect the fingerprint features of the fingerprint and determine whether or not the fingerprint corresponds to an authorized fingerprint. As a result, wake screen 630 of FIG. 6AH includes lock icon 632a indicating that device 600 is locked without displaying any notifications (because no unread notifications are available to be displayed). At FIG. 6AH, device 600 also displays touch graphical element 640a indicating that a touch input is required to unlock device 600 and/or transition to a different user interface.

FIGS. 6AI-6AJ illustrate an exemplary scenario where device 600 receives input directed to button 602 that starts when device 600 is locked and display 610 is on and displaying wake screen 630 with no notifications.

At FIG. 6AI, device 600 detects touch input 650o of a fingerprint that corresponds to an authorized fingerprint on the fingerprint sensor of button 602. In response to detecting (while device 600 is locked) touch input 650o of the fingerprint that corresponds to an authorized fingerprint, device 600 unlocks, displays unlock icon 632b, replaces touch graphical element 640a with rest graphical element 640b, and progresses toward reaching the threshold input.

As illustrated in FIG. 6AJ, device 600 continues to detect touch input 650o and, as a result, device 600 continues progress toward reaching the threshold input amount of time, as reflected by highlighting of rest graphical element 640b. In response to a determination that touch input 650g has been provided for the threshold input amount of time, device 600 transitions to a subsequent user interface, such as home screen 660 as shown in FIG. 6AK.

In some embodiments, when the input on button 602 is initially detected when device 600 is locked, display 610 is on, and no notifications are displayed, device 600 uses the first amount of time (e.g., 0.2 seconds, 0.25 seconds, 0.375 seconds, 0.5 seconds, or 1 second) as the threshold input. In some embodiments, when the input on button 602 is initially detected when device 600 is locked, display 610 is on, and no notifications are displayed, device 600 uses the second amount of time (e.g., 0.1 seconds, 0.2 seconds, 0.250 seconds, 0.3 seconds, or 0.35 seconds) as the threshold input (e.g., because there are no unread notifications displayed on the wake screen for the user to review).

At FIG. 6AL, while displaying home screen 660 (or alternatively, another user interface), device 600 detects press input 650p of button 602. In response to detecting press input 650p when display 610 is on, device 600 turns display 610 off, as shown in FIG. 6AM, and becomes locked.

At FIG. 6AM, while display 610 is off, device 600 detects input 650q, including an initial press input, of button 602. In response to detecting the press input portion of input 650q, device 600 displays wake screen 630 without displaying any notifications (because no unread notifications are available to be displayed), as shown in FIG. 6AN.

At FIG. 6AN, device 600 continues to receive a touch input portion of input 650*q* and determines that the fingerprint of input 650*q* corresponds to an authorized fingerprint. As a result, device 600 unlocks and displays unlock icon 632*b*, as shown in FIG. 6AO.

At FIG. 6AO-6AP, prior to device 600 determining that the touch input has been maintained (e.g., detected on the fingerprint sensor of button 602) long enough to reach the input threshold (e.g., 0.1 seconds, 0.2 seconds, 0.250 seconds, 0.3 seconds, or 0.35 seconds and/or second amount of time), device 600 detects lift off of input 650*q* and, therefore, does not transition to displaying a subsequent user interface.

FIGS. 6AQ-6AS illustrate an exemplary scenario where device 600 receives input directed to button 602 that starts when device 600 is unlocked and display 610 is on and displaying wake screen 630 with no notifications.

At FIG. 6AQ, device 600 detects touch input 650*r* on button 602. In response to detecting touch input 650*r*, device 600 replaces touch graphical element 640*a* with rest graphical element 640*b* and progresses toward reaching the threshold input, as indicated by the visual change to rest graphical element 640*b* in FIGS. 6AQ-6AR.

As illustrated in FIG. 6AR, device 600 continues to detect touch input 650*r* and, as a result, device 600 continues progress toward reaching the threshold input amount of time, as reflected by highlighting of rest graphical element 640*b*. In response to a determination that touch input 650*r* has been provided for the threshold input amount of time, device 600 transitions to a subsequent user interface, such as home screen 660 as shown in FIG. 6AS.

In some embodiments, when the input on button 602 is initially detected when device 600 is unlocked, display 610 is on, and no notifications are displayed, device 600 uses the first amount of time (e.g., 0.2 seconds, 0.25 seconds, 0.375 seconds, 0.5 seconds, or 1 second) as the threshold input. In some embodiments, when the input on button 602 is initially detected when device 600 is unlocked, display 610 is on, and no notifications are displayed, device 600 uses the second amount of time (e.g., 0.1 seconds, 0.2 seconds, 0.250 seconds, 0.3 seconds, or 0.35 seconds) as the threshold input (e.g., because there are no unread notifications displayed on the wake screen for the user to review).

Generally, in response to receiving a long press input of button 602 (e.g., regardless of whether the display is off, on, what user interface is being display, of whether device 600 is locked or unlocked, and/or of the amount of progress made toward the threshold input), device 600 provides a digital assistant (e.g., by outputting audio corresponding to the digital assistant and/or by (optionally turning on display 610 and) displaying a digital assistant user interface). For example, FIG. 6AT illustrates an exemplary user interface for the digital assistant that is optionally displayed when a long press input of button 602 is detected.

In some embodiments, the digital assistant has access to more information (and/or is able to provide secure information, such as phone numbers, addresses, or other personalized information) of device 600 when device 600 is unlocked (e.g., is unlocked when the long press input is initially received, becomes unlocked as a result of a determination that the long press input is provided with a finger that corresponds to an authorized fingerprint).

FIGS. 6AV-6AW illustrate an exemplary technique for unlocking device 600 using button 602 and face recognition (or, alternatively, iris recognition) via cameras 164 and 175 (or, alternatively, iris sensors). At FIG. 6AV, the display of device 600 is on and device 600 is locked, as reflected by lock icon 632*a*. Device 600 displays touch graphical element 64*a* to indicate that a touch input should be provided to transition to a user interface other than the wake screen (e.g., the home screen, an application user interface). Device 600 detects, via a touch sensor integrated into button 602, touch input 650*s*. Device 600 detects (e.g., in response to detecting touch input 650*s*), via cameras 164 and 175, facial attribute (e.g., face information) of a face (or, alternatively, iris information of an iris). Face recognition indicator 672*a* indicates that device 600 is detecting facial attribute (or, alternatively iris information). In accordance with a determination that the detected facial attribute of the face does not correspond to an authorized face, device 600 maintains device 600 in the locked state. In accordance with a determination that the detected facial attribute of the face corresponds to an authorized face, device 600 unlocks device 600, as shown in FIG. 6AW.

At FIG. 6AW, device 600 displays unlock icon 632*b* to indicate that device 600 is unlocked. Face recognition indicator 672*b* indicates that detected facial attribute corresponds to an authorized face. Device 600 also displays rest graphical element 640*b* as device 600 continues to detect touch input 650*s*. As device 600 continues to detect touch input 650*s*, device 600 updates rest graphical element 640*b* to reflect the duration for which touch input 650*s* has been detected. The progress of the visual change to rest graphical element 640*b* corresponds to the progress toward reaching the input threshold of time.

At FIG. 6AX, device 600 has progressed to reaching the input threshold of time (based on touch input 650*s*) and thus transitions to displaying home screen 660.

FIG. 6AY illustrates an exemplary animation for updating rest graphical element 640*b*. On the left side of FIG. 6AY (top to bottom), rest graphical element 640*b* is illustrated to reflect updating as the duration for a touch input increases. Rest graphical element 640*b* is a threshold indicator that indicates progress toward reaching an input threshold of time by progressing a visual change (e.g., a change in color, a change in brightness, a change in boldness) across rest graphical element 640*b* over time (e.g., by sequentially updating letters). The progress of the visual change to rest graphical element 640*b* corresponds to the progress toward reaching the input threshold of time. On the right side of FIG. 6AY (top to bottom), rest graphical element 640*b* is illustrated to reflect the animation once the touch input is no longer detected, prior to device 600 reaching the input threshold. Rest graphical element 640*b* reverses the animation by undoing the visual change (e.g., a change in color, a change in brightness, a change in boldness) across rest graphical element 640*b* over time (e.g., by sequentially updating letters in reverse).

Generally, in response to receiving a press input of button 602 when display 610 is on (e.g., regardless of what user interface is being display, of whether device 600 is locked or unlocked, and/or of the amount of progress made toward the threshold input), device 600 turns display 610 off and optionally locks the computer system. Generally, in response to receiving a press input of button 602 when display 610 is off, device 600 turns display 610 on.

FIG. 7 is a flow diagram illustrating a method for disambiguating an input on a touch sensor integrated into a button (e.g., 602) using a computer system (e.g., 100, 300, 500, 600) in accordance with some embodiments. Method 700 is performed at a computer system (e.g., 100, 300, 500, 600) with a touch sensor integrated into a button (e.g., a mechanical button (e.g., that can be actuated) or a solid-state button). The computer system (e.g., 600) is in communication with a display generation component (e.g., 610). Some operations in method 700 are, optionally, combined, the orders of some operations are, optionally, changed, and some operations are, optionally, omitted.

As described below, method 700 provides an intuitive way for disambiguating an input on a touch sensor integrated into a button (e.g., 602). The method reduces the cognitive burden on a user, thereby creating a more efficient human-machine interface. For battery-operated computing devices, disambiguating an input on a touch sensor integrated into a button may allow for faster and more efficient use of an electronic device, and conserves power and increases the time between battery charges.

While displaying, via the display generation component (e.g., 610), a wake screen (e.g., 630), the computer system (e.g., 600) detects (702) an input directed to the button.

In response to detecting the input (704) and in accordance (706) with a determination that the input (e.g., 650*b*) includes touching the touch sensor for less than a respective time threshold (e.g., lift off of the touching of the touch sensor is detected before the duration of the touch reaches the respective time threshold) and does not include activation of the button (e.g., does not include a press input of the button), the computer system (E.g., 600) maintains (708) display, via the display generation component, of the wake screen (e.g., 630 at FIG. 6D).

In response to detecting the input (704) and in accordance (710) with a determination that the input (e.g., 650*g*, 650*j*) includes touching the touch sensor for more than the respective time threshold (e.g., lift off of the touching of the touch sensor is not detected before the duration of the touch reaches the respective time threshold) and the computer system (e.g., 600) is unlocked, displaying (712), via the display generation component, a second user interface (e.g., 660, UI of FIG. 6S), wherein the second user interface is different from the wake screen in an unlocked state (e.g., a user interface unlocked state; a state in which one or more user interface functions that are not available in an unlocked state are available).

In response to detecting the input (704) and in accordance with (714) a determination that the input (e.g., 650*k*, 650*m*) includes activating (e.g., the input includes a press input) the button (e.g., a short press input), ceasing (716) to display, via the display generation component, at least a portion of the wake screen and transitioning the display generation component to a low power state (e.g., an off state or a low power consumption state in which less information is displayed via the display of the display generation component as compared to when the input directed to the button was received).

Performing different functions based on touch duration and activation of the button enables the device to use the same button to cause various the various functions to be performed, thereby reducing the need for additional hardware elements. Providing additional control options without adding additional buttons or cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the input (704) and in accordance with the determination that the computer system (e.g., 600) is in an unlocked state (e.g., a user interface unlocked state; a state in which one or more user interface functions that are not available in an unlocked state are available) and the input (e.g., 650*k*, 650*m*) includes activating the button (e.g., 602), transition the computer system (e.g., 600) to a locked state (e.g., a state in which one or more user interface functions are not available) (e.g., in addition to transitioning the display generation component to the low power state).

In some embodiments, when the computer system (e.g., 600) is locked when the input directed to the button is received, the computer system is maintained in the locked state in response to detecting the input (e.g., in addition to transitioning the display generation component to the low power state).

Performing different functions based on the device state and activation of the button enables the device to use the same button to cause various the various functions to be performed, thereby reducing the need for additional hardware elements. Providing additional control options without adding additional buttons or cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to displaying, via the display generation component, the wake screen (e.g., and while the display generation component is not displaying content), the computer system (e.g., 600) detects a second input (e.g., 650*a*, 650*f*) that includes activation (e.g., a short press input) of the button (e.g., 602). In response to detecting the second input (and, for example, in accordance with a determination that the display generation component is in the low power state), the computer system (e.g., 600) displays, via the display generation component, the wake screen (e.g., 630) (e.g., turning the display on and displaying the wake screen or transitioning from a user interface displayed when the display is in low power state to the wake screen).

Performing different functions based on activation of the button enables the device to use the same button to cause various the various functions to be performed, thereby reducing the need for additional hardware elements. Providing additional control options without adding additional buttons or cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the input (704) directed to the button and in accordance with a determination that the input (e.g., 650*b*) includes touching the touch sensor for more than the respective time threshold (e.g., lift off of the touching of the touch sensor is not detected before the duration of the touch reaches the time threshold) and the computer system (e.g., 600) is locked (e.g., because the computer system (e.g., 600) was locked when the input directed to the button was detected and the finger used to touch the button does not correspond to a fingerprint that is authorized to unlock the computer system (e.g., 600), the face detected does not correspond to an authorized/enrolled face, the iris detected does not correspond to an authorized/enrolled iris), the computer system (e.g., 600) maintains display, via the display generation component, of the wake screen (e.g., 630 at FIG. 6C) (and without displaying the second user interface).

Performing different functions based on the device state and touch duration of the button enables the device to use the same button to cause various the various functions to be performed, thereby reducing the need for additional hardware elements. Providing additional control options without adding additional buttons or cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) includes a biometric sensor (e.g., a fingerprint sensor such as fingerprint sensor that is combined with, integrated into, or embedded in a mechanical button or a solid-state button, a face identification sensor, or an iris identification sensor). In some embodiments, in accordance with (and, optionally, in response to detecting the input) a determination that the computer system (e.g., 600) is in a locked state and that a biometric input (e.g., a detected fingerprint of the finger used in providing the input, a detected face, and/or a detected iris; and/or of the input) collected by the biometric sensor matches an enrolled biometric feature (e.g., a previously registered face, iris, or fingerprint that is authorized to unlock the computer system (e.g., 600)), the computer system (e.g., 600) transitions (e.g., in response to detecting the input) the computer system (e.g., 600) to an unlocked state (e.g., FIGS. 6E, 6P). In some embodiments, in accordance with (and, optionally, in response to detecting the input) a determination that the computer system (e.g., 600) is in the locked and that the received biometric input (e.g., a detected fingerprint of the finger used in providing the input, a detected face, and/or a detected iris) of the input collected by the biometric sensor does not match an enrolled biometric feature (e.g., a previously registered face, iris, or fingerprint that is authorized to unlock the computer system), the computer system (e.g., 600) forgoes transitioning the computer system (e.g., 600) to the unlocked state (e.g., FIG. 6C).

Unlocking the system or maintaining the system in the locked state based on biometric input provides the system with security by preventing unauthorized access to information of the computer system.

In some embodiments, the biometric sensor is a fingerprint sensor.

Unlocking the system or maintaining the system in the locked state based fingerprint input provides the system with security be preventing unauthorized access to information of the computer system. Additionally, the computer system can use the same input to determine authorization, duration of touch, and activation of the button.

In some embodiments, the biometric sensor is integrated into the button (e.g., 602).

Unlocking the system or maintaining the system in the locked state based fingerprint input provides the system with security be preventing unauthorized access to information of the computer system. Additionally, the computer system can use the same input to determine authorization, duration of touch, and activation of the button.

In some embodiments, in accordance with a determination that the wake screen includes one or more notifications (e.g., 636a, 636b), the respective time threshold is a first time threshold. In some embodiments, in accordance with a determination that the wake screen does not include one or more notifications, the respective time threshold is a second time threshold that is different from the first time threshold.

In some embodiments, the first time threshold is longer than the second time threshold, thereby providing the user with a longer opportunity to view the notifications and to cease providing the touch input before the time threshold is met. Ceasing to provide the touch input before the respective time threshold is met causes the computer system to maintain display of the wake screen and corresponding notifications to continue without transitioning to displaying the second user interface.

The computer system performing operations based on reaching a different (e.g., longer) time threshold when notifications are available to be read enables the user to easily review the notifications and have sufficient time to decide whether to cease providing the input before the time threshold is reached, thereby enabling the user to review the notifications. A different (e.g., shorter) duration when notifications are not available to be read enables the user to more quickly transition away from the wake screen and access a different user interface of interest. Thus, the techniques makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the wake screen (e.g., 630) includes one or more unread notifications (e.g., 636a, 636b), the respective time threshold is a first time threshold. In some embodiments, in accordance with a determination that the wake screen (e.g., 630) does not include one or more unread notifications (e.g., the wake screen doesn't include any notifications or the wake screen includes only read notifications and does not include any unread notifications), the respective time threshold is a second time threshold that is different from the first time threshold.

In some embodiments, when the wake screen is initially displayed after the device switches from a low power state the wake screen includes only unread notifications (if there are any unread notifications) (e.g., notifications (regardless of whether a user has actually read the notifications) that do not meet a set of criteria (e.g., having been displayed for a predetermined period of time; having been displayed in a particular interface of the computer system or another computer system associated with (signed into) an account associated with (signed into) the computer system, have been previously dismissed by the user, unlocked the device while the notifications were displayed on the wake screen and navigated away from the wake screen, or otherwise interacted with the notification (e.g., press and hold input on the notification to display details of the notification)) are included for display on the wake screen (as part of the one or more notifications) and read notifications are not included for display on the wake screen (as part of the one or more notifications). Thus, the first time threshold is used when there are one or more unread notifications displayed on the wake screen and the second time threshold is used when there are no unread notifications (and therefore no notifications to display on the wake screen).

The computer system providing the user with extra time when there are unread notifications on the wake screen enables the user to easily review the unread notifications and have sufficient time to decide whether to cease providing the input before the time threshold is reached, thereby enabling the user to review the unread notifications. A different (e.g., shorter) duration when unread notifications are not available to be read enables the user to more quickly transition away from the wake screen and access a different user interface of interest. Thus, the techniques makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the computer system is in a locked state, the wake screen (e.g., 630) includes display of a notification (e.g., 636*a*, 636*b*) (e.g., an indication that a notification corresponding to an application has been received and/or the notification includes an identifier of the application) and does not include display of secure content (e.g., as in FIGS. 6B, 6O) (e.g., name of a sender of a received message, and/or the body of a received message) corresponding to the displayed notification.

In some embodiments, in accordance with a determination that the computer system is unlocked, the wake screen includes display of the notification and secure content (e.g., name of a sender of a received message, and/or the body of a received message) corresponding to the displayed notification. In some embodiments, while the computer system is locked, the computer system displays the wake screen, including displaying the notification without displaying the secure content of the notification. While displaying the notification without displaying the secure content of the notification, the computer system receives input that causes the computer system to transition from being in the locked state to being in the unlocked state. In response to receiving the input that causes the computer system to be in the unlocked state, the computer system updates display of the wake screen to include the secure content of the notification (e.g., along with the notification).

The computer system not providing secure content corresponding to displayed notifications provides the user with visual feedback that notifications are available to be read while maintaining the security of the content of the notifications. Not displaying the secure content corresponding to the notifications also provides the user with visual feedback that the system is locked. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, activation of the button (e.g., 602) (e.g., for a mechanical button) requires a determination that the button has been depressed. In some embodiments, activation of the button (e.g., 602) (e.g., a solid-state button) requires a determination that a characteristic intensity of a touch input on the button exceeds a non-zero intensity threshold.

Note that details of the processes described above with respect to method 700 (e.g., FIG. 7) are also applicable in an analogous manner to the methods described below. For example, methods 800, 1000, 1100, and 1200 optionally include one or more of the characteristics of the various methods described above with reference to method 700. For example, the computer systems are the same and the touch sensor, the biometric sensor, and the fingerprint sensor are optionally the same component and are optionally integrated into the button. For another example, the wake screens are the same screen. For another example, the enrollment process is used to enroll fingerprints that are checked for matches throughout the processes. For another example, the indications of the location of the fingerprint sensor, biometric sensor, touch sensor, and button are the same indicators throughout the processes. For brevity, these details are not repeated below.

FIG. 8 is a flow diagram illustrating a method for disambiguating an input on a fingerprint sensor using a computer system (e.g., 100, 300, 500, 600) in accordance with some embodiments. Method 800 is performed at a computer system (e.g., 100, 300, 500, 600) with a fingerprint sensor (e.g., a fingerprint sensor integrated into a button such as a mechanical button or a solid-state button). The computer system (e.g., 600) is in communication with a display generation component (e.g., 610). Some operations in method 800 are, optionally, combined, the orders of some operations are, optionally, changed, and some operations are, optionally, omitted.

As described below, method 800 provides an intuitive way for disambiguating an input on a fingerprint sensor. The method reduces the cognitive burden on a user, thereby creating a more efficient human-machine interface. For battery-operated computing devices, disambiguating an input on a touch sensor integrated into a button may allow for faster and more efficient use of an electronic device, and conserves power and increases the time between battery charges.

The computer system (e.g., 600) detects (800) an input directed to the fingerprint sensor.

In response (804) to detecting the input and in accordance with (806) a determination that the input (e.g., 650*c*, 650*q*) includes fingerprint information detected by the fingerprint sensor that matches one or more enrolled fingers (e.g., a fingerprint of the finger matches an enrolled fingerprint) and is for less than a input threshold (e.g., time threshold, distance threshold, and/or intensity threshold), the computer system (e.g., 600) displays (808), via the display generation component, a wake screen (e.g., 630) (e.g., a screen that displays, when available, one or more notifications; and/or a screen that includes one or more affordances that are available in a locked state and also available in an unlocked state) in an unlocked state.

In response (804) to detecting the input and in accordance with (810) a determination that the input (e.g., 650*g*, 650*j*) includes fingerprint information detected by the fingerprint sensor that matches one or more enrolled fingers (e.g., a fingerprint of the finger matches an enrolled fingerprint) and is for more than the input threshold, the computer system (e.g., 600) displays (812), via the display generation component, a second user interface (e.g., 660), wherein the second user interface is different from the wake screen in an unlocked state.

Performing different functions based on the input fingerprint information matching an enrolled fingerprint and reaching an input threshold enables the device to use the same fingerprint sensor to cause various the various functions to be performed, thereby reducing the need for additional hardware elements. Providing additional control options without adding additional buttons or cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Matching the finger to an enrolled fingerprint also provides security by limiting access to authorized users, thereby making the system more secure.

In some embodiments, the second user interface (e.g. user interface of FIG. 6S) is an application user interface. In some embodiments, the wake screen is a user interface of the operating system, and not of an application. In some embodiments, the wake screen includes notifications corresponding to a plurality of different applications of the computer system, whereas the application user interface does not include notifications corresponding to a plurality of different applications. In some embodiments, the second user interface is visually updated by the application.

Displaying a user interface of an application when a finger that matches an enrolled finger is used and the input threshold is met enables the system to quickly and securely provide access to the application user interface. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second user interface (e.g., 660) includes a plurality of icons corresponding to a plurality of applications. While displaying the second user interface, the computer system (e.g., 600) receives selection of (e.g., tap input on) an icon of the plurality of icons. In response to receiving selection of the icon, the computer system (e.g., 600) displays an application user interface corresponding to the icon.

In some embodiments, the second user interface is a system user interface and not an interface of an application. In some embodiments, the plurality of icons includes one or more of icons 416-446.

Displaying a user interface with a plurality of icons corresponding to a plurality of applications when a finger that matches an enrolled finger is used and the input threshold is met enables the system to quickly and securely provide access to start multiple applications. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response (804) to detecting the input and in accordance with a determination that the input (e.g., 650*b*, 650*h*) includes fingerprint information detected by the fingerprint sensor that does not match the one or more enrolled fingers (e.g., a fingerprint of the finger does not match any enrolled fingerprint), the computer system (e.g., 600) displays, via the display generation component, the wake screen (e.g., 630) (e.g., a screen that displays, when available, one or more notifications; and/or a screen that includes one or more affordances that are available in a locked state and also available in an unlocked state) in a locked state.

Displaying the wake screen with the computer system in the locked state when the finger does not match an enrolled finger provides the user with feedback that the finger has been detected while preventing unauthorized access to secure information of the computer system, thereby providing the user with feedback that the finger is not an authorized finger while increasing the security of the system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the computer system is in a first orientation (e.g., a portrait orientation, or a landscape orientation), the computer system (e.g., 600) displays as part of the wake screen in the locked state, via the display generation component at a first location (e.g., in relation to the wake screen user interface), a visual indication (e.g., 640*a*) that fingerprint authentication is required. In some embodiments, in accordance with a determination that the computer system is in a second orientation (e.g., a portrait orientation, or a landscape orientation) different from the first orientation, the computer system (e.g., 600) displays as part of the wake screen in the locked state, via the display generation component at a second location (e.g., in relation to the wake screen user interface) different from the first location, a visual indication (e.g., 640*a*) that fingerprint authentication is required.

In some embodiments, the first location is adjacent to the fingerprint sensor when the computer system is in the first orientation and the second location is adjacent to the fingerprint sensor when the computer system is in the second orientation.

In some embodiments, the wake screen in the locked state includes, at a location on the display that is adjacent to a location of the fingerprint sensor, a visual indication that fingerprint authentication is required.

In some embodiments, the location of the visual indication that fingerprint authentication is required is based on (and changes in conjunction with changes in) the orientation of the computer system. In some embodiments, the wake screen in the unlocked state does not include the visual indication that fingerprint authentication is required.

Displaying an indication that fingerprint authentication is required provides the user with visual feedback that the system is locked and that fingerprint authentication is required to access secured information. Displaying the visual indication adjacent to the fingerprint sensor provides the user with visual feedback about where the fingerprint sensor is located, which is particularly relevant when the device can be operated in numerous orientations, which would otherwise make it difficult for the user to quickly assess the location of the fingerprint sensor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response (804) to detecting the input and in accordance with a determination that the input (e.g., 650*c*) includes fingerprint information detected by the fingerprint sensor that matches one or more enrolled fingers (e.g., a fingerprint of the finger matches an enrolled fingerprint), the computer system (e.g., 600) updates display of the wake screen, via the display generation component, to indicate (e.g., 632*b*) that the computer system is in an unlocked state.

In some embodiments, the computer system detects the input (a finger) directed to the fingerprint sensor and detects a fingerprint of the finger. The computer system determines whether the finger has a fingerprint that matches an enrolled finger (with an enrolled fingerprint). If the finger matches an enrolled finger, the computer system unlocks the computer system and displays an indication that the computer system is unlocked. If the finger does not match the enrolled finger, the system does not unlock the computer system and does not display the indication that the computer system is unlocked. Optionally, the computer system displays an indication that the finger does not match an enrolled finger and/or that the system is locked.

Displaying an indication that the computer system is unlocked provides the user with visual feedback of the unlocked state of the computer system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, updating display of the wake screen, via the display generation component, to indicate that the computer system (e.g., 600) is an unlocked state includes changing (e.g., via an animation) an appearance of a lock indicator from a locked appearance (e.g., 632*a*) to an unlocked appearance (e.g., 632*b*) (e.g., at the same location).

Changing the appearance of the lock indicator for locked to unlocked provides the user with visual feedback that the state of the device has changed (e.g., based on the user's input) from the locked state to the unlocked state. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response (802) to detecting the input and in accordance with the determination that the input (e.g., 650*c*) includes fingerprint information detected by the fingerprint sensor that matches one or more enrolled fingers (e.g., a fingerprint of the finger matches an enrolled fingerprint), the computer system (e.g., 600) updates display of the wake screen (e.g., 630), via the display generation component, to include secure content of a displayed notification (e.g., 636*a*, 636*b*).

In some embodiments, in accordance with the determination that the input does not include fingerprint information that matches one or more enrolled fingers (e.g., a fingerprint of the finger matches an enrolled fingerprint), the computer system does not update the wake screen to include the secure content of the displayed notification.

Updating the wake screen to include secure content corresponding to notifications when the finger matches an enrolled finger provides the authorized user with access to the secure information and provides a visual indication that the computer system has matched the finger to an enrolled finger. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, updating display of the wake screen to indicate that the computer system is unlocked (e.g., displaying content of one or more notifications 636*a*, 636*b* and/or changing a lock indicator 632*a* to an unlocked appearance 632*b*) occurs concurrently with displaying a threshold indicator (e.g., 640*b*) that indicates progress toward reaching the input threshold by progressing a visual change (e.g., a change in color, a change in brightness) across the threshold indicator over time, the progress of the visual change corresponding to the progress toward reaching the input threshold.

In some embodiments, the threshold indicator indicates progress over time toward reaching a time input threshold (a threshold duration of touch). As the computer system continues to detect the input directed to the fingerprint sensor, the threshold indicator continues to update to reflect the duration of the input.

Displaying the threshold indicator provides the user with visual feedback of the progress toward reaching the input threshold. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while (e.g., in response to) detecting the input directed to the fingerprint sensor, the computer system (e.g., 600) displays a threshold indicator (e.g., 640*b*) that indicates progress toward reaching the input threshold. In some embodiments, while continuing to detecting the input directed to the fingerprint sensor, the computer system (e.g., 600) updates the threshold indicator (e.g., 640*b*) over time to indicate progress toward reaching the input threshold.

In some embodiments, displaying the threshold indicator includes replacing display of the visual indication that fingerprint authentication is required with display of the threshold indicator. In some embodiments, when the computer system is unlocked when the input is detected, the threshold indicator is displayed in response to detecting the input. In some embodiments, when the computer system is locked when the input is detected, the threshold indicator is displayed in response to a determination that the input directed to the fingerprint sensor includes a finger that matches one or more enrolled fingers (and is therefore authenticated).

Displaying the threshold indicator provides the user with visual feedback of the progress toward reaching the input threshold. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Figure 6Y:
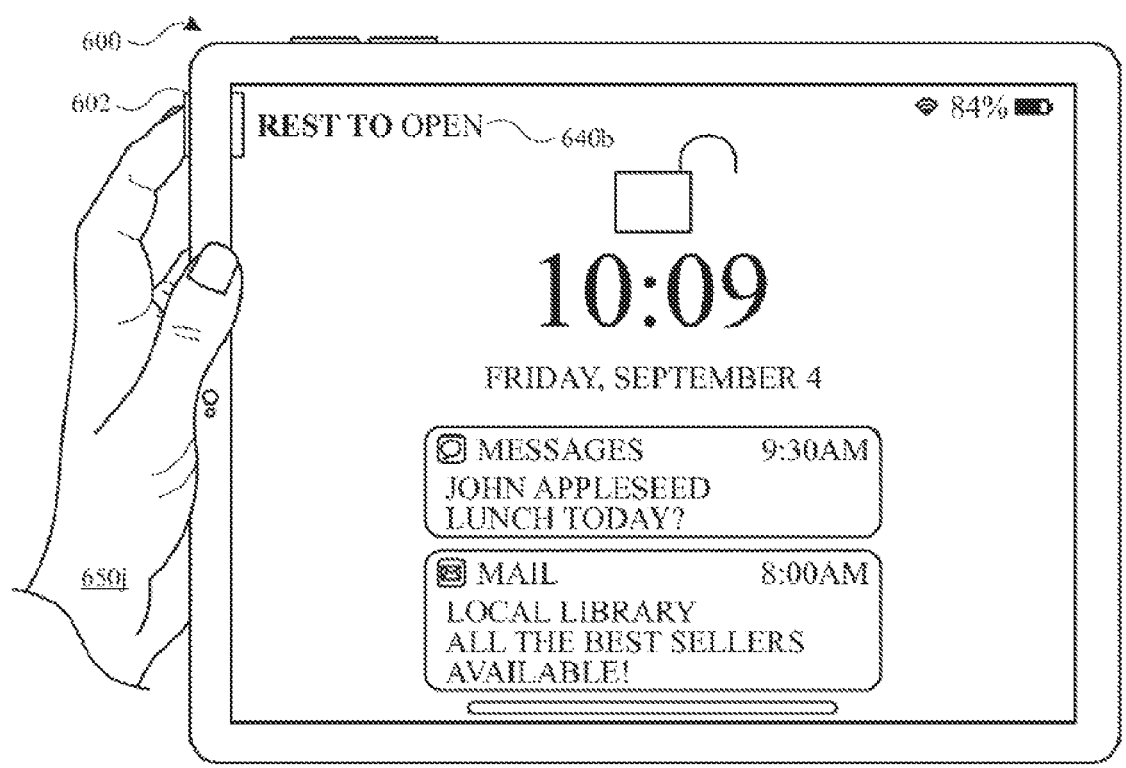
Figure 6Z:
Figure 6A:
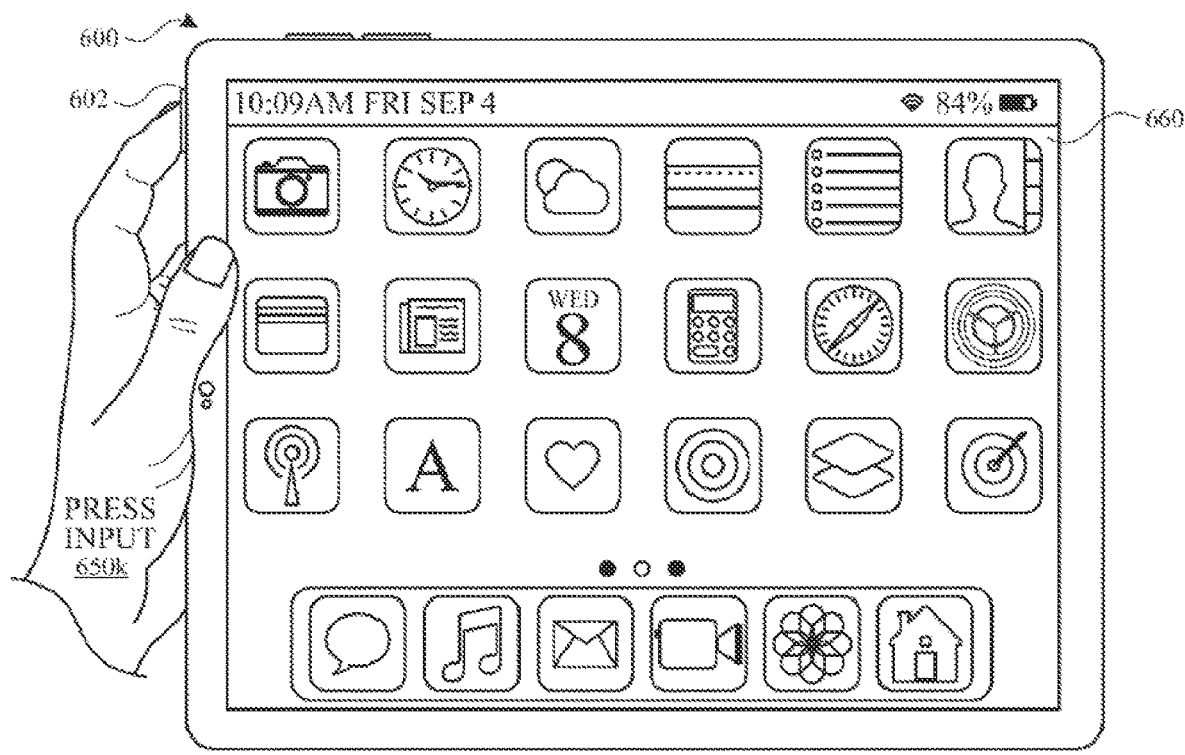
Figure 6A:
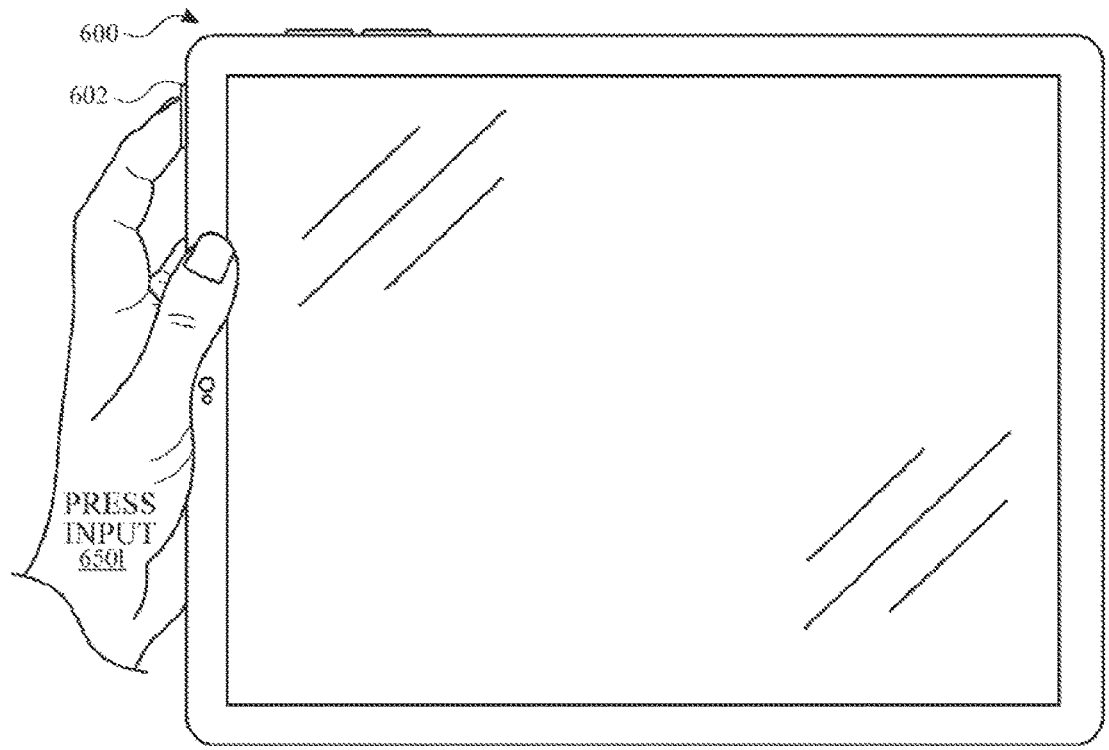
Figure 6A:
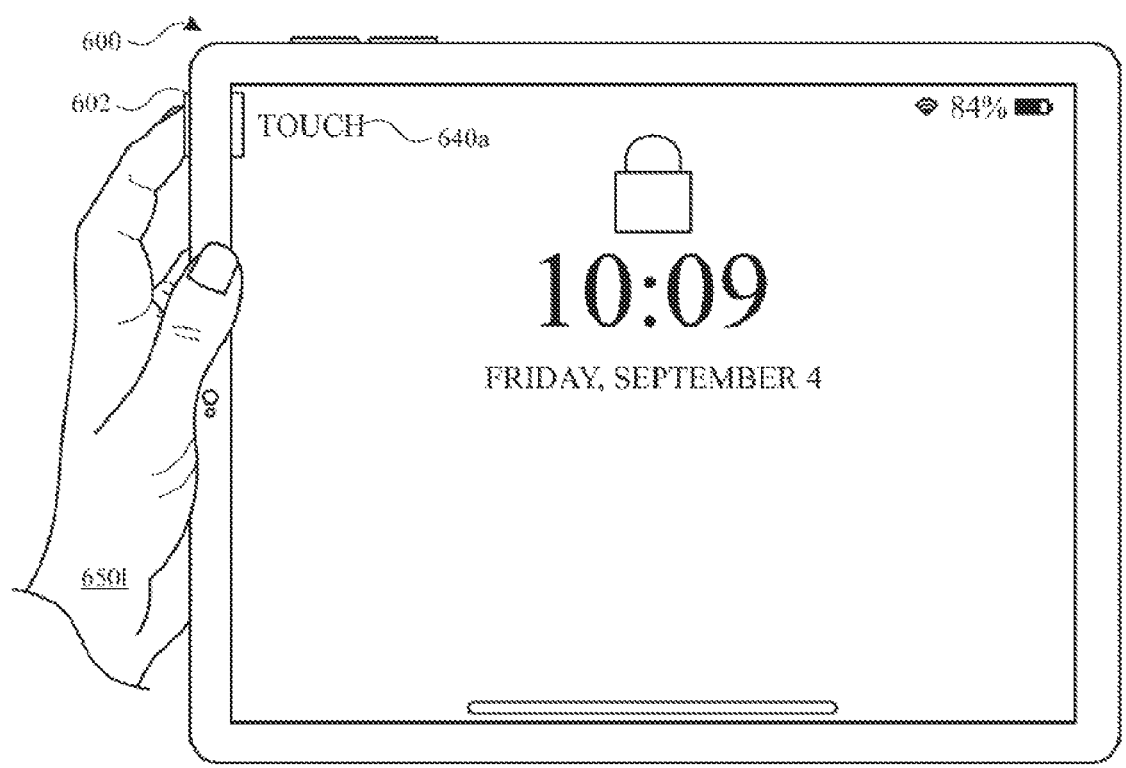
Figure 6A:
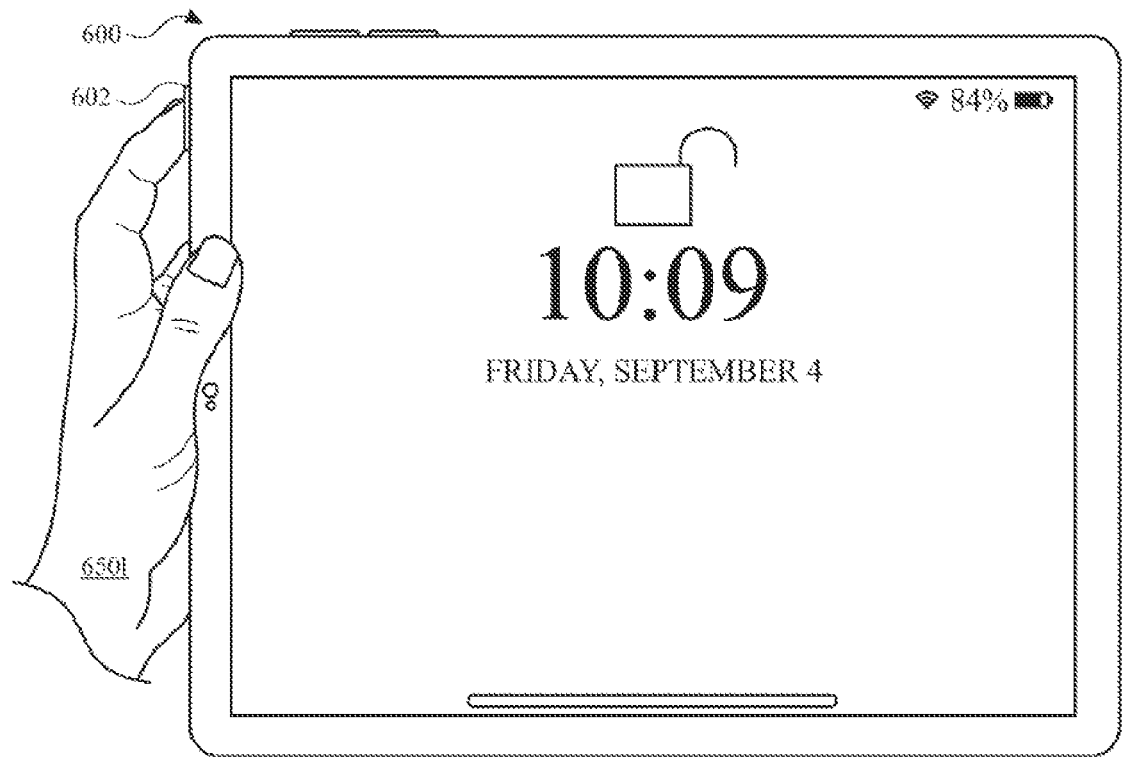
Figure 6A:
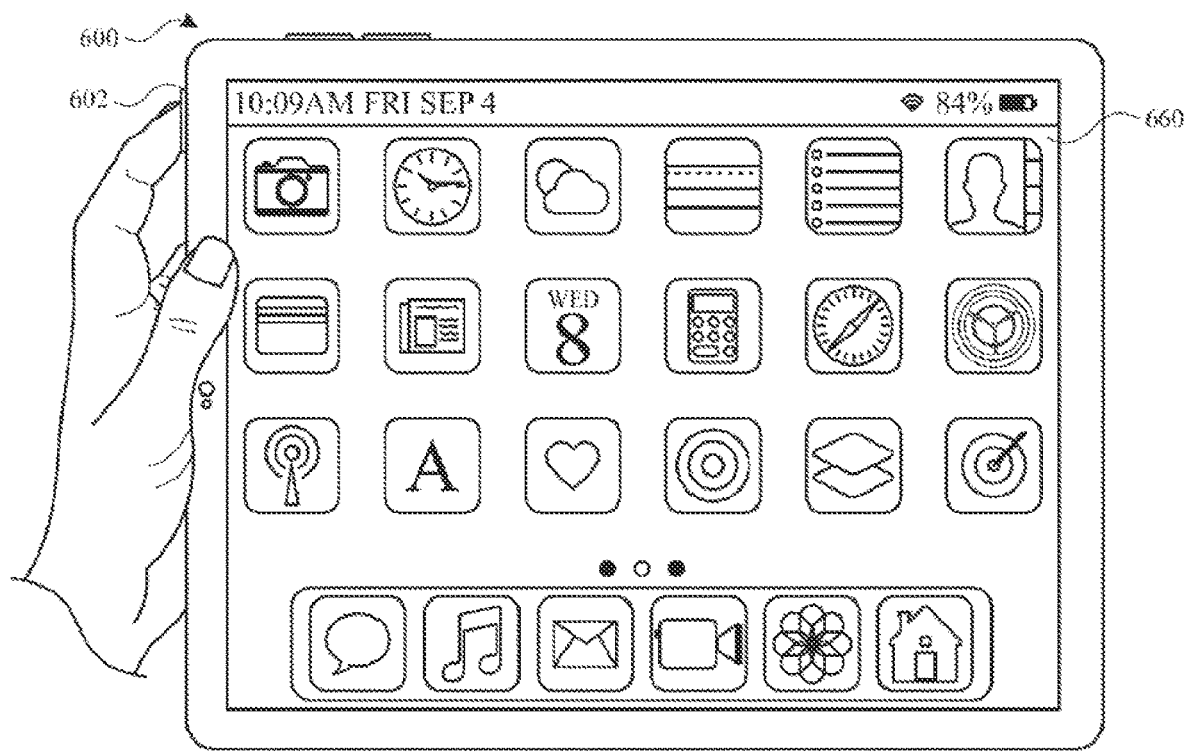
Figure 6A:
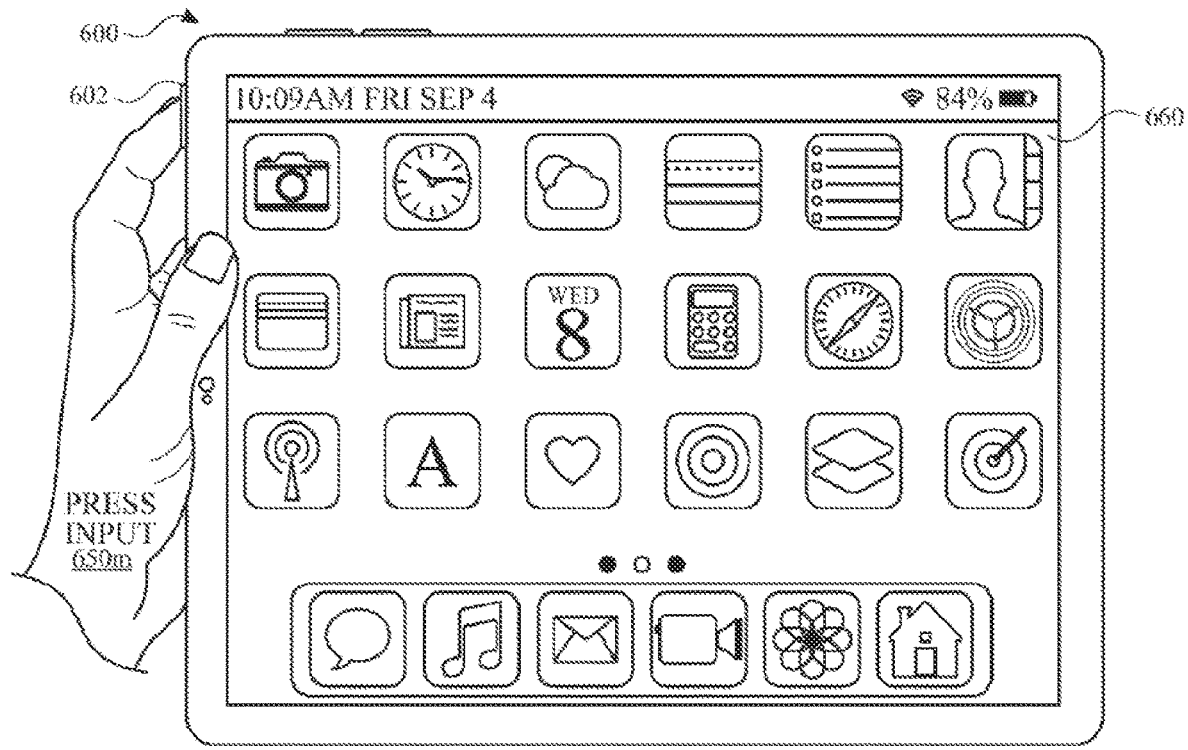
Figure 6A:
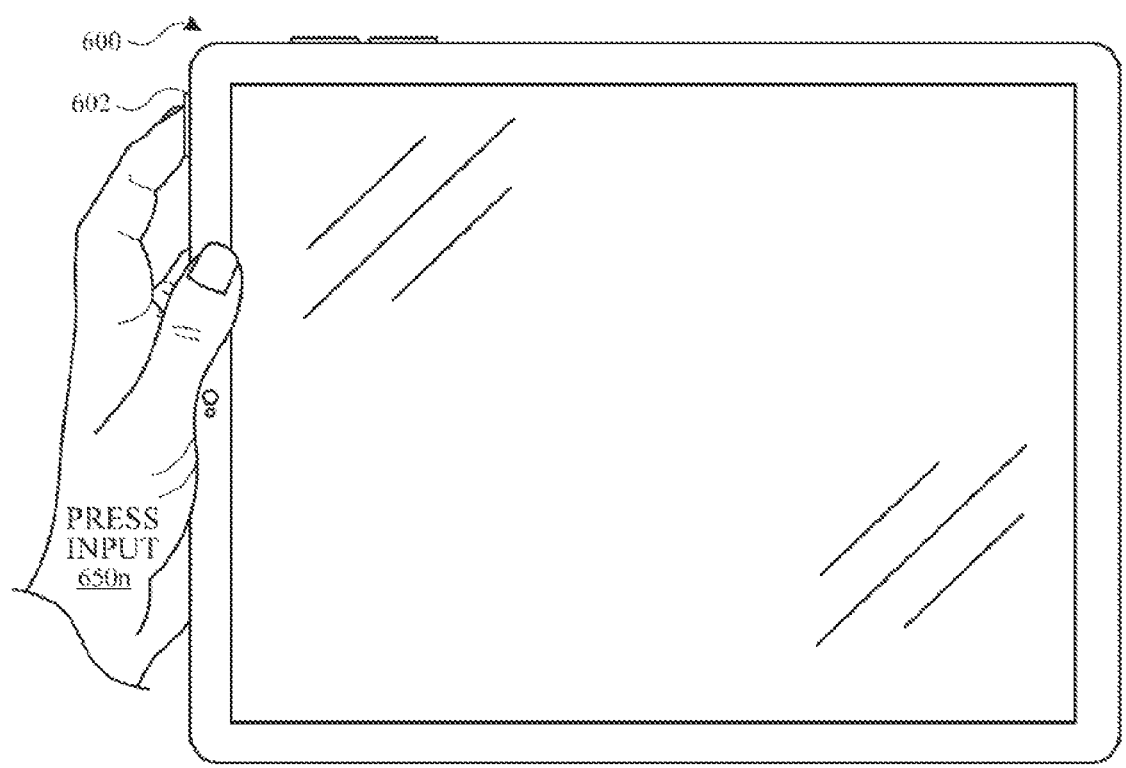
Figure 6A:
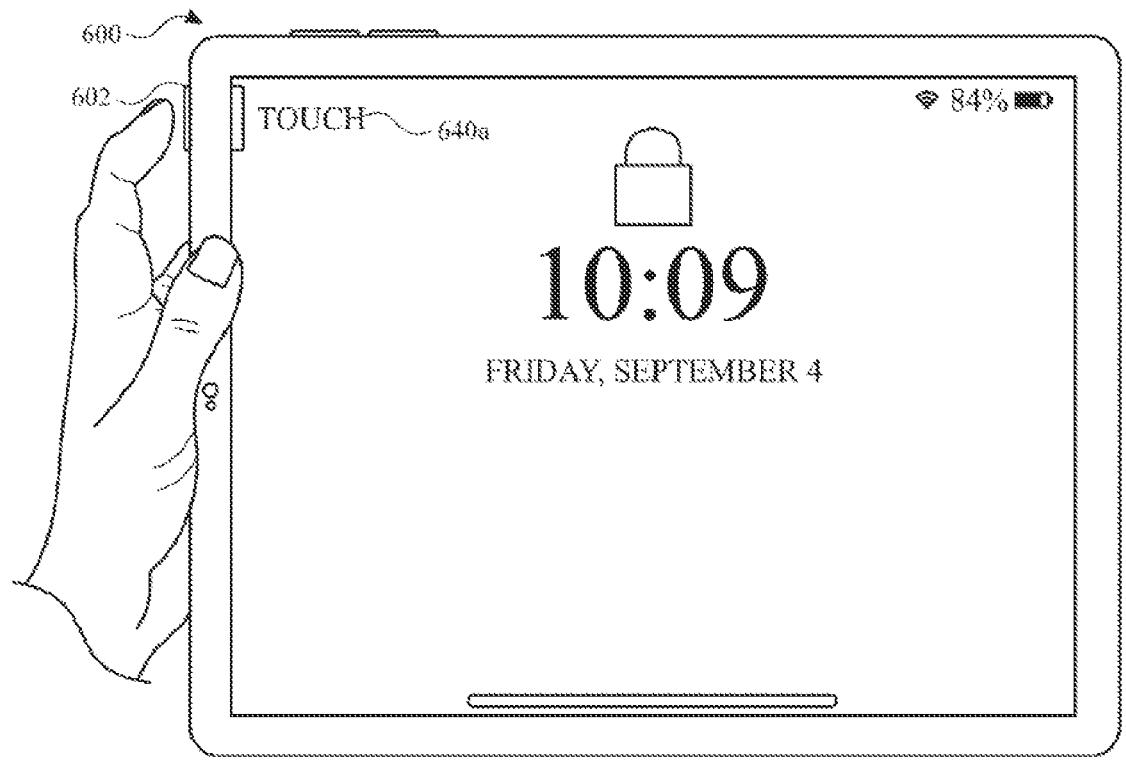
Figure 6A:
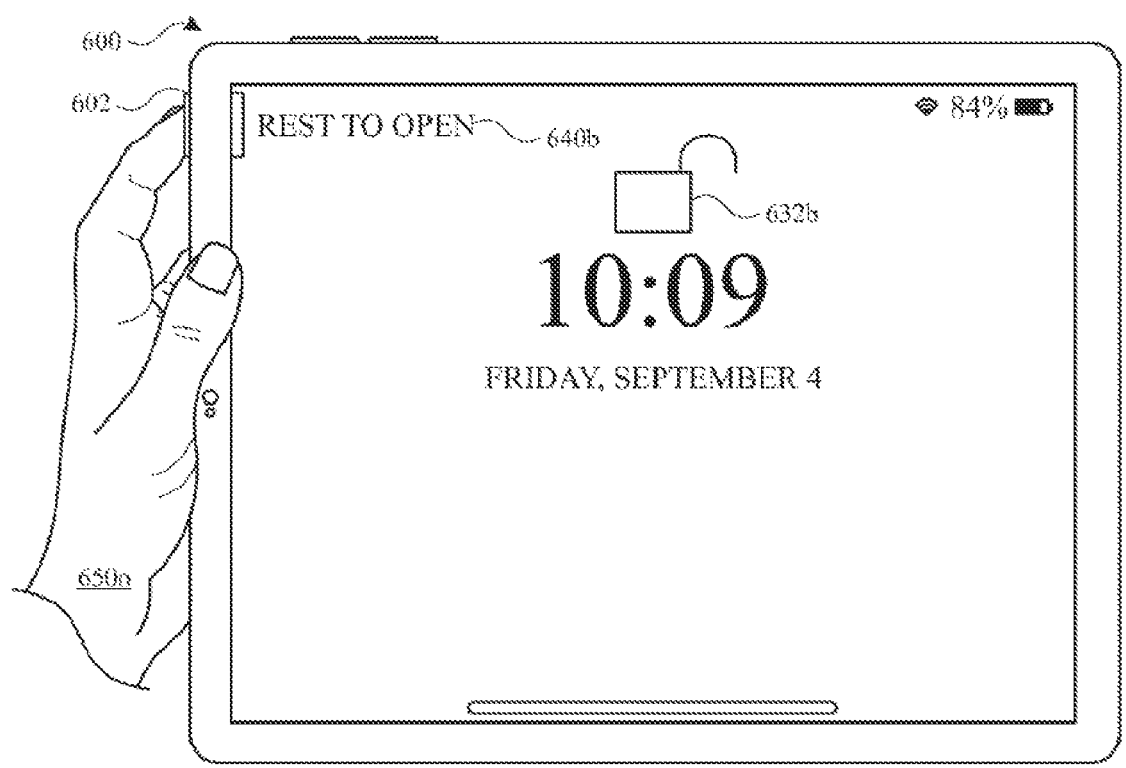
Figure 6A:
Figure 6A:
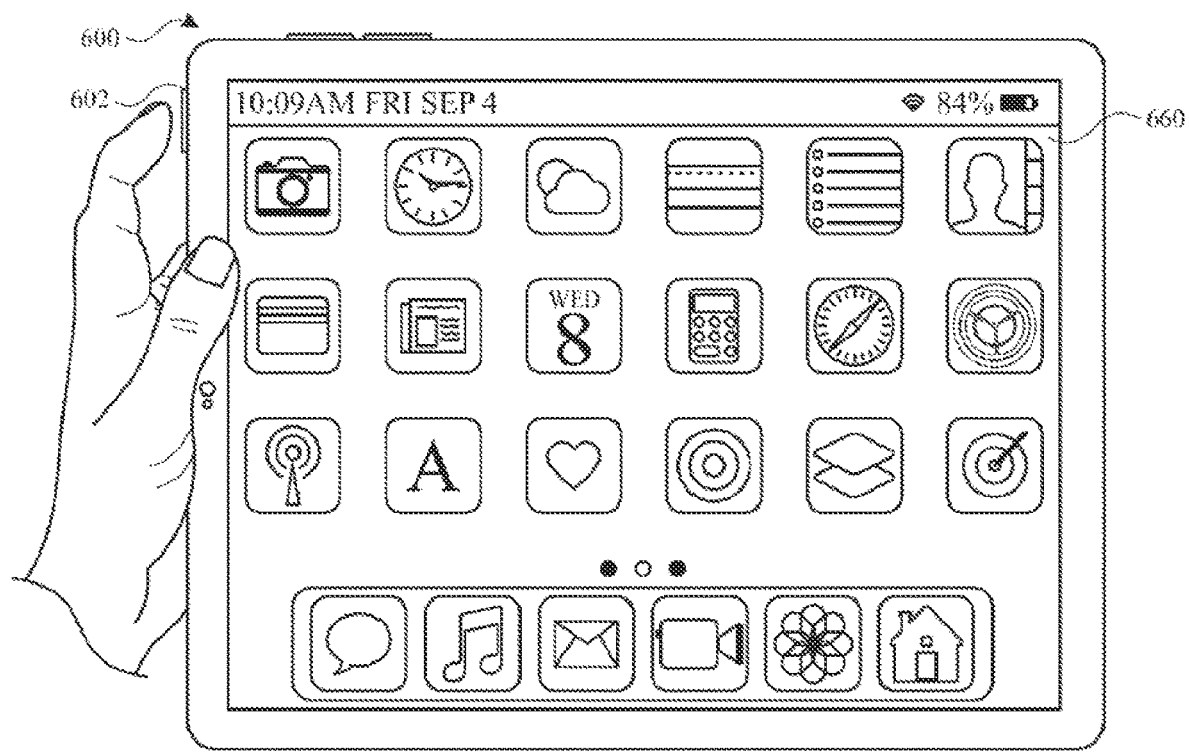
Figure 6A:
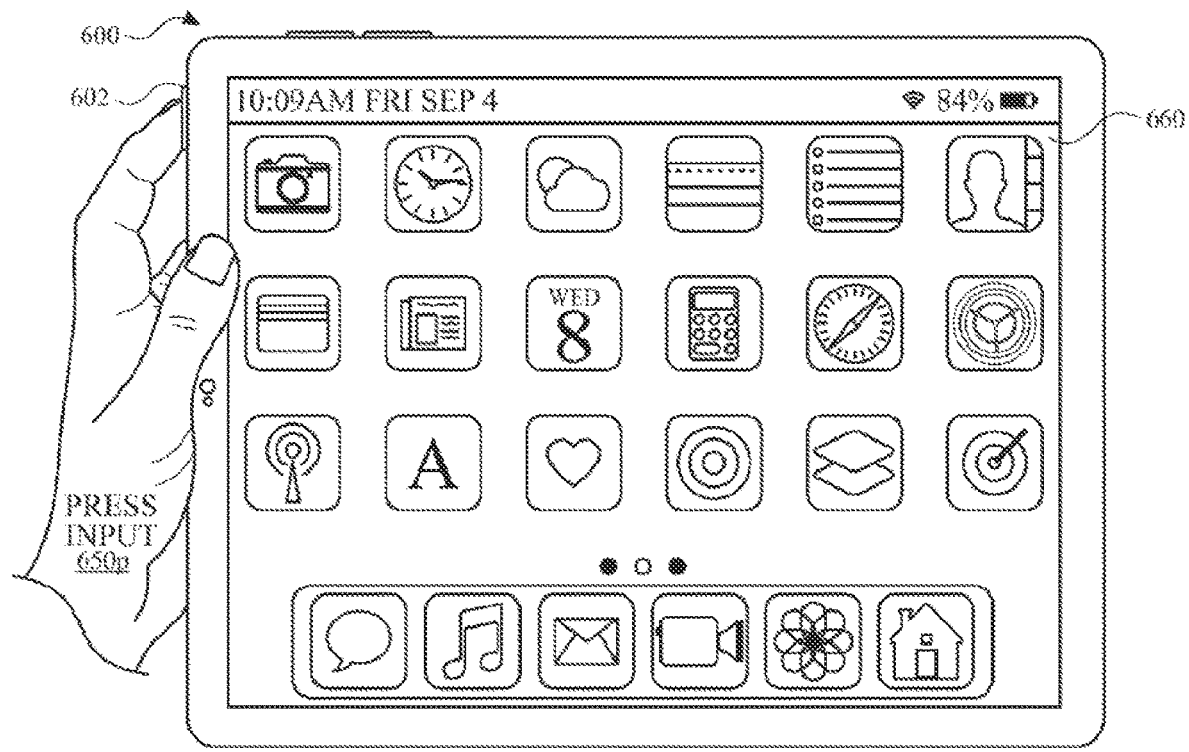
Figure 6A:
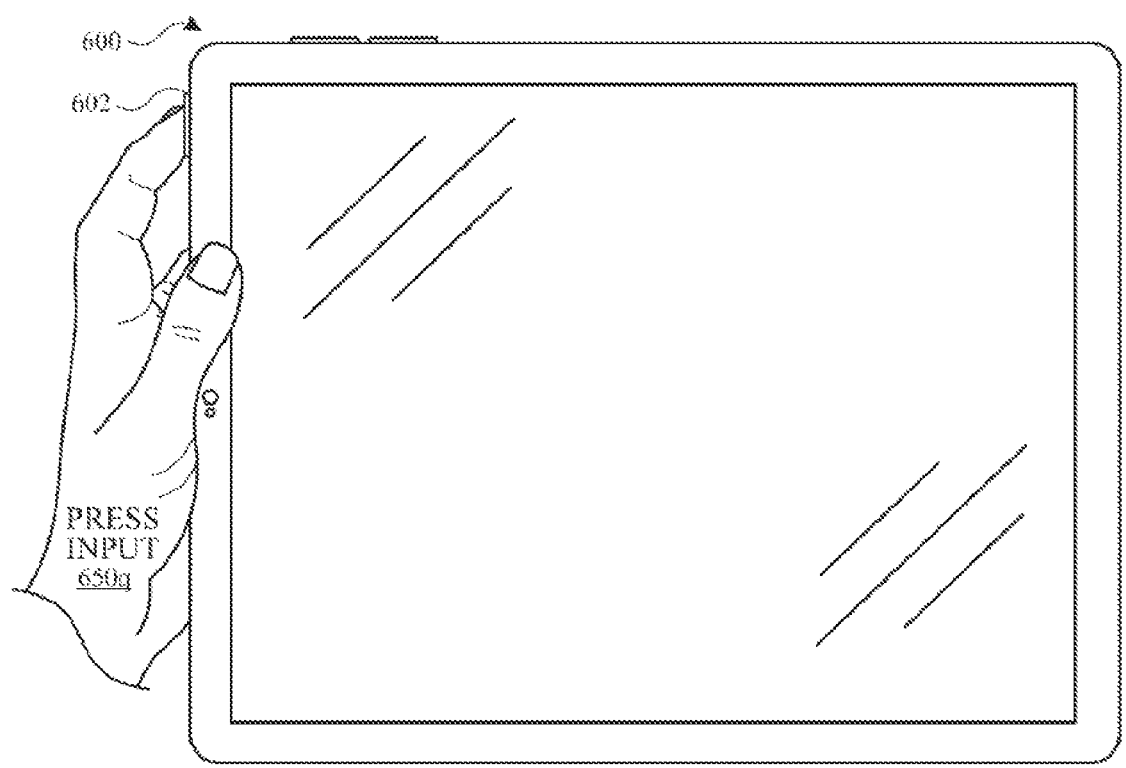
Figure 6A:
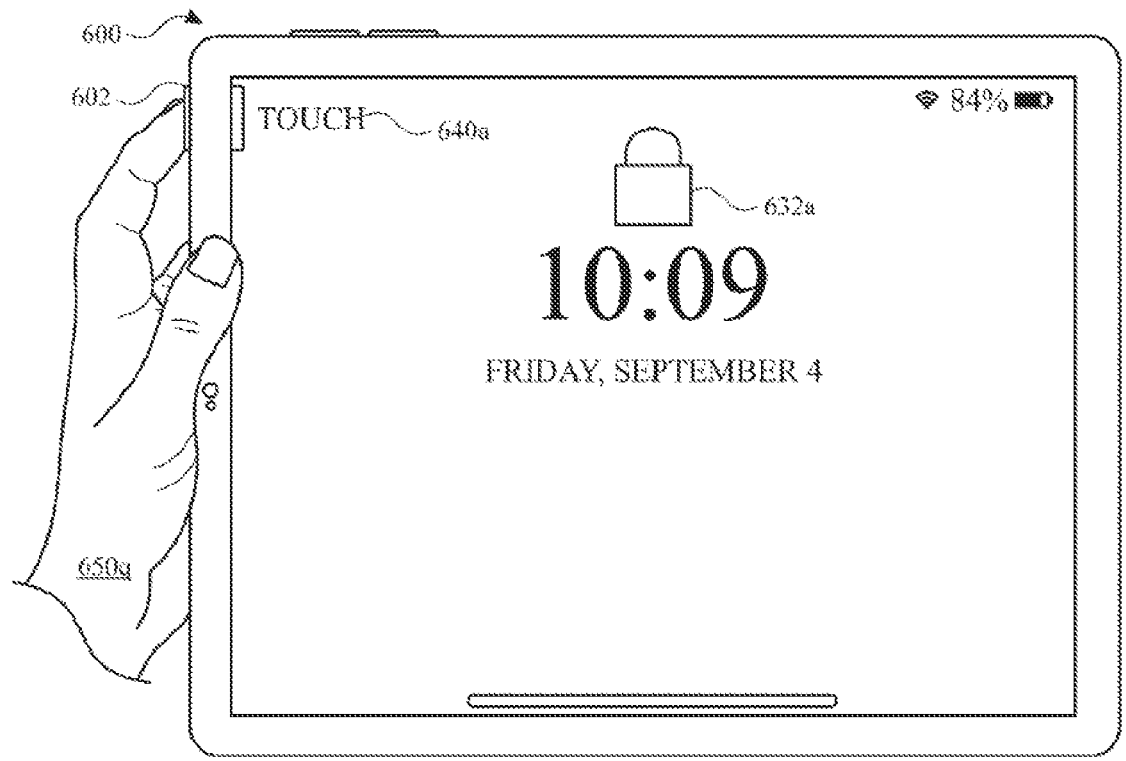
Figure 6A:
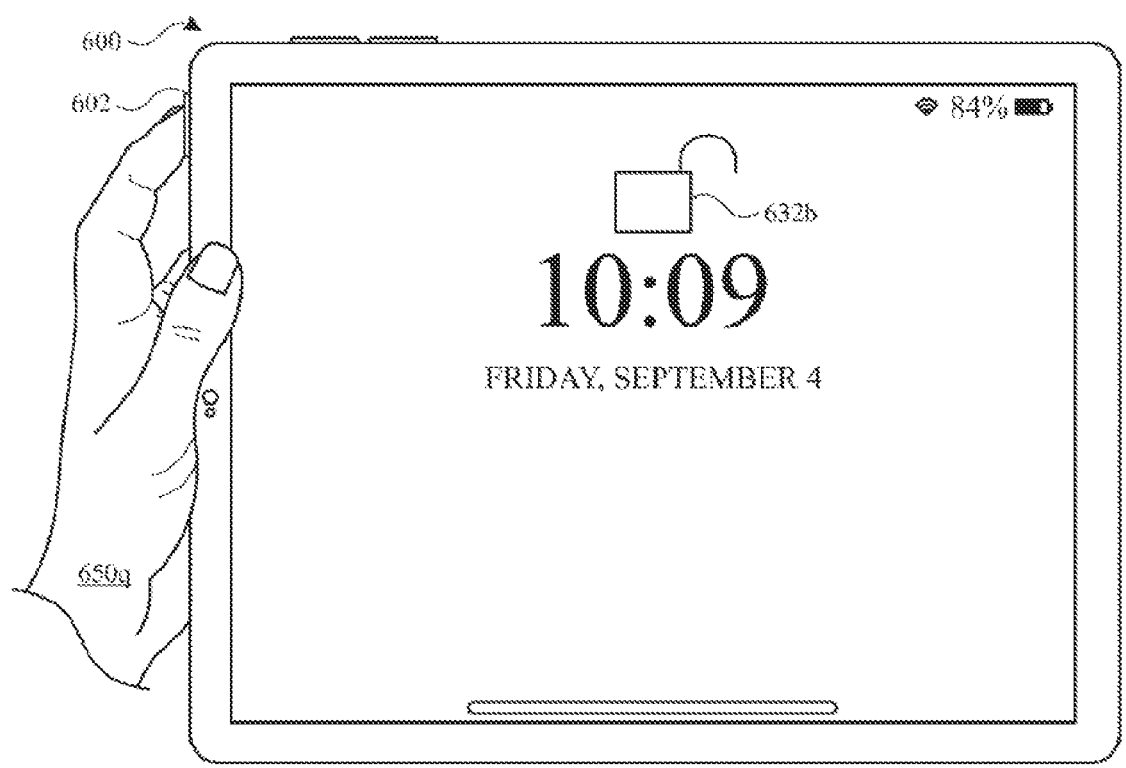
Figure 6A:
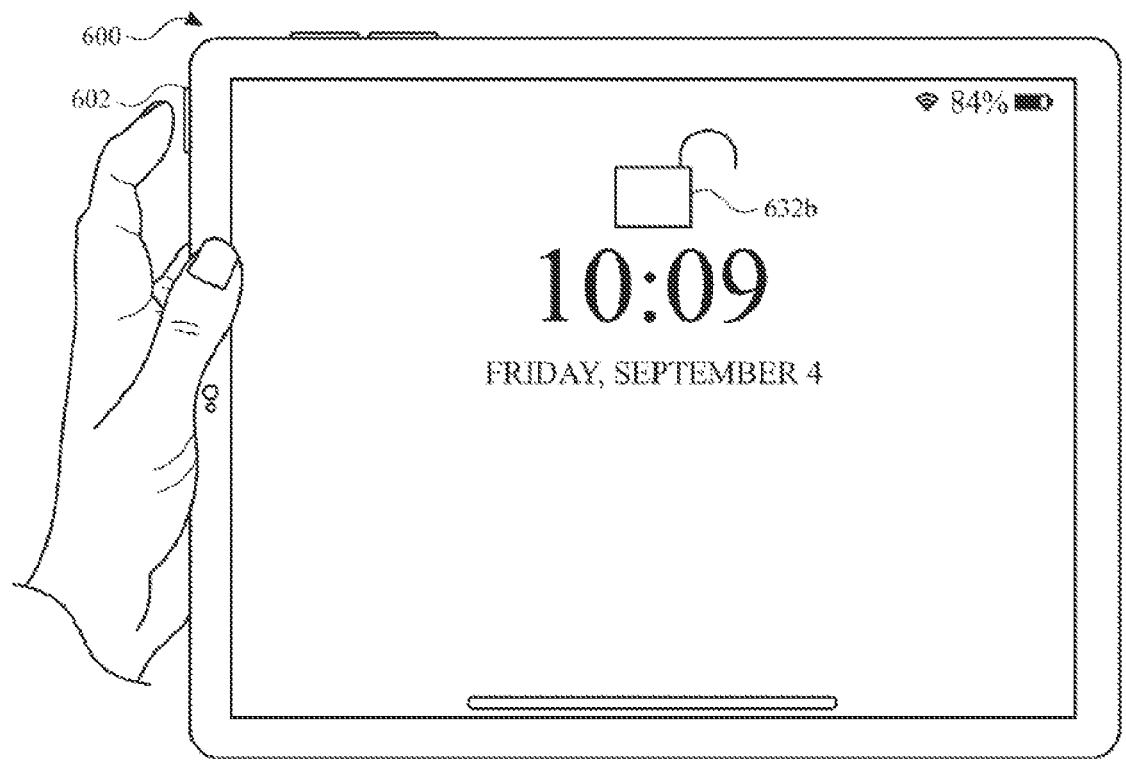
Figure 6A:
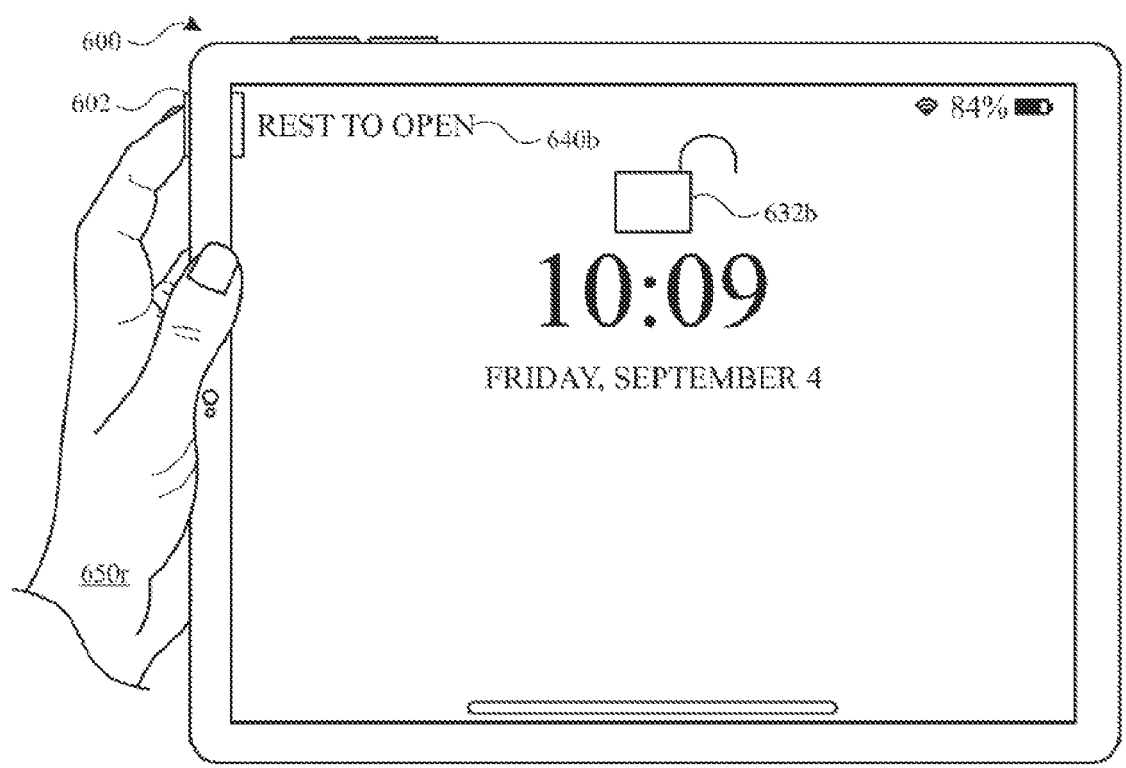
Figure 6A:
Figure 6A:
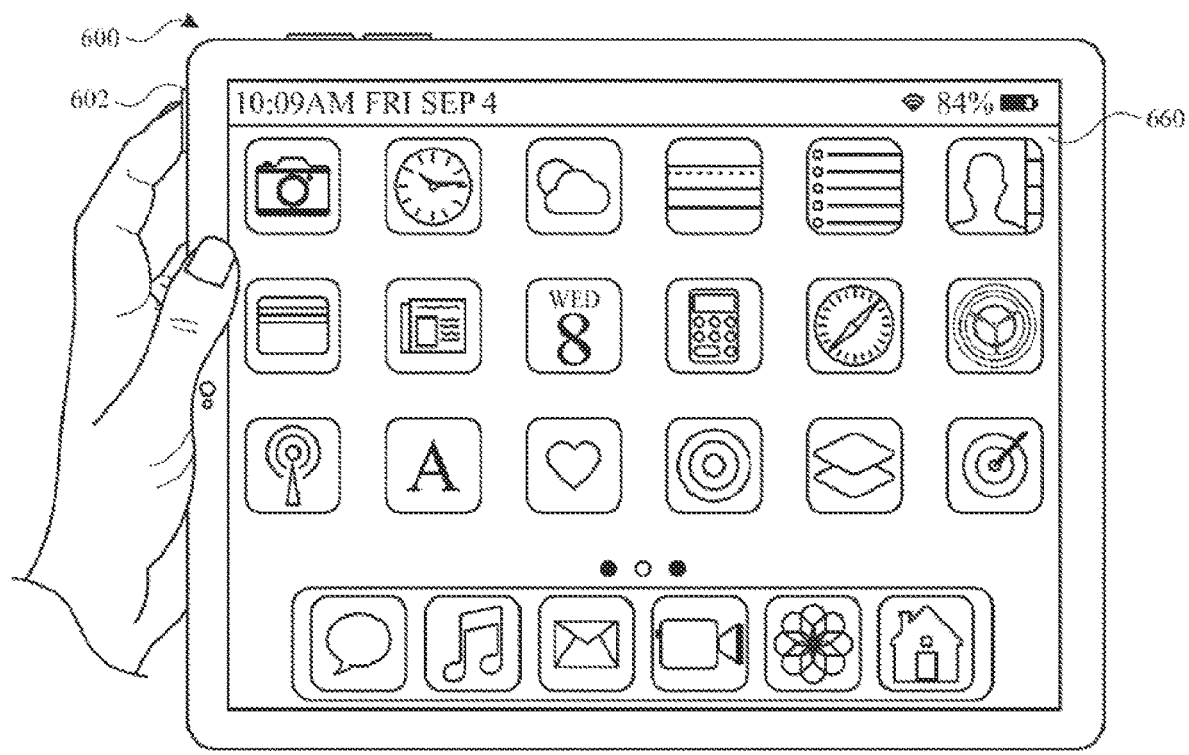
Figure 6A:
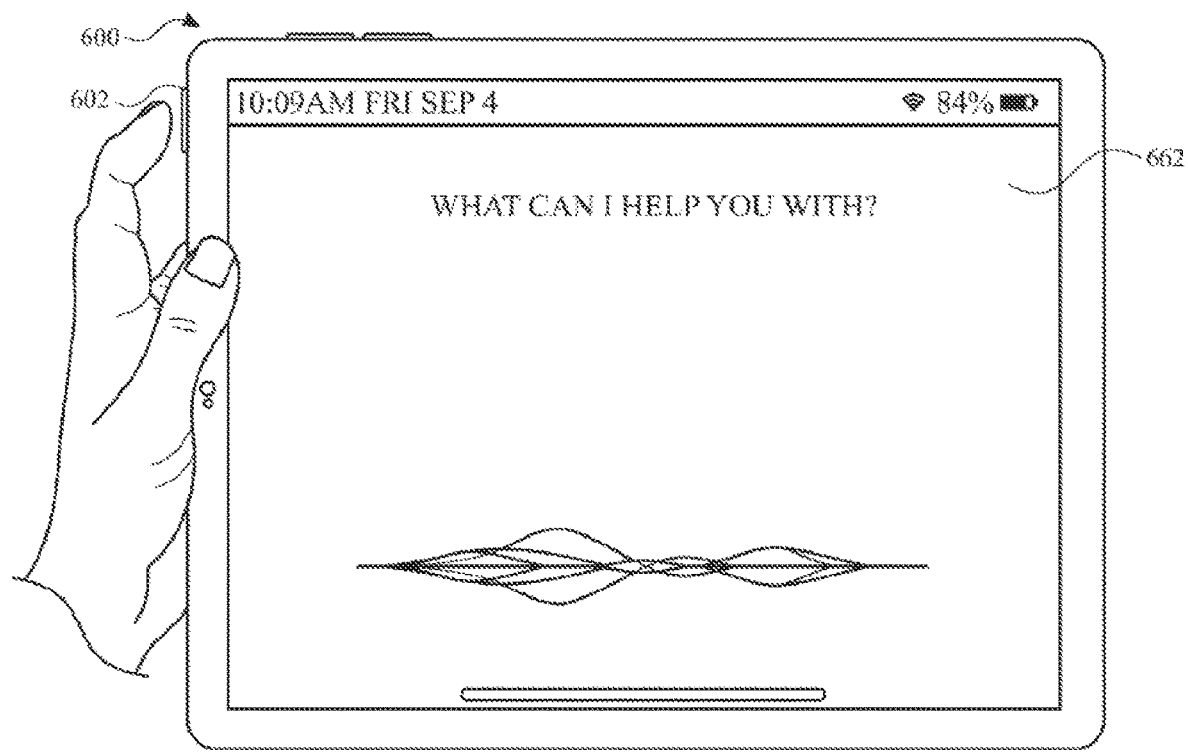
Figure 6A:
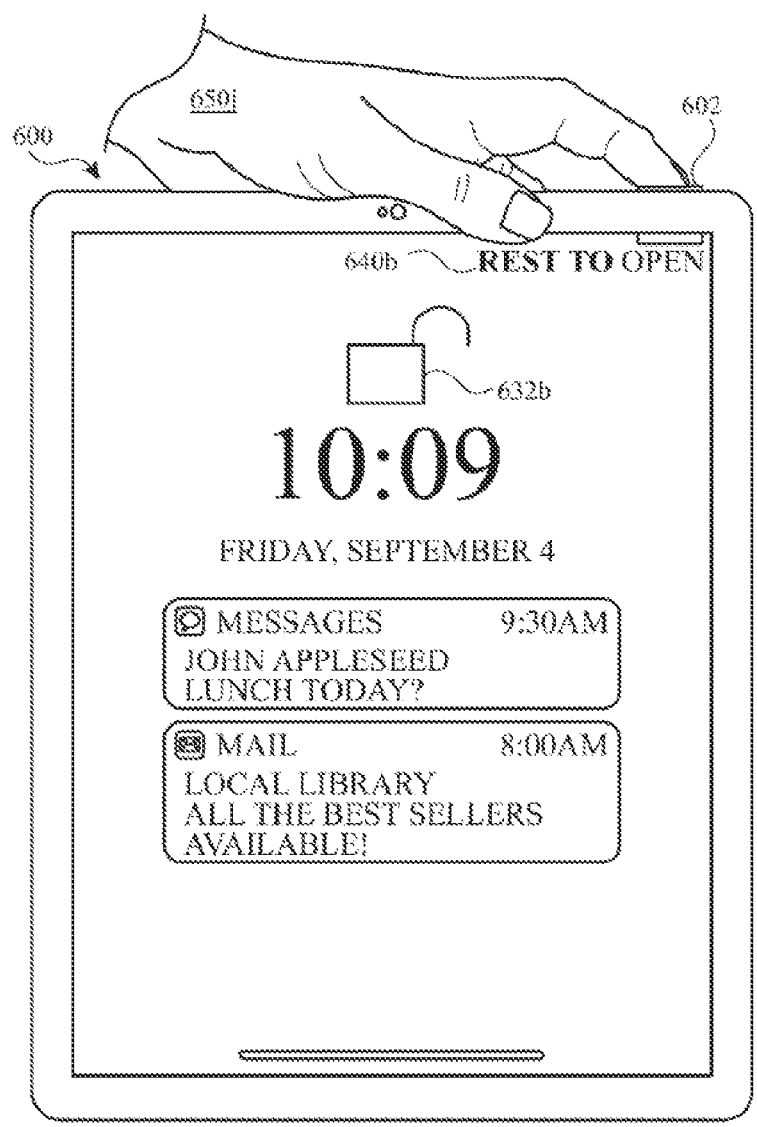
Figure 6A:
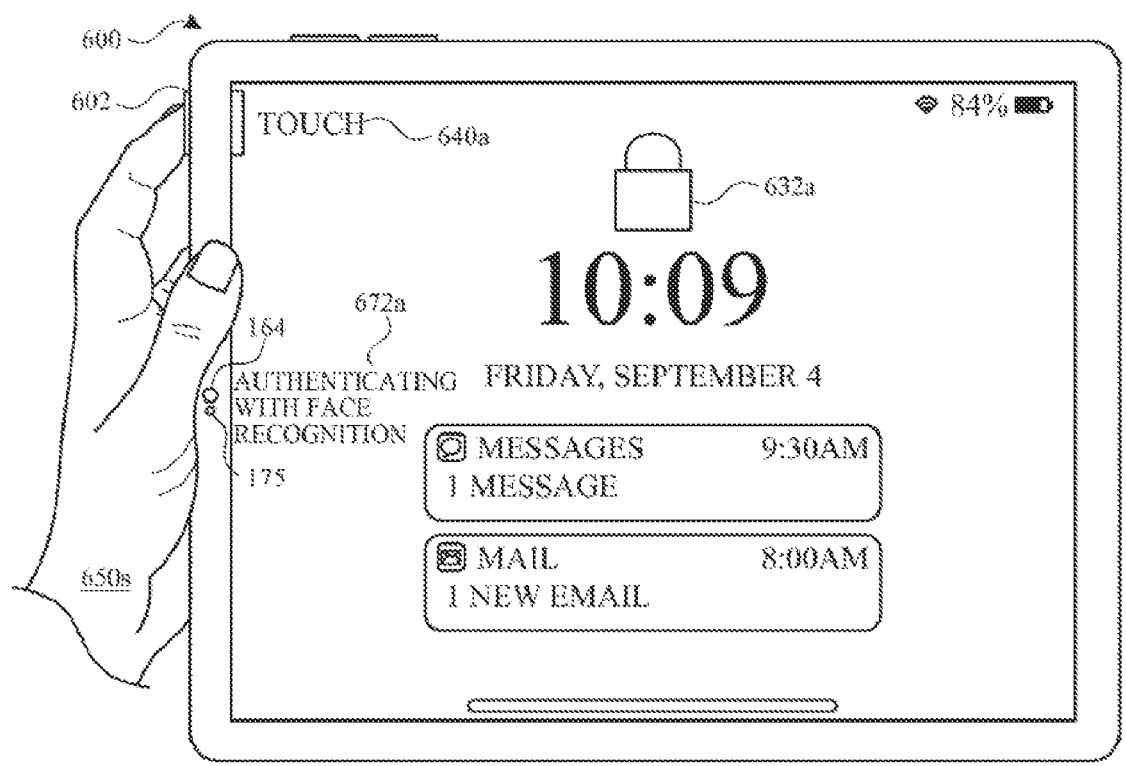
Figure 6A:
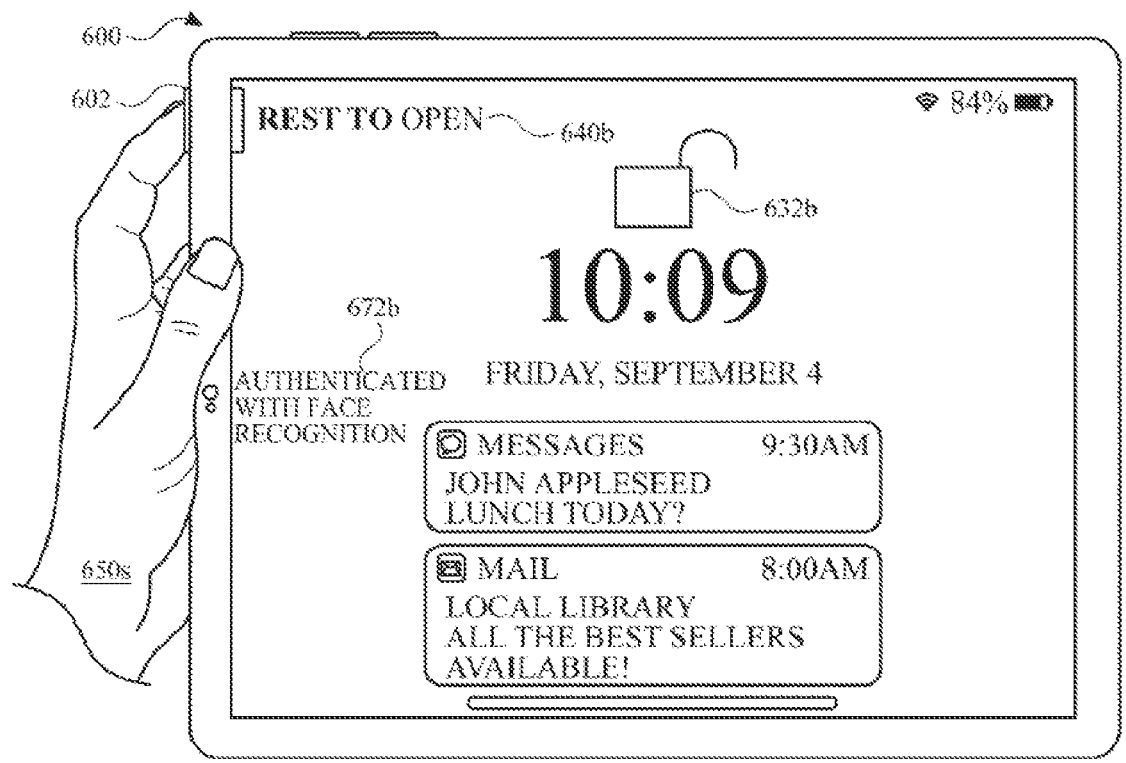
Figure 6A:
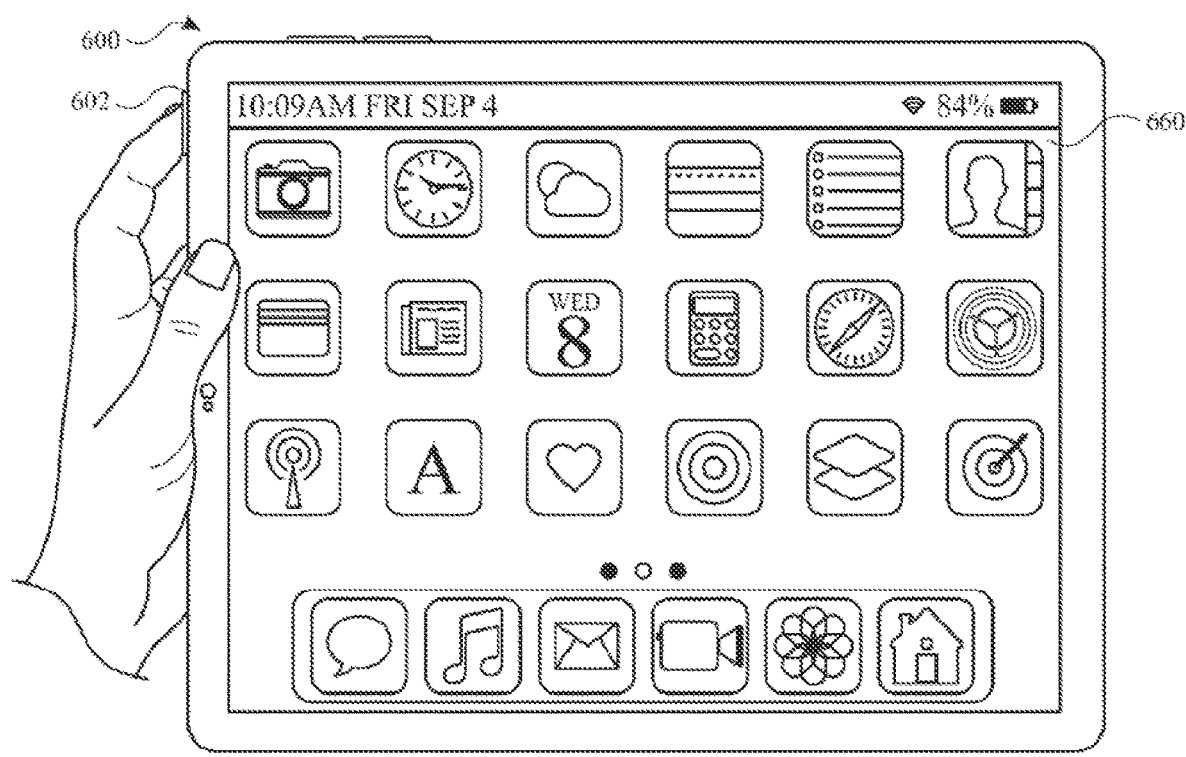
Figure 6A:
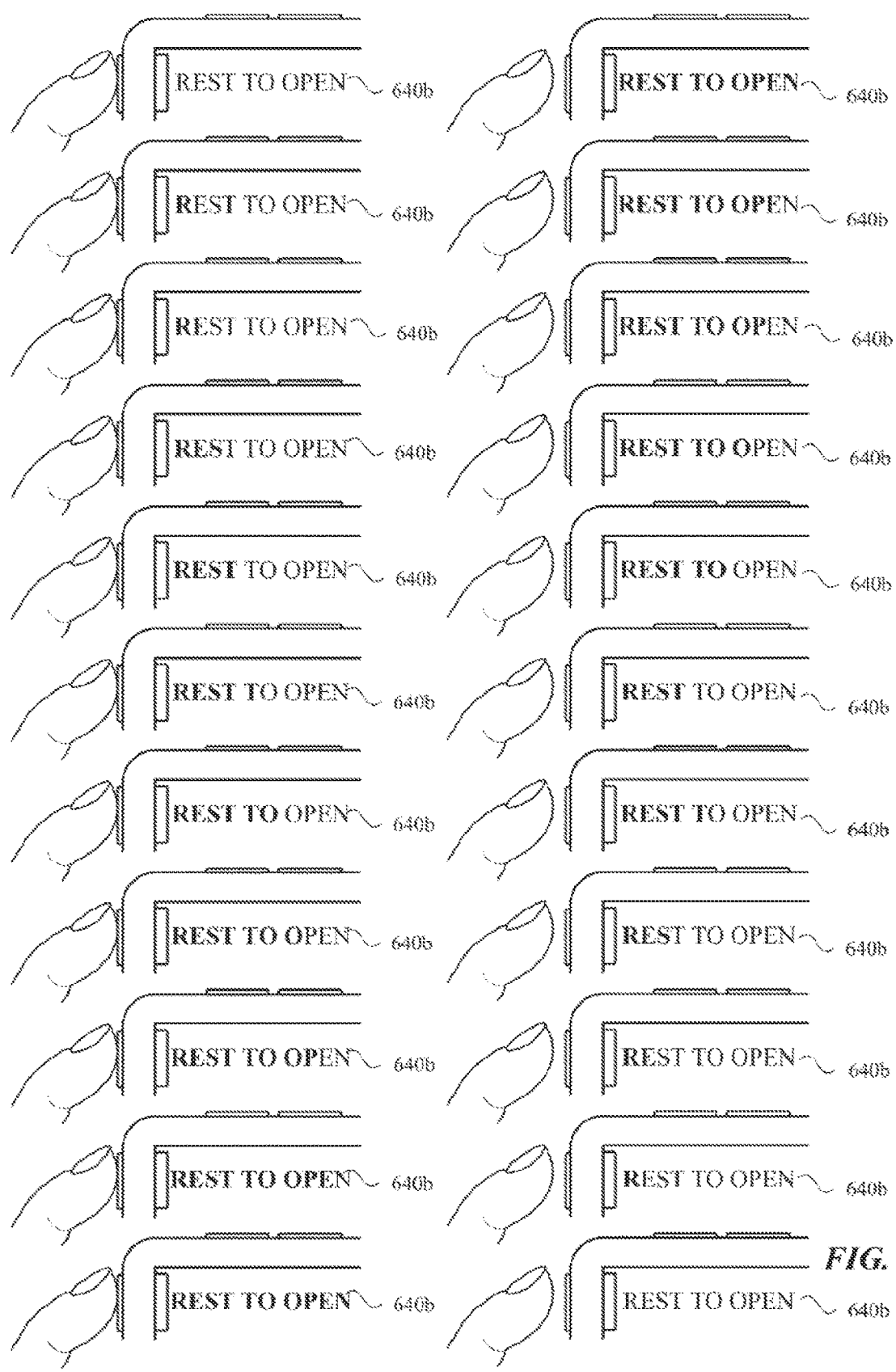

In some embodiments, displaying the threshold indicator (e.g., 640*b*) that indicates progress toward reaching the input threshold includes: in accordance with a determination that the computer system (e.g., 600) is in a first orientation (e.g., a portrait orientation, or a landscape orientation), displaying the threshold indicator (e.g., 640*b*) at a first location in the user interface that is displayed via the display generation component; and in accordance with a determination that the computer system (e.g., 600) is in a second orientation (e.g., a portrait orientation, or a landscape orientation) different from the first orientation, displaying the threshold indicator (e.g., 640*b*) at a second location, different from the first location, in the user interface that is displayed via the display generation component (e.g., as shown in FIGS. 6Y and 6AU).

In some embodiments, the first location is adjacent to the fingerprint sensor when the computer system is in the first orientation and the second location is adjacent to the fingerprint sensor when the computer system is in the second orientation.

In some embodiments, the threshold indicator is displayed (e.g., as part of the wake screen in the unlocked state) at a location on the display that is adjacent to the fingerprint sensor.

In some embodiments, the location of the threshold indicator is based on (and changes in conjunction with changes in) the orientation of the computer system. In some embodiments, the wake screen in the locked state does not include the threshold indicator.

Displaying the threshold indicator adjacent to the fingerprint sensor provides the user with visual feedback about what input is causing the threshold indicator to progress, which is particularly relevant when the system can receive inputs using various input mechanisms.

In some embodiments, while displaying the threshold indicator (e.g., 640*b*) with an indication of (e.g., partial, or non-zero) progress toward reaching the input threshold (e.g., as in FIG. 6G), the computer system (e.g., 600) detects an end of the input (e.g., 650*c*) (e.g., a lift off of the finger) directed to the fingerprint sensor. In response to detecting the end of the input (e.g., 650*c*) directed to the fingerprint sensor before the input threshold is reached, the computer system (e.g., 600) updates the threshold indicator (e.g., 640*b*) over time to indicate progress toward reaching the input threshold has ceased (e.g., as in FIG. 6H) (e.g., reversing the animation of the threshold indicator that indicated progress toward the input threshold).

Visually updating the threshold indicator over time to indicate progress toward reaching the input threshold has ceased provides the user with visual feedback that ending the input has caused the progress to revert. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the threshold indicator (e.g., 640*b*) with an indication of (e.g., partial, or non-zero) progress toward reaching the input threshold, the computer system (e.g., 600) detects an end of the input (e.g., as in FIG. 6H) (e.g., a lift off of the finger) directed to the fingerprint sensor. In response to detecting the end of the input directed to the fingerprint sensor: the computer system (e.g., 600) continues to display the threshold indicator (e.g., 640*b*) for a predetermined time after detecting the end of the input (as in FIG. 6H), and, after continuing to display the threshold indicator (e.g., 640*b*) for the predetermined time, the computer system (e.g., 600) ceases to display the threshold indicator (e.g., as in FIG. 6I, 640*b* replaced by 640*a*).

In some embodiments, when a second input is directed to the fingerprint sensor before the predetermined time has elapsed, the computer system continues to display threshold indictor while the second input continues to be detected, even after the predetermined time has elapsed.

Continuing to display the threshold indicator for the predetermined time after detecting the end of the input provides the user with visual feedback of the effect of ending the input (e.g., by showing the amount of progress achieved (e.g., zero)). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the threshold indicator (e.g., 640*b*) is a text string and wherein a visual property (e.g., letters) of the text string are sequentially updated (e.g., highlighted, changed in color, brightened, changed in size, and/or changed in opacity) over time to indicate progress toward reaching the input threshold (e.g., as in FIG. 6AY or 6X-6Z).

Sequentially updating a visual property of the text string, such as letters of the text string, to indicate progress provides the user with visual feedback of the progress toward reaching the input threshold while providing a textual message to the user, thereby enabling the user to concurrently assess the textual message and the progress. Sequentially updating the visual property of the text string also draws attention to the content (e.g., instructions) of the text string, thereby emphasizing the content. Including both the instructions and the indication of progress in the same graphical element (the threshold indicator) reduces clutter on the display and allows more information to be displayed on the user interface Providing improved visual feedback to the user without cluttering the user interface enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the input (e.g., the start of the input) is detected while the display generation component is in a low power state, the input threshold is a first time threshold. In some embodiments, in accordance with a determination that the input (e.g., the start of the input) is detected while the display generation component is not in the low power state (e.g., is in the standard power state; and/or is not in an off state or a low power consumption state in which less information is displayed via the display of the display generation component as compared to when the input directed to the button was received), the input threshold is a second time threshold that is different from the first time threshold. In some embodiments, the first time threshold is longer than the second time threshold. In some embodiments, the first time threshold is shorter than the second time threshold.

Varying the time threshold based on the power state enables the computer system to more quickly transition to the second user interface when certain power state conditions are met. For example, the user can more readily view the content of the display when the display is not in the low power state at the time (or before) the user provides the input. Performing an operation more quickly when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the input is detected while one or more unread notifications (e.g., 636a, 636b) are available for display, the input threshold is a first time threshold. In some embodiments, in accordance with a determination that the input is detected while unread notifications (e.g., notifications that do not meet a set of criteria (e.g., having been displayed for a predetermined period of time; and/or having been displayed in a particular interface of the computer system or another computer system associated with an account associated with the computer system)) are not available for display (e.g., there are no unread notifications), the input threshold is a second time threshold that is different from the first time threshold.

In some embodiments, the first time threshold is longer than the second time threshold, thereby providing the user with a longer opportunity to view the notifications and to cease providing the touch input before the time threshold is met. In some embodiments, the first time threshold is shorter than the second time threshold. Ceasing to provide the touch input before the time threshold is met enables the wake screen and corresponding notifications to continue to be displayed without transitioning to displaying the second user interface.

The computer system performing operations based on reaching a different (e.g., longer) time threshold when unread notifications are available to be read enables the user to easily review the notifications and have sufficient time to decide whether to cease providing the input before the time threshold is reached, thereby enabling the user to review the notifications. A different (e.g., shorter) duration when unread notifications are not available to be read enables the user to more quickly transition away from the wake screen and access a different user interface of interest. Thus, the techniques makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while continuing to detect the input and before the input exceeds the input threshold, in accordance with a determination that one or more unread notifications (e.g., 636a, 636b) are available for display (e.g., one or more unread notifications are displayed), the computer system (e.g., 600) displays a first graphical indication (e.g., 640b) (e.g., the threshold indicator) at a first location in the user interface that is displayed via the display generation component (e.g., without displaying a second graphical indication). In some embodiments, while continuing to detect the input and before the input exceeds the input threshold, in accordance with a determination that unread notifications are not available for display (e.g., there are no unread notifications or no unread notifications are displayed), forgoing display of the first graphical indication (e.g., as in FIGS. 6AD-6AE) at the first location in the user interface that is displayed via the display generation component (e.g., do not display the first graphical indication and, optionally, instead display a second graphical indication at the first location).

Displaying a graphical indication based on whether there are unread notifications provides the user with visual feedback about the availability of unread notifications. Further, when the graphical indication provides an indication of progress towards a threshold before transitioning to the second user interface, the system provides the user with additional feedback about the amount of progress required and, therefore, time left to review the unread notifications before the notifications cease to be displayed (as a result of transitioning to the second user interface). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the fingerprint sensor is part of a button (e.g., 602) of the computer system (e.g., the fingerprint sensor is integrated into the button such as a mechanical button or a solid-state button). In some embodiments, in response (804) to detecting the input and in accordance with a determination that the input (e.g., 650a, 650f, 650j, 650l) that includes activation (e.g., a short press input) of the button (e.g., 602) that is less than an activation duration and that the display generation component is in a low power state, the computer system (e.g., 600) transitions the display generation component from the low power state to a higher (e.g., standard) power state (and, optionally, displaying the wake screen).

Performing different functions based on a duration of activation of the button and the power state enables various functions to be performed using the same button, thereby reducing the need for additional hardware elements. Providing additional control options without adding additional buttons or cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the fingerprint sensor is part of a button (e.g., 602) of the computer system (e.g., the fingerprint sensor is integrated into the button such as a mechanical button or a solid-state button). In some embodiments, in response (804) to detecting the input and in accordance with a determination that the input (e.g., 650e, 650i, 650k, 650m) that includes activation (e.g., a short press input) of the button that is less than an activation duration and that the display generation component is not in a low power state, the computer system (e.g., 600) transitions the display generation component to the low power state.

Performing different functions based on a duration of activation of the button and the power state enables various functions to be performed using the same button, thereby reducing the need for additional hardware elements. Providing additional control options without adding additional buttons or cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the fingerprint sensor is part of a button (e.g., 602) of the computer system (e.g., the fingerprint sensor is integrated into the button such as a mechanical button or a solid-state button). In some embodiments, in response (804) to detecting the input and in accordance with a determination that the input that includes activation (e.g., a long press input) of the button that is more than an activation duration (and independent of whether the display generation component is in the low power state or not in the low power state), the computer system (e.g., 600) invokes a virtual assistant (e.g., as shown in FIG. 6AT) (e.g., enabling a microphone of the computer system to receive an utterance, performing an operation based on natural language processing of the utterance).

In some embodiments, activations of the button for less than the activation duration are considered a short activation (e.g., resulting from a short press) and activations of the button for more than the activation duration are considered long activations (e.g., resulting from a long press). In some embodiments, a long activation while the computer system is unlocked (or using an enrolled finger that causes the computer system to unlock) invokes a virtual assistant that has accesses to private information (e.g., contact information, home address information) while a long activation while the computer system is locked (and using a finger that is not enrolled) invokes a virtual assistant that does not have access to private information.

Performing different functions based on a duration of activation of the button enables various functions to be performed using the same button, thereby reducing the need for additional hardware elements, reducing manufacturing costs, and reducing the number of components in the computer system that can fail with repeated use. Providing additional control options without adding additional buttons or cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response (804) to detecting the input and in accordance with a determination that the computer system (e.g., 600) is in an unlocked state and that the input (e.g., 650*d*, 650*r*) includes touching the fingerprint sensor for more than the input threshold regardless of whether the fingerprint input detected by the fingerprint sensor matches one or more enrolled fingers, the computer system (e.g., 600) displays, via the display generation component, the second user interface (e.g., 660).

Thus, any finger (even a finger that does not include fingerprint information that matches the enrolled fingers) can be used to access the second user interface when the device is unlocked (e.g., when the computer system is displaying the wake screen in the unlocked state).

Performing different functions based on a threshold of touch of the fingerprint sensor enables various functions to be performed using the same button, thereby reducing the need for additional hardware elements. Providing additional control options without adding additional buttons or cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, not requiring a finger to match an enrolled finger when the computer system is already unlocked enables additional means (e.g., different fingers) to be used to cause the transition to the second user interface while maintaining the security of the system.

In some embodiments, prior to detecting the input, in accordance with a determination that the computer system (e.g., 600) is in a locked state, the computer system (e.g., 600) displays, via the display generation component, a visual indication (e.g., 640*a*) of a location of the fingerprint sensor on the computer system (e.g., 600). In some embodiments, the visual indication of the location of the fingerprint sensor is displayed at a location on the display that is adjacent to the button as part of the wake screen in the locked state and includes a visual indication that fingerprint authentication is required.

In some embodiments, the location of the visual indication of the location of the fingerprint sensor is based on (and changes in conjunction with changes in) the orientation of the computer system.

Displaying the visual indication adjacent to the fingerprint sensor provides the user with visual feedback about where the fingerprint sensor is located, which is particularly relevant when the device can be operated in numerous orientations, which would otherwise make it difficult for the user to quickly assess the location of the fingerprint sensor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response (804) to detecting the input and in accordance with a determination that the input includes fingerprint information detected by the fingerprint sensor that matches one or more enrolled fingers (e.g., a fingerprint of the finger matches an enrolled fingerprint) (and, optionally, while continuing to detect the touching of the fingerprint sensor and/or after a determination that the finger matches one or more enrolled fingers), the computer system (e.g., 600) replaces display, via the display generation component, of the visual indication (e.g., 640*a*) of the location of the fingerprint sensor with a threshold indicator (e.g., 640*b*) that indicates progress toward reaching the input threshold.

In some embodiments, the technique ceases to display the visual indication of the location of the fingerprint sensor and, instead, displays the threshold indicator that indicates progress toward reaching the input threshold.

Displaying the threshold indicator provides the user with visual feedback of the progress toward reaching the input threshold. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to beginning to detect the input, the computer system (e.g., 600) ceases to detect the input (e.g., detecting that the finger has been lifted from the fingerprint sensor). In some embodiments, in response to ceasing to detect the input and in accordance with a determination that the input did not reach the input threshold, the computer system (e.g., 600) resets progress (e.g., clearing progress) toward reaching the input threshold (e.g., as described with respect to FIG. 6H).

In some embodiments, subsequent to resetting progress toward the input threshold, the computer system detects an additional input directed to the fingerprint sensor. Because the progress toward the input threshold was reset when the computer system ceased to detect the input, the additional input will cause transition to displaying the second user interface once the additional input meets the input threshold independent of the progress made by the initial input toward the input threshold (e.g., without regard to how close the input came to reaching the input threshold before the input ceased to be detected).

Resetting progress toward the input threshold enables the computer system to require that the full threshold be met when subsequent user input is detected, thereby not requiring the user to track the progress of previous progress towards the input threshold using previous inputs. For an input threshold that is a time threshold, the computer system can provide the use with information during the time that the time threshold is not met, allowing the user to cease providing the input to not meet the time threshold. Resetting progress toward the input threshold also reduces likelihood of unintentionally reaching the input threshold that may occur if progress cumulatively stored progress had come close to reaching the input threshold such that a small (e.g., short in duration, and/or short in distance) or accidental touch could cause the input threshold to be met, thereby unintentionally triggering an operation. Providing improved visual feedback to the user and reducing unintentional triggering of operations enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) detects a plurality (e.g., three) of finger contacts during a locked session (e.g., a period where the computer system remains locked) that do not include fingerprint information that matches one or more enrolled fingers. In response to detecting the plurality of finger contacts during the locked session that do not include fingerprint information that matches the one or more enrolled fingers, the computer system (e.g., 600) displays, via the display generation component, a passcode entry user interface (e.g., an interface requesting a passcode be entered to unlock the computer system).

In some embodiments, while displaying the passcode entry user interface, the computer system receives an entry (e.g., via a virtual keyboard). In accordance with a determination that the entry matches a registered passcode, unlocking the computer system. In accordance with a determination that the entry does not match the registered passcode, maintaining the computer system in the locked state.

Displaying a passcode entry user interface after receiving a plurality of unsuccessful finger inputs provides the user with visual feedback that alternative authentication procedures are available and provides the alternative authentication procedure, thereby reducing the number of inputs required to access the alternative procedure. Providing improved visual feedback to the user and reducing the number of inputs needed to perform an operation enhance the operability of the device and make the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

Note that details of the processes described above with respect to method 800 (e.g., FIG. 8) are also applicable in an analogous manner to the methods described below/above. For example, methods 700, 1000, 1100, and 1200 optionally include one or more of the characteristics of the various methods described above with reference to method 800. For example, the computer systems are the same and the touch sensor, the biometric sensor, and the fingerprint sensor are optionally the same component and are optionally integrated into the button. For another example, the wake screens are the same screen. For another example, the enrollment process is used to enroll fingerprints that are checked for matches throughout the processes. For another example, the indications of the location of the fingerprint sensor, biometric sensor, touch sensor, and button are the same indicators throughout the processes. For brevity, these details are not repeated below.

FIGS. 9A-9AH illustrate exemplary user interfaces for receiving user inputs, in accordance with some embodiments. The user interfaces in these figures are used to illustrate the processes described below, including the processes in FIGS. 10, 11, and 12.

FIG. 9A illustrates an electronic device 600 (e.g., a tablet, a smart phone) that includes display 610, housing 612, and buttons 602, 604a, and 604b.

Button 602 is optionally a mechanical button or a solid-state button, as described above. A press input by the user of button 602 activates button 602 for less than a long-press threshold period of time (e.g., for less than an activation duration). A long press input by the user of button 602 activates button 602 for longer than the long-press threshold period of time (e.g., longer than the activation duration). Button 602 includes an integrated fingerprint sensor, which enables electronic device 600 to detect fingerprint features of a finger as the finger touches button 602 (e.g., a touch input where the finger is placed on button 602 without providing a press input) and while the finger is providing a press input of button 602.

Buttons 604a and 604b optionally do not include an integrated fingerprint sensor. Buttons 604a and 604b, when activated, increase and decrease, respectively, a volume of electronic device 600.

At FIG. 9A, electronic device 600 is in a landscape orientation while in a setup process to configure device 600 for use and, as a result, device 600 displays device setup user interface 920 in the landscape orientation. Device setup user interface 920 does not include a touch graphical element, as device 600 is not requesting that the user provide a fingerprint input at the fingerprint sensor integrated into button 602. Device setup user interface 920 includes continue option 920a. At FIG. 9A, device 600 detects, via a touch-sensitive surface, tap gesture 950a on continue option 920a. In response to detecting tap gesture 950a, device 600 proceeds to a next step of the setup process, as shown in FIG. 9B.

Figure 9B:
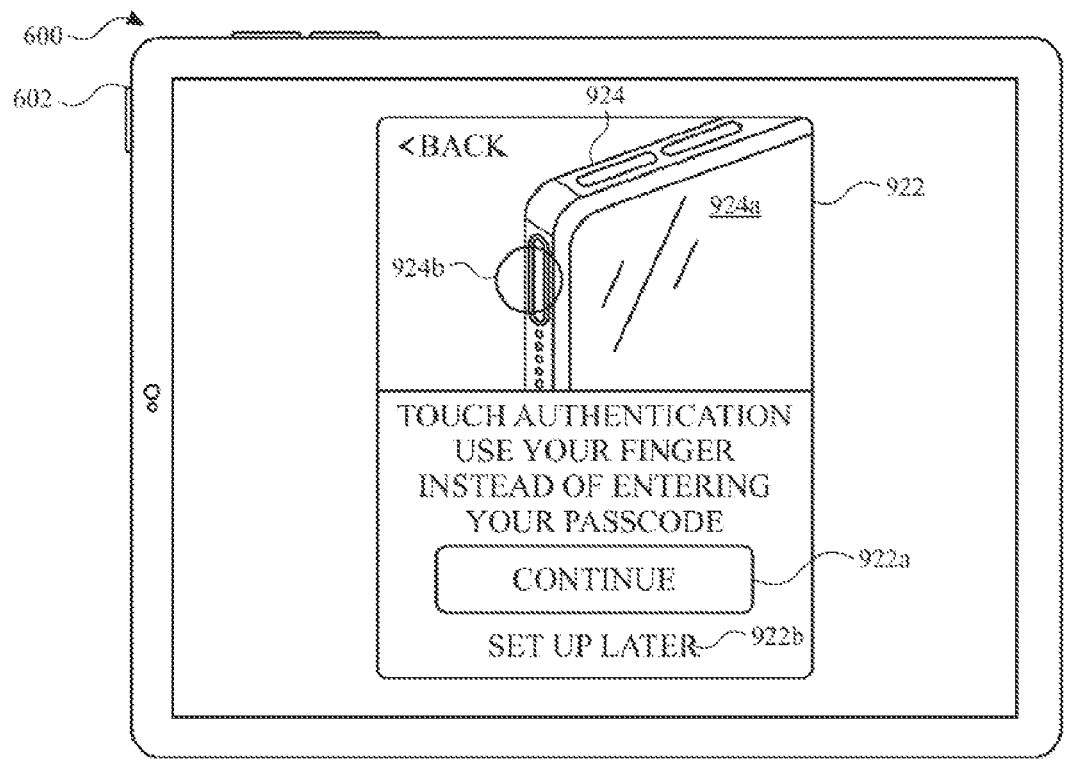

At FIG. 9B, in response to detecting tap gesture 950a, device 600 displays user interface 922 for enrolling a fingerprint for fingerprint authentication. User interface 922 includes video 924 (or an image) that includes representation 924a of device 600 in the same orientation (e.g., landscape orientation) as device 600 is currently in. Video 924 shows the location of the button with the integrated fingerprint sensor of representation 924a and displays highlight 924*b* (e.g., circle, a colored filter) overlaid on the button of representation 924*a* to further provide the user with feedback on the location of the fingerprint sensor. User interface 922 further includes continue option 922*a* and set up later option 922*b*. In response to detecting a tap gesture on set up later option 922*b*, device 600 ceases the fingerprint enrollment process of the setup process and, optionally, continues on with a remainder of the setup process. In response to detecting tap gesture on continue option 922*a*, device 600 proceeds to a next step of the setup process, as shown in FIG. 9F. User interface 922 optionally does not include touch graphical element 640*a*, as device 600 is not requesting that the user provide a fingerprint input at the fingerprint sensor integrated into button 602.

Figure 9D:
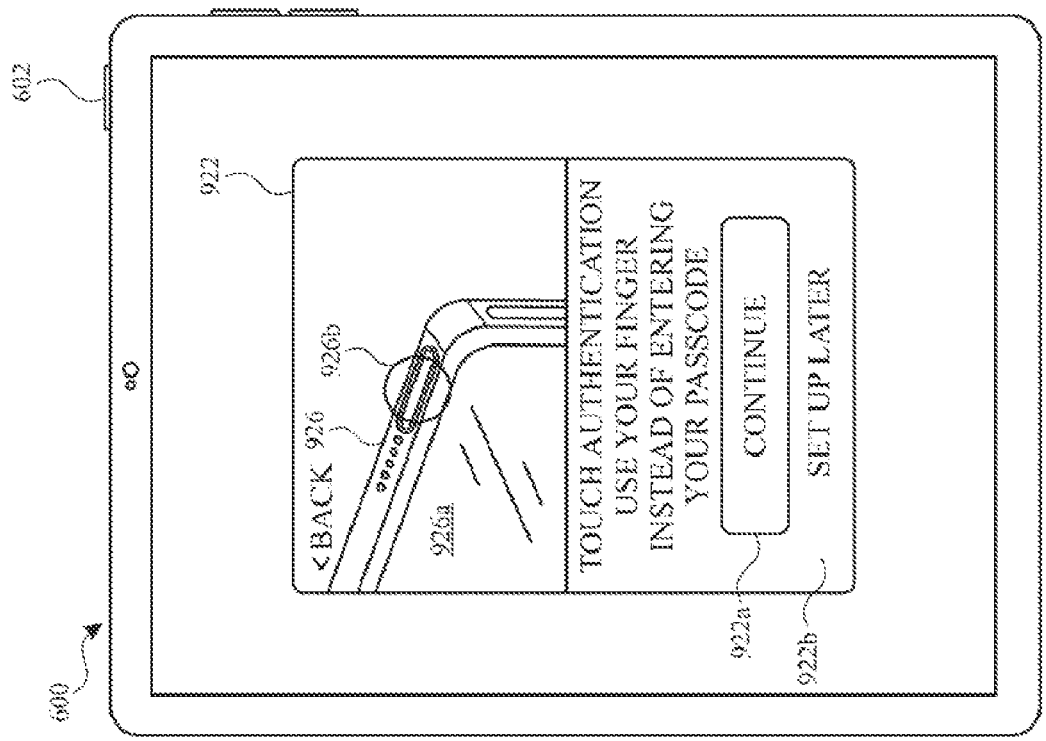
Figure 9C:
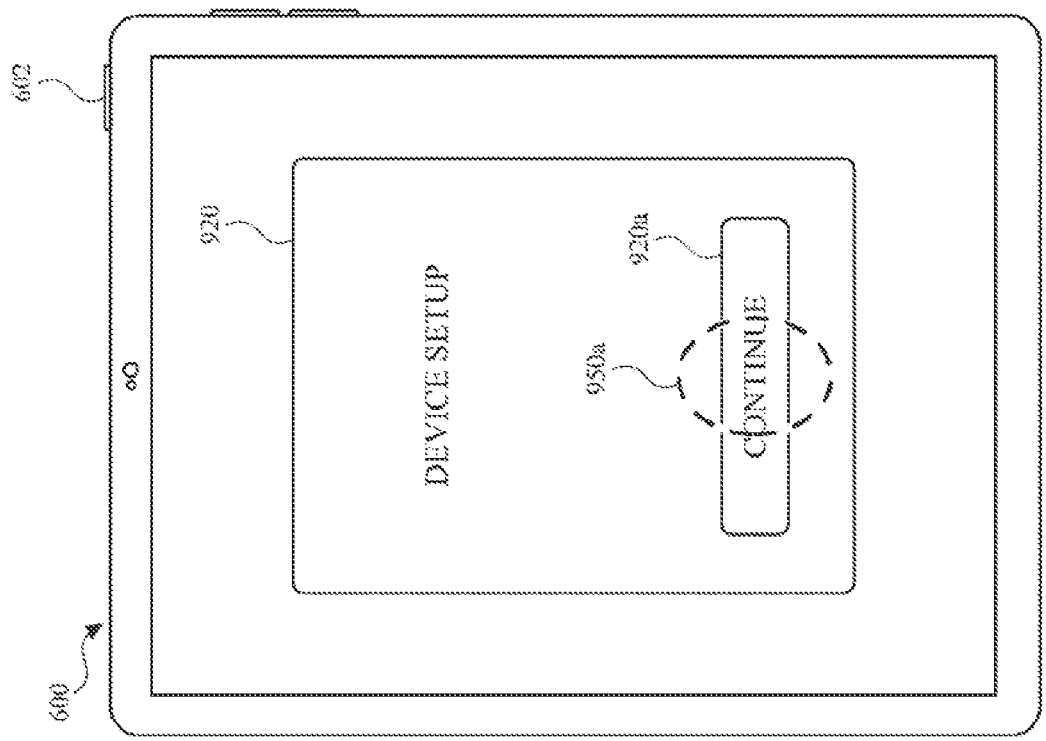

FIGS. 9C-9D illustrate user interfaces for when device 600 is in a portrait orientation. The user interfaces of FIGS. 9C-9D correspond to those of FIGS. 9A-9B, respectively. At FIG. 9C, in response to detecting tap gesture 950*a*, device 600 displays user interface 922. User interface 922 includes video 926 (or an image) that includes representation 926*a* of device 600 in the same orientation (e.g., portrait orientation) as device 600 is currently in. Video 924 shows the location of the button with the integrated fingerprint sensor of representation 926*a* and displays highlight 926*b* (e.g., circle, a colored filter) overlaid on the button of representation 926*a* to further provide the user with feedback on the location of the fingerprint sensor in that particular orientation. For example, while in the landscape orientation and displaying the user interface of FIG. 9B, device 600 detects a change in the orientation of device 600 to the portrait orientation and, in response, displays the user interface of FIG. 9D. For another example, while in the portrait orientation and displaying the user interface of FIG. 9D, device 600 detects a change in the orientation of device 600 to the landscape orientation and, in response, displays the user interface of FIG. 9B.

Figure 9E:
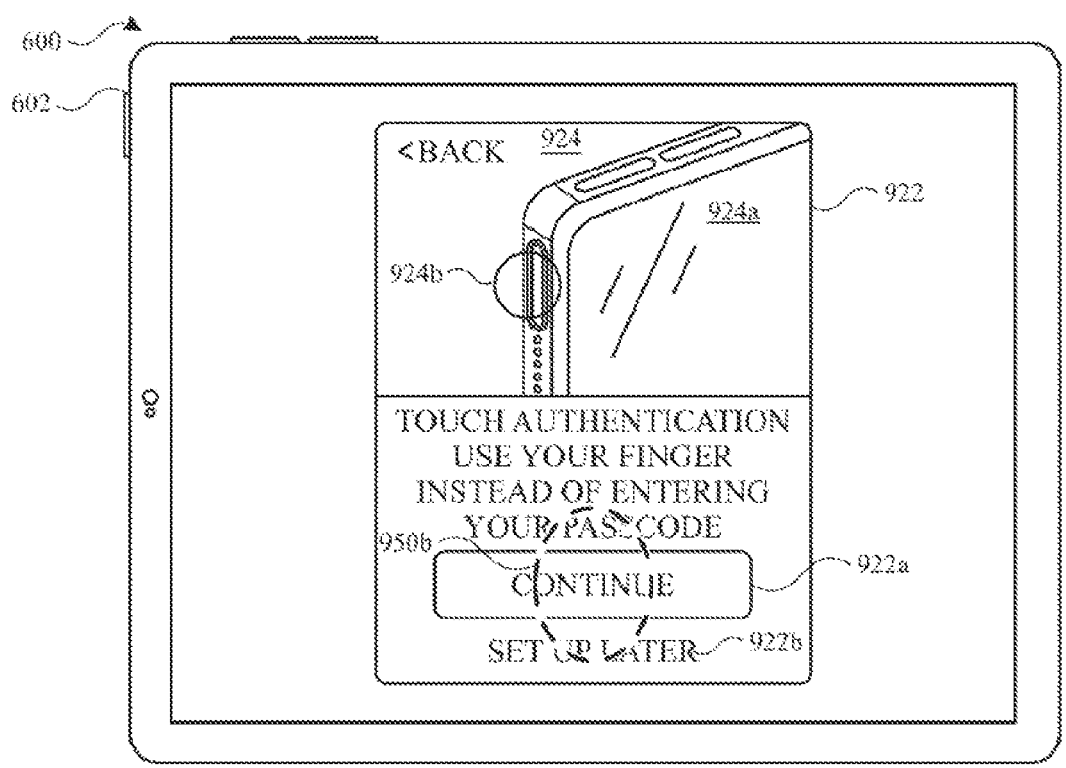
Figure 9F:
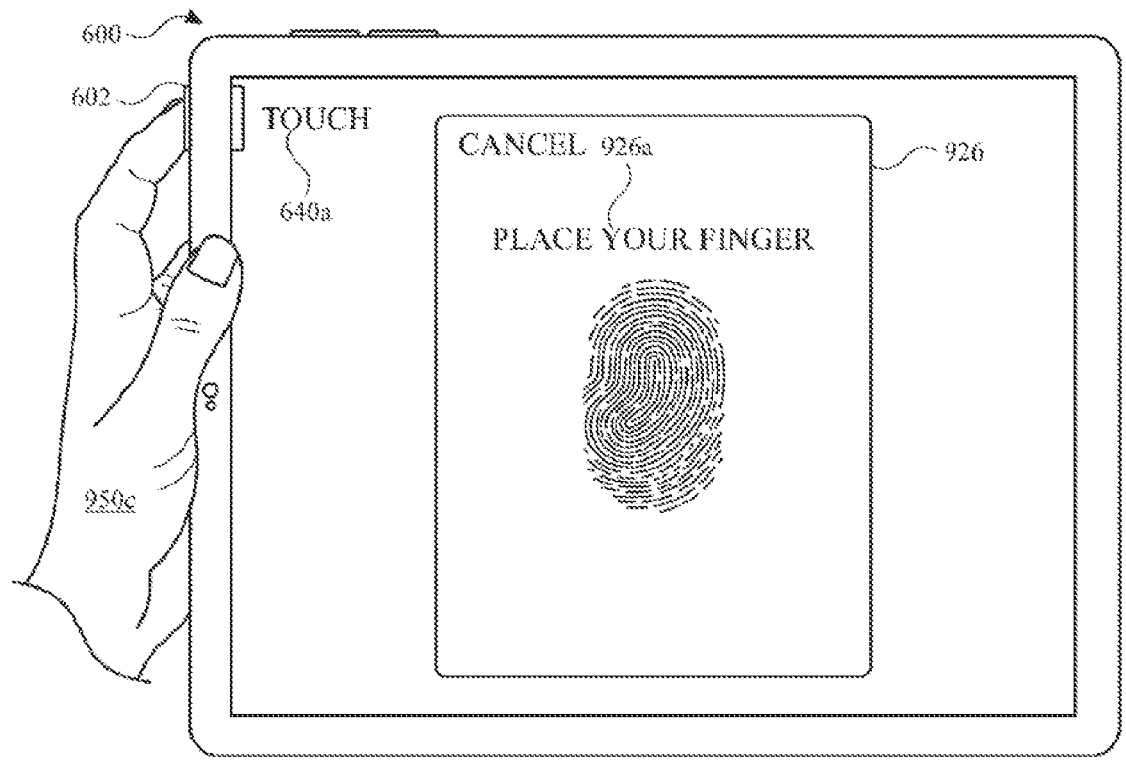

At FIG. 9E, while device 600 is in the landscape orientation and displaying user interface 922, device 600 detects tap gesture 950*b* on continue option 922*a*. In response to detecting tap gesture 950*b* on continue option 922*a*, device 600 proceeds to a next step of the setup process, as shown in FIG. 9F.

At FIG. 9F, device 600 displays user interface 926, including instruction 926*a* for the user to place their finger on the fingerprint sensor of button 602. In addition, device 600 displays touch graphical element 640*a* (e.g., prior to detecting the user's finger on the fingerprint sensor) next to button 602 to provide a visual indication to the user that the user should place their finger on the fingerprint sensor of button 602 and to provide a visual indication of the location of button 602. At FIG. 9F, device 600 detects a portion of the fingerprint of the user based on the user directing their finger to the fingerprint sensor of button 602 via touch input 950*c*.

Figure 9G:
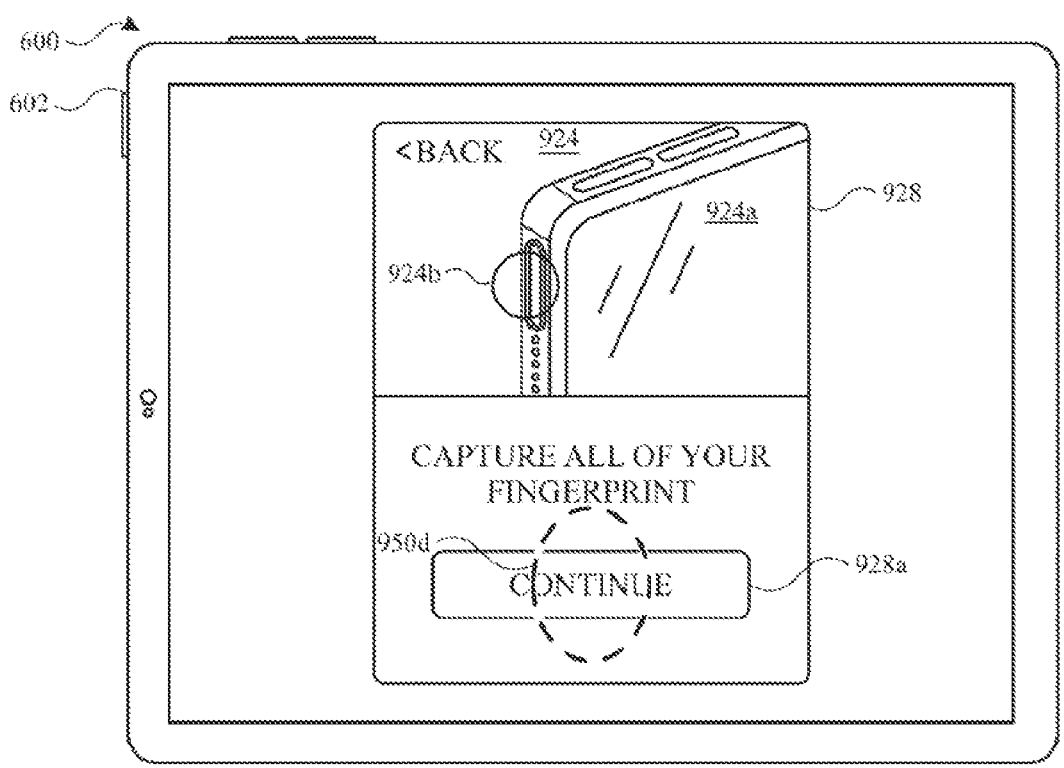

At FIG. 9G, in response to detecting the portion of the fingerprint, device 600 displays touch authentication user interface 928, which includes video 924 (selected based on the orientation of device 600, as described above) and prompts the user to provide additional fingerprint information for the same finger. At FIG. 9G, device 600 detects tap gesture 950*d* on continue option 928*a*.

Figure 9H:
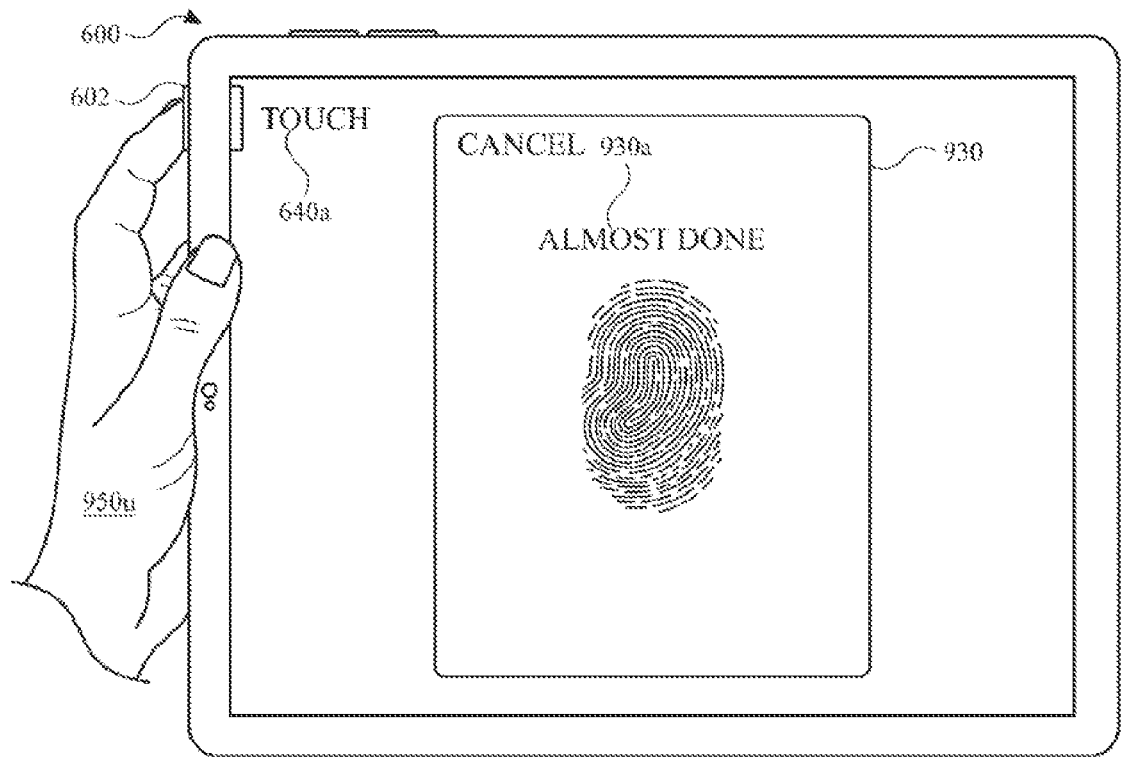

At FIG. 9H, in response to detecting tap gesture 950*d*, device 600 displays user interface 930, including instruction 930*a* for the user to place their finger on the fingerprint sensor of button 602. In addition, device 600 displays touch graphical element 640*a* (e.g., prior to detecting the user's finger) next to button 602 to provide a visual indication that the user should place their finger on the fingerprint sensor of button 602 and to provide a visual indication of the location of button 602. At FIG. 9H, device 600 detects additional portions of the fingerprint of the user based on the user directing their finger to the fingerprint sensor of button 602 via touch input(s) 950*u* (e.g., multiple consecutive touch inputs).

Figure 9I:
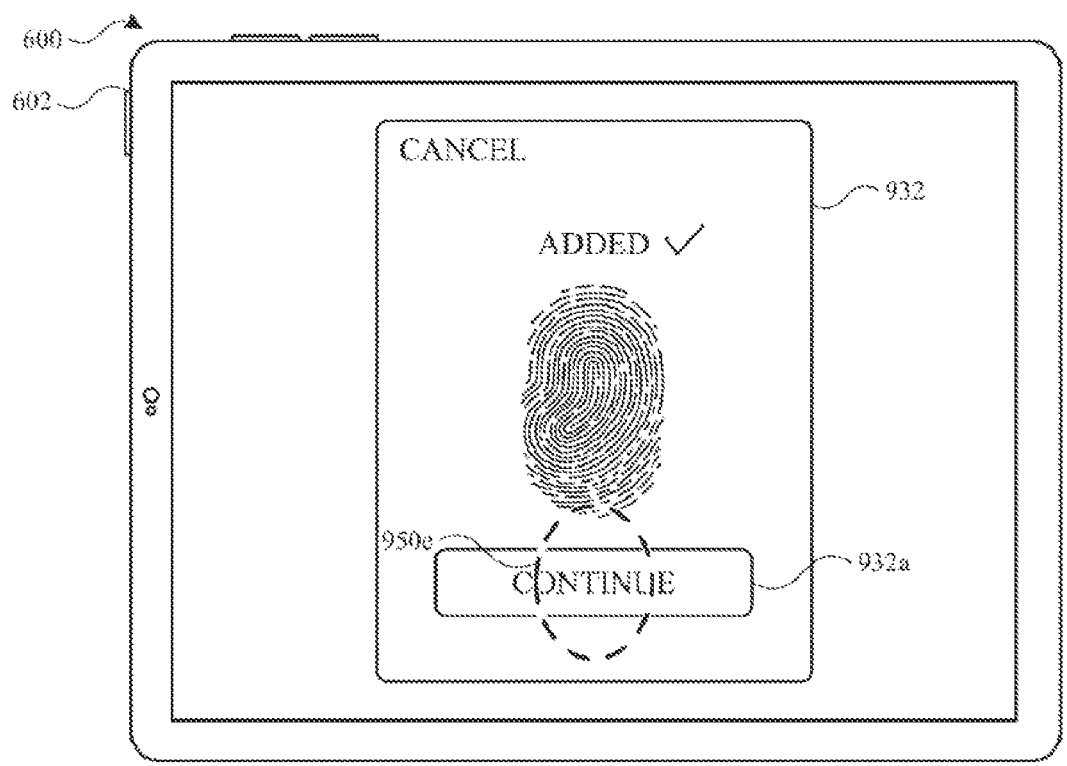

At FIG. 9I, in response to detecting the additional portions of the fingerprint via touch input(s) 950*u*, device 600 displays user interface 932, which indicates that the fingerprint of the finger has been enrolled (and, therefore, can be used to authenticate requests in the future). User interface 932 also includes continue option 932*a*. Device 600 detects tap gesture 950*e* on continue option 932*a*.

Figure 9J:
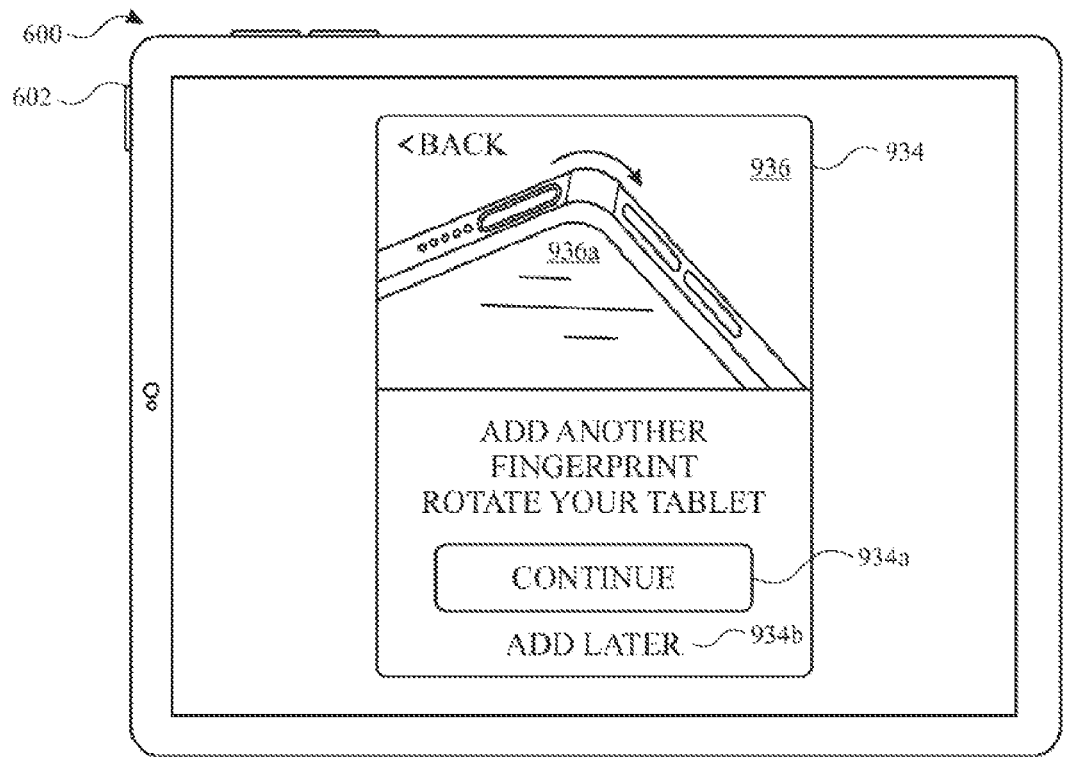
Figure 9K:
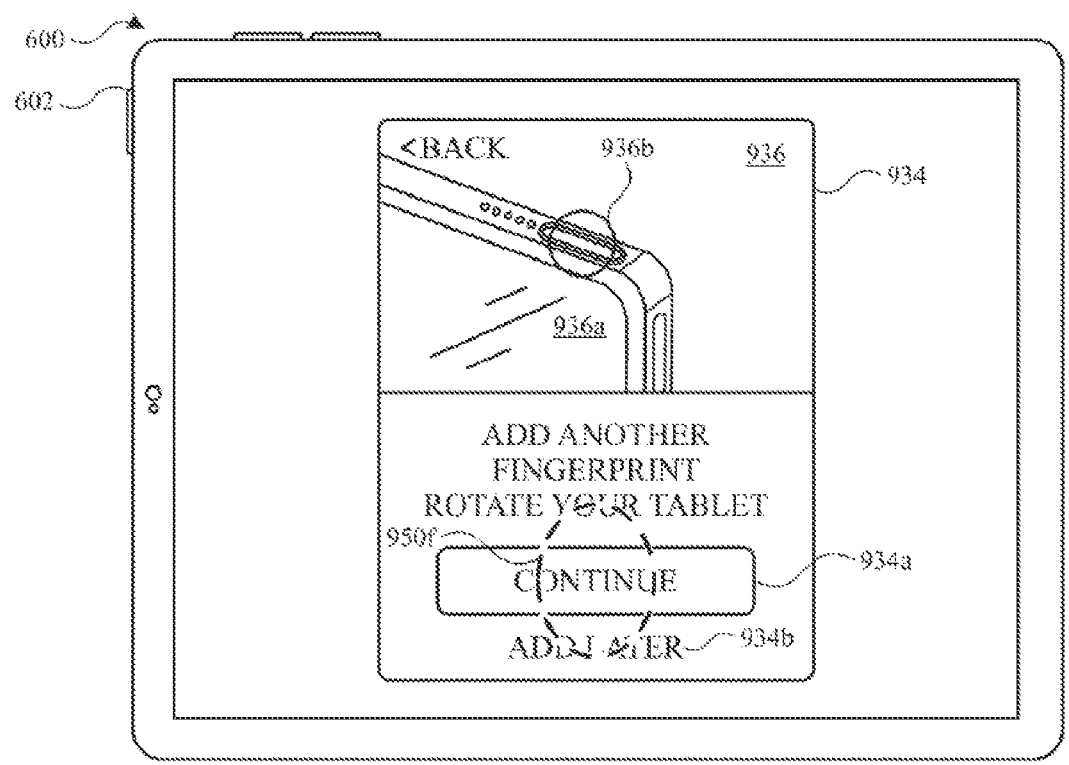

At FIGS. 9J-9K, in response to detecting tap gesture 950*e*, device 600 displays user interface 934, which includes video 936 showing representation 936*a* of device 600 rotating from the current orientation of device 600 to a different orientation and an option to enroll a second finger for fingerprint authentication. For example, because device 600 is in a landscape orientation, video 936 shows representation 936*a* rotating from the landscape orientation to a portrait orientation. For another example, if device 600 were in a portrait orientation, the video would optionally show representation 936*a* rotating from the portrait orientation to the landscape orientation. Thus, device 600 selects video 936 (e.g., from among a plurality of videos) for display based on the orientation of device 600 to encourage the user to rotate the orientation of device 600 from the current orientation to a different orientation.

In some embodiments, video 936 includes a highlight (e.g., circle, a colored filter) overlaid on the button of representation 936*a* to further provide the user with feedback on the location of the fingerprint sensor. In some embodiments, video 936 does not include the highlight overlaid on the button of representation 936*a* when the representation is in the starting (e.g., current) orientation of device 600 and does include highlight 936*b* overlaid on the button of representation 936*a* when the representation is in the new (e.g., different) orientation, as shown in the transition between FIGS. 9J and 9K.

User interface 934 further includes continue option 934*a* and add later option 934*b*. In response to detecting a tap gesture on add later option 934*b*, device 600 does not proceed with the fingerprint enrollment process for the second finger and, optionally, continues on with a remainder of the setup process. In response to detecting tap gesture 950*f* on continue option 934*a*, device 600 proceeds to a next step of the setup process to enroll a second finger, as shown in FIG. 9L. User interface 934 optionally does not include touch graphical element 640*a*, as device 600 is not requesting that the user provide a fingerprint input at the fingerprint sensor integrated into button 602.

At FIG. 9L, device 600 displays user interface 938 in the portrait orientation based on device 600 being in the portrait orientation. User interface 938 in the portrait orientation corresponds to user interface 926 in the landscape orientation. User interface 938 includes instruction 938*a* for the user to place their finger (e.g., a second finger) on the fingerprint sensor of button 602 to begin the process of enrolling the second finger. In addition, device 600 displays touch graphical element 640*a* (e.g., prior to detecting the user's finger on the fingerprint sensor) next to button 602 to provide a visual indication to the user that the user should place their finger on the fingerprint sensor of button 602 and to provide a visual indication of the location of button 602. Touch graphical element 640*a* is displayed in a different portion of user interface 926 (e.g., in the top left corner) as compared to user interface 938 (e.g., in the top right corner), based on the orientation of device 600. At FIG. 9L, device 600 detects a portion of the second fingerprint of the user based on the user directing the finger to the fingerprint sensor of button 602 via touch input 950g.

Figure 9M:
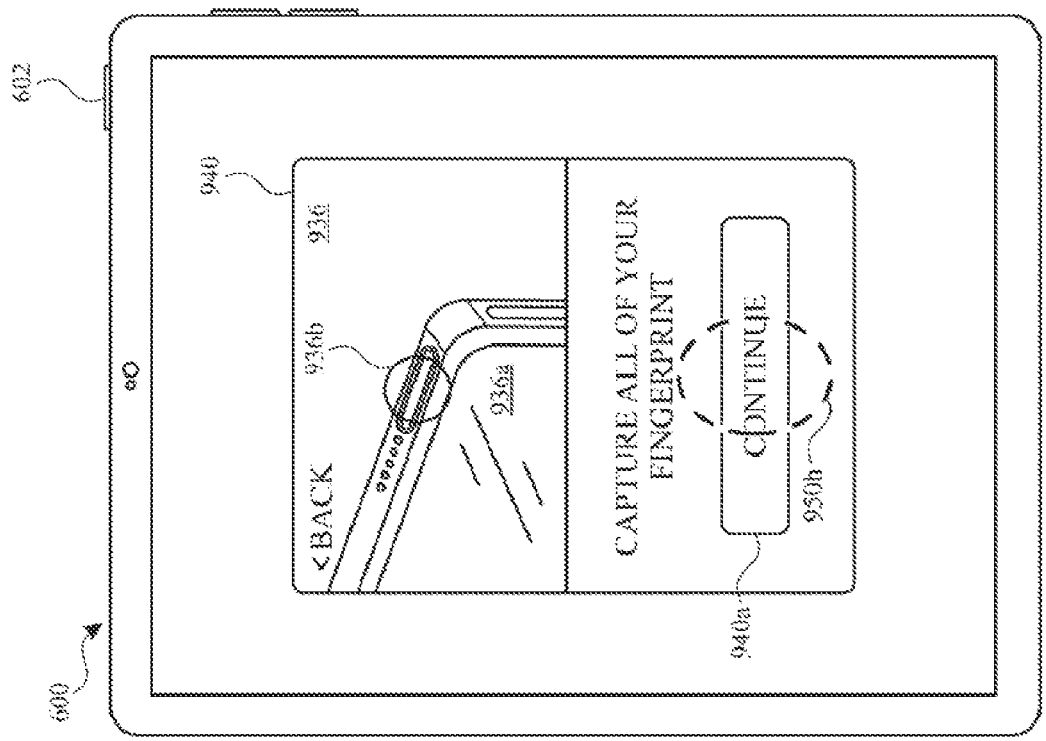
Figure 9L:
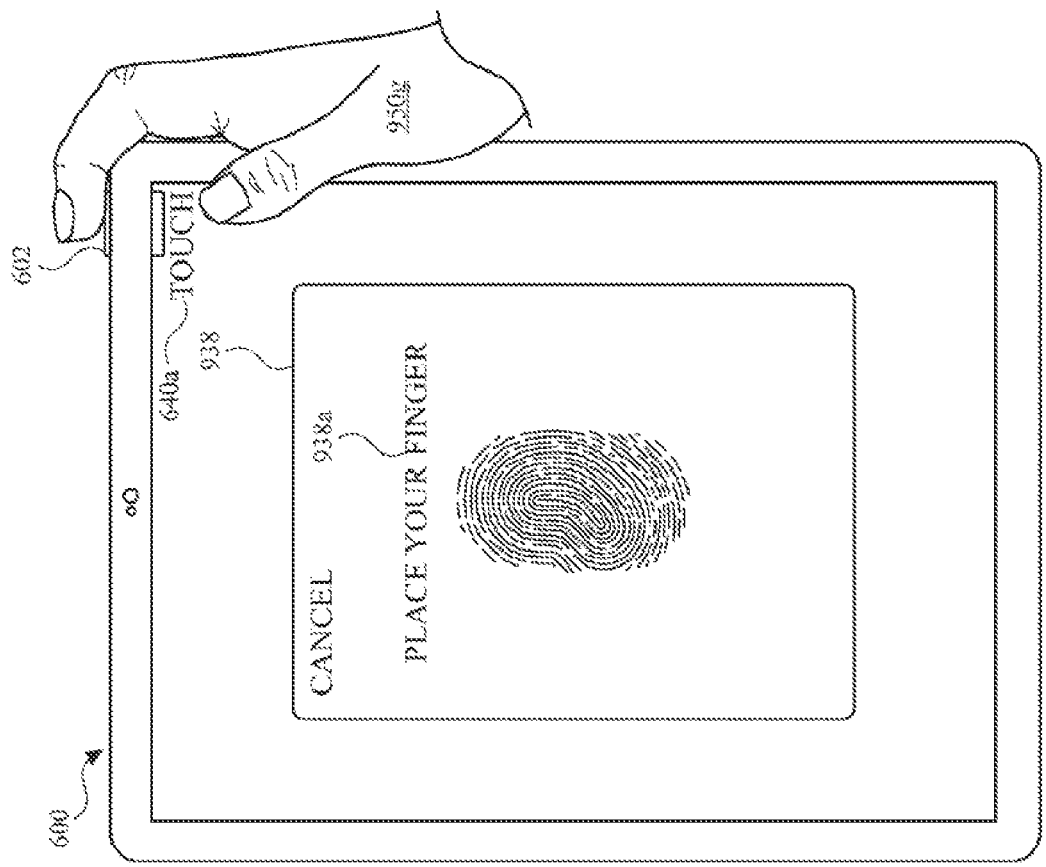
Figure 9O:
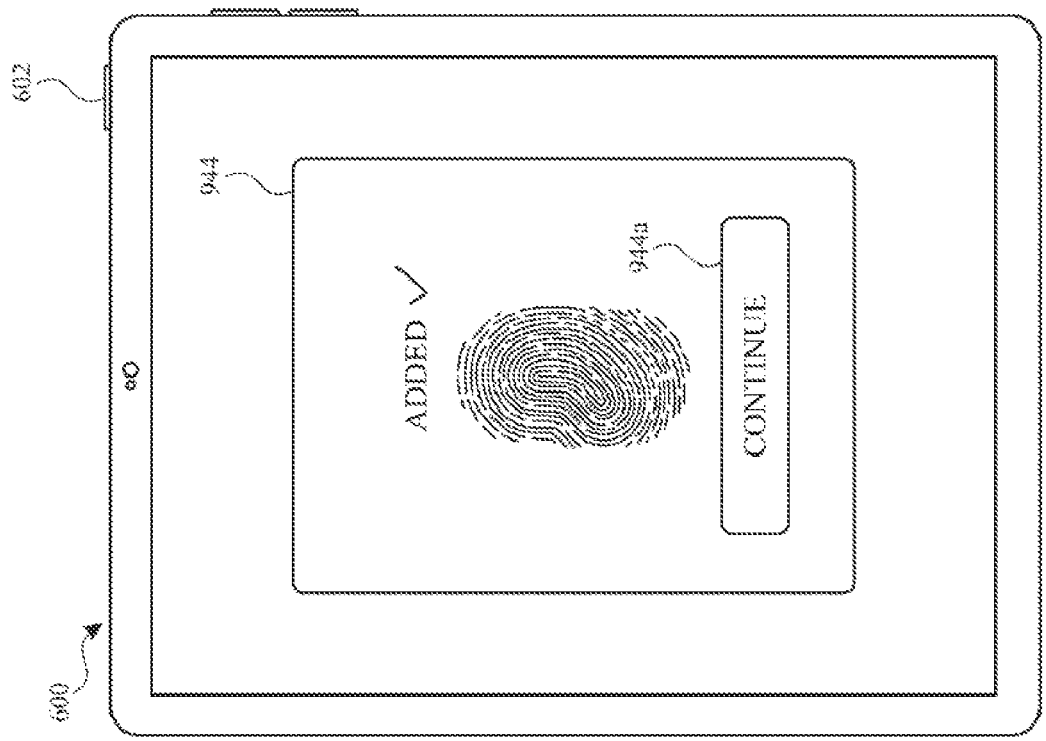

At FIG. 9M, in response to detecting the portion of the second fingerprint, device 600 displays touch authentication user interface 940, which includes video 936 (selected based on the orientation of device 600, as described above) and prompts the user to provide additional fingerprint information for the same finger. At FIG. 9M, device 600 detects tap gesture 950h on continue option 940a.

Figure 9N:
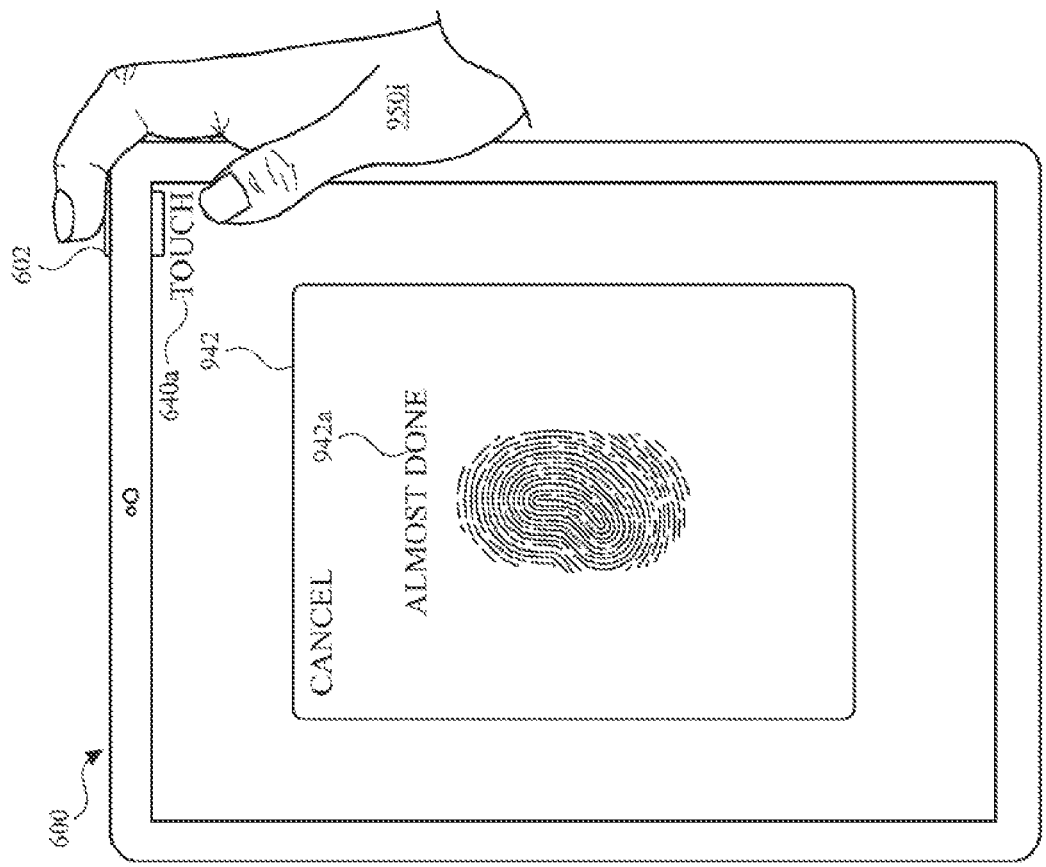

At FIG. 9N, in response to detecting tap gesture 950h, device 600 displays user interface 942, including instruction 942a for the user to place their finger (e.g., the second finger) on the fingerprint sensor of button 602. In addition, device 600 displays touch graphical element 640a (e.g., prior to detecting the user's finger) next to button 602 to provide a visual indication that the user should place their finger on the fingerprint sensor of button 602 and to provide a visual indication of the location of button 602. Touch graphical element 640a is displayed in a different portion of user interface 930 (e.g., in the top left corner) as compared to user interface 942 (e.g., in the top right corner), based on the orientation of device 600. At FIG. 9N, device 600 detects additional portions of the second fingerprint of the user based on the user directing the finger to the fingerprint sensor of button 602 via touch input(s) 950i (e.g., multiple consecutive touch inputs).

At FIG. 9O, in response to detecting the additional portions of the second fingerprint via touch input(s) 950i, device 600 displays user interface 944, which indicates that the second fingerprint of the finger has been enrolled (and, therefore, can be used to authenticate requests in the future). User interface 944 also includes continue option 944a which, when activated, causes device 600 to continue to the next portion of the setup process.

FIG. 9P illustrates device 600 in four different orientations as device 600a, 600b, 600c, and 600d. Devices 600a and 600b are both in the landscape orientation, though they are oriented different from each other. Button 602 of device 600a is on the left side of the device, while button 602 of device 600b is on the right side of the device. Although device 600a and 600b are in different orientations, the same video 924 is displayed as part of their user interfaces during the setup process (e.g., as part of the user interfaces of 9B and 9D). Similarly, devices 600c and 600d are both in the portrait orientation, though they are oriented different from each other. Button 602 of device 600c is on the top side of the device, while button 602 of device 600d is on the bottom side of the device. Although device 600c and 600d are in different orientations, the same video 926 is displayed as part of their user interfaces during the setup process (e.g., as part of the user interfaces of 9B and 9D).

At FIG. 9Q, device 600 has completed the setup process and multiple fingers of the user are enrolled to authorize operations and, therefore, can be used to authorize operations (e.g., unlock device 600, download/install applications, and/or make payments). At FIG. 9Q, while the display of device 600 is off, device 600 detects tap input 950j on the touch screen (e.g., via a touch-sensitive surface of device 600) of device 600.

Figure 9R:
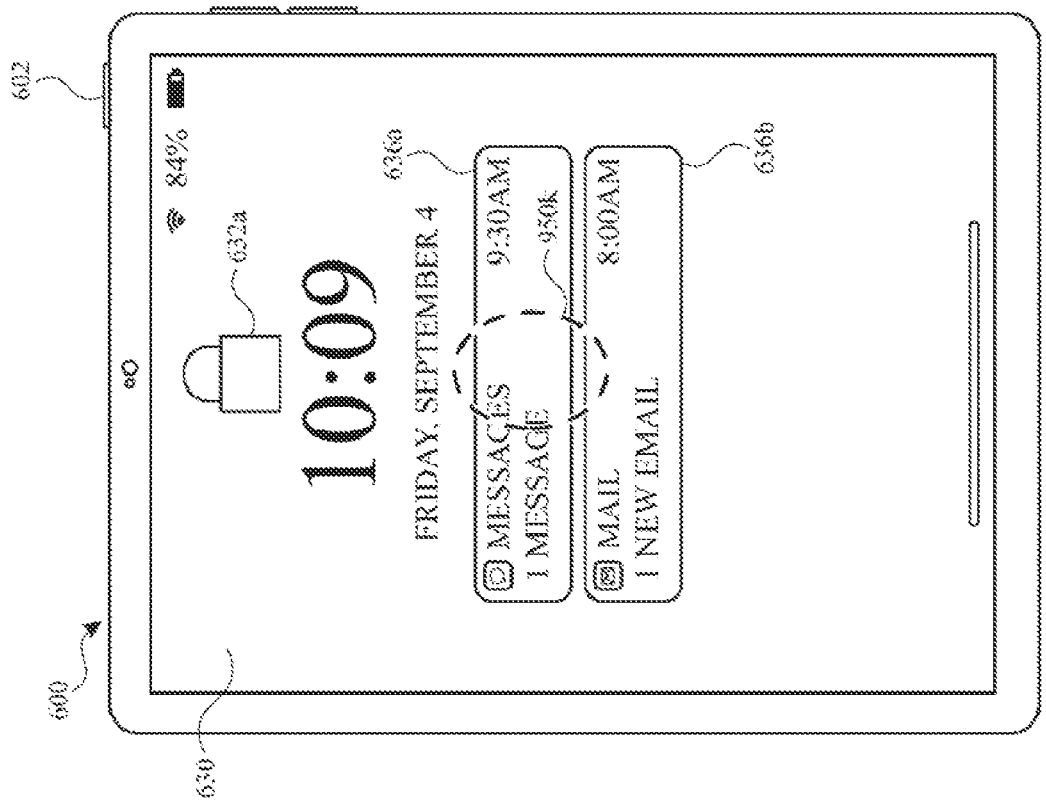

At FIG. 9R, in response to detecting tap input 950j, the display of device 600 turns on and wake screen 630 is displayed with device 600 locked, as indicated by lock icon 632a. Wake screen 630 includes multiple unread notifications 636a, 636b. In some embodiments, wake screen 630 of FIG. 9R includes touch graphical element 640a next to button 602 to indicate that the device is locked and/or to indicate a location of button 602.

At FIG. 9R, device 600 detects input gesture 950k (e.g., a tap gesture, a swipe gesture) on notification 636a while device 600 is locked, where input gesture 950k is a request to display the application corresponding to notification 636a. Because device 600 is locked, authorization is required to access/display the application corresponding to notification 636a.

Figure 9S:
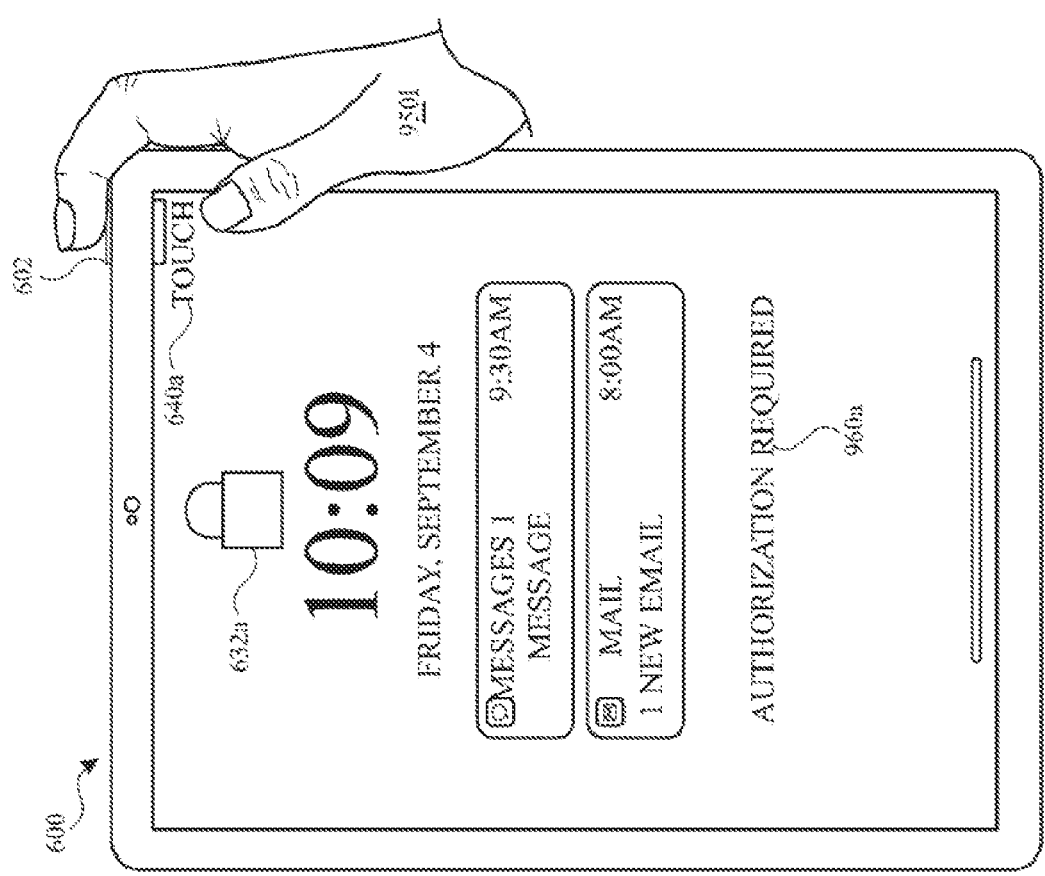

At FIG. 9S, in response to detecting input gesture 950k and because authorization is required, device 600 in the portrait orientation displays touch graphical element 640a next to button 602 (e.g., in the top right corner of wake screen 630) to indicate the location of the fingerprint sensor and that an enrolled fingerprint can be used to authorize the requested operation. Device 600 also optionally displays additional indication 960a that authorization is required. The location of touch graphical element 640a in wake screen 630 of FIG. 9S is based on the orientation of device 600.

In comparison with FIG. 9S, device 600 of FIG. 9T is in a landscape orientation when gesture 950k is detected and, in response, device 600 displays touch graphical element 640a in a different part of wake screen 630 (e.g., next to button 602, in the top left corner of wake screen 630). The location of touch graphical element 640a in wake screen 630 of FIG. 9T is based on the orientation of device 600.

Figure 9V:
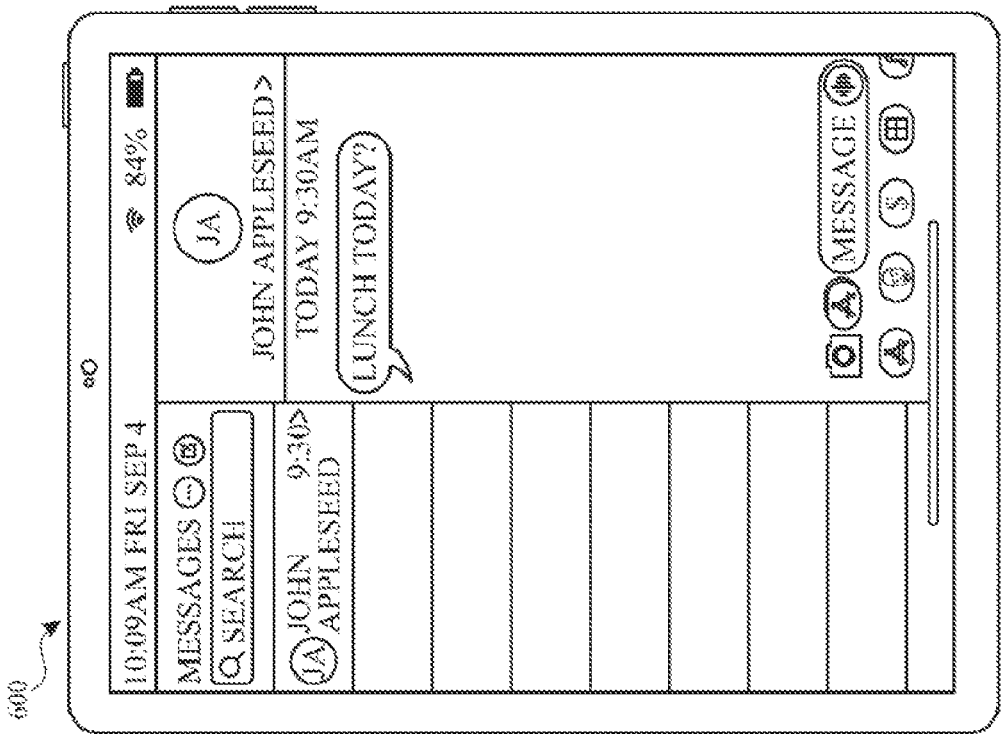

Turning back to FIG. 9T, while the request to display the application corresponding to notification 636a is pending, device 600 detects a fingerprint that corresponds to an authorized fingerprint on the fingerprint sensor of button 602 via touch input 950k and, in response, displays the application (e.g., the messages application) corresponding to the notification, as shown in FIG. 9V.

Figure 9U:
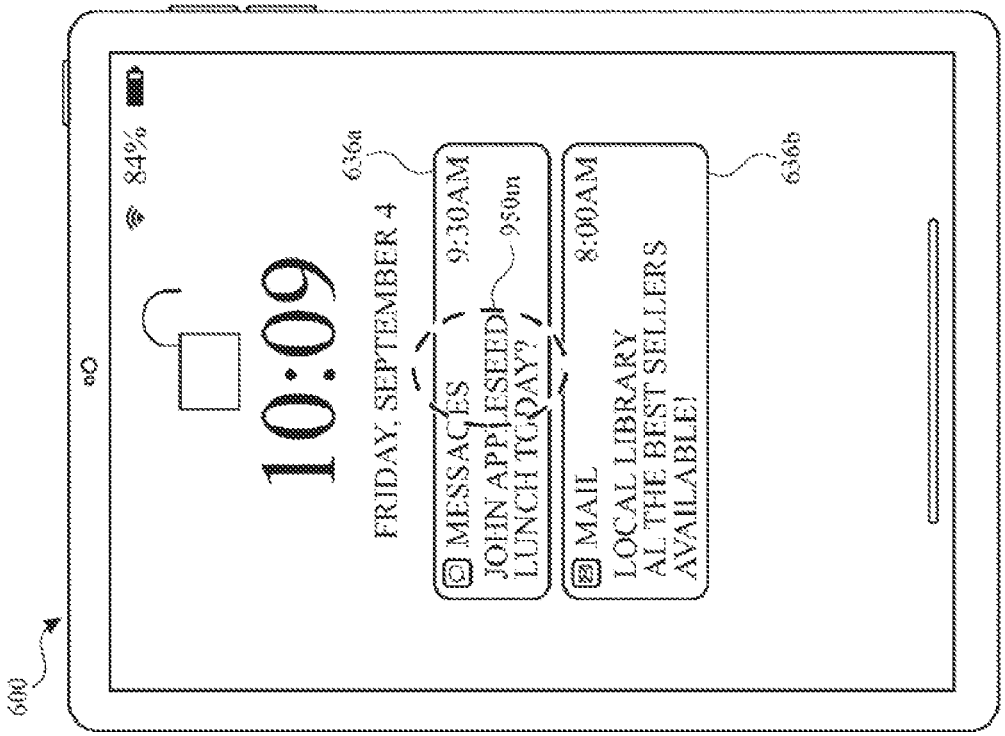
Figure 9W:
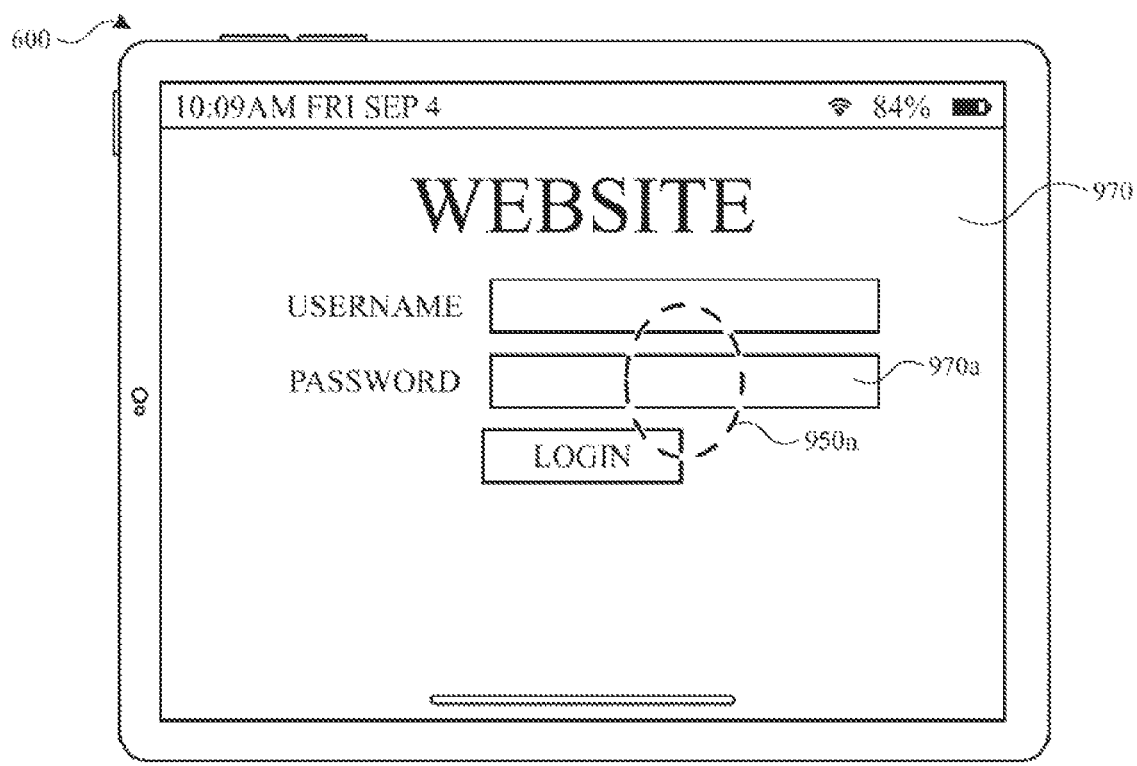
Figure 9X:
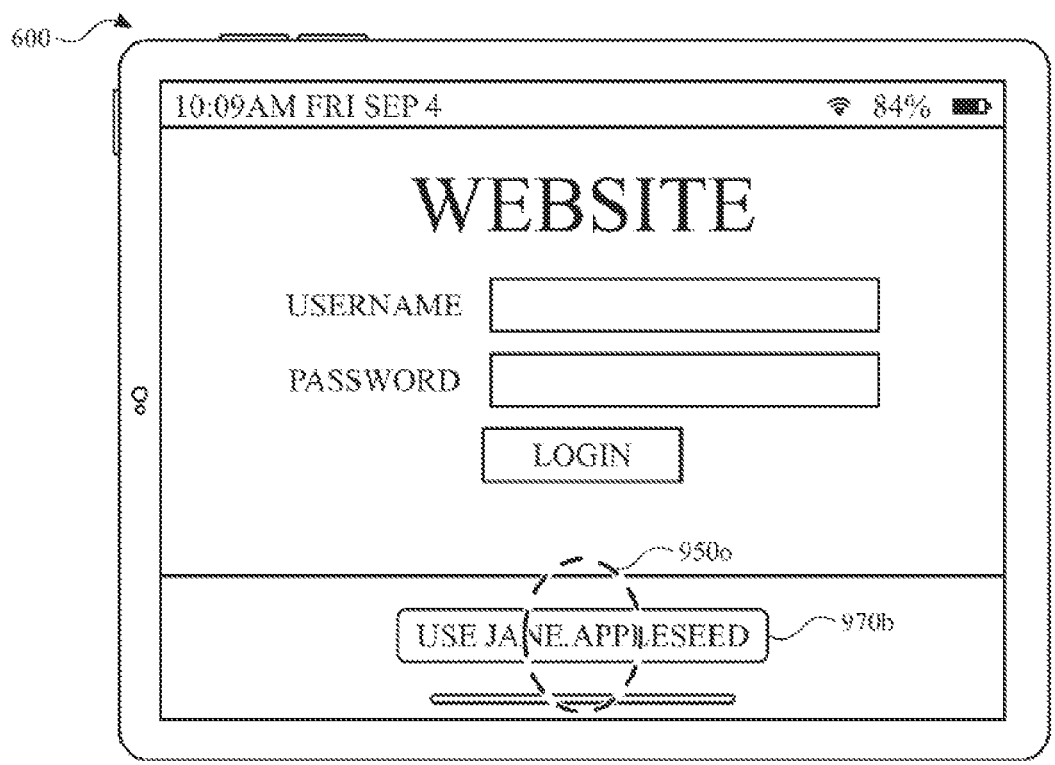

FIG. 9U illustrates an example where device 600 is unlocked when the request to display the application corresponding to notification 636a. At FIG. 9U, device 600 is displaying wake screen 630 and device 600 is unlocked (e.g., using the technique described above with respect to FIGS. 6A-6AY), as indicated by unlock icon 632b. While device 600 is unlocked, device 600 detects input gesture 950m (e.g., a tap gesture, a swipe gesture) on notification 636a, where input gesture 950m is a request to display the application corresponding to notification 636a. Because device 600 is unlocked, authorization has already been provided and authorization is therefore not required to access/display the application corresponding to notification 636a. Because authorization is not required, device 600 displays the application (e.g., the messages application) corresponding to the notification, as shown in FIG. 9V, without displaying touch graphical element 640a.

FIGS. 9W-9Z illustrate an exemplary process for performing a password autofill operation. At FIG. 9W, device 600 detects tap 950n on password field 970a of user interface 970. In response, device 600 displays option 970b to autofill the password and detects input 950o requesting to autofill the password. Although device 600 is unlocked, the password autofill operation requires authorization. In response to input 950o, device 600 displays authorization request 970c and displays touch graphical element 640a next to button 602, based on the orientation of device 600, as shown for landscape orientation and portrait orientation in FIG. 9Y.

Figure 9Z:
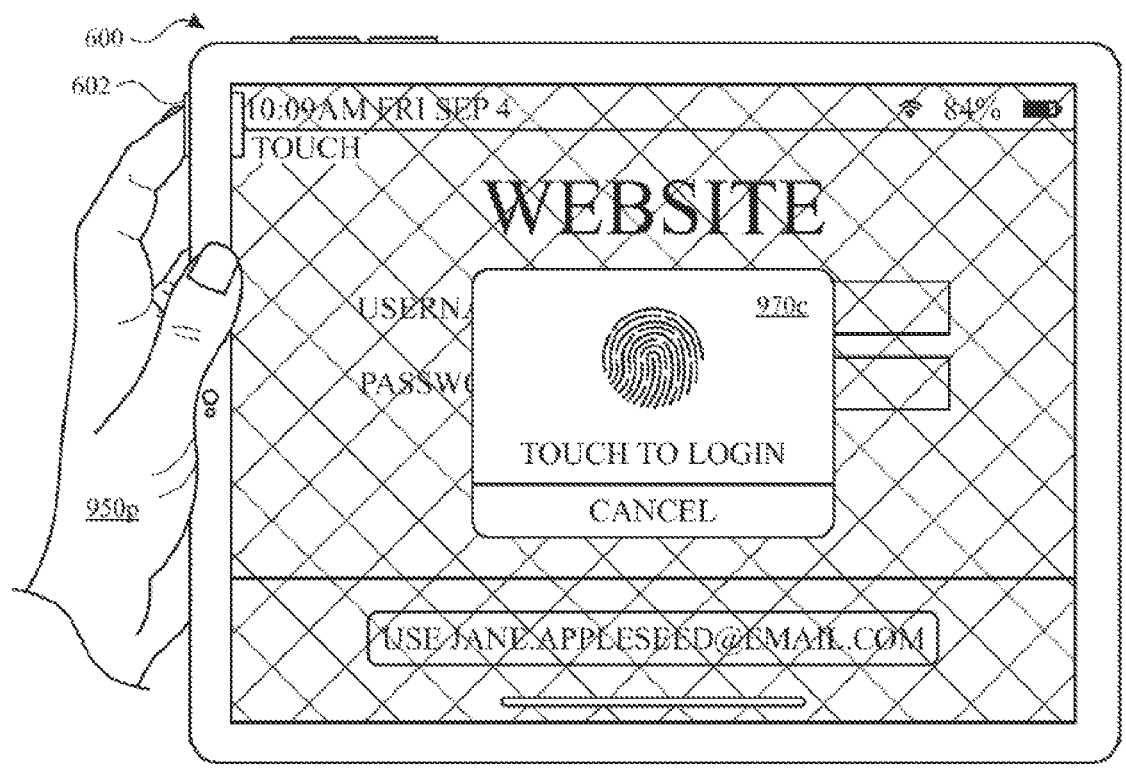
Figure 9A:
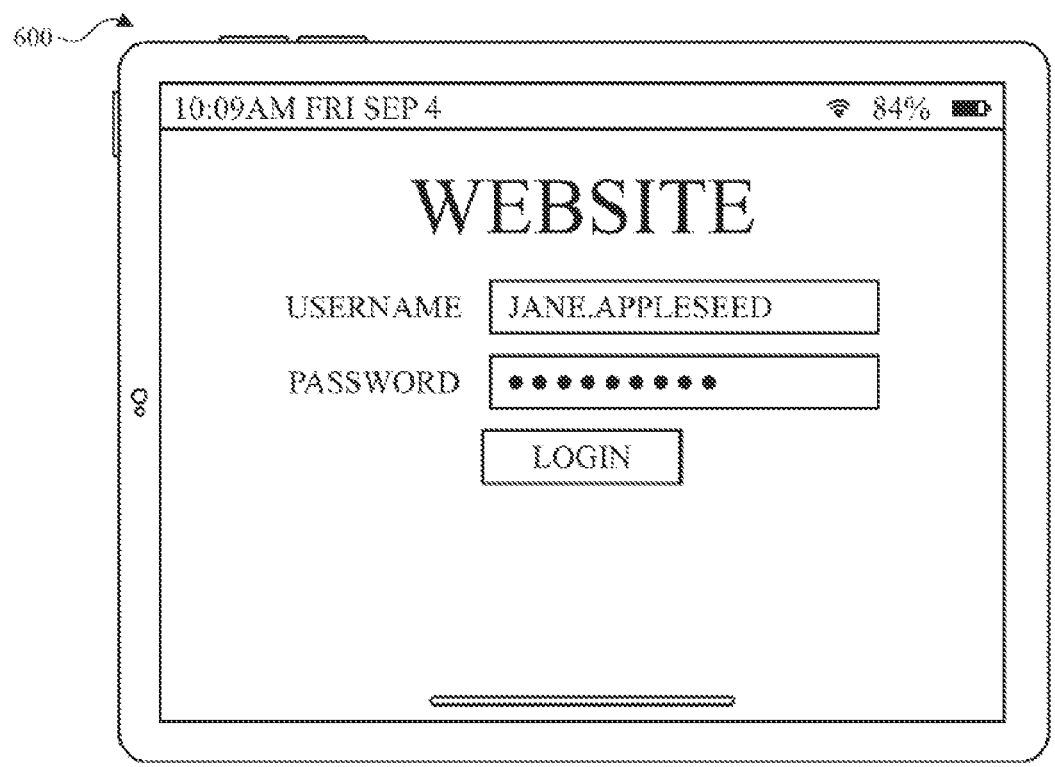
Figure 9A:
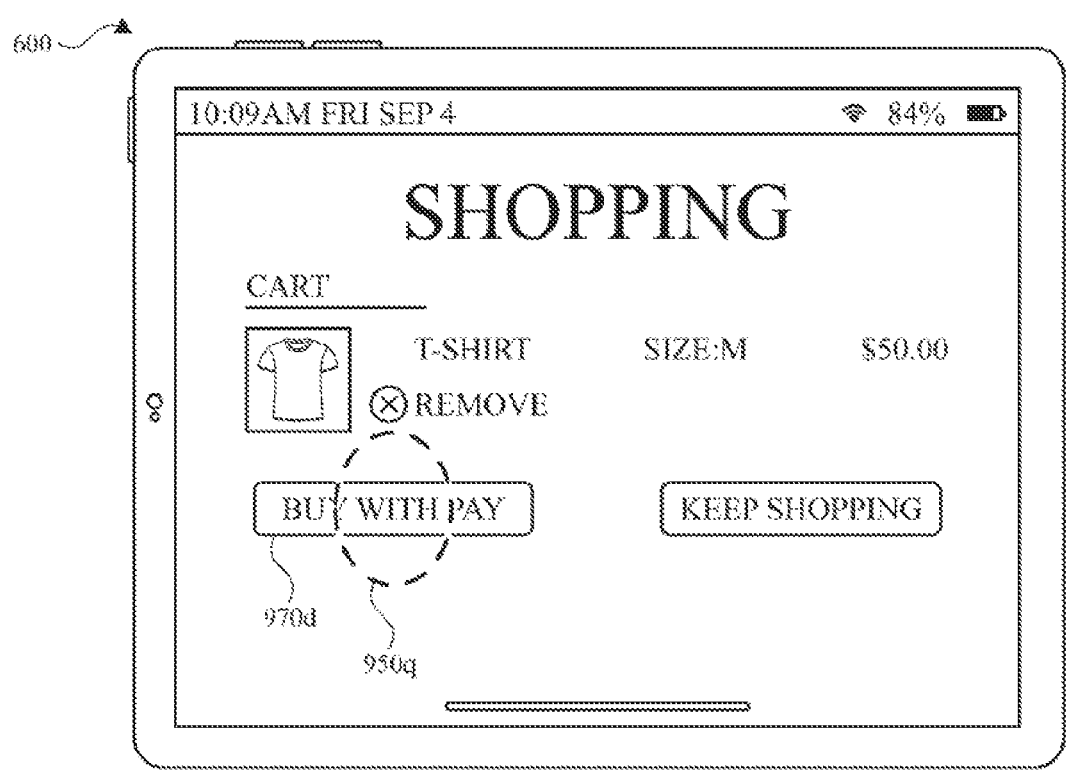
Figure 9A:
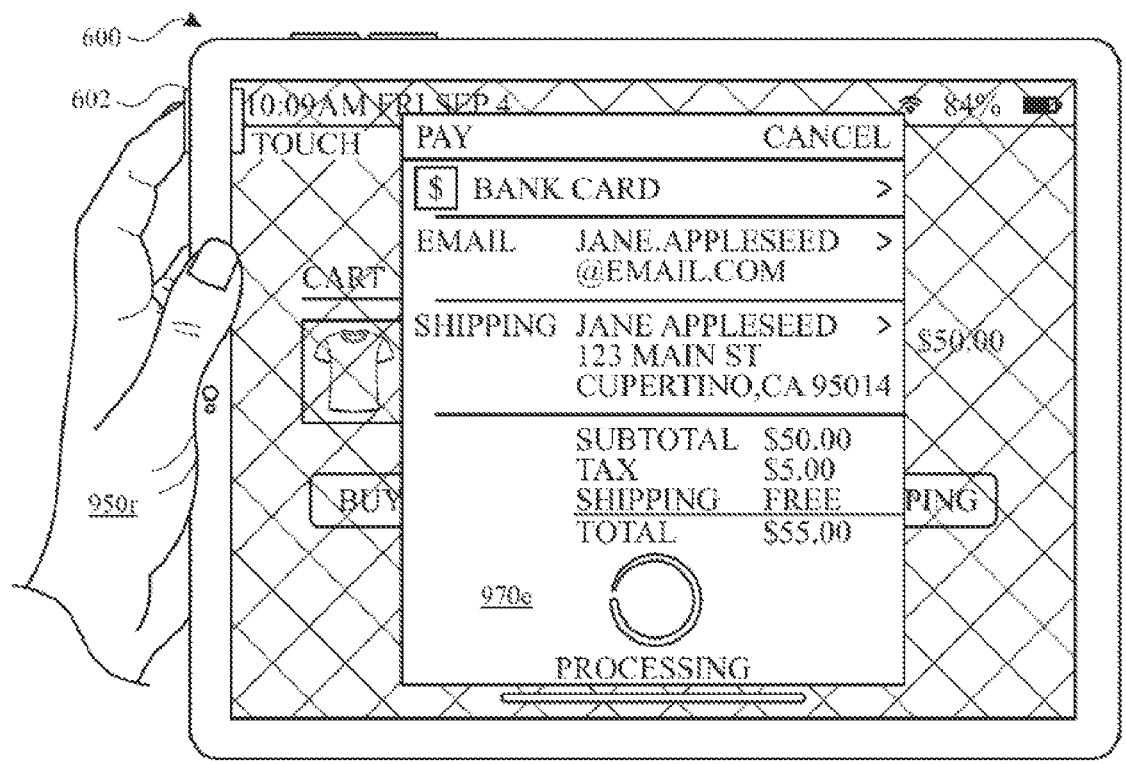
Figure 9A:
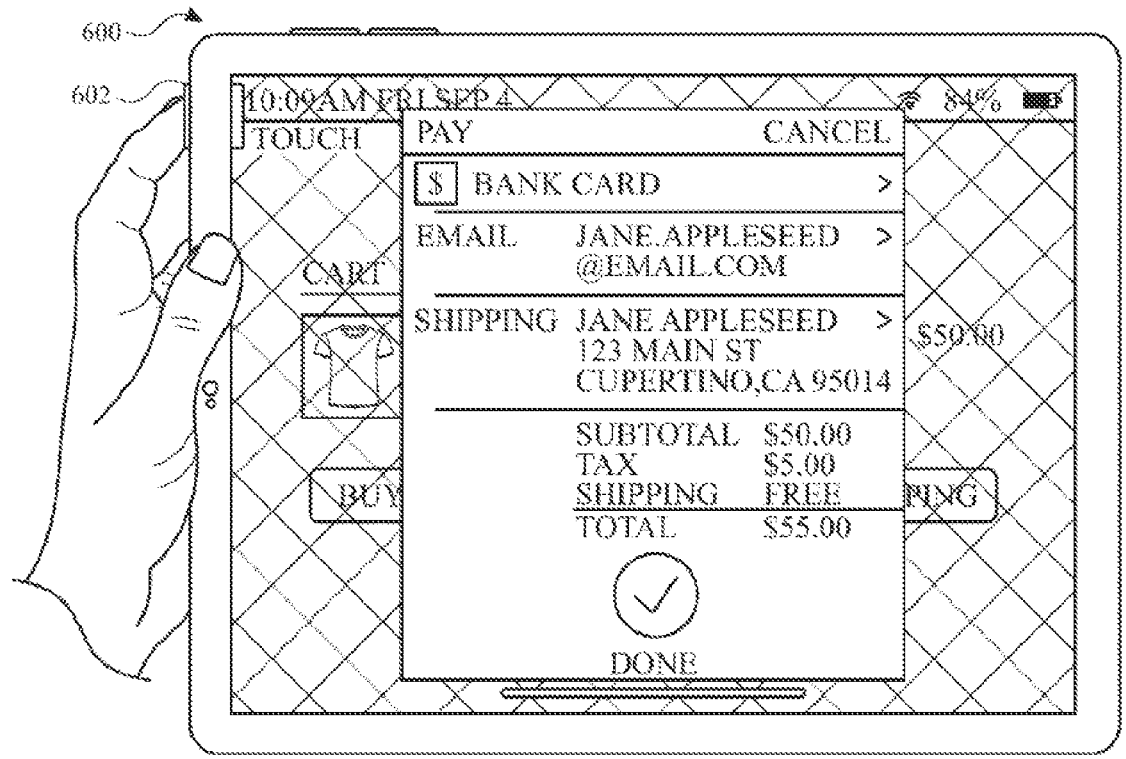
Figure 9A:
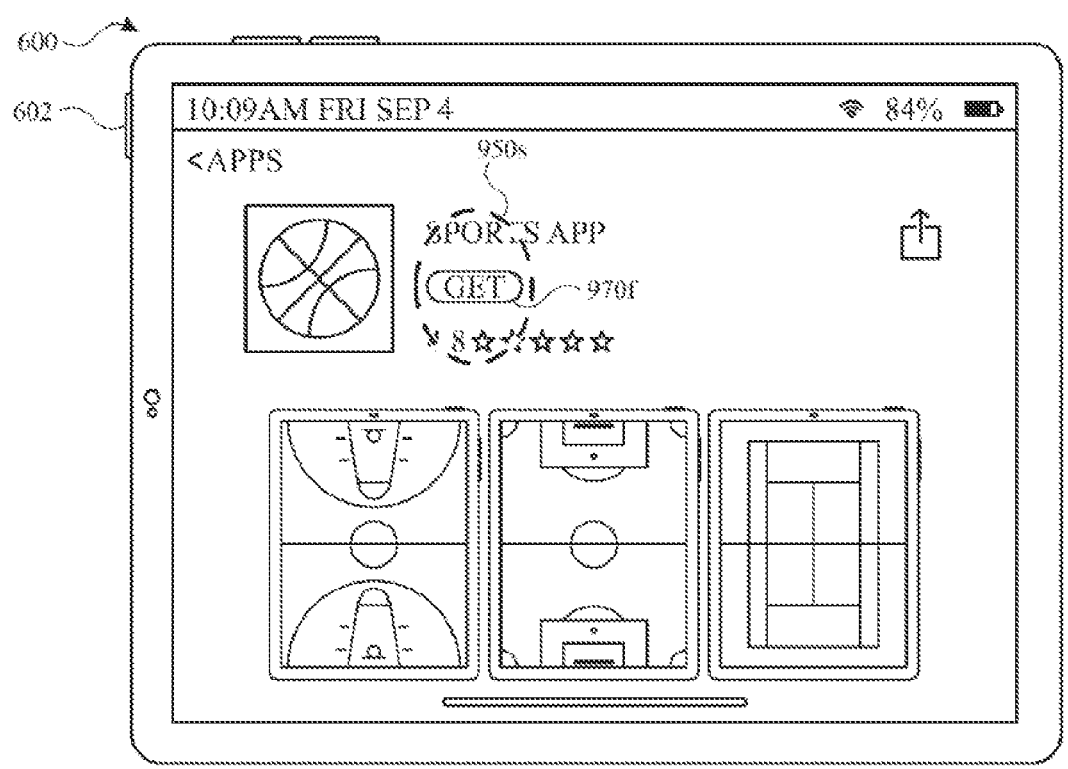
Figure 9A:
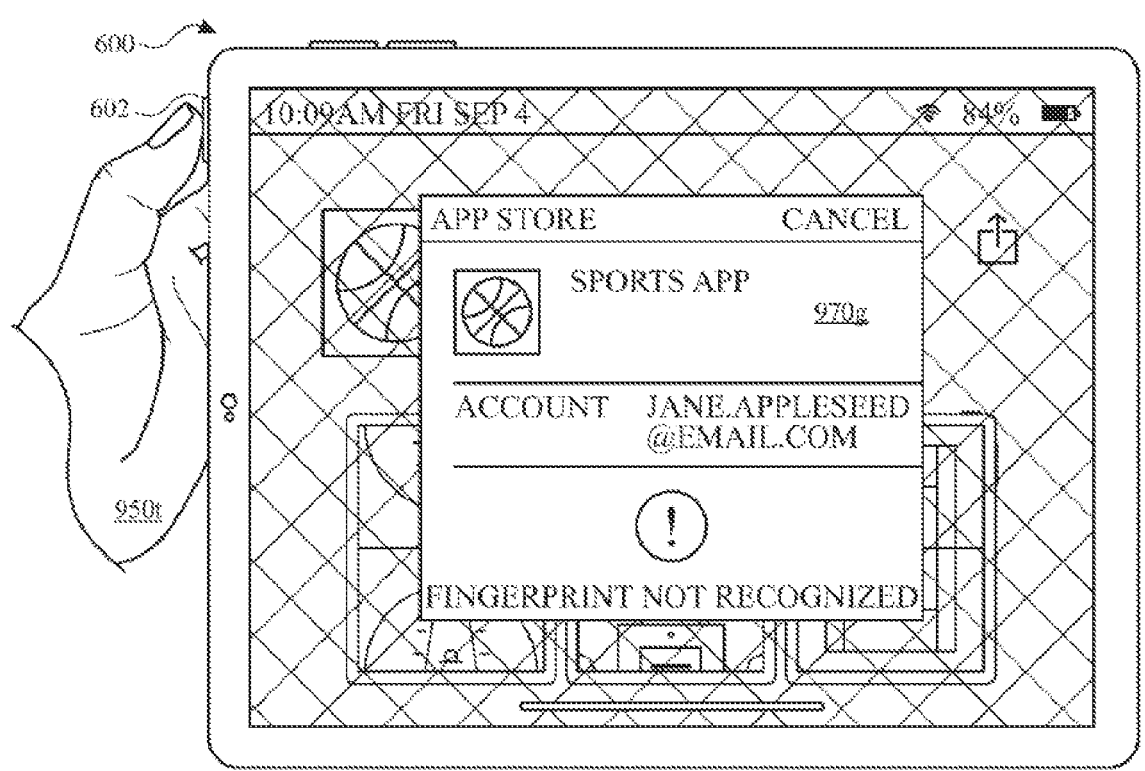

FIGS. 9Z-9AA illustrates device 600 receiving authorization via an enrolled fingerprint of touch input 950p on button 602 and, in response, the password autofill operation being performed.

FIGS. 9AB-9AE illustrate an exemplary process for performing a payment operation. At FIG. 9AB, device 600 detects tap 950q on buy option 970d. Although device 600 is unlocked, the payment operation requires authorization. In response to input 950q, device 600 displays authorization request 970e and displays touch graphical element 640a next to button 602, based on the orientation of device 600, as shown for landscape orientation and portrait orientation in FIG. 9AC.

FIGS. 9AD-9AE illustrates device 600 receiving authorization via an enrolled fingerprint of touch input 950r on button 602 and, in response, the payment operation being performed.

FIGS. 9AF-9AH illustrate an exemplary process for downloading an application. At FIG. 9AF, device 600 detects tap 950s on get option 970f. Although device 600 is unlocked, the download operation requires authorization. In response to input 950s, device 600 displays authorization request 970g and displays touch graphical element 640a next to button 602, based on the orientation of device 600, as shown for landscape orientation and portrait orientation in FIG. 9AG.

FIG. 9AH illustrates device 600 receiving input via a fingerprint that does not corresponds to an authorized fingerprint via touch input 950t on button 602 and, in response, the download operation is not performed.

FIG. 10 is a flow diagram illustrating a method for displaying a user interface for enrolling a biometric feature using a computer system (e.g., 100, 300, 500, 600) in accordance with some embodiments. Method 1000 is performed at a computer system (e.g., 100, 300, 500, 600) with a biometric sensor (e.g., a fingerprint sensor such as fingerprint sensor combined with, integrated into, or embedded in a physical button or a solid-state button, a face identification sensor, or an iris identification sensor). The computer system (e.g., 600) is in communication with a display generation component (e.g., 610). Some operations in method 1000 are, optionally, combined, the orders of some operations are, optionally, changed, and some operations are, optionally, omitted.

As described below, method 1000 provides an intuitive way for enrolling a biometric feature. The method reduces the cognitive burden on a user, thereby creating a more efficient human-machine interface. For battery-operated computing devices, disambiguating an input on a touch sensor integrated into a button may allow for faster and more efficient use of an electronic device, and conserves power and increases the time between battery charges.

The computer system (e.g., 600) displays (1002), via the display generation component (e.g., 610), a user interface for enrolling a biometric feature (e.g., enrolling a fingerprint, enrolling a face, or enrolling an iris).

While displaying (1004) the user interface for enrolling the biometric feature, the computer system (e.g., 600) receives (1006) one or more enrollment inputs (e.g., 950c, 950d) via the biometric sensor (e.g., 602).

In response (1008) to receiving the one or more enrollment inputs, the computer system (e.g., 600) enrolls (1010) (e.g., completing enrollment of) a first biometric feature (e.g., a first finger, or a first iris).

After (e.g., in response to) successfully enrolling (1012) the first biometric feature, the computer system (e.g., 600) prompts (1014) (e.g., as in FIG. 9J) a user to enroll a second biometric feature (e.g., a second finger different from the first finger, or a second iris different from the first iris) that is different from the first biometric feature.

Prompting the user to enroll a second biometric feature after successfully enrolling a first biometric feature provides the user with feedback that an additional biometric feature can be enrolled. Enrolling multiple biometric features is particularly helpful for computer systems that can be used in a variety of different orientations (e.g., landscape orientation, or portrait orientation) such that, after the enrollment process, the computer system can receive biometric information (e.g., to authenticate the user) from any one of the multiple enrolled biometric features that is more accessible or convenient (e.g., located nearby the biometric sensor, and/or located within a sensing area of the biometric sensor) when the system is in a particular orientation. Providing improved feedback to the user and enabling the device to authenticate using various biometric features enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the fingerprint sensor uses capacitive touch to take one or more high-resolution images of the fingerprint (e.g., from the subepidermal layers of the skin). The computer system creates and securely stores (e.g., in a secure enclave) fingerprint information, which includes a mathematical representation of the fingerprint (e.g., representing the directions and widths of ridges extracted from a portion of the fingerprint) and does not include images of the finger itself, as part of enrolling the finger. For a subsequent authentication, the fingerprint sensor again uses capacitive touch to take one or more high-resolution images of the fingerprint bring provided. The computer system creates a mathematical representation of the fingerprint and compares this to the enrolled fingerprint information to determine whether there is a match. The fingerprint is authenticated when there is a match, and the operation that required authentication (e.g., unlock of the computer system, and/or transmitting a payment) is performed when there is a match. In some embodiments, the computer system never stores images of the finger or fingerprint itself. The computer system optionally incrementally updates the mathematical representation of enrolled fingerprints over time to improve matching accuracy.

In some embodiments, for use of a face identification sensor for authentication, the computer system projects and analyzes invisible dots (e.g., 30,000 invisible dots) in the field of view of the sensor to create a depth map of a face. The computer system and captures an infrared image of the face. The computer system creates and securely stores (e.g., in a secure enclave) face information, which includes a mathematical representation of the face, as part of enrolling the finger. For a subsequent authentication via the face identification sensor, the computer system again projects and analyzes invisible dots (e.g., 30,000 invisible dots) in the field of view of the sensor to create a depth map of a face in the field of view of the sensor. The computer system creates a mathematical representation of the face and compares this to the enrolled face information to determine whether there is a match. The face is authenticated when there is a match, and the operation that required authentication (e.g., unlock of the computer system, and/or transmitting a payment) is performed when there is a match. In some embodiments, the computer system never stores images of the face itself. The computer system optionally incrementally updates the mathematical representation of enrolled faces over time to improve matching accuracy.

In some embodiments, the electronic device receives biometric input and determines whether the received biometric input matches the enrolled first biometric feature, independent of the (e.g., enrolled) second biometric feature. In accordance with a determination that the received biometric input matches the enrolled first biometric feature, the received biometric input is authenticated (e.g., thereby unlocking the computer system, and/or providing access to secured information). In accordance with a determination that the received biometric input does not match the enrolled first biometric feature, the received biometric input is not authenticated (e.g., thereby not unlocking the computer system, and/or not providing access to secured information). Thus, in some embodiments, each of the enrolled biometric features can be used independent of the other enrolled biometric features to authenticate a user's biometric input as authenticated.

In some embodiments, prompting a user to enroll a second biometric feature (e.g., a second finger different from the first finger, or a second iris different from the first iris) that is different from the first biometric feature includes concurrently displaying with the prompt (e.g., 936, 934a) to enroll a second biometric feature, via the display generation component, an option (e.g., 934b) to not enroll a second biometric feature. In some embodiments, while concurrently displaying the prompt to enroll the second biometric feature and the option not to enroll a second biometric feature, the computer system (e.g., 600) receives user input selecting the option to not enroll a second biometric feature. In response to receiving user input selecting the option to not enroll a second biometric feature, the computer system (e.g., 600) ceases to display the prompt to enroll a second biometric feature.

Displaying an option to not enroll a second biometric feature provides the user with feedback that enrollment of the additional biometric feature is not required to proceed using the device using the first biometric feature that is enrolled. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the prompt to enroll a second biometric feature is displayed, via the display generation component. Two selectable options are concurrently displayed: (a) an option to proceed with enrolling the second biometric feature and (b) an option to not enroll the second biometric feature.

In some embodiments, displaying the user interface for enrolling a biometric feature and receiving one or more enrollment inputs via the biometric sensor are part of a setup procedure (e.g., as shown in FIGS. 9A-9D) (e.g., to personal the settings of the computer system for the user) for configuring the computer system (e.g., 600) for use (e.g., for initial use).

Displaying the user interface for enrolling a biometric feature and receiving corresponding enrollment inputs during a setup procedure of the computer system enables the computer system to configure biometric authentication prior to the user storing sensitive information on the system, thereby increasing the security of the system. Encouraging the user to enroll multiple biometric features during the setup of the computer system is particularly helpful for computer systems that can be used in a variety of different orientations (e.g., landscape orientation, or portrait orientation) such that, after the enrollment process, the computer system can receive biometric information (e.g., to authenticate the user) from any one of the multiple enrolled biometric features that is most accessible or convenient (e.g., located nearby the biometric sensor, and/or located within a sensing area of the biometric sensor) when the system is in a particular orientation.

In some embodiments, the computer system can transition between locked and unlocked states. An enrolled biometric feature can be used to transition the computer system from the locked state to the unlocked state.

In some embodiments, subsequent to enrolling the first biometric feature and prior to enrolling the second biometric feature, the computer system (e.g., 600) prompts (e.g., as in FIG. 9J) (e.g., displaying, via the display generation component, and/or concurrently with the prompt to enroll the second biometric feature) the user to rotate the computer system (e.g., 600) from a first orientation to a second orientation that is different from the first orientation (e.g., to rotate the computer system from a portrait orientation to a landscape orientation, to rotate the computer system from a landscape orientation to a portrait orientation, and/or to rotate the computer system by approximately 90 degrees or 90 degrees).

Prompting the user to rotate the computer system between enrollments of different biometric features provides the user with feedback that the computer system can be used in different orientations and enables the computer system to collect the different biometric information with the system in various orientations. For example, collecting biometric information with the computer system in various orientations better enables the system to authenticate input when the input is provided with the system at those various orientations, thereby increasing the security and ease of usability of the system. Encouraging the user to enroll multiple biometric features in different orientations is particularly helpful for computer systems that can be used in a variety of different orientations (e.g., landscape orientation, or portrait orientation) such that the computer system can receive biometric information (e.g., to authenticate the user) from any one of the multiple enrolled biometric features that is most accessible or convenient (e.g., located nearby the biometric sensor, and/or located within a sensing area of the biometric sensor) when the system is in a particular orientation.

In some embodiments, prompting the user to rotate the computer system (e.g., 600) includes displaying a moving representation (e.g., 936) (e.g., a video or representative animation) of the computer system (e.g., 600) rotating from the first orientation (e.g., a portrait orientation) to the second orientation (e.g., a landscape orientation) that is different from the first orientation.

Prompting the user by displaying moving representation of the computer system rotating provides the user with visual feedback on the orientation options of the computer system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface for enrolling the biometric feature includes a visual indication (e.g., 924b, 926b, 640a) of a location (e.g., a location on a housing 612 of the computer system) of the biometric sensor of the computer system (e.g., 600). In some embodiments, the visual indication of the location of the biometric sensor is displayed as part of an image and/or video of a representation of the computer system with a button. In some embodiments, the visual indication (or a second visual indication of the location of the biometric sensor) is displayed, via the display generation component, adjacent to the biometric sensor. In some embodiments, a location of the visual indication (and/or the second visual indication) of the location of the biometric sensor is based on the orientation of the computer system.

Displaying a visual indication of the location of the biometric sensor provides the user with visual feedback about where the biometric sensor is located, which is particularly relevant when the system can be operated in numerous orientations, which would otherwise make it difficult for the user to quickly assess the location of the biometric sensor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, via the display generation component, the user interface for enrolling the biometric feature with the visual indication of the location of the biometric sensor, the computer system (e.g., 600) detects a change in the orientation of the computer system (e.g., 600). In response to detecting the change in the orientation of the computer system (e.g., 600), the computer system (e.g., 600) changes (e.g., as shown in FIG. 9P) the visual indication of the location of the biometric sensor (e.g., changing a position and/or orientation of the indication).

Changing the visual indication of the location of the biometric sensor when the orientation of the system changes provides the user with visual feedback about where the biometric sensor is located with respect to the new orientation, which is particularly relevant when the system can be operated in numerous orientations, and which would otherwise make it difficult for the user to quickly assess the location of the biometric sensor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, changing the visual indication of the location of the biometric sensor includes displaying a second image and/or second video of a representation of the computer system with a button. In some embodiments, the orientation of the representation of the computer system in the second image and/or second video corresponds to the new orientation of the computer system. In some embodiments, the visual indication of the location of the biometric sensor includes two components, a textual component and a non-textual component. In some embodiments, changing the visual indication of the location of the biometric sensor includes rotating the textual component without rotating the non-textual component.

In some embodiments, the user interface for enrolling the biometric feature includes a visual indication (e.g., 924a, 926a) of an orientation of the computer system (e.g., 600).

In some embodiments, the visual indication of the orientation of the computer system is displayed as part of an image and/or video of a representation of the computer system with a button. In some embodiments, the orientation of the representation of the computer system in the image and/or video corresponds to the orientation of the computer system.

Displaying a visual indication of the orientation of the computer system provides the user with visual feedback about how the system is detecting the current orientation, which is particularly relevant when the system can be operated in numerous orientations. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, via the display generation component, the user interface for enrolling the biometric feature with the visual indication of the orientation of the computer system (e.g., 600), the computer system (e.g., 600) detects a change in the orientation (e.g., as among the orientations in FIG. 9P) of the computer system (e.g., 600). In response to detecting the change in the orientation of the computer system (e.g., 600), the computer system (e.g., 600) changes the visual indication (e.g., 924, 926) of the orientation of the computer system (e.g., 600).

Changing the visual indication of the orientation of the computer system when the orientation of the computer system changes provides the user with visual feedback about how the system has detected the change in orientation, which is particularly relevant when the system can be operated in numerous orientations. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, changing the visual indication of the orientation of the computer system includes displaying a second image and/or second video of a device with a button. In some embodiments, the orientation of the device in the second image and/or second video corresponds to the new orientation of the computer system. In some embodiments, the computer system switches among four orientations (e.g., first portrait, second portrait, first landscape, and second landscape) and a first visual indication of the orientation of the computer system is used for two orientations (e.g., first portrait, and second portrait) of the four orientations and a second visual indication of the orientation of the computer system is used for two orientations (e.g., first landscape, and second landscape) of the four orientations.

Note that details of the processes described above with respect to method 1000 (e.g., FIG. 10) are also applicable in an analogous manner to the methods described below/above. For example, methods 700, 800, 1100, and 1200 optionally include one or more of the characteristics of the various methods described above with reference to method 1000. For example, the computer systems are the same and the touch sensor, the biometric sensor, and the fingerprint sensor are optionally the same component and are optionally integrated into the button. For another example, the wake screens are the same screen. For another example, the enrollment process is used to enroll fingerprints that are checked for matches throughout the processes. For another example, the indications of the location of the fingerprint sensor, biometric sensor, touch sensor, and button are the same indicators throughout the processes. For brevity, these details are not repeated below.

FIG. 11 is a flow diagram illustrating a method for displaying a user interface for indicating a location of the biometric sensor using a computer system (e.g., 100, 300, 500, 600) in accordance with some embodiments. Method 1100 is performed at a computer system (e.g., 100, 300, 500, 600) with a biometric sensor (e.g., a fingerprint sensor such as fingerprint sensor combined with, integrated into, or embedded in a mechanical button or a solid-state button, a face identification sensor, or an iris identification sensor). The computer system (e.g., 600) is in communication with a display generation component (e.g., 610) and one or more input devices (e.g., button 602, a touch-sensitive surface). Some operations in method 1100 are, optionally, combined, the orders of some operations are, optionally, changed, and some operations are, optionally, omitted.

As described below, method 1100 provides an intuitive way for indicating a location of the biometric sensor. The method reduces the cognitive burden on a user, thereby creating a more efficient human-machine interface. For battery-operated computing devices, disambiguating an input on a touch sensor integrated into a button may allow for faster and more efficient use of an electronic device, and conserves power and increases the time between battery charges.

The computer system (e.g., 600) receives (1102), via one or more input devices, a request (e.g., 950*a*) to initiate a process for enrolling a biometric feature, wherein the enrollment will be performed using biometric information collected via the biometric sensor.

In response (1104) to receiving the request to initiate the process for enrolling the biometric feature and in accordance with (1106) a determination that the computer system (e.g., 600) is in a first orientation, the computer system (e.g., 600) displays (1108), via the display generation component, a first user interface element (e.g., 924, 926) (e.g., image, video, and/or text) indicating a location of the biometric sensor on the computer system (e.g., 600) (without displaying a second user interface element).

In response (1104) to receiving the request to initiate the process for enrolling the biometric feature and in accordance with (1110) a determination that the computer system (e.g., 600) is in a second orientation, the computer system (e.g., 600) displays, via the display generation component, a second user interface element (e.g., 924, 926) (e.g., image, video, and/or text) indicating a location of the biometric sensor on the computer system (without displaying the first user interface element), wherein the second user interface element is different from the first user interface element. In some embodiments, the first orientation is different from the second orientation.

Displaying different user interface elements that indicate a location of the biometric sensor based on the detected orientation of the computer system provides the user with visual feedback about how the system is detecting the current orientation of the system, which is particularly relevant when the system can be operated in numerous orientations. In addition, the different user interface elements can provide the user with feedback about the location of the biometric sensor, thereby enabling the user to more quickly access the biometric sensor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the first user interface element includes a representation (e.g., 924*a*, 926*a*) of the computer system (e.g., 600) in the first orientation (e.g., in a portrait orientation).

Displaying a representation of the computer system in the first orientation as part of the first user interface element provides the user with visual feedback about how the system is detecting the current orientation of the system, which is particularly relevant when the system can be operated in numerous orientations. In addition, the different user interface elements can provide the user with feedback about the location of the biometric sensor, thereby enabling the user to more quickly access the biometric sensor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the second user interface element includes a representation (e.g., 924*a*, 926*a*) of the computer system in the second orientation (e.g., in a landscape orientation).

Displaying a representation of the computer system in the second orientation as part of the second user interface element provides the user with visual feedback about how the system is detecting the current orientation of the system, which is particularly relevant when the system can be operated in numerous orientations. In addition, the different user interface elements can provide the user with feedback about the location of the biometric sensor, thereby enabling the user to more quickly access the biometric sensor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to receiving the request (e.g., 950*a*) to initiate the process for enrolling the biometric feature, the computer system (e.g., 600) collects (e.g., via input 950*c*, 950*d*), via the biometric sensor (e.g., 602), biometric information (e.g., multiple scans of the biometric feature) corresponding to the biometric feature (e.g., a first finger, or a first iris). In some embodiments, the computer system (e.g., 600) enrolls the biometric feature (e.g., for use in later authentication operations) using the biometric information collected using the biometric sensor.

Collecting biometric information and enrolling the biometric feature enables the computer system to biometrically authenticate the user in the future, thereby increasing the ease of use and security of the computer system.

In some embodiments, after (e.g., in response to) successfully enrolling the biometric feature, the computer system (e.g., 600) prompts (e.g., 936) a user to enroll a second biometric feature (e.g., a second finger different from the first finger, or a second iris different from the first iris) that is different from the biometric feature.

Prompting the user to enroll a second biometric feature after successfully enrolling a first biometric feature provides the user with feedback that an additional biometric feature can be enrolled. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to enrolling the biometric feature and prior to enrolling the second biometric feature, the computer system (e.g., 600) prompts (e.g., 936) (e.g., displaying, via the display generation component, and/or concurrently with the prompt to enroll the second biometric feature) the user to rotate the computer system from a first orientation to a second orientation (e.g., to rotate the computer system from a portrait orientation to a landscape orientation, to rotate the computer system from a landscape orientation to a portrait orientation, and/or to rotate the computer system to a different predetermined orientation such as rotating the device by approximately 90 degrees).

Prompting the user to rotate the computer system between enrollments of different biometric features provides the user with feedback that the computer system can be used in different orientations and enables the computer system to collect the different biometric information with the system in various orientations. For example, collecting biometric information with the computer system in various orientations better enables the system to authenticate input when the input is provided with the system at those various orientations, thereby increasing the security and ease of usability of the system.

In some embodiments, the computer system (e.g., 600) detects a change in the orientation of the computer system during the process for enrolling the biometric feature. In response to detecting the change in the orientation (e.g., as in FIGS. 9A-9D) of the computer system (e.g., 600): in accordance with a determination that the computer system has changed to the first orientation, the computer system (e.g., 600) displays, via the display generation component, the first user interface element (e.g., 924, 926) (e.g., image, video, and/or text) indicating a location of the biometric sensor on the computer system without displaying the second user interface element; and in accordance with a determination that the computer system has changed to the second orientation, the computer system (e.g., 600) displays, via the display generation component, the second user interface element (e.g., 924, 926) (e.g., image, video, and/or text) indicating a location of the biometric sensor on the computer system without displaying the first user interface element, wherein the second user interface element is different from the first user interface element.

Changing the user interface element that indicates the location of the biometric sensor when the orientation of the system changes provides the user with visual feedback about where the biometric sensor is located with respect to the new orientation, which is particularly relevant when the system can be operated in numerous orientations, and which would otherwise make it difficult for the user to quickly assess the location of the biometric sensor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) displays in a portion of the user interface that is displayed at or near a portion of the device that includes the biometric sensor (e.g., adjacent to the biometric sensor, proximate to the biometric sensor, and/or closer to the biometric sensor than to other portions of the device that do not include the biometric sensor), via the display generation component, a visual indication (e.g., 640*a*) of a location of the biometric sensor.

In some embodiments, the visual indication of the location of the biometric sensor that is displayed adjacent to the biometric sensor is concurrently displayed with the first or second user interface element (e.g., image, video, and/or text) indicating a location of the biometric sensor. In some embodiments, the visual indication of the location of the biometric sensor is different from the first and second user interface element. In some embodiments, the visual indication of the location of the biometric sensor includes two components, a textual component and a non-textual component. In some embodiments, changing the visual indication of the location of the biometric sensor includes rotating the textual component without rotating the non-textual component.

Displaying the visual indication of the location of the biometric sensor enables the user to more quickly access the biometric sensor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, an orientation of the computer system is determined and the user interface is displayed based on the determined orientation. In order to display, via the display generation component, the visual indication (of a location of the biometric sensor) at a location that corresponds to where the biometric sensor is located with respect to the housing of the computer system, the computer system displays the visual indication (of a location of the biometric sensor) at different portions of the user interface based on the current orientation of the computer system.

In some embodiments, the visual indication (of a location of the biometric sensor) is displayed at a location that is proximate to a first portion of the housing of the computer system, including: in accordance with a determination that the user interface of the computer system is in a first orientation relative to the biometric sensor, displaying the visual indication at a first location in the user interface that is proximate to the first portion of the housing of the computer system; and in accordance with a determination that the user interface of the electronic device is in a second orientation (that is different from the first orientation) relative to the biometric sensor, displaying the visual indication at a second location in the user interface that is proximate to the first portion of the housing of the electronic device. In some embodiments, the first portion of the housing is the biometric sensor and the first location (while displaying the user interface in the first orientation) is a distance from the biometric sensor and the second location (while displaying the user interface in the second orientation) is the same distance from the biometric sensor. In some embodiments, transitioning from the first orientation to the second orientation results in the location of the visual indication changing with respect to the user interface in which it is displayed, but is maintained at the same location (and optionally rotated and/or otherwise visually changed) with respect to the housing of the computer system (e.g., for a display, some overlapping pixels are used to display the visual indication while in the first and second orientation). In some embodiments, the visual indication being displayed proximate to the first portion (e.g., where the biometric sensor is located) of the housing of the computer system includes displaying the visual indication along an edge of the displayable area, the edge being the closest edge (from among a plurality of edges of the displayable area) to the first portion of the housing. In some embodiments, being displayed along the edge of the displayable area includes being displayed closer to the edge of the displayable area than to a center of the displayable area and/or no other visual objects being displayed between the visual indication and a point on the edge of the displayable area, the point being the point on the edge that is closest to the visual indication.

In some embodiments, in accordance with a determination that the user interface of the computer system is in a third orientation relative to the biometric sensor, the user interface in the third orientation having a first top side and a first bottom side, displaying the visual indication at a location proximate to the first top side of the user interface in the third orientation; and in accordance with a determination that the user interface of the computer system is in a fourth orientation (e.g., an approximately 180 degree change or a 180 degree change) relative to the biometric sensor, the user interface in the fourth orientation having a second top side and a second bottom side, displaying the visual indication at a location that is proximate to the second bottom side of the user interface in the fourth orientation (and not the second top side), the third orientation being different from the fourth orientation.

In some embodiments, the visual indication of the location of the biometric sensor is displayed in response to a determination that the computer system (e.g., 600) is ready to collect biometric information using the biometric sensor.

Displaying the visual indication of the location of the biometric sensor once the computer system is ready to collect biometric information using the biometric sensor provides the user with feedback that the system and biometric sensor are enabled and ready. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system is configured to rotate user interfaces for display based on at least four different orientations of the computer system. In some embodiments, in response to receiving the request to initiate the process for enrolling the biometric feature: in accordance with a determination that the computer system is in a third orientation (e.g., as shown in the orientations of FIG. 9P), the computer system (e.g., 600) displays, via the display generation component, the first user interface element (e.g., image, video, and/or text) indicating a location of the biometric sensor on the computer system (without displaying a second user interface element), wherein the third orientation is different from the first orientation, the second orientation, and the fourth orientation; and in accordance with a determination that the computer system is in a second orientation (e.g., as shown in the orientations of FIG. 9P), the computer system (e.g., 600) displays, via the display generation component, a fourth user interface element (e.g., image, video, and/or text) indicating a location of the biometric sensor on the computer system (without displaying the first user interface element), wherein the fourth orientation is different from the first orientation, the second orientation, and the third orientation.

Providing the user interface element for two distinct orientations (e.g., two portrait orientations) and a different user interface element for two other distinct (e.g., two landscape orientations) enables the computer system to provide feedback about the orientation of the computer system without requiring separate user interface elements, such as videos, to be stored or access by the computer system for each orientation, thereby reducing the data, storage, and power consumption requirements of the computer system.

In some embodiments, the computer system switches among four orientations (e.g., first portrait, second portrait, first landscape, and second landscape) and a first visual indication of the orientation of the computer system is used for two orientations (e.g., first portrait, and second portrait) of the four orientations and a second visual indication of the orientation of the computer system is used for two orientations (e.g., first landscape, and second landscape) of the four orientations.

In some embodiments, the computer system switches among four orientations (e.g., first portrait, second portrait, first landscape, and second landscape) and a different visual indication of the orientation is used for each of the four orientations. For example, a first visual indication of the orientation of the computer system is used for a first orientation (e.g., first portrait) of the four orientations, a second visual indication of the orientation of the computer system is used for a second orientation (e.g., second portrait) of the four orientations, a third visual indication of the orientation of the computer system is used for a third orientation (e.g., first landscape) of the four orientations, and a fourth visual indication of the orientation of the computer system is used for a fourth orientation (e.g., second landscape) of the four orientations.

In some embodiments, the biometric sensor is a fingerprint sensor configured to detect fingerprint information from fingers that touch the fingerprint sensor. In some embodiments, the biometric information corresponds to fingerprint information. A fingerprint sensor enables the computer system to collect fingerprint information and authenticate the user using fingerprint matching, thereby increasing the security of the computer system.

In some embodiments, the biometric sensor is a face recognition sensor configured to detect facial attributes of faces detected in a field of view of the face recognition sensor (e.g., as shown in the user interfaces of FIGS. 6AV-AX). In some embodiments, the biometric information corresponds to facial attribute information. A face recognition sensor enables the computer system to collect facial attribute information and authenticate the user using facial matching, thereby increasing the security of the computer system.

In some embodiments, the biometric sensor is an iris recognition sensor configured to detect iris attributes of irises detected in a field of view of the iris recognition sensor (e.g., similar the user interfaces shown in FIGS. 6AV-AX). In some embodiments, the biometric information corresponds to iris information. An iris sensor enables the computer system to collect iris information and authenticate the user using iris matching, thereby increasing the security of the computer system.

Note that details of the processes described above with respect to method 1100 (e.g., FIG. 11) are also applicable in an analogous manner to the methods described below/above. For example, methods 700, 800, 1100, and 1200 optionally include one or more of the characteristics of the various methods described above with reference to method 1100. For example, the computer systems are the same and the touch sensor, the biometric sensor, and the fingerprint sensor are optionally the same component and are optionally integrated into the button. For another example, the wake screens are the same screen. For another example, the enrollment process is used to enroll fingerprints that are checked for matches throughout the processes. For another example, the indications of the location of the fingerprint sensor, biometric sensor, touch sensor, and button are the same indicators throughout the processes. For brevity, these details are not repeated below.

FIG. 12 is a flow diagram illustrating a method for displaying a graphical indication of a location of a fingerprint sensor using a computer system (e.g., 100, 300, 500, 600) in accordance with some embodiments. Method 1200 is performed at a computer system (e.g., 100, 300, 500, 600) with a fingerprint sensor (e.g., a fingerprint sensor that is combined with, integrated into, or embedded in a mechanical button (e.g., 602) or a solid-state button (e.g., 602)). The computer system (e.g., 600) is in communication with a display generation component (e.g., 610) and one or more input devices (e.g., input devices that are separate from the fingerprint sensor).

Some operations in method 1200 are, optionally, combined, the orders of some operations are, optionally, changed, and some operations are, optionally, omitted.

As described below, method 1200 provides an intuitive way for displaying a graphical indication of a location of a fingerprint sensor. The method reduces the cognitive burden on a user, thereby creating a more efficient human-machine interface. For battery-operated computing devices, disambiguating an input on a touch sensor integrated into a button may allow for faster and more efficient use of an electronic device, and conserves power and increases the time between battery charges.

The computer system (e.g., 600) receives (1202), via the one or more input devices, a request (e.g., 950k, 950m, 950o, 950q) to perform an operation.

In response (1204) to receiving the request to perform the operation while the fingerprint sensor is available to receive fingerprint input but a finger is not currently detected on the fingerprint sensor and in accordance with (1206) a determination that the operation requires authentication and that the computer system (e.g., 600) is in a first orientation (and, optionally, independent of an error condition that corresponds to the orientation of the computer system and independent of an error condition that corresponds to a biometric sensor (e.g., the fingerprint sensor) being (e.g., improperly) covered), the computer system (e.g., 600) displays (1208), via the display generation component, a graphical indication (e.g., 640a) of a location of the fingerprint sensor in a first portion of the user interface (e.g., without displaying the graphical indication in the second portion of the user interface; and/or without performing the operation).

In response (1204) to receiving the request to perform the operation while the fingerprint sensor is available to receive fingerprint input but a finger is not currently detected on the fingerprint sensor and in accordance with (1210) a determination that the operation requires authentication and that the computer system (e.g., 600) is in a second orientation that is different from the first orientation (and, optionally, independent of an error condition that corresponds to the orientation of the computer system and independent of an error condition that corresponds to a biometric sensor (e.g., the fingerprint sensor) being (e.g., improperly) covered), the computer system (e.g., 600) displays (1212), via the display generation component, a graphical indication (e.g., 640a) of a location of the fingerprint sensor in a second portion of the user interface that is different from the first portion of the user interface (e.g., without displaying the graphical indication in the first portion of the user interface; and/or without performing the operation).

Providing graphical indications of a location of a fingerprint sensor in different portions of the user interface based on the orientation of the computer system provides the user with visual feedback about the orientation that the computer system is currently detecting. The graphical indication also provides feedback about the location of the fingerprint sensor, thereby enabling the user to more easily and efficiently access the fingerprint sensor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the graphical indication (e.g., 640a) (of a location of the fingerprint sensor) is displayed at the same location, via the display generation component, as the threshold indicator (e.g., 640b). In some embodiments, while a finger is not detected on the fingerprint sensor, the computer system displays the graphical indication of a location of the fingerprint sensor. In response to a finger with a fingerprint that matches an enrolled finger being detected on the fingerprint sensor, the computer system replaces the graphical indication with the threshold indicator, as described above with respect to FIGS. 6A-6AY (e.g., ceases display of the graphical indication and, instead, displays at the same location, the threshold indicator). In some embodiments, changes in orientation of the computer system cause the graphical indication and the threshold indictor to similarly change (to the same new location) with respect to the user interface.

In some embodiments, independent of an error condition that makes biometric authentication using the biometric sensor impossible" (e.g., an orientation of the device or the sensor being covered)

In some embodiments, in response to receiving the request (e.g., 950k, 950m, 950o, 950q) to perform the operation while the fingerprint sensor is available to receive fingerprint input but a finger is not currently detected on the fingerprint sensor and in accordance with a determination that the operation (e.g., as described with respect to FIG. 9U) does not require authentication (e.g., a match of biometric input to an enrolled biometric feature), the computer system (e.g., 600) performs the operation (e.g., without displaying the graphical indication of a location of the fingerprint sensor and/or without checking for authentication).

Performing an operation that does not require authentication when a finger is not detected on the fingerprint sensor enables the computer system to avoid unnecessary checks for authentication and without prompting the user to provide input. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) includes a housing (e.g., 612) with a plurality of sides, wherein the display generation component (e.g., 610) is arranged on a first side of the housing and the fingerprint sensor (e.g., 602) is arrange on a second side of the housing that is adjacent to the first side of the housing.

Displaying a graphical indication of the location of the fingerprint sensor when the fingerprint sensor is arranged on a side of the housing different from the side of the display provides the user with visual feedback about the side on which the fingerprint sensor is arranged, thereby enabling the user to more quickly access the fingerprint sensor.

In some embodiments, the fingerprint sensor is integrated into a button (e.g., 602) of the computer system (e.g., a mechanical button or a solid-state button).

Integrating the fingerprint sensor into a button of the computer system enables the computer system to concurrently detect fingerprint information and button activation from a same input (e.g., finger input), thereby reducing the number of requires inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the operation is a password fill operation (e.g., autofill, as shown in FIGS. 9W-9Z). In some embodiments, the request to perform the operation is selection of (e.g., tap on) a username field and/or password field, such as in a webpage or an application. In some embodiments, performing the operating includes filling in the username and/or password.

Using fingerprint authentication to fill a password enables the user to enter the password using a fingerprint input, thereby reducing the number of inputs required and increasing the accuracy of entered passwords. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the operation is a payment operation (e.g., an in-application payment, and/or an NFC payment) (e.g., as shown in FIGS. 9AA-9AE). In some embodiments, the request to perform the operation is selection of a payment user interface object, such as in a webpage or an application. In some embodiments, performing the operating includes transmitting funds.

Using fingerprint authentication to authorize a payment increases the security of the computer system and reduces the need for a user to enter lengthy passwords. Reducing the number of inputs needed to perform an operation enhances the operability of the device and makes the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

In some embodiments, the operation is an application installation operation (e.g., download and installation of an application onto the computer system) (e.g., as shown in FIGS. 9AF-9AH). In some embodiments, the request to perform the operation is selection of (e.g., tap on) an installation user interface object. In some embodiments, performing the operating includes downloading the application and installing the application.

Using fingerprint authentication to authorize an application installation increases the security of the computer system and reduces the need for a user to enter lengthy passwords. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the operation is an unlock operation (e.g., transitioning the computer system from a locked state to an unlocked state) (e.g., as shown in FIGS. 9Q-9U and/or as described with respect to FIGS. 6A-6AY). In some embodiments, the request to perform the operation is selection of (e.g., tap on) a notification or an icon of an application. In some embodiments, performing the operating includes unlocking the computer system.

Using fingerprint authentication to authorize device unlock increases the security of the computer system and reduces the need for a user to enter lengthy passwords. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the fingerprint sensor is available to receive fingerprint input for an operation that requires authentication but a finger is not currently detected on the fingerprint sensor, the computer system (e.g., 600) detects a change in the orientation of the computer system. In some embodiments, in accordance with a determination that the computer system (e.g., 600) has changed to the first orientation, the computer system (e.g., 600) displays (e.g., as shown in FIG. 9Y, 9AC, 9AG), via the display generation component, the graphical indication of a location of the fingerprint sensor in the first portion of the user interface (e.g., by moving the graphical indication, without displaying the graphical indication in the second portion of the user interface; and/or without performing the operation). In some embodiments, in accordance with a determination that the computer system (e.g., 600) has changed to the second orientation, the computer system (e.g., 600) displays (e.g., as shown in FIG. 9Y, 9AC, 9AG), via the display generation component, the graphical indication of a location of the fingerprint sensor in the second portion of the user interface (e.g., by moving the graphical indication, without displaying the graphical indication in the first portion of the user interface; and/or without performing the operation).

Changing the location of the graphical indication of the location of the fingerprint sensor when the computer system detects a change in orientation provides the user with visual feedback about the orientation that the computer system is currently detecting. The graphical indication also provides feedback about the location of the fingerprint sensor, thereby enabling the user to more easily and efficiently access the fingerprint sensor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, when the orientation of the computer system changes, the computer system rotates portions of the user interface (and/or the full user interview) relative to the housing of the computer system. In some embodiments, the graphical indication of a location of the fingerprint sensor will be displayed, via the display generation component, in different portions of the user interface (e.g., different corners of the user interfaces) for different user interfaces corresponding to different computer system orientations because the fingerprint sensor has a different position relative to the user interface for the different orientations.

In some embodiments, while displaying the graphical indication of a location of the fingerprint sensor, the computer system (e.g., 600) receives input (e.g., 950*l*, 950*p*, 950*r*, 950*t*) directed to the fingerprint sensor. In response to receiving the input directed to the fingerprint sensor: in accordance with a determination that the input includes fingerprint information detected by the fingerprint sensor that matches one or more enrolled fingers (e.g., a fingerprint of the finger matches an enrolled fingerprint, thereby authenticating the user), the computer system (e.g., 600) performs the operation (e.g., as shown in FIGS. 9V, 9AA, 9AE); and in accordance with a determination that the input does not include fingerprint information detected by the fingerprint sensor that matches one or more enrolled fingers, the computer system (e.g., 600) forgoes performing the operation (as shown in FIG. 9AH).

Performing the operation by authenticating the user using fingerprint authentication increases the security of the computer system by preventing unauthorized users from performing operations that require authentication.

In some embodiments, the computer system includes a button (e.g., 602) and the fingerprint sensor is integrated into the button (e.g., 602). In some embodiments, while displaying the graphical indication (e.g., 640*a*) of a location of the fingerprint sensor, the computer system (e.g., 600) receives input directed to the fingerprint sensor (or button). In response to receiving the input directed to the fingerprint sensor and in accordance with a determination that the input includes activation (e.g., press input) of the button (e.g., independent of whether the fingerprint matches an enrolled fingerprint): the computer system (e.g., 600) transitions the display generation component to the low power state (e.g., off, as shown in FIG. 6V), from a higher (e.g., standard) power state (e.g., ceases displaying the wake screen, ceases displaying the UI 970, UI of FIG. 9AD, UI of FIG. 9AH) and locks the computer system (e.g., without performing the operation).

Transitioning the display to the low power state conserves the energy of the computer system and locking the computer system provides additional security for the computer system. Additionally, detecting activation of the button enables the computer system to transition to the low power state and transition the computer system to the locked state without unintentionally authorizing the operation to be performed. Transitioning to the low power state and locking the computer system based on the input directed to the fingerprint sensor reduces the number of inputs required to perform the two features. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system obtains, via the fingerprint sensor, fingerprint information (e.g., without detecting a activation (e.g., press) of the button) of the input directed to the fingerprint sensor. In some embodiments, in response to receiving the input directed to the fingerprint sensor: in accordance with a determination that the operation requires authentication and that the fingerprint information matches an enrolled finger, the computer system performs the operation (e.g., when activation of the button has not been detected and/or independent of whether activation of the button has been detected). In some embodiments, in response to receiving the input directed to the fingerprint sensor: in accordance with a determination that the operation requires authentication and that the fingerprint information does not match an enrolled finger, the computer system foregoes performing the operation (e.g., when activation of the button has not been detected and/or independent of whether activation of the button has been detected). In some embodiments, detection of activation (e.g., pressing) of the button is not required to authorize operations.

In some embodiments, in response to receiving the input directed to the fingerprint sensor, the computer systems waits a predetermined amount of time to allow for detecting of activation of (e.g., pressing) the button before performing the operation. Thus, in some embodiments, pressing of the button (e.g., during the predetermined time and/or independent of whether the fingerprint information matches an enrolled finger) causes the computer system to forgo performing the operation.

Note that details of the processes described above with respect to method 1200 (e.g., FIG. 12) are also applicable in an analogous manner to the methods described above. For example, methods 700, 800, 1000, and 1100 optionally includes one or more of the characteristics of the various methods described above with reference to method 1200. For example, the computer systems are the same and the touch sensor, the biometric sensor, and the fingerprint sensor are optionally the same component and are optionally integrated into the button. For another example, the wake screens are the same screen. For another example, the enrollment process is used to enroll fingerprints that are checked for matches throughout the processes. For another example, the indications of the location of the fingerprint sensor, biometric sensor, touch sensor, and button are the same indicators throughout the processes. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve user input and authorization of operations. The present disclosure contemplates that in some instances, this gathered data may include personal information data that uniquely identifies or can be used to contact or locate a specific person. Such personal information data can include fingerprint information, demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide more efficient device access.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of fingerprint authorization, the present technology can be configured to allow users to select to "opt in" or "opt out" of participation in the collection of fingerprint information during device setup or anytime thereafter. In addition to providing "opt in" and "opt out" options, the present disclosure contemplates providing notifications relating to the access or use of personal information.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer system, comprising:
a biometric sensor;
a display generation component;
one or more processors; and
memory storing one or more programs configured to be executed by the one or more processors, the one or more programs including instructions for:
during a setup procedure for configuring one or more functions of the computer system:
displaying, via the display generation component, a user interface for enrolling a biometric feature;
while displaying the user interface for enrolling the biometric feature, receiving one or more enrollment inputs via the biometric sensor;
in response to receiving the one or more enrollment inputs, enrolling a first biometric feature;
after successfully enrolling the first biometric feature:
prompting a user to enroll a second biometric feature that is different from the first biometric feature; and
concurrently displaying with the prompt to enroll the second biometric feature, via the display generation component, a respective option to continue the setup procedure without enrolling the second biometric feature;
while concurrently displaying the prompt to enroll the second biometric feature and the respective option to continue the setup procedure without enrolling the second biometric feature, receiving user input corresponding to selection of the respective option to continue the setup procedure without enrolling the second biometric feature; and
in response to receiving the user input corresponding to selection of the respective option to continue the setup procedure without enrolling the second biometric feature;

ceasing to display the prompt to enroll the second biometric feature; and continuing with the setup procedure without enrolling the second biometric feature.

2. The computer system of claim 1, wherein the setup procedure for configuring one or more functions of the computer system is part of a setup procedure for configuring the computer system for use.

3. The computer system of claim 1, the one or more programs further including instructions for:

subsequent to enrolling the first biometric feature and prior to enrolling the second biometric feature, prompting the user to rotate the computer system from a first orientation to a second orientation that is different from the first orientation.

4. The computer system of claim 3, wherein prompting the user to rotate the computer system includes displaying a moving representation of the computer system rotating from the first orientation to the second orientation that is different from the first orientation.

5. The computer system of claim 1, wherein the user interface for enrolling the biometric feature includes a visual indication of a location of the biometric sensor of the computer system.

6. The computer system of claim 5, the one or more programs further including instructions for:

while displaying, via the display generation component, the user interface for enrolling the biometric feature with the visual indication of the location of the biometric sensor, detecting a change in an orientation of the computer system; and in response to detecting the change in the orientation of the computer system, changing the visual indication of the location of the biometric sensor.

7. The computer system of claim 1, wherein the user interface for enrolling the biometric feature includes a visual indication of an orientation of the computer system.

8. The computer system of claim 7, the one or more programs further including instructions for:

while displaying, via the display generation component, the user interface for enrolling the biometric feature with the visual indication of the orientation of the computer system, detecting a change in the orientation of the computer system; and in response to detecting the change in the orientation of the computer system, changing the visual indication of the orientation of the computer system.

9. A non-transitory computer-readable storage medium storing one or more programs configured to be executed by one or more processors of a computer system with a biometric sensor, wherein the computer system is in communication with a display generation component, the one or more programs including instructions for:

during a setup procedure for configuring one or more functions of the computer system:

displaying, via the display generation component, a user interface for enrolling a biometric feature;

while displaying the user interface for enrolling the biometric feature, receiving one or more enrollment inputs via the biometric sensor;

in response to receiving the one or more enrollment inputs, enrolling a first biometric feature;

after successfully enrolling the first biometric feature:

prompting a user to enroll a second biometric feature that is different from the first biometric feature; and concurrently displaying with the prompt to enroll the second biometric feature, via the display generation component a respective option to continue the setup procedure without enrolling the second biometric feature;

while concurrently displaying the prompt to enroll the second biometric feature and the respective option to continue the setup procedure without enrolling the second biometric feature, receiving user input corresponding to selection of the respective option to continue the setup procedure without enrolling the second biometric feature; and in response to receiving the user input corresponding to selection of the respective caption to continue the setup procedure without enrolling the second biometric feature:

ceasing to display the prompt to enroll the second biometric feature; and continuing with the setup procedure without enrolling the second biometric feature.

10. The non-transitory computer-readable storage medium of claim 9, wherein the setup procedure for configuring one or more functions of the computer system is part of a setup procedure for configuring the computer system for use.

11. The non-transitory computer-readable storage medium of claim 9, the one or more programs further including instructions for:

subsequent to enrolling the first biometric feature and prior to enrolling the second biometric feature, prompting the user to rotate the computer system from a first orientation to a second orientation that is different from the first orientation.

12. The non-transitory computer-readable storage medium of claim 11, wherein prompting the user to rotate the computer system includes displaying a moving representation of the computer system rotating from the first orientation to the second orientation that is different from the first orientation.

13. The non-transitory computer-readable storage medium of claim 9, wherein the user interface for enrolling the biometric feature includes a visual indication of a location of the biometric sensor of the computer system.

14. The non-transitory computer-readable storage medium of claim 13, the one or more programs further including instructions for:

while displaying, via the display generation component, the user interface for enrolling the biometric feature with the visual indication of the location of the biometric sensor, detecting a change in an orientation of the computer system; and in response to detecting the change in the orientation of the computer system, changing the visual indication of the location of the biometric sensor.

15. The non-transitory computer-readable storage medium of claim 9, wherein the user interface for enrolling the biometric feature includes a visual indication of an orientation of the computer system.

16. The non-transitory computer-readable storage medium of claim 15, the one or more programs further including instructions for:

while displaying, via the display generation component, the user interface for enrolling the biometric feature with the visual indication of the orientation of the computer system, detecting a change in the orientation of the computer system; and in response to detecting the change in the orientation of the computer system, changing the visual indication of the orientation of the computer system.

17. A method, comprising:
at a computer system with a biometric sensor, wherein the computer system is in communication with a display generation component:
during a setup procedure for configuring one or more functions of the computer system:
displaying, via the display generation component, a user interface for enrolling a biometric feature;
while displaying the user interface for enrolling the biometric feature, receiving one or more enrollment inputs via the biometric sensor;
in response to receiving the one or more enrollment inputs, enrolling a first biometric feature;
after successfully enrolling the first biometric feature:
prompting a user to enroll a second biometric feature that is different from the first biometric feature; and
concurrently displaying with the prompt to enroll the second biometric feature, via the display generation component, a respective option to continue the setup procedure without enrolling the second biometric feature;
while concurrently displaying the prompt to enroll the second biometric feature and the respective option to continue the setup procedure without enrolling the second biometric feature, receiving user input corresponding to selection of the respective option to continue the setup procedure without enrolling the second biometric feature; and
in response to receiving the user input corresponding to selection of the respective option to continue the setup procedure without enrolling the second biometric feature:
ceasing to display the prompt to enroll the second biometric feature; and
continuing with the setup procedure without enrolling the second biometric feature.

18. The method of claim 17, wherein the setup procedure for configuring one or more functions of the computer system is part of a setup procedure for configuring the computer system for use.

19. The method of claim 17, further comprising:
subsequent to enrolling the first biometric feature and prior to enrolling the second biometric feature, prompting the user to rotate the computer system from a first orientation to a second orientation that is different from the first orientation.

20. The method of claim 19, wherein prompting the user to rotate the computer system includes displaying a moving representation of the computer system rotating from the first orientation to the second orientation that is different from the first orientation.

21. The method of claim 17, wherein the user interface for enrolling the biometric feature includes a visual indication of a location of the biometric sensor of the computer system.

22. The method of claim 21, further comprising:
while displaying, via the display generation component, the user interface for enrolling the biometric feature with the visual indication of the location of the biometric sensor, detecting a change in an orientation of the computer system; and
in response to detecting the change in the orientation of the computer system, changing the visual indication of the location of the biometric sensor.

23. The method of claim 17, wherein the user interface for enrolling the biometric feature includes a visual indication of an orientation of the computer system.

24. The method of claim 23, further comprising:
while displaying, via the display generation component, the user interface for enrolling the biometric feature with the visual indication of the orientation of the computer system, detecting a change in the orientation of the computer system; and
in response to detecting the change in the orientation of the computer system, changing the visual indication of the orientation of the computer system.

* * * * *

UNITED STATES PATENT AND TRADEMARK OFFICE
CERTIFICATE OF CORRECTION

| | | |
|---|---|---|
| PATENT NO. | : 11,703,996 B2 | Page 1 of 1 |
| APPLICATION NO. | : 17/826808 | |
| DATED | : July 18, 2023 | |
| INVENTOR(S) | : Marcel Van Os et al. | |

It is certified that error appears in the above-identified patent and that said Letters Patent is hereby corrected as shown below:

In the Claims

Column 92, Line 67, Claim 1, delete "feature;" and insert --feature:--.

Column 94, Line 3, Claim 9, delete "component" and insert --component,--.

Column 94, Line 15, Claim 9, delete "caption" and insert --option--.

Signed and Sealed this
Third Day of September, 2024

Katherine Kelly Vidal
*Director of the United States Patent and Trademark Office*